US008786559B2

(12) United States Patent  (10) Patent No.: US 8,786,559 B2
Hogan                      (45) Date of Patent:     Jul. 22, 2014

(54) DEVICE, METHOD, AND GRAPHICAL USER INTERFACE FOR MANIPULATING TABLES USING MULTI-CONTACT GESTURES

(75) Inventor: Edward P. A. Hogan, Pittsburgh, PA (US)

(73) Assignee: Apple Inc., Cupertino, CA (US)

( * ) Notice: Subject to any disclaimer, the term of this patent is extended or adjusted under 35 U.S.C. 154(b) by 805 days.

(21) Appl. No.: 12/789,425

(22) Filed: May 27, 2010

(65) Prior Publication Data

US 2011/0163968 A1    Jul. 7, 2011

Related U.S. Application Data

(60) Provisional application No. 61/292,854, filed on Jan. 6, 2010.

(51) Int. Cl.
*G06F 3/041* (2006.01)

(52) U.S. Cl.
USPC ........................................... 345/173; 715/863

(58) Field of Classification Search
USPC ................... 345/173–181; 715/863
See application file for complete search history.

(56) References Cited

U.S. PATENT DOCUMENTS

| 5,252,951 | A |   | 10/1993 | Tannenbaum et al. |
|---|---|---|---|---|
| 5,347,295 | A |   | 9/1994 | Agulnick et al. |
| 5,502,803 | A |   | 3/1996 | Yoshida et al. |
| 5,677,710 | A |   | 10/1997 | Thompson-Rohrlich |
| 5,717,939 | A | * | 2/1998 | Bricklin et al. ............... 715/212 |
| 5,848,187 | A |   | 12/1998 | Bricklin et al. |
| 6,380,931 | B1 | * | 4/2002 | Gillespie et al. .............. 345/173 |
| 6,525,749 | B1 |   | 2/2003 | Moran et al. |
| 7,479,949 | B2 |   | 1/2009 | Jobs et al. |
| 7,536,656 | B2 |   | 5/2009 | Hullender et al. |
| 7,577,925 | B2 |   | 8/2009 | Zotov et al. |

(Continued)

FOREIGN PATENT DOCUMENTS

DE    20 2007 014957    12/2007
EP       0 840 200 A2    5/1998

(Continued)

OTHER PUBLICATIONS

European Search Report and Written Opinion dated Jul. 8, 2011, in European Patent Application No. 11150220.9, which corresponds to U.S. Appl. No. 12/789,425.

(Continued)

*Primary Examiner* — Christopher E Leiby
(74) *Attorney, Agent, or Firm* — Morrison & Foerster LLP

(57) ABSTRACT

An electronic device having a display and a touch-sensitive surface, displays a table having a plurality of rows, a plurality of columns, and a plurality of cells. The device detects a gesture on the touch-sensitive surface that includes movement of one or more of a first contact and a second contact. When the detected gesture is a pinch gesture at a location that corresponds to one or more respective columns in the table and has a component that is perpendicular to the one or more respective columns, the device decreases the width of the one or more respective columns. When the detected gesture is a de-pinch gesture at a location that corresponds to one or more respective columns in the table and has a component that is perpendicular to the one or more respective columns, the device increases the width of the one or more respective columns.

22 Claims, 71 Drawing Sheets

(56) References Cited

U.S. PATENT DOCUMENTS

| | | |
|---|---|---|
| 7,627,834 B2 | 12/2009 | Rimas Ribikauskas et al. |
| 7,864,195 B2 | 1/2011 | Rimas et al. |
| 8,195,641 B2 | 6/2012 | Rucker et al. |
| 8,286,101 B2 * | 10/2012 | Kupka ......................... 715/863 |
| 2002/0018051 A1 | 2/2002 | Singh |
| 2005/0052427 A1 | 3/2005 | Wu et al. |
| 2005/0120293 A1 | 6/2005 | Benhase et al. |
| 2006/0123336 A1 | 6/2006 | Altman et al. |
| 2006/0125803 A1 | 6/2006 | Westerman et al. |
| 2006/0150078 A1 * | 7/2006 | Brookler et al. .............. 715/509 |
| 2006/0210958 A1 | 9/2006 | Rimas-Ribikauskas et al. |
| 2007/0050697 A1 | 3/2007 | Lewis-Bowen et al. |
| 2008/0036743 A1 | 2/2008 | Westerman et al. |
| 2008/0165141 A1 | 7/2008 | Christie |
| 2008/0165149 A1 | 7/2008 | Platzer et al. |
| 2008/0168403 A1 | 7/2008 | Westerman et al. |
| 2008/0168405 A1 | 7/2008 | Tolmasky et al. |
| 2008/0297482 A1 | 12/2008 | Weiss |
| 2008/0309632 A1 | 12/2008 | Westerman et al. |
| 2009/0044139 A1 | 2/2009 | Shin et al. |
| 2009/0083614 A1 * | 3/2009 | Wedekind ..................... 715/217 |
| 2009/0125848 A1 | 5/2009 | Keohane et al. |
| 2009/0174675 A1 * | 7/2009 | Gillespie et al. .............. 345/173 |
| 2009/0228792 A1 | 9/2009 | van Os et al. |
| 2009/0284479 A1 | 11/2009 | Dennis et al. |
| 2009/0327976 A1 | 12/2009 | Williamson et al. |
| 2010/0031203 A1 | 2/2010 | Morris et al. |
| 2010/0077354 A1 | 3/2010 | Russo |
| 2010/0103124 A1 * | 4/2010 | Kruzeniski et al. ............ 345/173 |
| 2010/0162181 A1 * | 6/2010 | Shiplacoff et al. ............ 715/863 |
| 2010/0289752 A1 * | 11/2010 | Birkler .......................... 345/173 |
| 2011/0231796 A1 | 9/2011 | Vigil |
| 2012/0013539 A1 | 1/2012 | Hogan et al. |

FOREIGN PATENT DOCUMENTS

| | | |
|---|---|---|
| EP | 1 615 109 A2 | 1/2006 |
| EP | 1 983 416 A1 | 10/2008 |
| WO | WO 2007/037806 A1 | 4/2007 |

OTHER PUBLICATIONS

Invitation to Pay Additional Fees dated Jul. 13, 2011, in International Patent Application No. PCT/US2010/062588, which corresponds to U.S. Appl. No. 12/789,425.

Palm Inc., "Palm Pre Phone User Guide," Sprint, 2009, pp. 41-51 and 165-175.

SavySoda, "Documents 2 by SavySoda," May 6, 2009, http://web.archive.org/web/20090506223817/http://www.savysoda.com/Documents2/, 5 pages.

International Search Report and Written Opinion dated Dec. 14, 2011, received in U.S. Appl. No. 12/789,425 (Hogan).

Office Action dated Oct. 30, 2012, in Chinese Patent Application No. 201110079357.X, which corresponds to U.S. Appl. No. 12/789,425, 9 pages (Hogan).

Eglowstein, "Reviews: Roundup Applying the Power of the Pen—Nine pen-centric applications, from spreadsheets to note-takers, challenge the notion that pens are just for vertical markets," Byte, Jul. 1993, 5 pages.

Kim, "On-Line Gesture Recognition By Feature Analysis," Computer Vision and Shape Recognition, Feb. 1989, pp. 209-223, Series in Computer Science—vol. 14.

Mantel, K., "Go Figure With A Pen" Datamation, May 1, 1992, 18 pages.

Office Action dated Aug. 9, 2013, in Chinese Patent Application No. 201110079357.X, which corresponds to U.S. Appl. No. 12/789,425, 10 pages (Hogan).

Office Action dated Jun. 13, 2013, in U.S. Appl. No. 12/835,700, 18 pages (Hogan).

Final Office Action dated Nov. 4, 2013, in U.S. Appl. No. 12/835,700, 16 pages (Hogan).

* cited by examiner

DEVICE, METHOD, AND GRAPHICAL USER INTERFACE FOR MANIPULATING TABLES USING MULTI-CONTACT GESTURES

RELATED APPLICATIONS

This application claims priority to U.S. Provisional Application Ser. No. 61/292,854, filed Jan. 6, 2010, entitled "Device, Method, and Graphical User Interface for Manipulating Tables Using Multi-Contact Gestures," which is incorporated herein by reference in its entirety.

TECHNICAL FIELD

This relates generally to electronic devices with touch-sensitive surfaces, including but not limited to electronic devices with touch-sensitive surfaces that provide inputs for manipulating tables using simultaneous multi-contact gestures.

BACKGROUND

The use of touch-sensitive surfaces as input devices for computers and other electronic computing devices has increased significantly in recent years. Exemplary touch-sensitive surfaces include touch pads and touch screen displays. Such surfaces are sometimes used to manipulate tables that are displayed on a display.

Exemplary actions that a user may need to perform on a table include selecting a range of cells in the table, adjusting width of columns, adjusting the height of rows, sorting the contents of the table based on the contents in the cells of a single column or row, copying the contents of cells and/or cutting and pasting the contents of cells. A user may need to perform such actions on tables in wide variety of situations, including in a file management program (e.g., Finder from Apple Inc. of Cupertino, Calif.), an image management application (e.g., Aperture or iPhoto from Apple Inc. of Cupertino, Calif.), a digital content (e.g., videos and music) management application (e.g., iTunes from Apple Inc. of Cupertino, Calif.), a drawing application, a presentation application (e.g., Keynote from Apple Inc. of Cupertino, Calif.), a word processing application (e.g., Pages from Apple Inc. of Cupertino, Calif.), a website creation application (e.g., iWeb from Apple Inc. of Cupertino, Calif.), or a spreadsheet application (e.g., Numbers from Apple Inc. of Cupertino, Calif.).

But existing methods for performing table manipulations are cumbersome and inefficient. For example, a sequence of individual inputs may be required to directly manipulate cells in a table or navigate through menu hierarchies to locate a command to perform the desired manipulation. Such a sequence of individual inputs is tedious and creates a significant cognitive burden on a user. In addition, existing methods take longer than necessary, thereby wasting energy. This latter consideration is particularly important in battery-operated devices.

SUMMARY

Accordingly, there is a need for computing devices with faster, more efficient methods and interfaces for manipulating tables. Such methods and interfaces may complement or replace conventional methods for manipulating tables. Such methods and interfaces reduce the cognitive burden on a user and produce a more efficient human-machine interface. For battery-operated computing devices, such methods and interfaces conserve power and increase the time between battery charges.

The above deficiencies and other problems associated with user interfaces for computing devices with touch-sensitive surfaces are reduced or eliminated by the disclosed devices. In some embodiments, the device is a desktop computer. In some embodiments, the device is portable (e.g., a notebook computer, tablet computer, or handheld device). In some embodiments, the device has a touchpad. In some embodiments, the device has a touch-sensitive display (also known as a "touch screen" or "touch screen display"). In some embodiments, the device has a graphical user interface (GUI), one or more processors, memory and one or more modules, programs or sets of instructions stored in the memory for performing multiple functions. In some embodiments, the user interacts with the GUI primarily through finger contacts and gestures on the touch-sensitive surface. In some embodiments, the functions may include image editing, drawing, presenting, word processing, website creating, disk authoring, spreadsheet making, game playing, telephoning, video conferencing, e-mailing, instant messaging, workout support, digital photographing, digital videoing, web browsing, digital music playing, and/or digital video playing. Executable instructions for performing these functions may be included in a computer readable storage medium or other computer program product configured for execution by one or more processors.

In accordance with some embodiments, a method is performed at an electronic device with a display and a touch-sensitive surface. The method includes: displaying a table comprising a plurality of cells. Each cell is located in a respective row and a respective column of the table. The method further includes detecting a plurality of concurrent contacts on the touch-sensitive surface. Each contact is associated with a respective cell in an initial subset of the plurality of cells. The method further includes, in response to detecting the plurality of concurrent contacts, determining, for the initial subset of the plurality of cells, an initial minimum row of the cells in the initial subset of the plurality of cells, an initial maximum row of the cells in the initial subset of the plurality of cells, an initial minimum column of the cells in the initial subset of the plurality of cells, and an initial maximum column of the cells in the initial subset of the plurality of cells; and selecting an initial range of cells from the plurality of cells. The initial range of cells consists of all of the cells that: are located in a row including the initial minimum row, the initial maximum row, or any row between the initial minimum row and the initial maximum row, and are located in a column including the initial minimum column, the initial maximum column or any column between the initial minimum column and the initial maximum column. The method further includes displaying a visual indication of the selection of the initial range of cells.

In accordance with some embodiments, a method is performed at an electronic device with a display and a touch-sensitive surface. The method includes: displaying a table comprising a plurality of rows, a plurality of columns, and a plurality of header regions. The header regions include a row header region and a column header region. Each row has a height and a row header in the row header region. Each column has a width and a column header in the column header region. The method further includes detecting a first contact and a second contact on the touch-sensitive surface; and detecting a gesture on the touch-sensitive surface. The gesture includes movement of one or more of the first contact and the second contact on the touch-sensitive surface. The method also includes, in response to detecting the gesture: when the detected gesture is a pinch gesture at a location on the touch-sensitive surface that corresponds to one or more respective columns, decreasing the width of the one or more respective columns in the table; and when the detected gesture is a de-pinch gesture at a location on the touch-sensitive surface that corresponds to one or more respective columns in the table and has a component that is perpendicular to the one or more respective columns, increasing the width of the one or more respective columns in the table.

In accordance with some embodiments, a method is performed at an electronic device with a display and a touch-sensitive surface. The method includes displaying a table comprising a plurality of rows and a plurality of columns. Each column includes a column header and a plurality of cells. The method further includes detecting a first contact and a second contact at a location on the touch-sensitive surface that corresponds to a column header for a first column in the plurality of columns, and detecting a first gesture on the touch-sensitive surface. The first gesture includes simultaneous movement of the first contact and the second contact in a direction on the touch-sensitive surface that corresponds to a direction on the display that is along the first column. The method further includes, in response to detecting the first gesture, sorting the first column based on content of the cells in the first column.

In accordance with some embodiments, a method is performed at an electronic device with a display and a touch-sensitive surface. The method includes: displaying a table comprising a plurality of rows and a plurality of columns. Each column includes a column header region and a plurality of cells. The method further includes detecting a first contact and a second contact at a location on the touch-sensitive surface that corresponds to a column header for a first column in the plurality of columns, and detecting a first gesture on the touch-sensitive surface made with the first contact and the second contact. The method also includes, in response to detecting the first gesture: when the first gesture is a pinch gesture or a de-pinch gesture, resizing the first column in accordance with the first gesture; and when the first gesture includes simultaneous movement of the first contact and the second contact in a direction on the touch-sensitive surface that corresponds to a direction on the display that is along the first column, sorting the first column based on content of the cells in the first column.

In accordance with some embodiments, a method is performed at an electronic device with a display and a touch-sensitive surface. The method includes: displaying a first electronic document including a table comprising a plurality of cells and having a one or more origin cells, the origin cells comprising a currently selected subset of the plurality of cells in the first electronic document, and detecting a first gesture within the first electronic document. The first gesture is a multi-contact pinch gesture at a location on the touch-sensitive surface that corresponds to a location of the one or more origin cells on the display. The method further includes, in response to detecting the first gesture, preparing to perform a copy operation to copy content from the one or more origin cells to one or more destination cells. The method also includes detecting a second gesture on the touch-sensitive-surface. The method further includes, in response to detecting the second gesture: when the second gesture is at a location on the touch-sensitive surface that corresponds to the location of the one or more destination cells on the display, performing the copy operation by copying the content from the one or more origin cells into the one or more destination cells while simultaneously maintaining the copied content in the one or more origin cells; and when the second gesture is at a location on the touch-sensitive surface that does not correspond to a location of one or more cells on the display, cancelling the copy operation.

In accordance with some embodiments, a method is performed at an electronic device with a display and a touch-sensitive surface. The method includes: displaying a table comprising a plurality of rows and a plurality of columns. Each column includes a column header and a plurality of cells. The method further includes detecting a first contact at a location on the touch-sensitive surface that corresponds to a first column in the plurality of columns; and detecting a first gesture on the touch-sensitive surface. The first gesture includes movement of the first contact in a direction on the touch-sensitive surface that corresponds to a direction on the display that is along the first column. The method also includes, in response to detecting the first gesture, sorting the first column based on content of the cells in the first column.

In accordance with some embodiments, a method is performed at an electronic device with a display and a touch-sensitive surface. The method includes: displaying a table comprising a plurality of rows, a plurality of columns, and a plurality of cells; detecting a first contact and a second contact at a location on the touch-sensitive surface that corresponds to one or more of a respective column in the plurality of columns and a respective row in the plurality of rows; and detecting a multi-contact gesture on the touch-sensitive surface made with the first contact and the second contact. The method further includes, in response to detecting the multi-contact gesture, disambiguating the multi-contact gesture based on movement of one or more of the first contact and the second contact to determine whether the multi-contact gesture is a pinch/de-pinch gesture or a multi-contact swipe gesture: when the multi-contact gesture is determined to be a pinch/de-pinch gesture, resizing one or more of the respective column and the respective row in accordance with the multi-contact gesture; and when the multi-contact gesture is determined to be a multi-contact swipe gesture, sorting one or more of the respective column based on content of cells in the respective column and the respective row based on content of the cells in the respective row.

In accordance with some embodiments, an electronic device includes a display, a touch-sensitive surface, one or more processors, memory, and one or more programs; the one or more programs are stored in the memory and configured to be executed by the one or more processors and the one or more programs include instructions for performing the operations of any of the methods described above. In accordance with some embodiments, a graphical user interface on an electronic device with a display, a touch-sensitive surface, a memory, and one or more processors to execute one or more programs stored in the memory includes one or more of the elements displayed in any of the methods described above, which are updated in response to inputs, as described in any of the methods above. In accordance with some embodiments, a computer readable storage medium has stored therein instructions which when executed by an electronic device with a display and a touch-sensitive surface, cause the device to perform the operations of any of the methods described above. In accordance with some embodiments, an electronic device includes: a display; a touch-sensitive surface; and means for performing the operations of any of the methods described above. In accordance with some embodiments, an information processing apparatus, for use in an electronic device with a display and a touch-sensitive surface, includes means for performing the operations of any of the methods described above.

Thus, electronic devices with display and a touch-sensitive surface are provided with faster, more efficient methods and interfaces for manipulating tables using multi-contact gestures, thereby increasing the effectiveness, efficiency, and user satisfaction with such devices. Such methods and interfaces may complement or replace conventional methods for manipulating tables.

BRIEF DESCRIPTION OF THE DRAWINGS

For a better understanding of the aforementioned embodiments of the invention as well as additional embodiments thereof, reference should be made to the Description of Embodiments below, in conjunction with the following drawings in which like reference numerals refer to corresponding parts throughout the figures.

DESCRIPTION OF EMBODIMENTS

Figure 1A:
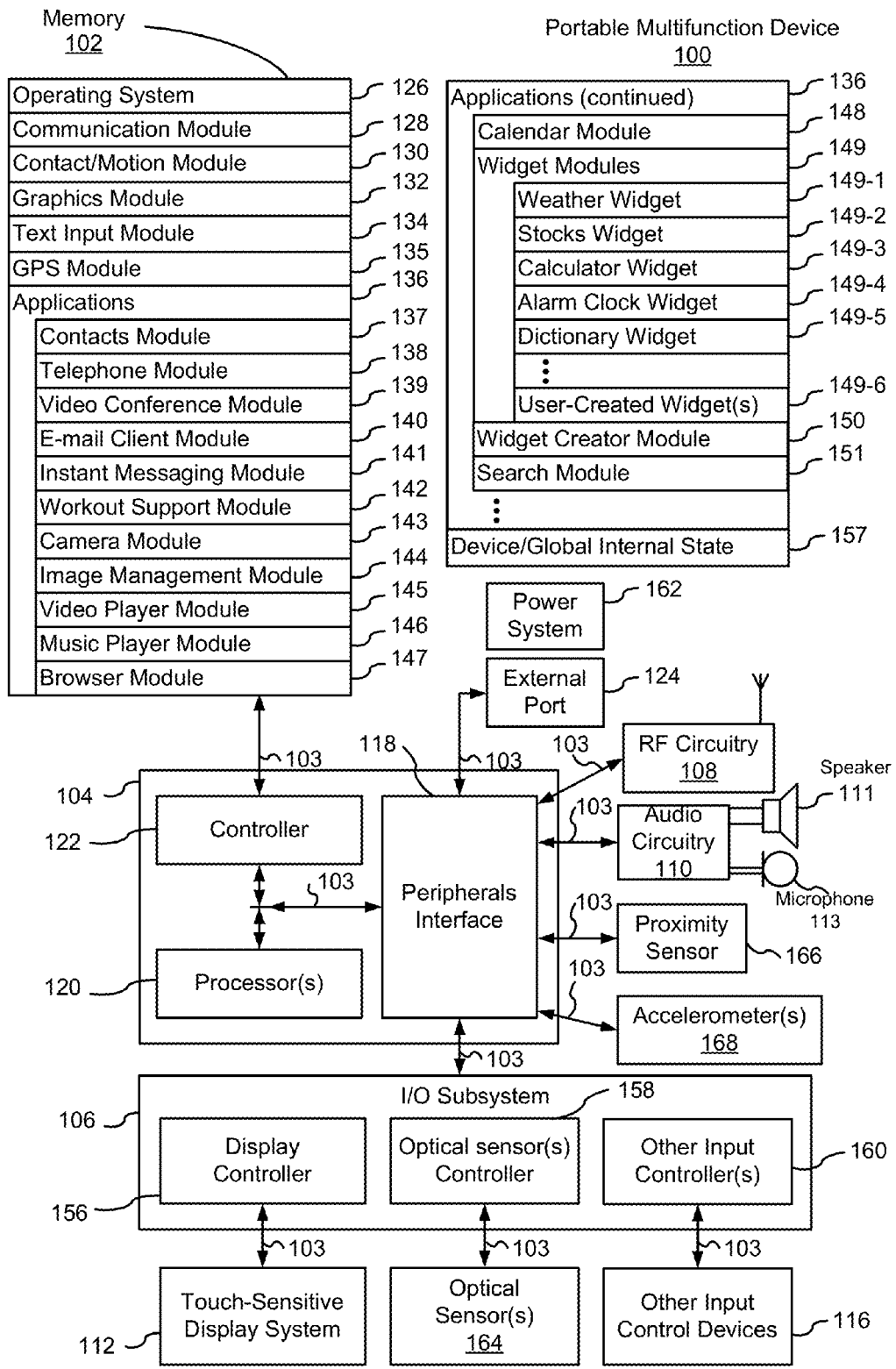
FIGS. 1A and 1B are block diagrams illustrating portable multifunction devices with touch-sensitive displays in accordance with some embodiments.

Reference will now be made in detail to embodiments, examples of which are illustrated in the accompanying drawings. In the following detailed description, numerous specific details are set forth in order to provide a thorough understanding of the present invention. However, it will be apparent to one of ordinary skill in the art that the present invention may be practiced without these specific details. In other instances, well-known methods, procedures, components, circuits, and networks have not been described in detail so as not to unnecessarily obscure aspects of the embodiments.

It will also be understood that, although the terms first, second, etc. may be used herein to describe various elements, these elements should not be limited by these terms. These terms are only used to distinguish one element from another. For example, a first contact could be termed a second contact, and, similarly, a second contact could be termed a first contact, without departing from the scope of the present invention. The first contact and the second contact are both contacts, but they are not the same contact.

The terminology used in the description of the invention herein is for the purpose of describing particular embodiments only and is not intended to be limiting of the invention. As used in the description of the invention and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

As used herein, the term "resolution" of a display refers to the number of pixels (also called "pixel counts" or "pixel resolution") along each axis or in each dimension of the display. For example, a display may have a resolution of 320×480 pixels. Furthermore, as used herein, the term "resolution" of a multifunction device refers to the resolution of a display in the multifunction device. The term "resolution" does not imply any limitations on the size of each pixel or the spacing of pixels. For example, compared to a first display with a 1024×768-pixel resolution, a second display with a 320×480-pixel resolution has a lower resolution. However, it should be noted that the physical size of a display depends not only on the pixel resolution, but also on many other factors, including the pixel size and the spacing of pixels. Therefore, the first display may have the same, smaller, or larger physical size, compared to the second display.

As used herein, the term "video resolution" of a display refers to the density of pixels along each axis or in each dimension of the display. The video resolution is often measured in a dots-per-inch (DPI) unit, which counts the number of pixels that can be placed in a line within the span of one inch along a respective dimension of the display.

Embodiments of computing devices, user interfaces for such devices, and associated processes for using such devices are described. In some embodiments, the computing device is a portable communications device, such as a mobile telephone, that also contains other functions, such as PDA and/or music player functions. Exemplary embodiments of portable multifunction devices include, without limitation, the iPhone® and iPod Touch® devices from Apple Inc. of Cupertino, Calif. Other portable devices, such as laptops or tablet computers with touch-sensitive surfaces (e.g., touch screen displays and/or touch pads), may also be used. It should also be understood that, in some embodiments, the device is not a portable communications device, but is a desktop computer with a touch-sensitive surface (e.g., a touch screen display and/or a touch pad).

In the discussion that follows, a computing device that includes a display and a touch-sensitive surface is described. It should be understood, however, that the computing device may include one or more other physical user-interface devices, such as a physical keyboard, a mouse and/or a joystick.

The device supports a variety of applications, such as one or more of the following: a drawing application, a presentation application, a word processing application, a website creation application, a disk authoring application, a spreadsheet application, a gaming application, a telephone application, a video conferencing application, an e-mail application, an instant messaging application, a workout support application, a photo management application, a digital camera application, a digital video camera application, a web browsing application, a digital music player application, and/or a digital video player application.

The various applications that may be executed on the device may use at least one common physical user-interface device, such as the touch-sensitive surface. One or more functions of the touch-sensitive surface as well as corresponding information displayed on the device may be adjusted and/or varied from one application to the next and/or within a respective application. In this way, a common physical architecture (such as the touch-sensitive surface) of the device may support the variety of applications with user interfaces that are intuitive and transparent to the user.

The user interfaces may include one or more soft keyboard embodiments. The soft keyboard embodiments may include standard (QWERTY) and/or non-standard configurations of symbols on the displayed icons of the keyboard, such as those described in U.S. patent application Ser. No. 11/459,606, "Keyboards For Portable Electronic Devices," filed Jul. 24, 2006, and Ser. No. 11/459,615, "Touch Screen Keyboards For Portable Electronic Devices," filed Jul. 24, 2006, the contents of which are hereby incorporated by reference in their entireties. The keyboard embodiments may include a reduced number of icons (or soft keys) relative to the number of keys in existing physical keyboards, such as that for a typewriter. This may make it easier for users to select one or more icons in the keyboard, and thus, one or more corresponding symbols. The keyboard embodiments may be adaptive. For example, displayed icons may be modified in accordance with user actions, such as selecting one or more icons and/or one or more corresponding symbols. One or more applications on the device may utilize common and/or different keyboard embodiments. Thus, the keyboard embodiment used may be tailored to at least some of the applications. In some embodiments, one or more keyboard embodiments may be tailored to a respective user. For example, one or more keyboard embodiments may be tailored to a respective user based on a word usage history (lexicography, slang, individual usage) of the respective user. Some of the keyboard embodiments may be adjusted to reduce a probability of a user error when selecting one or more icons, and thus one or more symbols, when using the soft keyboard embodiments.

Figure 1B:
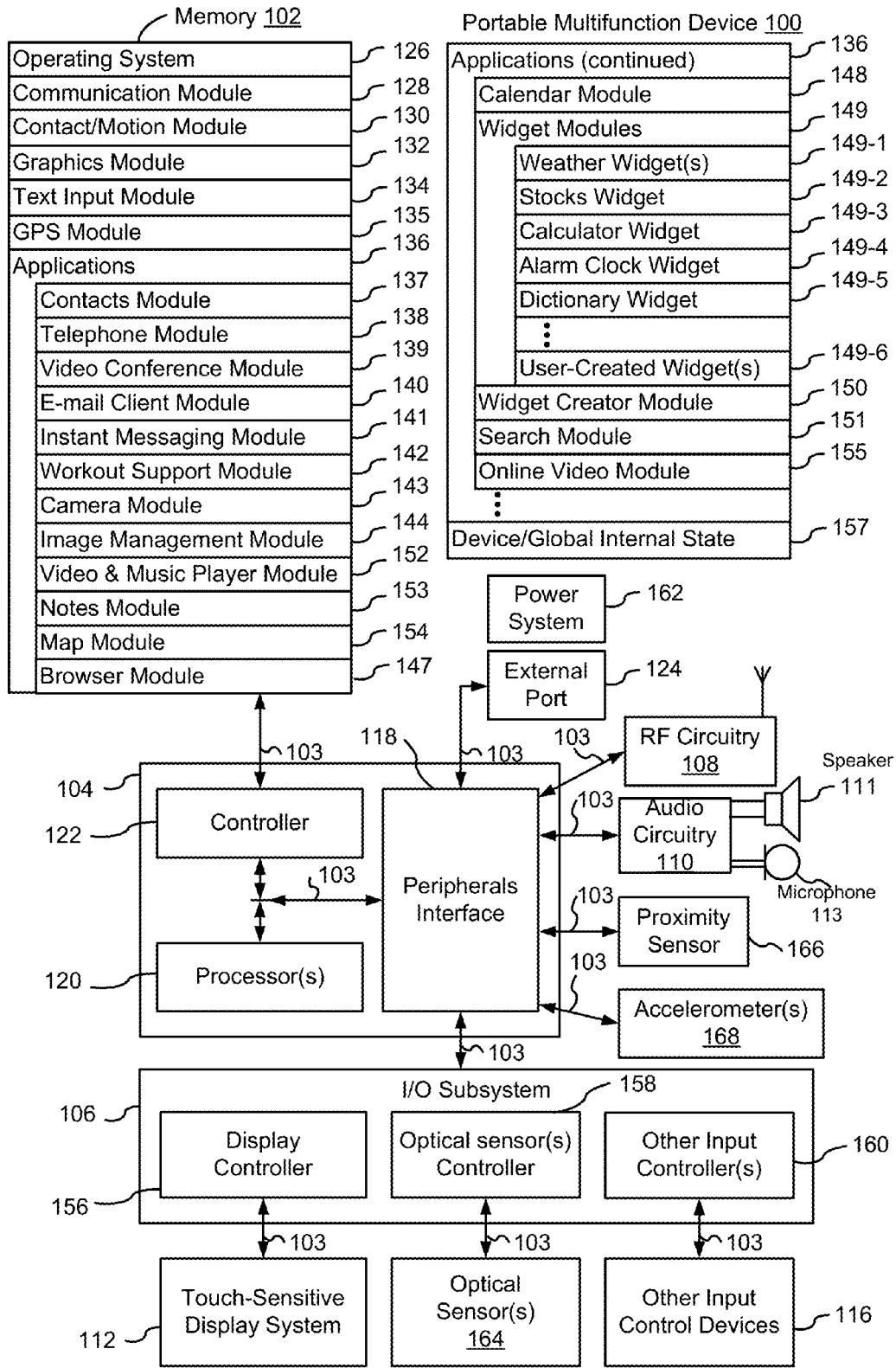

Attention is now directed toward embodiments of portable devices with touch-sensitive displays. FIGS. 1A and 1B are block diagrams illustrating portable multifunction devices 100 with touch-sensitive displays 112 in accordance with some embodiments. Touch-sensitive display 112 is sometimes called a "touch screen" for convenience, and may also be known as or called a touch-sensitive display system. Device 100 may include memory 102 (which may include one or more computer readable storage mediums), memory controller 122, one or more processing units (CPU's) 120, peripherals interface 118, RF circuitry 108, audio circuitry 110, speaker 111, microphone 113, input/output (I/O) subsystem 106, other input or control devices 116, and external port 124. Device 100 may include one or more optical sensors 164. These components may communicate over one or more communication buses or signal lines 103.

It should be appreciated that device 100 is only one example of a portable multifunction device, and that device 100 may have more or fewer components than shown, may combine two or more components, or may have a different configuration or arrangement of the components. The various components shown in FIGS. 1A and 1B may be implemented in hardware, software, or a combination of both hardware and software, including one or more signal processing and/or application specific integrated circuits.

Memory 102 may include high-speed random access memory and may also include non-volatile memory, such as one or more magnetic disk storage devices, flash memory devices, or other non-volatile solid-state memory devices. Access to memory 102 by other components of device 100, such as CPU 120 and the peripherals interface 118, may be controlled by memory controller 122.

Peripherals interface 118 can be used to couple input and output peripherals of the device to CPU 120 and memory 102. The one or more processors 120 run or execute various software programs and/or sets of instructions stored in memory 102 to perform various functions for device 100 and to process data.

In some embodiments, peripherals interface 118, CPU 120, and memory controller 122 may be implemented on a single chip, such as chip 104. In some other embodiments, they may be implemented on separate chips.

RF (radio frequency) circuitry 108 receives and sends RF signals, also called electromagnetic signals. RF circuitry 108 converts electrical signals to/from electromagnetic signals and communicates with communications networks and other communications devices via the electromagnetic signals. RF circuitry 108 may include well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. RF circuitry 108 may communicate with networks, such as the Internet, also referred to as the World Wide Web (WWW), an intranet and/or a wireless network, such as a cellular telephone network, a wireless local area network (LAN) and/or a metropolitan area network (MAN), and other devices by wireless communication. The wireless communication may use any of a plurality of communications standards, protocols and technologies, including but not limited to Global System for Mobile Communications (GSM), Enhanced Data GSM Environment (EDGE), high-speed downlink packet access (HSDPA), wideband code division multiple access (W-CDMA), code division multiple access (CDMA), time division multiple access (TDMA), Bluetooth, Wireless Fidelity (Wi-Fi) (e.g., IEEE 802.11a, IEEE 802.11b, IEEE 802.11g and/or IEEE 802.11n), voice over Internet Protocol (VoIP), Wi-MAX, a protocol for e-mail (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), Instant Messaging and Presence Service (IMPS)), and/or Short Message Service (SMS), or any other suitable communication protocol, including communication protocols not yet developed as of the filing date of this document.

Audio circuitry 110, speaker 111, and microphone 113 provide an audio interface between a user and device 100. Audio circuitry 110 receives audio data from peripherals interface 118, converts the audio data to an electrical signal, and transmits the electrical signal to speaker 111. Speaker 111 converts the electrical signal to human-audible sound waves. Audio circuitry 110 also receives electrical signals converted by microphone 113 from sound waves. Audio circuitry 110 converts the electrical signal to audio data and transmits the audio data to peripherals interface 118 for processing. Audio data may be retrieved from and/or transmitted to memory 102 and/or RF circuitry 108 by peripherals interface 118. In some embodiments, audio circuitry 110 also includes a headset jack (e.g., 212, FIG. 2). The headset jack provides an interface between audio circuitry 110 and removable audio input/output peripherals, such as output-only headphones or a headset with both output (e.g., a headphone for one or both ears) and input (e.g., a microphone).

I/O subsystem 106 couples input/output peripherals on device 100, such as touch screen 112 and other input control devices 116, to peripherals interface 118. I/O subsystem 106 may include display controller 156 and one or more input controllers 160 for other input or control devices. The one or more input controllers 160 receive/send electrical signals from/to other input or control devices 116. The other input control devices 116 may include physical buttons (e.g., push buttons, rocker buttons, etc.), dials, slider switches, joysticks, click wheels, and so forth. In some alternate embodiments, input controller(s) 160 may be coupled to any (or none) of the following: a keyboard, infrared port, USB port, and a pointer device such as a mouse. The one or more buttons (e.g., 208, FIG. 2) may include an up/down button for volume control of speaker 111 and/or microphone 113. The one or more buttons may include a push button (e.g., 206, FIG. 2). A quick press of the push button may disengage a lock of touch screen 112 or begin a process that uses gestures on the touch screen to unlock the device, as described in U.S. patent application Ser. No. 11/322,549, "Unlocking a Device by Performing Gestures on an Unlock Image," filed Dec. 23, 2005, which is hereby incorporated by reference in its entirety. A longer press of the push button (e.g., 206) may turn power to device 100 on or off. The user may be able to customize a functionality of one or more of the buttons. Touch screen 112 is used to implement virtual or soft buttons and one or more soft keyboards.

Touch-sensitive display 112 provides an input interface and an output interface between the device and a user. Display controller 156 receives and/or sends electrical signals from/to touch screen 112. Touch screen 112 displays visual output to the user. The visual output may include graphics, text, icons, video, and any combination thereof (collectively termed "graphics"). In some embodiments, some or all of the visual output may correspond to user-interface objects.

Touch screen 112 has a touch-sensitive surface, sensor or set of sensors that accepts input from the user based on haptic and/or tactile contact. Touch screen 112 and display controller 156 (along with any associated modules and/or sets of instructions in memory 102) detect contact (and any movement or breaking of the contact) on touch screen 112 and converts the detected contact into interaction with user-interface objects (e.g., one or more soft keys, icons, web pages or images) that are displayed on touch screen 112. In an exemplary embodiment, a point of contact between touch screen 112 and the user corresponds to a finger of the user.

Touch screen 112 may use LCD (liquid crystal display) technology, LPD (light emitting polymer display) technology, or LED (light emitting diode) technology, although other display technologies may be used in other embodiments. Touch screen 112 and display controller 156 may detect contact and any movement or breaking thereof using any of a plurality of touch sensing technologies now known or later developed, including but not limited to capacitive, resistive, infrared, and surface acoustic wave technologies, as well as other proximity sensor arrays or other elements for determining one or more points of contact with touch screen 112. In an exemplary embodiment, projected mutual capacitance sensing technology is used, such as that found in the iPhone® and iPod Touch® from Apple Inc. of Cupertino, Calif.

A touch-sensitive display in some embodiments of touch screen 112 may be analogous to the multi-touch sensitive touchpads described in the following U.S. Pat. No. 6,323,846 (Westerman et al.), U.S. Pat. No. 6,570,557 (Westerman et al.), and/or U.S. Pat. No. 6,677,932 (Westerman), and/or U.S. Patent Publication 2002/0015024A1, each of which is hereby incorporated by reference in its entirety. However, touch screen 112 displays visual output from portable device 100, whereas touch sensitive touchpads do not provide visual output.

A touch-sensitive display in some embodiments of touch screen 112 may be as described in the following applications: (1) U.S. patent application Ser. No. 11/381,313, "Multipoint Touch Surface Controller," filed May 2, 2006; (2) U.S. patent application Ser. No. 10/840,862, "Multipoint Touchscreen," filed May 6, 2004; (3) U.S. patent application Ser. No. 10/903,964, "Gestures For Touch Sensitive Input Devices," filed Jul. 30, 2004; (4) U.S. patent application Ser. No. 11/048,264, "Gestures For Touch Sensitive Input Devices," filed Jan. 31, 2005; (5) U.S. patent application Ser. No. 11/038,590, "Mode-Based Graphical User Interfaces For Touch Sensitive Input Devices," filed Jan. 18, 2005; (6) U.S. patent application Ser. No. 11/228,758, "Virtual Input Device Placement On A Touch Screen User Interface," filed Sep. 16, 2005; (7) U.S. patent application Ser. No. 11/228,700, "Operation Of A Computer With A Touch Screen Interface," filed Sep. 16, 2005; (8) U.S. patent application Ser. No. 11/228,737, "Activating Virtual Keys Of A Touch-Screen Virtual Keyboard," filed Sep. 16, 2005; and (9) U.S. patent application Ser. No. 11/367,749, "Multi-Functional Hand-Held Device," filed Mar. 3, 2006. All of these applications are incorporated by reference herein in their entirety.

Touch screen 112 may have a video resolution in excess of 100 dpi. In some embodiments, the touch screen has a video resolution of approximately 160 dpi. The user may make contact with touch screen 112 using any suitable object or appendage, such as a stylus, a finger, and so forth. In some embodiments, the user interface is designed to work primarily with finger-based contacts and gestures, which can be less precise than stylus-based input due to the larger area of contact of a finger on the touch screen. In some embodiments, the device translates the rough finger-based input into a precise pointer/cursor position or command for performing the actions desired by the user.

In some embodiments, in addition to the touch screen, device 100 may include a touchpad (not shown) for activating or deactivating particular functions. In some embodiments, the touchpad is a touch-sensitive area of the device that, unlike the touch screen, does not display visual output. The touchpad may be a touch-sensitive surface that is separate from touch screen 112 or an extension of the touch-sensitive surface formed by the touch screen.

In some embodiments, device 100 may include a physical or virtual wheel (e.g., a click wheel) as input control device 116. A user may navigate among and interact with one or more graphical objects (e.g., icons) displayed in touch screen 112 by rotating the click wheel or by moving a point of contact with the click wheel (e.g., where the amount of movement of the point of contact is measured by its angular displacement with respect to a center point of the click wheel). The click wheel may also be used to select one or more of the displayed icons. For example, the user may press down on at least a portion of the click wheel or an associated button. User commands and navigation commands provided by the user via the click wheel may be processed by input controller 160 as well as one or more of the modules and/or sets of instructions in memory 102. For a virtual click wheel, the click wheel and click wheel controller may be part of touch screen 112 and display controller 156, respectively. For a virtual click wheel, the click wheel may be either an opaque or semitransparent object that appears and disappears on the touch screen display in response to user interaction with the device. In some embodiments, a virtual click wheel is displayed on the touch screen of a portable multifunction device and operated by user contact with the touch screen.

Device 100 also includes power system 162 for powering the various components. Power system 162 may include a power management system, one or more power sources (e.g., battery, alternating current (AC)), a recharging system, a power failure detection circuit, a power converter or inverter, a power status indicator (e.g., a light-emitting diode (LED)) and any other components associated with the generation, management and distribution of power in portable devices.

Device 100 may also include one or more optical sensors 164. FIGS. 1A and 1B show an optical sensor coupled to optical sensor controller 158 in I/O subsystem 106. Optical sensor 164 may include charge-coupled device (CCD) or complementary metal-oxide semiconductor (CMOS) phototransistors. Optical sensor 164 receives light from the environment, projected through one or more lens, and converts the light to data representing an image. In conjunction with imaging module 143 (also called a camera module), optical sensor 164 may capture still images or video. In some embodiments, an optical sensor is located on the back of device 100, opposite touch screen display 112 on the front of the device, so that the touch screen display may be used as a viewfinder for still and/or video image acquisition. In some embodiments, an optical sensor is located on the front of the device so that the user's image may be obtained for videoconferencing while the user views the other video conference participants on the touch screen display. In some embodiments, the position of optical sensor 164 can be changed by the user (e.g., by rotating the lens and the sensor in the device housing) so that a single optical sensor 164 may be used along with the touch screen display for both video conferencing and still and/or video image acquisition.

Device 100 may also include one or more proximity sensors 166. FIGS. 1A and 1B show proximity sensor 166 coupled to peripherals interface 118. Alternately, proximity sensor 166 may be coupled to input controller 160 in I/O subsystem 106. Proximity sensor 166 may perform as described in U.S. patent application Ser. No. 11/241,839, "Proximity Detector In Handheld Device"; Ser. No. 11/240,788, "Proximity Detector In Handheld Device"; Ser. No. 11/620,702, "Using Ambient Light Sensor To Augment Proximity Sensor Output"; Ser. No. 11/586,862, "Automated Response To And Sensing Of User Activity In Portable Devices"; and Ser. No. 11/638,251, "Methods And Systems For Automatic Configuration Of Peripherals," which are hereby incorporated by reference in their entirety. In some embodiments, the proximity sensor turns off and disables touch screen 112 when the multifunction device is placed near the user's ear (e.g., when the user is making a phone call).

Device 100 may also include one or more accelerometers 168. FIGS. 1A and 1B show accelerometer 168 coupled to peripherals interface 118. Alternately, accelerometer 168 may be coupled to an input controller 160 in I/O subsystem 106. Accelerometer 168 may perform as described in U.S. Patent Publication No. 20050190059, "Acceleration-based Theft Detection System for Portable Electronic Devices," and U.S. Patent Publication No. 20060017692, "Methods And Apparatuses For Operating A Portable Device Based On An Accelerometer," both of which are which are incorporated by reference herein in their entirety. In some embodiments, information is displayed on the touch screen display in a portrait view or a landscape view based on an analysis of data received from the one or more accelerometers. Device 100 optionally includes, in addition to accelerometer(s) 168, a magnetometer (not shown) and a GPS (or GLONASS or other global navigation system) receiver (not shown) for obtaining information concerning the location and orientation (e.g., portrait or landscape) of device 100.

Figure 3:
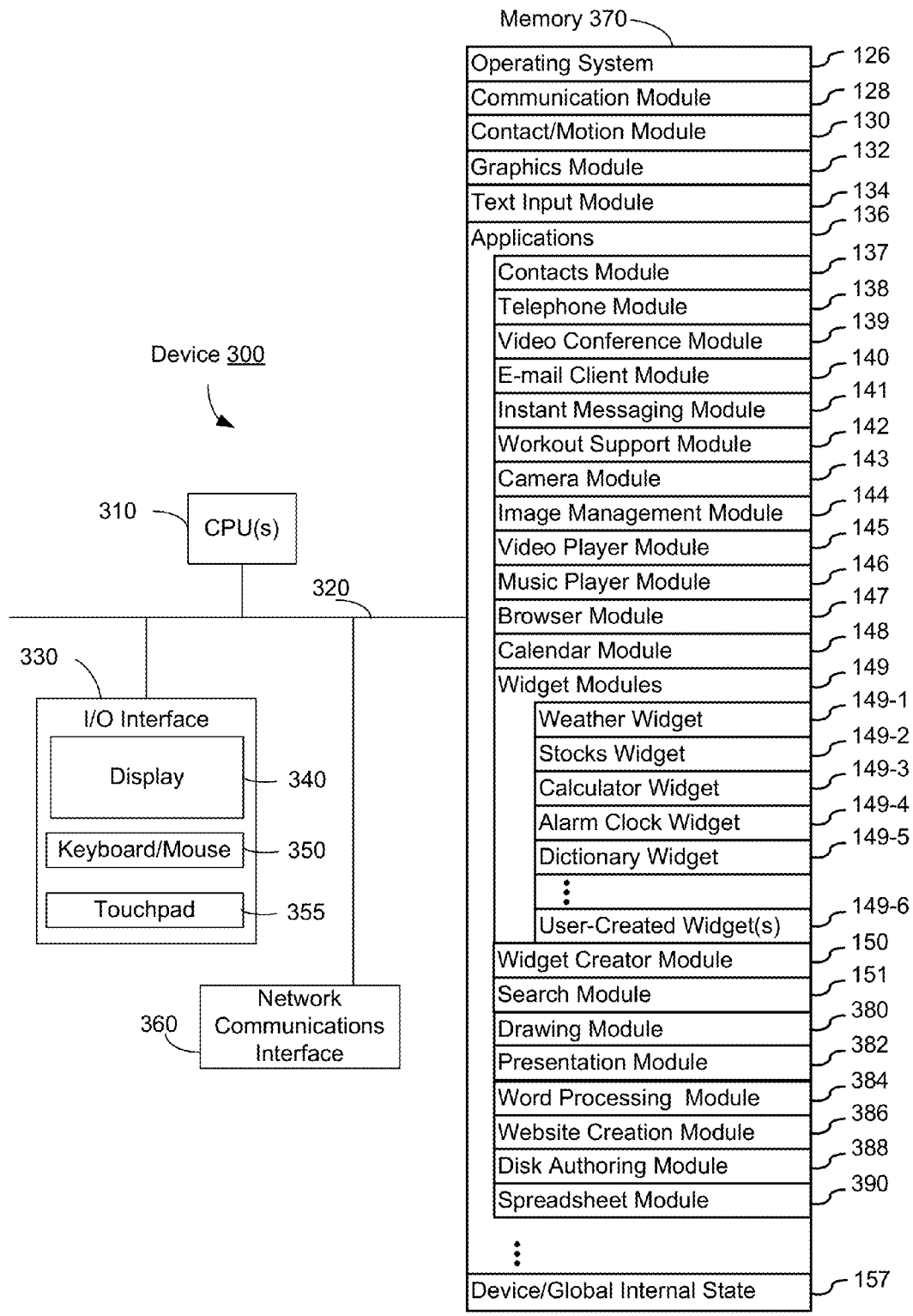
FIG. 3 is a block diagram of an exemplary multifunction device with a display and a touch-sensitive surface in accordance with some embodiments.

In some embodiments, the software components stored in memory 102 include operating system 126, communication module (or set of instructions) 128, contact/motion module (or set of instructions) 130, graphics module (or set of instructions) 132, text input module (or set of instructions) 134, Global Positioning System (GPS) module (or set of instructions) 135, and applications (or sets of instructions) 136. Furthermore, in some embodiments memory 102 stores device/global internal state 157, as shown in FIGS. 1A, 1B and 3. Device/global internal state 157 includes one or more of: active application state, indicating which applications, if any, are currently active; display state, indicating what applications, views or other information occupy various regions of touch screen display 112; sensor state, including information obtained from the device's various sensors and input control devices 116; and location information concerning the device's location and/or attitude.

Operating system 126 (e.g., Darwin, RTXC, LINUX, UNIX, OS X, WINDOWS, or an embedded operating system such as VxWorks) includes various software components and/or drivers for controlling and managing general system tasks (e.g., memory management, storage device control, power management, etc.) and facilitates communication between various hardware and software components.

Communication module 128 facilitates communication with other devices over one or more external ports 124 and also includes various software components for handling data received by RF circuitry 108 and/or external port 124. External port 124 (e.g., Universal Serial Bus (USB), FIREWIRE, etc.) is adapted for coupling directly to other devices or indirectly over a network (e.g., the Internet, wireless LAN, etc.). In some embodiments, the external port is a multi-pin (e.g., 30-pin) connector that is the same as, or similar to and/or compatible with the 30-pin connector used on iPod (trademark of Apple Inc.) devices.

Contact/motion module 130 may detect contact with touch screen 112 (in conjunction with display controller 156) and other touch sensitive devices (e.g., a touchpad or physical click wheel). Contact/motion module 130 includes various software components for performing various operations related to detection of contact, such as determining if contact has occurred (e.g., detecting a finger-down event), determining if there is movement of the contact and tracking the movement across the touch-sensitive surface (e.g., detecting one or more finger-dragging events), and determining if the contact has ceased (e.g., detecting a finger-up event or a break in contact). Contact/motion module 130 receives contact data from the touch-sensitive surface. Determining movement of the point of contact, which is represented by a series of contact data, may include determining speed (magnitude), velocity (magnitude and direction), and/or an acceleration (a change in magnitude and/or direction) of the point of contact. These operations may be applied to single contacts (e.g., one finger contacts) or to multiple simultaneous contacts (e.g., "multitouch"/multiple finger contacts). In some embodiments, contact/motion module 130 and display controller 156 detects contact on a touchpad. In some embodiments, contact/motion module 130 and controller 160 detects contact on a click wheel.

Contact/motion module 130 may detect a gesture input by a user. Different gestures on the touch-sensitive surface have different contact patterns. Thus, a gesture may be detected by detecting a particular contact pattern. For example, detecting a finger tap gesture includes detecting a finger-down event followed by detecting a finger-up (lift off) event at the same position (or substantially the same position) as the finger-down event (e.g., at the position of an icon). As another example, detecting a finger swipe gesture on the touch-sensitive surface includes detecting a finger-down event followed by detecting one or more finger-dragging events, and subsequently followed by detecting a finger-up (lift off) event.

Graphics module 132 includes various known software components for rendering and displaying graphics on touch screen 112 or other display, including components for changing the intensity of graphics that are displayed. As used herein, the term "graphics" includes any object that can be displayed to a user, including without limitation text, web pages, icons (such as user-interface objects including soft keys), digital images, videos, animations and the like.

In some embodiments, graphics module 132 stores data representing graphics to be used. Each graphic may be assigned a corresponding code. Graphics module 132 receives, from applications etc., one or more codes specifying graphics to be displayed along with, if necessary, coordinate data and other graphic property data, and then generates screen image data to output to display controller 156.

Text input module 134, which may be a component of graphics module 132, provides soft keyboards for entering text in various applications (e.g., contacts 137, e-mail 140, IM 141, browser 147, and any other application that needs text input).

GPS module 135 determines the location of the device and provides this information for use in various applications (e.g., to telephone 138 for use in location-based dialing, to camera 143 as picture/video metadata, and to applications that provide location-based services such as weather widgets, local yellow page widgets, and map/navigation widgets).

Applications 136 may include the following modules (or sets of instructions), or a subset or superset thereof:
  contacts module 137 (sometimes called an address book or contact list);
  telephone module 138;
  video conferencing module 139;
  e-mail client module 140;
  instant messaging (IM) module 141;
  workout support module 142;
  camera module 143 for still and/or video images;
  image management module 144;
  video player module 145;
  music player module 146;
  browser module 147;
  calendar module 148;
  widget modules 149, which may include one or more of: weather widget 149-1, stocks widget 149-2, calculator widget 149-3, alarm clock widget 149-4, dictionary widget 149-5, and other widgets obtained by the user, as well as user-created widgets 149-6;
  widget creator module 150 for making user-created widgets 149-6;
  search module 151;
  video and music player module 152, which merges video player module 145 and music player module 146;
  notes module 153;
  map module 154; and/or
  online video module 155.

Examples of other applications 136 that may be stored in memory 102 include other word processing applications, other image editing applications, drawing applications, presentation applications, JAVA-enabled applications, encryption, digital rights management, voice recognition, and voice replication.

In conjunction with touch screen 112, display controller 156, contact module 130, graphics module 132, and text input module 134, contacts module 137 may be used to manage an address book or contact list (e.g., stored in application internal state 192 of contacts module 137 in memory 102 or memory 370), including: adding name(s) to the address book; deleting name(s) from the address book; associating telephone number(s), e-mail address(es), physical address(es) or other information with a name; associating an image with a name; categorizing and sorting names; providing telephone numbers or e-mail addresses to initiate and/or facilitate communications by telephone 138, video conference 139, e-mail 140, or IM 141; and so forth.

In conjunction with RF circuitry 108, audio circuitry 110, speaker 111, microphone 113, touch screen 112, display controller 156, contact module 130, graphics module 132, and text input module 134, telephone module 138 may be used to enter a sequence of characters corresponding to a telephone number, access one or more telephone numbers in address book 137, modify a telephone number that has been entered, dial a respective telephone number, conduct a conversation and disconnect or hang up when the conversation is completed. As noted above, the wireless communication may use any of a plurality of communications standards, protocols and technologies.

In conjunction with RF circuitry 108, audio circuitry 110, speaker 111, microphone 113, touch screen 112, display controller 156, optical sensor 164, optical sensor controller 158, contact module 130, graphics module 132, text input module 134, contact list 137, and telephone module 138, videoconferencing module 139 includes executable instructions to initiate, conduct, and terminate a video conference between a user and one or more other participants in accordance with user instructions.

In conjunction with RF circuitry 108, touch screen 112, display controller 156, contact module 130, graphics module 132, and text input module 134, e-mail client module 140 includes executable instructions to create, send, receive, and manage e-mail in response to user instructions. In conjunction with image management module 144, e-mail client module 140 makes it very easy to create and send e-mails with still or video images taken with camera module 143.

In conjunction with RF circuitry 108, touch screen 112, display controller 156, contact module 130, graphics module 132, and text input module 134, the instant messaging module 141 includes executable instructions to enter a sequence of characters corresponding to an instant message, to modify previously entered characters, to transmit a respective instant message (for example, using a Short Message Service (SMS) or Multimedia Message Service (MMS) protocol for telephony-based instant messages or using XMPP, SIMPLE, or IMPS for Internet-based instant messages), to receive instant messages and to view received instant messages. In some embodiments, transmitted and/or received instant messages may include graphics, photos, audio files, video files and/or other attachments as are supported in a MMS and/or an Enhanced Messaging Service (EMS). As used herein, "instant messaging" refers to both telephony-based messages (e.g., messages sent using SMS or MMS) and Internet-based messages (e.g., messages sent using XMPP, SIMPLE, or IMPS).

In conjunction with RF circuitry 108, touch screen 112, display controller 156, contact module 130, graphics module 132, text input module 134, GPS module 135, map module 154, and music player module 146, workout support module 142 includes executable instructions to create workouts (e.g., with time, distance, and/or calorie burning goals); communicate with workout sensors (sports devices); receive workout sensor data; calibrate sensors used to monitor a workout; select and play music for a workout; and display, store and transmit workout data.

In conjunction with touch screen 112, display controller 156, optical sensor(s) 164, optical sensor controller 158, contact module 130, graphics module 132, and image management module 144, camera module 143 includes executable instructions to capture still images or video (including a video stream) and store them into memory 102, modify characteristics of a still image or video, or delete a still image or video from memory 102.

In conjunction with touch screen 112, display controller 156, contact module 130, graphics module 132, text input module 134, and camera module 143, image management module 144 includes executable instructions to arrange, modify (e.g., edit), or otherwise manipulate, label, delete, present (e.g., in a digital slide show or album), and store still and/or video images.

In conjunction with touch screen 112, display controller 156, contact module 130, graphics module 132, audio circuitry 110, and speaker 111, video player module 145 includes executable instructions to display, present or otherwise play back videos (e.g., on touch screen 112 or on an external, connected display via external port 124).

In conjunction with touch screen 112, display system controller 156, contact module 130, graphics module 132, audio circuitry 110, speaker 111, RF circuitry 108, and browser module 147, music player module 146 includes executable instructions that allow the user to download and play back recorded music and other sound files stored in one or more file formats, such as MP3 or AAC files. In some embodiments, device 100 may include the functionality of an MP3 player, such as an iPod (trademark of Apple Inc.).

In conjunction with RF circuitry 108, touch screen 112, display system controller 156, contact module 130, graphics module 132, and text input module 134, browser module 147 includes executable instructions to browse the Internet in accordance with user instructions, including searching, linking to, receiving, and displaying web pages or portions thereof, as well as attachments and other files linked to web pages.

In conjunction with RF circuitry 108, touch screen 112, display system controller 156, contact module 130, graphics module 132, text input module 134, e-mail client module 140, and browser module 147, calendar module 148 includes executable instructions to create, display, modify, and store calendars and data associated with calendars (e.g., calendar entries, to do lists, etc.) in accordance with user instructions.

In conjunction with RF circuitry 108, touch screen 112, display system controller 156, contact module 130, graphics module 132, text input module 134, and browser module 147, widget modules 149 are mini-applications that may be downloaded and used by a user (e.g., weather widget 149-1, stocks widget 149-2, calculator widget 149-3, alarm clock widget 149-4, and dictionary widget 149-5) or created by the user (e.g., user-created widget 149-6). In some embodiments, a widget includes an HTML (Hypertext Markup Language) file, a CSS (Cascading Style Sheets) file, and a JavaScript file. In some embodiments, a widget includes an XML (Extensible Markup Language) file and a JavaScript file (e.g., Yahoo! Widgets).

In conjunction with RF circuitry 108, touch screen 112, display system controller 156, contact module 130, graphics module 132, text input module 134, and browser module 147, the widget creator module 150 may be used by a user to create widgets (e.g., turning a user-specified portion of a web page into a widget).

In conjunction with touch screen 112, display system controller 156, contact module 130, graphics module 132, and text input module 134, search module 151 includes executable instructions to search for text, music, sound, image, video, and/or other files in memory 102 that match one or more search criteria (e.g., one or more user-specified search terms) in accordance with user instructions.

In conjunction with touch screen 112, display controller 156, contact module 130, graphics module 132, and text input module 134, notes module 153 includes executable instructions to create and manage notes, to do lists, and the like in accordance with user instructions.

In conjunction with RF circuitry 108, touch screen 112, display system controller 156, contact module 130, graphics module 132, text input module 134, GPS module 135, and browser module 147, map module 154 may be used to receive, display, modify, and store maps and data associated with maps (e.g., driving directions; data on stores and other points of interest at or near a particular location; and other location-based data) in accordance with user instructions.

In conjunction with touch screen 112, display system controller 156, contact module 130, graphics module 132, audio circuitry 110, speaker 111, RF circuitry 108, text input module 134, e-mail client module 140, and browser module 147, online video module 155 includes instructions that allow the user to access, browse, receive (e.g., by streaming and/or download), play back (e.g., on the touch screen or on an external, connected display via external port 124), send an e-mail with a link to a particular online video, and otherwise manage online videos in one or more file formats, such as H.264. In some embodiments, instant messaging module 141, rather than e-mail client module 140, is used to send a link to a particular online video. Additional description of the online video application can be found in U.S. Provisional Patent Application No. 60/936,562, "Portable Multifunction Device, Method, and Graphical User Interface for Playing Online Videos," filed Jun. 20, 2007, and U.S. patent application Ser. No. 11/968,067, "Portable Multifunction Device, Method, and Graphical User Interface for Playing Online Videos," filed Dec. 31, 2007, the content of which is hereby incorporated by reference in its entirety.

Each of the above identified modules and applications correspond to a set of executable instructions for performing one or more functions described above and the methods described in this application (e.g., the computer-implemented methods and other information processing methods described herein). These modules (i.e., sets of instructions) need not be implemented as separate software programs, procedures or modules, and thus various subsets of these modules may be combined or otherwise re-arranged in various embodiments. For example, video player module 145 may be combined with music player module 146 into a single module (e.g., video and music player module 152, FIG. 1B). In some embodiments, memory 102 may store a subset of the modules and data structures identified above. Furthermore, memory 102 may store additional modules and data structures not described above.

In some embodiments, device 100 is a device where operation of a predefined set of functions on the device is performed exclusively through a touch screen and/or a touchpad. By using a touch screen and/or a touchpad as the primary input control device for operation of device 100, the number of physical input control devices (such as push buttons, dials, and the like) on device 100 may be reduced.

The predefined set of functions that may be performed exclusively through a touch screen and/or a touchpad include navigation between user interfaces. In some embodiments, the touchpad, when touched by the user, navigates device 100 to a main, home, or root menu from any user interface that may be displayed on device 100. In such embodiments, the touchpad may be referred to as a "menu button." In some other embodiments, the menu button may be a physical push button or other physical input control device instead of a touchpad.

Figure 1C:
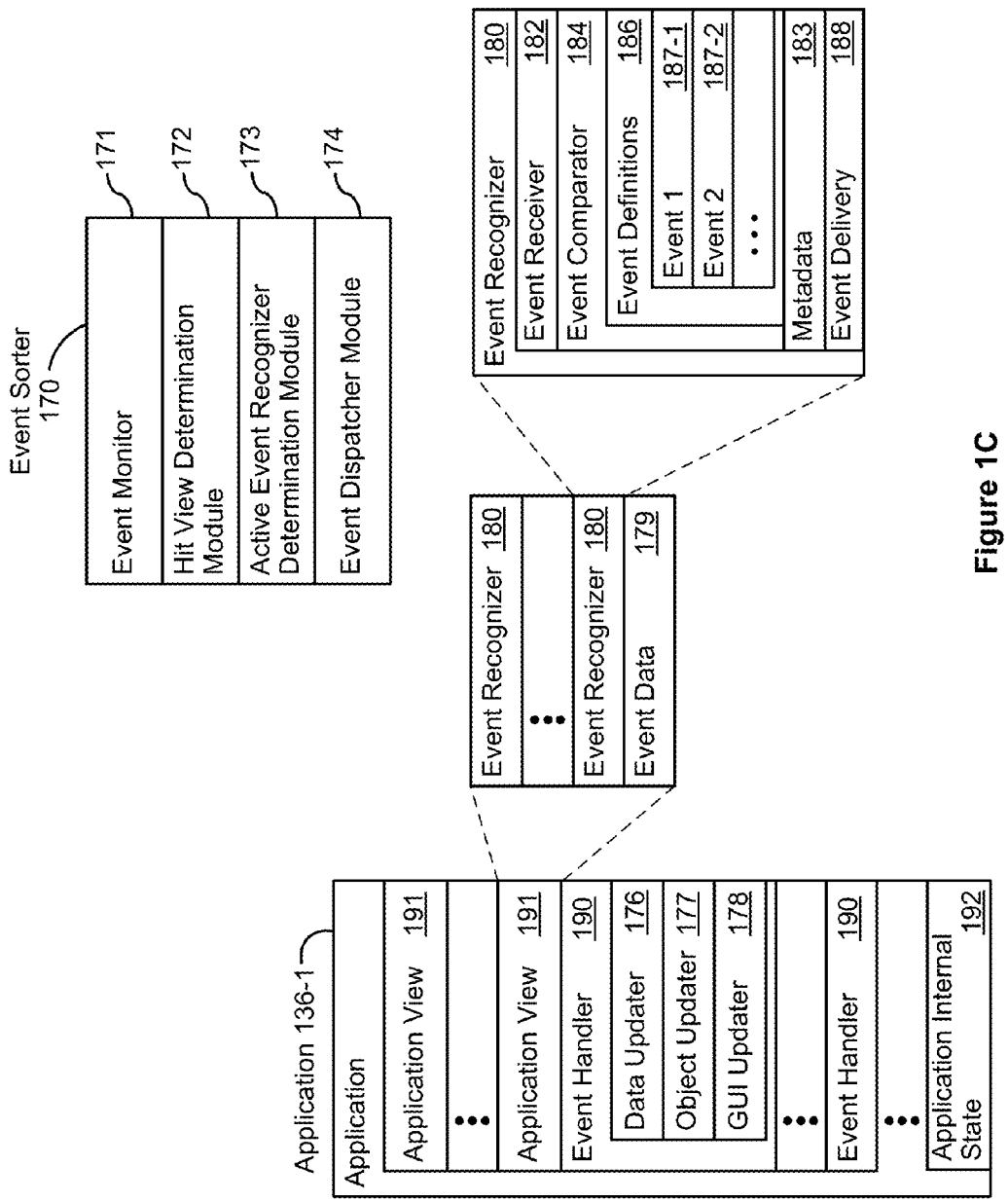
FIG. 1C is a block diagram illustrating exemplary components for event handling in accordance with some embodiments.

FIG. 1C is a block diagram illustrating exemplary components for event handling in accordance with some embodiments. In some embodiments, memory 102 (in FIGS. 1A and 1B) or 370 (FIG. 3) includes event sorter 170 (e.g., in operating system 126) and a respective application 136-1 (e.g., any of the aforementioned applications 137-151, 155, 380-390).

Event sorter 170 receives event information and determines the application 136-1 and application view 191 of application 136-1 to which to deliver the event information. Event sorter 170 includes event monitor 171 and event dispatcher module 174. In some embodiments, application 136-1 includes application internal state 192, which indicates the current application view(s) displayed on touch sensitive display 112 when the application is active or executing. In some embodiments, device/global internal state 157 is used by event sorter 170 to determine which application(s) is(are) currently active, and application internal state 192 is used by event sorter 170 to determine application views 191 to which to deliver event information.

In some embodiments, application internal state 192 includes additional information, such as one or more of: resume information to be used when application 136-1 resumes execution, user interface state information that indicates information being displayed or that is ready for display by application 136-1, a state queue for enabling the user to go back to a prior state or view of application 136-1, and a redo/undo queue of previous actions taken by the user.

Event monitor 171 receives event information from peripherals interface 118. Event information includes information about a sub-event (e.g., a user touch on touch-sensitive display 112, as part of a multi-touch gesture). Peripherals interface 118 transmits information it receives from I/O subsystem 106 or a sensor, such as proximity sensor 166, accelerometer(s) 168, and/or microphone 113 (through audio circuitry 110). Information that peripherals interface 118 receives from I/O subsystem 106 includes information from touch-sensitive display 112 or a touch-sensitive surface.

In some embodiments, event monitor 171 sends requests to the peripherals interface 118 at predetermined intervals. In response, peripherals interface 118 transmits event information. In other embodiments, peripheral interface 118 transmits event information only when there is a significant event (e.g., receiving an input above a predetermined noise threshold and/or for more than a predetermined duration).

In some embodiments, event sorter 170 also includes a hit view determination module 172 and/or an active event recognizer determination module 173.

Hit view determination module 172 provides software procedures for determining where a sub-event has taken place within one or more views, when touch sensitive display 112 displays more than one view. Views are made up of controls and other elements that a user can see on the display.

Another aspect of the user interface associated with an application is a set of views, sometimes herein called application views or user interface windows, in which information is displayed and touch-based gestures occur. The application views (of a respective application) in which a touch is detected may correspond to programmatic levels within a programmatic or view hierarchy of the application. For example, the lowest level view in which a touch is detected may be called the hit view, and the set of events that are recognized as proper inputs may be determined based, at least in part, on the hit view of the initial touch that begins a touch-based gesture.

Hit view determination module 172 receives information related to sub-events of a touch-based gesture. When an application has multiple views organized in a hierarchy, hit view determination module 172 identifies a hit view as the lowest view in the hierarchy which should handle the sub-event. In most circumstances, the hit view is the lowest level view in which an initiating sub-event occurs (i.e., the first sub-event in the sequence of sub-events that form an event or potential event). Once the hit view is identified by the hit view determination module, the hit view typically receives all sub-events related to the same touch or input source for which it was identified as the hit view.

Active event recognizer determination module 173 determines which view or views within a view hierarchy should receive a particular sequence of sub-events. In some embodiments, active event recognizer determination module 173 determines that only the hit view should receive a particular sequence of sub-events. In other embodiments, active event recognizer determination module 173 determines that all views that include the physical location of a sub-event are actively involved views, and therefore determines that all actively involved views should receive a particular sequence of sub-events. In other embodiments, even if touch sub-events were entirely confined to the area associated with one particular view, views higher in the hierarchy would still remain as actively involved views.

Event dispatcher module 174 dispatches the event information to an event recognizer (e.g., event recognizer 180). In embodiments including active event recognizer determination module 173, event dispatcher module 174 delivers the event information to an event recognizer determined by active event recognizer determination module 173. In some embodiments, event dispatcher module 174 stores in an event queue the event information, which is retrieved by a respective event receiver module 182.

In some embodiments, operating system 126 includes event sorter 170. Alternatively, application 136-1 includes event sorter 170. In yet other embodiments, event sorter 170 is a stand-alone module, or a part of another module stored in memory 102, such as contact/motion module 130.

In some embodiments, application 136-1 includes a plurality of event handlers 190 and one or more application views 191, each of which includes instructions for handling touch events that occur within a respective view of the application's user interface. Each application view 191 of the application 136-1 includes one or more event recognizers 180. Typically, a respective application view 191 includes a plurality of event recognizers 180. In other embodiments, one or more of event recognizers 180 are part of a separate module, such as a user interface kit (not shown) or a higher level object from which application 136-1 inherits methods and other properties. In some embodiments, a respective event handler 190 includes one or more of: data updater 176, object updater 177, GUI updater 178, and/or event data 179 received from event sorter 170. Event handler 190 may utilize or call data updater 176, object updater 177 or GUI updater 178 to update the application internal state 192. Alternatively, one or more of the application views 191 includes one or more respective event handlers 190. Also, in some embodiments, one or more of data updater 176, object updater 177, and GUI updater 178 are included in a respective application view 191.

A respective event recognizer 180 receives event information (e.g., event data 179) from event sorter 170, and identifies an event from the event information. Event recognizer 180 includes event receiver 182 and event comparator 184. In some embodiments, event recognizer 180 also includes at least a subset of: metadata 183, and event delivery instructions 188 (which may include sub-event delivery instructions).

Event receiver 182 receives event information from event sorter 170. The event information includes information about a sub-event, for example, a touch or a touch movement. Depending on the sub-event, the event information also includes additional information, such as location of the sub-event. When the sub-event concerns motion of a touch the event information may also include speed and direction of the sub-event. In some embodiments, events include rotation of the device from one orientation to another (e.g., from a portrait orientation to a landscape orientation, or vice versa), and the event information includes corresponding information about the current orientation (also called device attitude) of the device.

Event comparator 184 compares the event information to predefined event or sub-event definitions and, based on the comparison, determines an event or sub-event, or determines or updates the state of an event or sub-event. In some embodiments, event comparator 184 includes event definitions 186. Event definitions 186 contain definitions of events (e.g., predefined sequences of sub-events), for example, event 1 (187-1), event 2 (187-2), and others. In some embodiments, sub-events in an event 187 include, for example, touch begin, touch end, touch movement, touch cancellation, and multiple touching. In one example, the definition for event 1 (187-1) is a double tap on a displayed object. The double tap, for example, comprises a first touch (touch begin) on the displayed object for a predetermined phase, a first lift-off (touch end) for a predetermined phase, a second touch (touch begin) on the displayed object for a predetermined phase, and a second lift-off (touch end) for a predetermined phase. In another example, the definition for event 2 (187-2) is a dragging on a displayed object. The dragging, for example, comprises a touch (or contact) on the displayed object for a predetermined phase, a movement of the touch across touch-sensitive display 112, and lift-off of the touch (touch end). In some embodiments, the event also includes information for one or more associated event handlers 190.

In some embodiments, event definition 187 includes a definition of an event for a respective user-interface object. In some embodiments, event comparator 184 performs a hit test to determine which user-interface object is associated with a sub-event. For example, in an application view in which three user-interface objects are displayed on touch-sensitive display 112, when a touch is detected on touch-sensitive display 112, event comparator 184 performs a hit test to determine which of the three user-interface objects is associated with the touch (sub-event). If each displayed object is associated with a respective event handler 190, the event comparator uses the result of the hit test to determine which event handler 190 should be activated. For example, event comparator 184 selects an event handler associated with the sub-event and the object triggering the hit test.

In some embodiments, the definition for a respective event 187 also includes delayed actions that delay delivery of the event information until after it has been determined whether the sequence of sub-events does or does not correspond to the event recognizer's event type.

When a respective event recognizer 180 determines that the series of sub-events do not match any of the events in event definitions 186, the respective event recognizer 180 enters an event impossible, event failed, or event ended state, after which it disregards subsequent sub-events of the touch-based gesture. In this situation, other event recognizers, if any, that remain active for the hit view continue to track and process sub-events of an ongoing touch-based gesture.

In some embodiments, a respective event recognizer 180 includes metadata 183 with configurable properties, flags, and/or lists that indicate how the event delivery system should perform sub-event delivery to actively involved event recognizers. In some embodiments, metadata 183 includes configurable properties, flags, and/or lists that indicate how event recognizers may interact with one another. In some embodiments, metadata 183 includes configurable properties, flags, and/or lists that indicate whether sub-events are delivered to varying levels in the view or programmatic hierarchy.

In some embodiments, a respective event recognizer 180 activates event handler 190 associated with an event when one or more particular sub-events of an event are recognized. In some embodiments, a respective event recognizer 180 delivers event information associated with the event to event handler 190. Activating an event handler 190 is distinct from sending (and deferred sending) sub-events to a respective hit view. In some embodiments, event recognizer 180 throws a flag associated with the recognized event, and event handler 190 associated with the flag catches the flag and performs a predefined process.

In some embodiments, event delivery instructions 188 include sub-event delivery instructions that deliver event information about a sub-event without activating an event handler. Instead, the sub-event delivery instructions deliver event information to event handlers associated with the series of sub-events or to actively involved views. Event handlers associated with the series of sub-events or with actively involved views receive the event information and perform a predetermined process.

In some embodiments, data updater 176 creates and updates data used in application 136-1. For example, data updater 176 updates the telephone number used in contacts module 137, or stores a video file used in video player module 145. In some embodiments, object updater 177 creates and updates objects used in application 136-1. For example, object updater 176 creates a new user-interface object or updates the position of a user-interface object. GUI updater 178 updates the GUI. For example, GUI updater 178 prepares display information and sends it to graphics module 132 for display on a touch-sensitive display.

In some embodiments, event handler(s) 190 includes or has access to data updater 176, object updater 177, and GUI updater 178. In some embodiments, data updater 176, object updater 177, and GUI updater 178 are included in a single module of a respective application 136-1 or application view 191. In other embodiments, they are included in two or more software modules.

It shall be understood that the foregoing discussion regarding event handling of user touches on touch-sensitive displays also applies to other forms of user inputs to operate multifunction devices 100 with input-devices, not all of which are initiated on touch screens, e.g., coordinating mouse movement and mouse button presses with or without single or multiple keyboard presses or holds, user movements taps, drags, scrolls, etc., on touch-pads, pen stylus inputs, movement of the device, oral instructions, detected eye movements, biometric inputs, and/or any combination thereof, which may be utilized as inputs corresponding to sub-events which define an event to be recognized.

Figure 2:
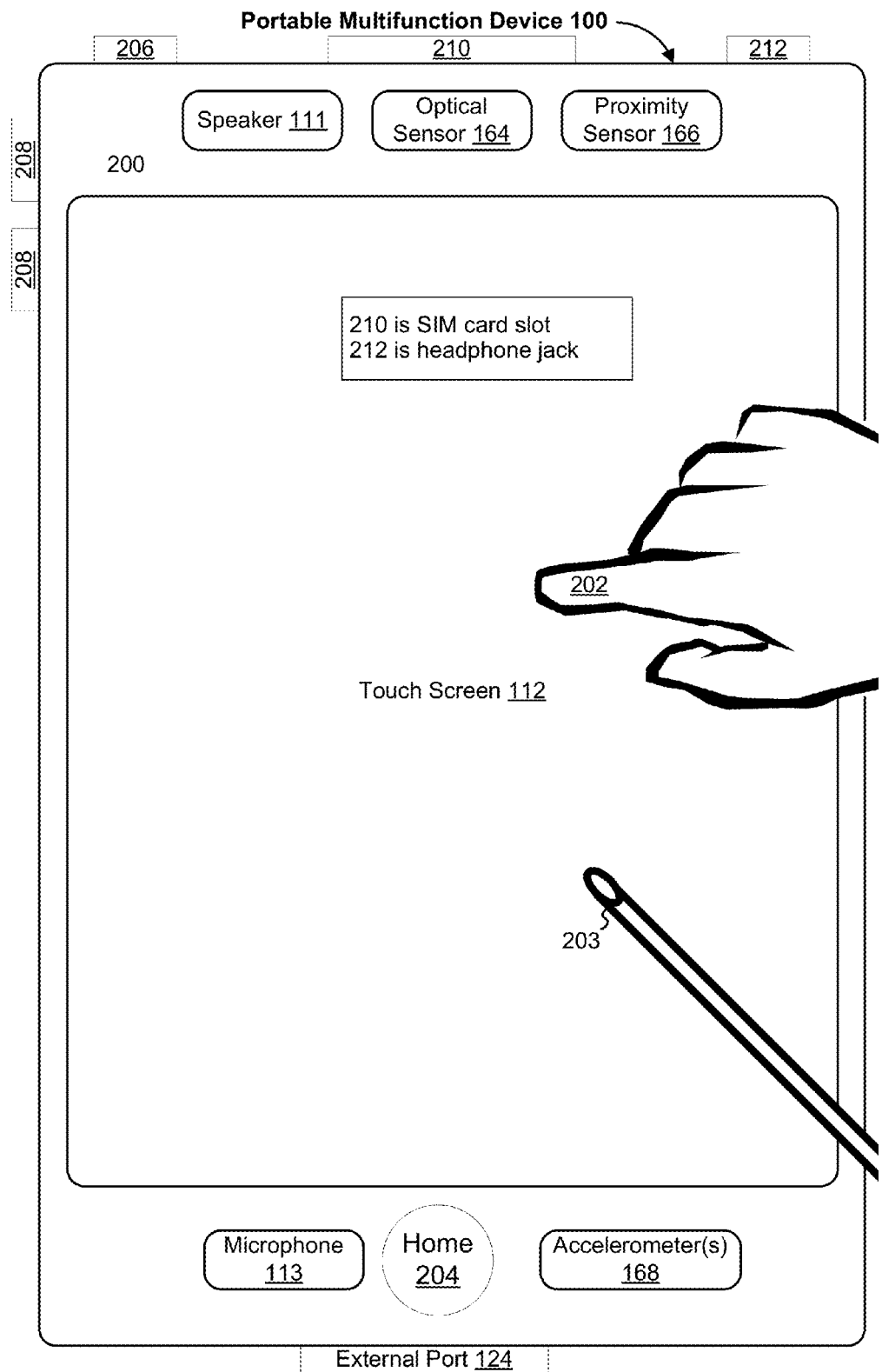
FIG. 2 illustrates a portable multifunction device having a touch screen in accordance with some embodiments.

FIG. 2 illustrates a portable multifunction device 100 having a touch screen 112 in accordance with some embodiments. The touch screen may display one or more graphics within user interface (UI) 200. In this embodiment, as well as others described below, a user may select one or more of the graphics by making contact or touching the graphics, for example, with one or more fingers 202 (not drawn to scale in the figure) or one or more styluses 203 (not drawn to scale in the figure). In some embodiments, selection of one or more graphics occurs when the user breaks contact with the one or more graphics. In some embodiments, the contact may include a gesture, such as one or more taps, one or more swipes (from left to right, right to left, upward and/or downward) and/or a rolling of a finger (from right to left, left to right, upward and/or downward) that has made contact with device 100. In some embodiments, inadvertent contact with a graphic may not select the graphic. For example, a swipe gesture that sweeps over an application icon may not select the corresponding application when the gesture corresponding to selection is a tap.

Device 100 may also include one or more physical buttons, such as "home" or menu button 204. As described previously, menu button 204 may be used to navigate to any application 136 in a set of applications that may be executed on device 100. Alternatively, in some embodiments, the menu button is implemented as a soft key in a GUI displayed on touch screen 112.

In one embodiment, device 100 includes touch screen 112, menu button 204, push button 206 for powering the device on/off and locking the device, volume adjustment button(s) 208, Subscriber Identity Module (SIM) card slot 210, head set jack 212, and docking/charging external port 124. Push button 206 may be used to turn the power on/off on the device by depressing the button and holding the button in the depressed state for a predefined time interval; to lock the device by depressing the button and releasing the button before the predefined time interval has elapsed; and/or to unlock the device or initiate an unlock process. In an alternative embodiment, device 100 also may accept verbal input for activation or deactivation of some functions through microphone 113.

FIG. 3 is a block diagram of an exemplary multifunction device with a display and a touch-sensitive surface in accordance with some embodiments. Device 300 need not be portable. In some embodiments, device 300 is a laptop computer, a desktop computer, a tablet computer, a multimedia player device, a navigation device, an educational device (such as a child's learning toy), a gaming system, or a control device (e.g., a home or industrial controller). Device 300 typically includes one or more processing units (CPU's) 310, one or more network or other communications interfaces 360, memory 370, and one or more communication buses 320 for interconnecting these components. Communication buses 320 may include circuitry (sometimes called a chipset) that interconnects and controls communications between system components. Device 300 includes input/output (I/O) interface 330 comprising display 340, which is typically a touch screen display. I/O interface 330 also may include a keyboard and/or mouse (or other pointing device) 350 and touchpad 355. Memory 370 includes high-speed random access memory, such as DRAM, SRAM, DDR RAM or other random access solid state memory devices; and may include non-volatile memory, such as one or more magnetic disk storage devices, optical disk storage devices, flash memory devices, or other non-volatile solid state storage devices. Memory 370 may optionally include one or more storage devices remotely located from CPU(s) 310. In some embodiments, memory 370 stores programs, modules, and data structures analogous to the programs, modules, and data structures stored in memory 102 of portable multifunction device 100 (FIG. 1), or a subset thereof. Furthermore, memory 370 may store additional programs, modules, and data structures not present in memory 102 of portable multifunction device 100. For example, memory 370 of device 300 may store drawing module 380, presentation module 382, word processing module 384, website creation module 386, disk authoring module 388, and/or spreadsheet module 390, while memory 102 of portable multifunction device 100 (FIG. 1) may not store these modules.

Each of the above identified elements in FIG. 3 may be stored in one or more of the previously mentioned memory devices. Each of the above identified modules corresponds to a set of instructions for performing a function described above. The above identified modules or programs (i.e., sets of instructions) need not be implemented as separate software programs, procedures or modules, and thus various subsets of these modules may be combined or otherwise re-arranged in various embodiments. In some embodiments, memory 370 may store a subset of the modules and data structures identified above. Furthermore, memory 370 may store additional modules and data structures not described above.

Attention is now directed towards embodiments of user interfaces ("UI") that may be implemented on portable multifunction device 100.

Figure 4A:
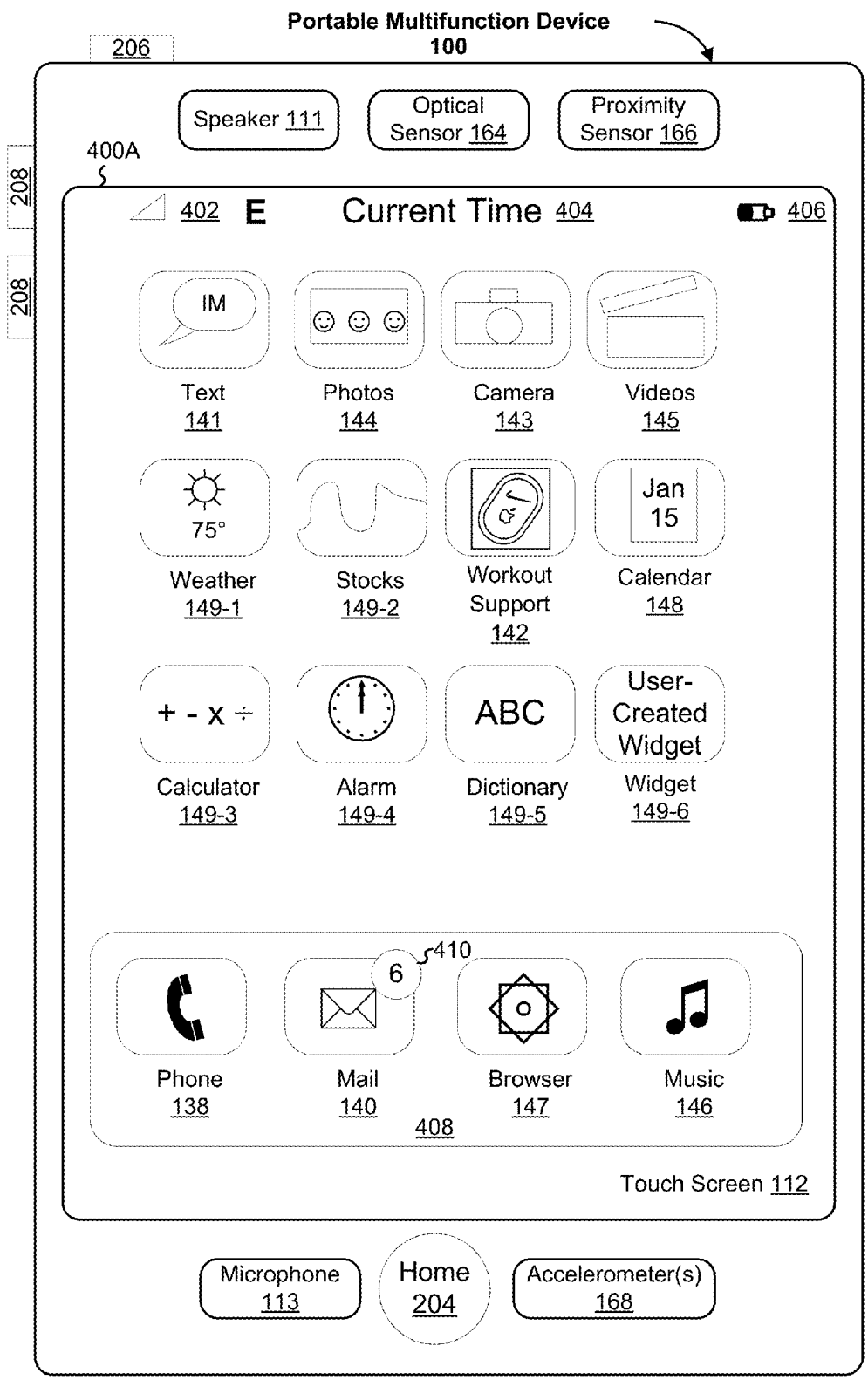
FIGS. 4A and 4B illustrate exemplary user interfaces for a menu of applications on a portable multifunction device in accordance with some embodiments.
Figure 4B:
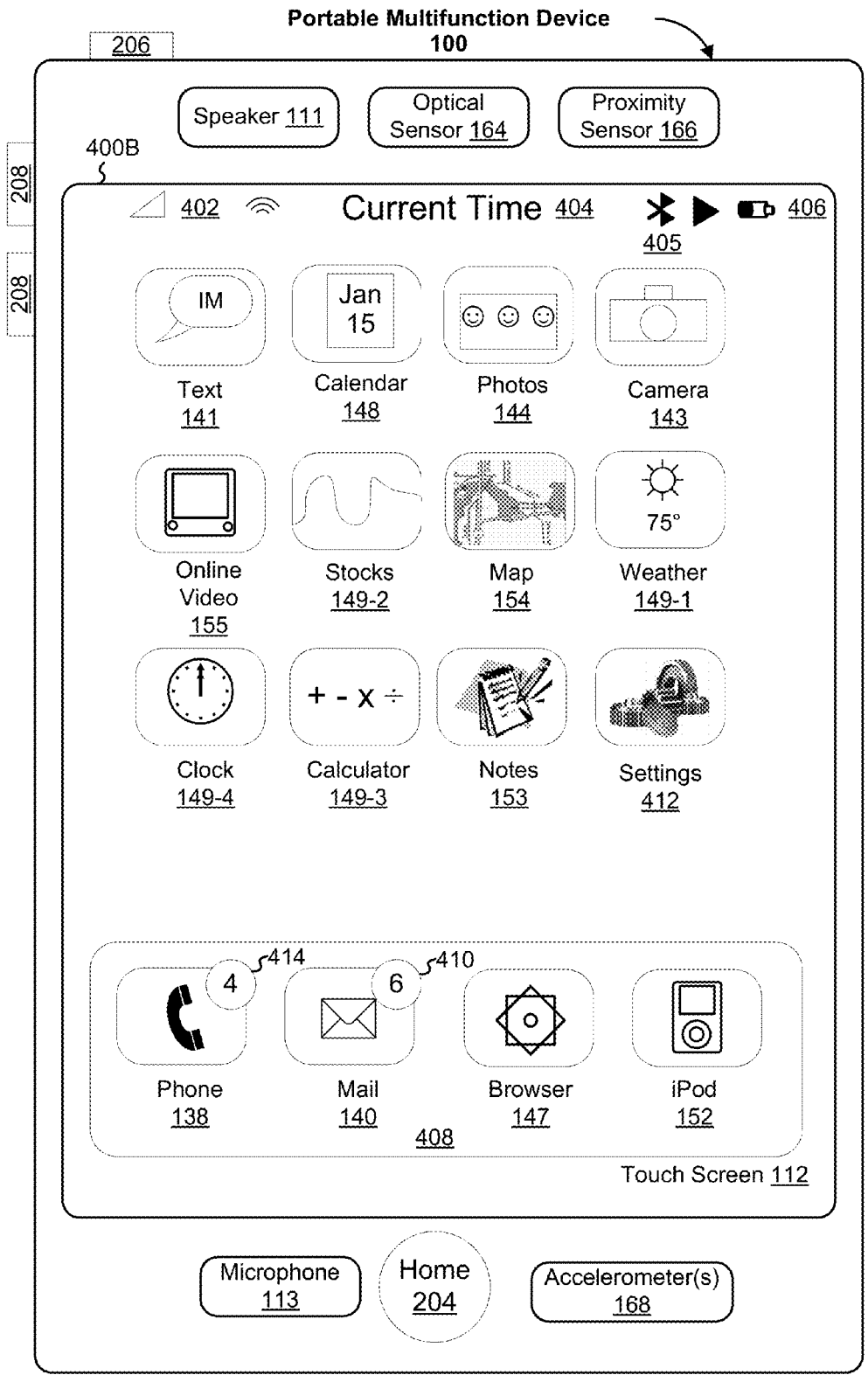

FIGS. 4A and 4B illustrate exemplary user interfaces for a menu of applications on portable multifunction device 100 in accordance with some embodiments. Similar user interfaces may be implemented on device 300. In some embodiments, user interface 400A includes the following elements, or a subset or superset thereof:

Signal strength indicator(s) 402 for wireless communication(s), such as cellular and Wi-Fi signals;
Time 404;
Bluetooth indicator 405;
Battery status indicator 406;
Tray 408 with icons for frequently used applications, such as:
Phone 138, which may include an indicator 414 of the number of missed calls or voicemail messages;

E-mail client 140, which may include an indicator 410 of the number of unread e-mails;

Browser 147; and

Music player 146; and

Icons for other applications, such as:

IM 141;

Image management 144;

Camera 143;

Video player 145;

Weather 149-1;

Stocks 149-2;

Workout support 142;

Calendar 148;

Calculator 149-3;

Alarm clock 149-4;

Dictionary 149-5; and

User-created widget 149-6.

In some embodiments, user interface 400B includes the following elements, or a subset or superset thereof:

402, 404, 405, 406, 141, 148, 144, 143, 149-3, 149-2, 149-1, 149-4, 410, 414, 138, 140, and 147, as described above;

Map 154;

Notes 153;

Settings 412, which provides access to settings for device 100 and its various applications 136, as described further below;

Video and music player module 152, also referred to as iPod (trademark of Apple Inc.) module 152; and Online video module 155, also referred to as YouTube (trademark of Google Inc.) module 155.

Figure 4C:
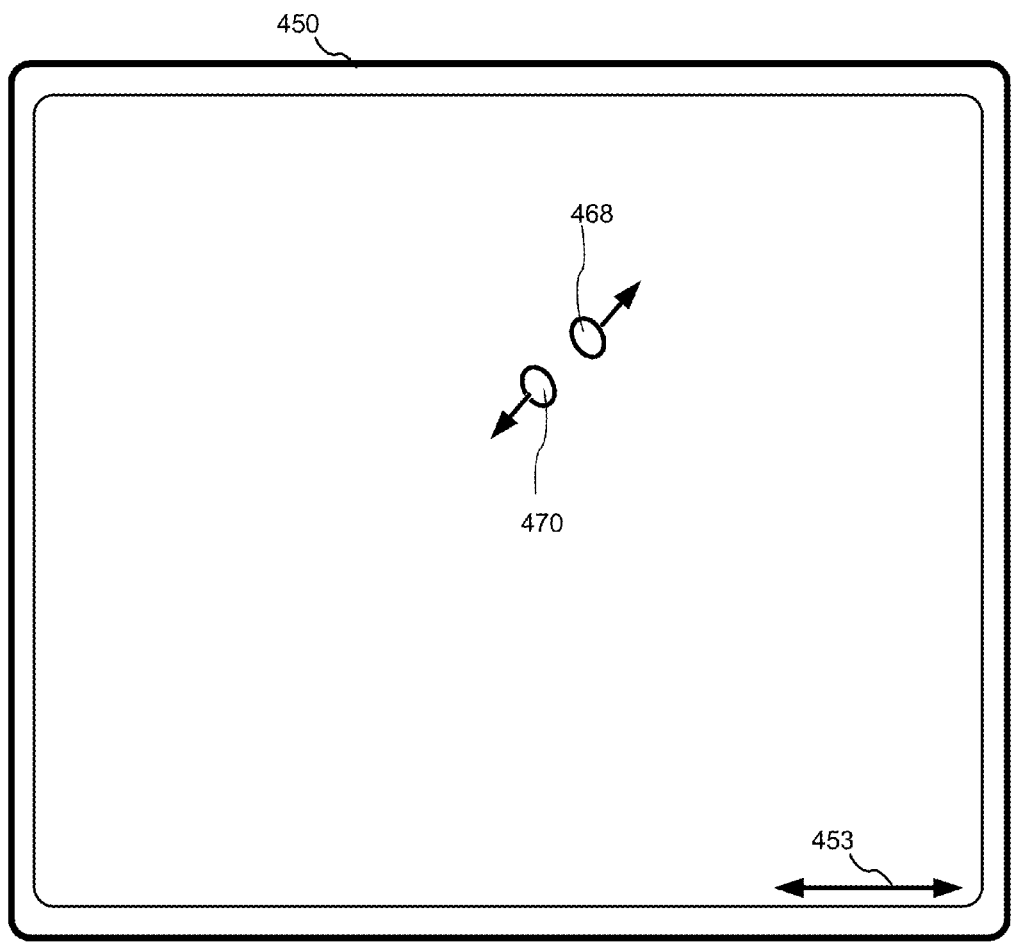
FIG. 4C illustrates an exemplary user interface for a multifunction device with a touch-sensitive surface that is separate from the display in accordance with some embodiments.
Figure 4C:
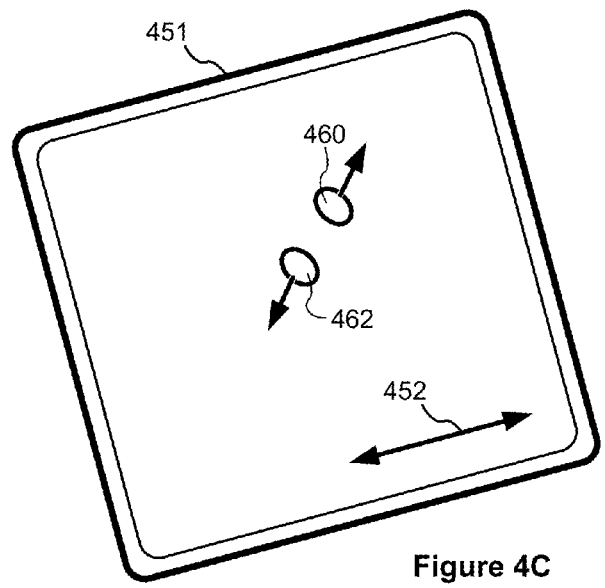

FIG. 4C illustrates an exemplary user interface on a device (e.g., device 300, FIG. 3) with a touch-sensitive surface 451 (e.g., a tablet or touchpad 355, FIG. 3) that is separate from the display 450 (e.g., touch screen display 112). Although many of the examples which follow will be given with reference to inputs on touch screen display 112 (where the touch sensitive surface and the display are combined), in some embodiments, the device detects inputs on a touch-sensitive surface that is separate from the display, as shown in FIG. 4C. In some embodiments the touch sensitive surface (e.g., 451 in FIG. 4C) has a primary axis (e.g., 452 in FIG. 4C) that corresponds to a primary axis (e.g., 453 in FIG. 4C) on the display (e.g., 450). In accordance with these embodiments, the device detects contacts (e.g., 460 and 462 in FIG. 4C) with the touch-sensitive surface 451 at locations that correspond to respective locations on the display (e.g., in FIG. 4C 460 corresponds to 468 and 462 corresponds to 470). In this way, user inputs (e.g., contacts 460 and 462, and movements thereof) detected by the device on the touch-sensitive surface (e.g., 451 in FIG. 4C) are used by the device to manipulate the user interface on the display (e.g., 450 in FIG. 4C) of the multifunction device when the touch-sensitive surface is separate from the display. It should be understood that similar methods may be used for other user interfaces described herein.

Additionally, while the following examples are given primarily with reference to finger inputs (e.g., finger contacts, finger tap gestures, finger swipe gestures), it should be understood that, in some embodiments, one or more of the finger inputs are replaced with input from another input device (e.g., a mouse based input or stylus input). For example, a swipe gesture may be replaced with a mouse click (e.g., instead of a contact) followed by movement of the cursor along the path of the swipe (e.g., instead of movement of the contact). As another example, a tap gesture may be replaced with a mouse click while the cursor is located over the location of the tap gesture (e.g., instead of detection of the contact followed by ceasing to detect the contact). Similarly, when multiple user inputs are simultaneously detected, it should be understood that multiple computer mice may be used simultaneously, or a mouse and finger contacts may be used simultaneously.

Attention is now directed towards embodiments of user interfaces ("UI") and associated processes that may be implemented on a multifunction device with a display and a touch-sensitive surface, such as device 300 or portable multifunction device 100.

While the following examples of modifying a table are given primarily with reference to a table (e.g., 5002 in FIGS. 5A-5PP) in a spreadsheet application, it should be understood that analogous modifications could also be performed on a table in a different kind of electronic document authoring application (e.g., a word processing application, a presentation application, a webpage authoring application, etc.) or electronic document display application (e.g., a spreadsheet viewer, a web browser, etc.). Similarly, in some embodiments, the methods described herein may also be used to manipulate displayed data that includes rows and/or columns of data that is not explicitly organized into a table (e.g., files in a file management program, or a media content management program).

In the exemplary embodiments described in greater detail below, in addition to the table (e.g., 5002 in FIGS. 5A-5PP) that is being manipulated, the spreadsheet application includes a plurality of other regions which provide additional functionality. For example, in FIGS. 5A-5PP, the device displays the table (e.g., 5002 in FIGS. 5A-5PP) in a worksheet of a spreadsheet application (e.g., Numbers). In some embodiments, cells which are empty have a numerical value that is equal to zero. In some embodiments, the spreadsheet application includes a command region (e.g., 5003 in FIGS. 5A-5PP) including commands for editing and otherwise modifying the table (e.g., 5002 in FIGS. 5A-5PP) or the entire spreadsheet. In some embodiments the spreadsheet application also includes a properties region (e.g., 5004 in FIGS. 5A-5PP) for changing the properties of text in cells of the table (e.g., 5002 in FIGS. 5A-5PP) or other elements in the spreadsheet document. Additionally, in this example, a navigation region (e.g., 5006 in FIGS. 5A-5PP) is also displayed, which includes representations of other worksheets in the spreadsheet document and enables the user to navigate between different worksheets of the spreadsheet application.

FIGS. 5A-5G illustrate exemplary user interfaces for manipulating a table using multi-contact gestures in accordance with some embodiments. The user interfaces in these figures are used to illustrate the processes described below, including the processes in FIGS. 6A-6C, 7A-7E, 8A-8C, 9 and 10A-10C.

Figure 5A:
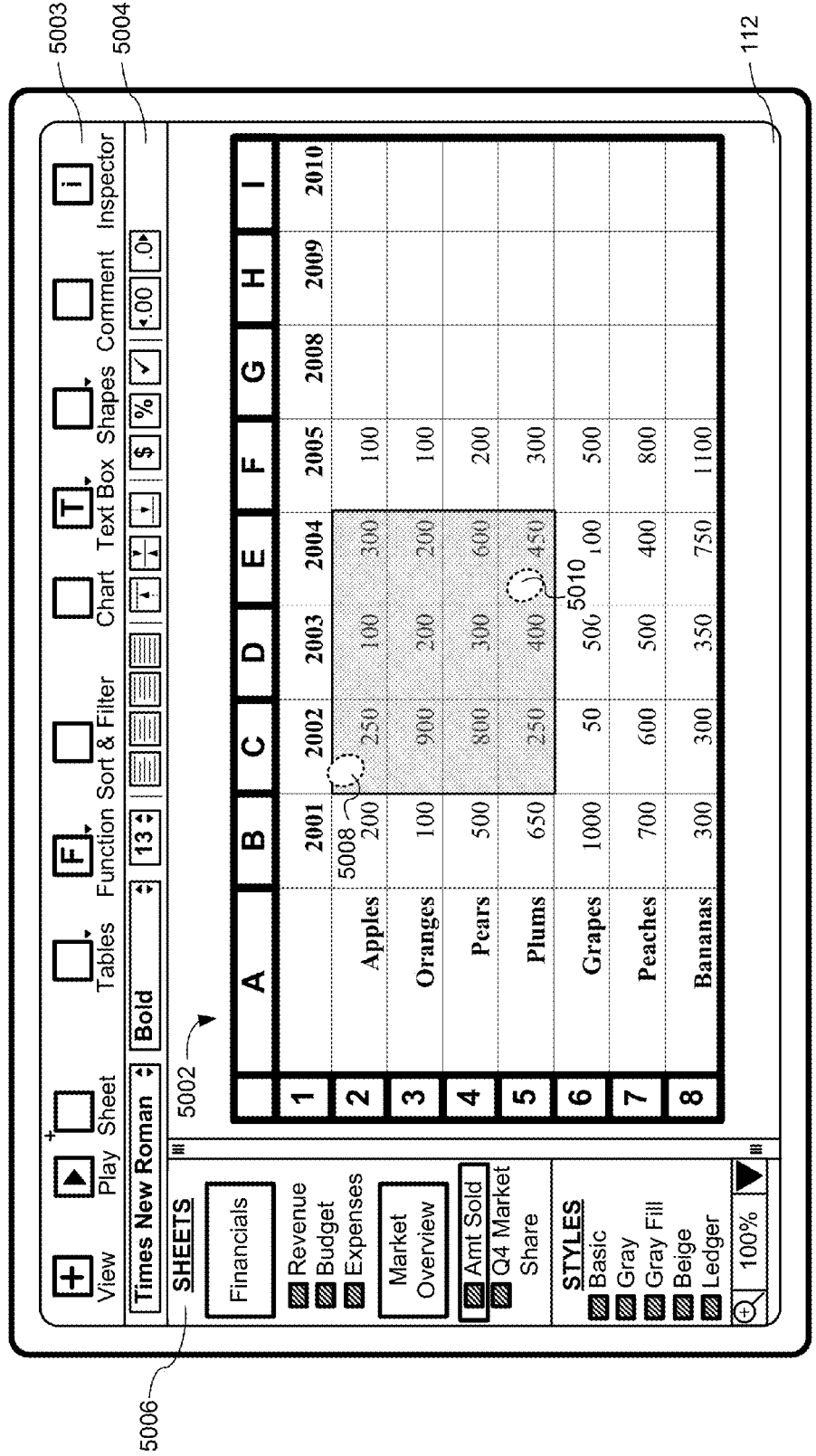
FIGS. 5A-5PP illustrate exemplary user interfaces for manipulating tables using multi-contact gestures in accordance with some embodiments.
Figure 5B:
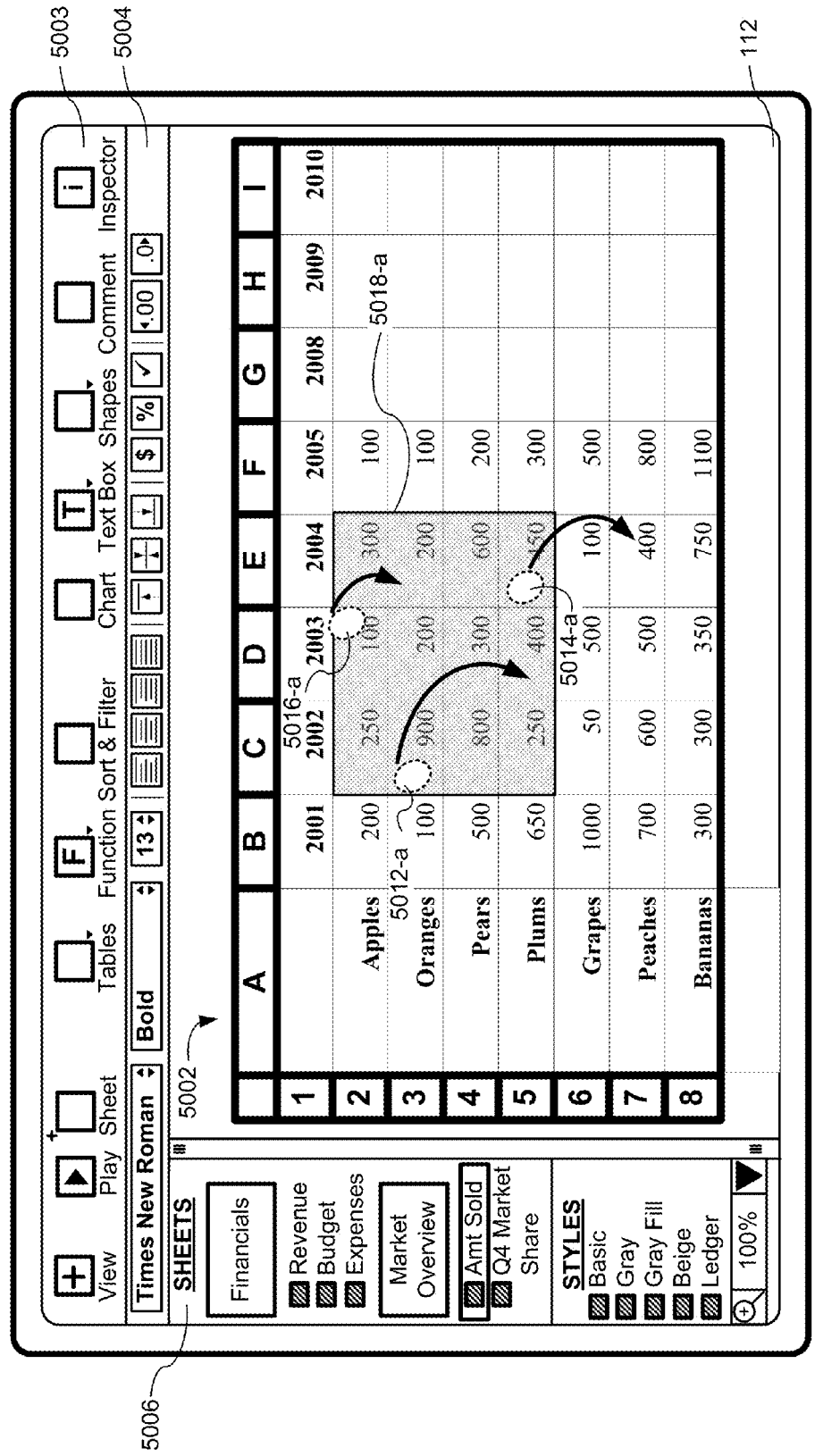

FIGS. 5A-5B illustrate selecting a plurality of cells in a table 5002 based on a plurality of simultaneous contacts (e.g., 5008 and 5010 in FIGS. 5A and 5012, 5014 and 5016 in FIG. 5B).

Figure 5C:
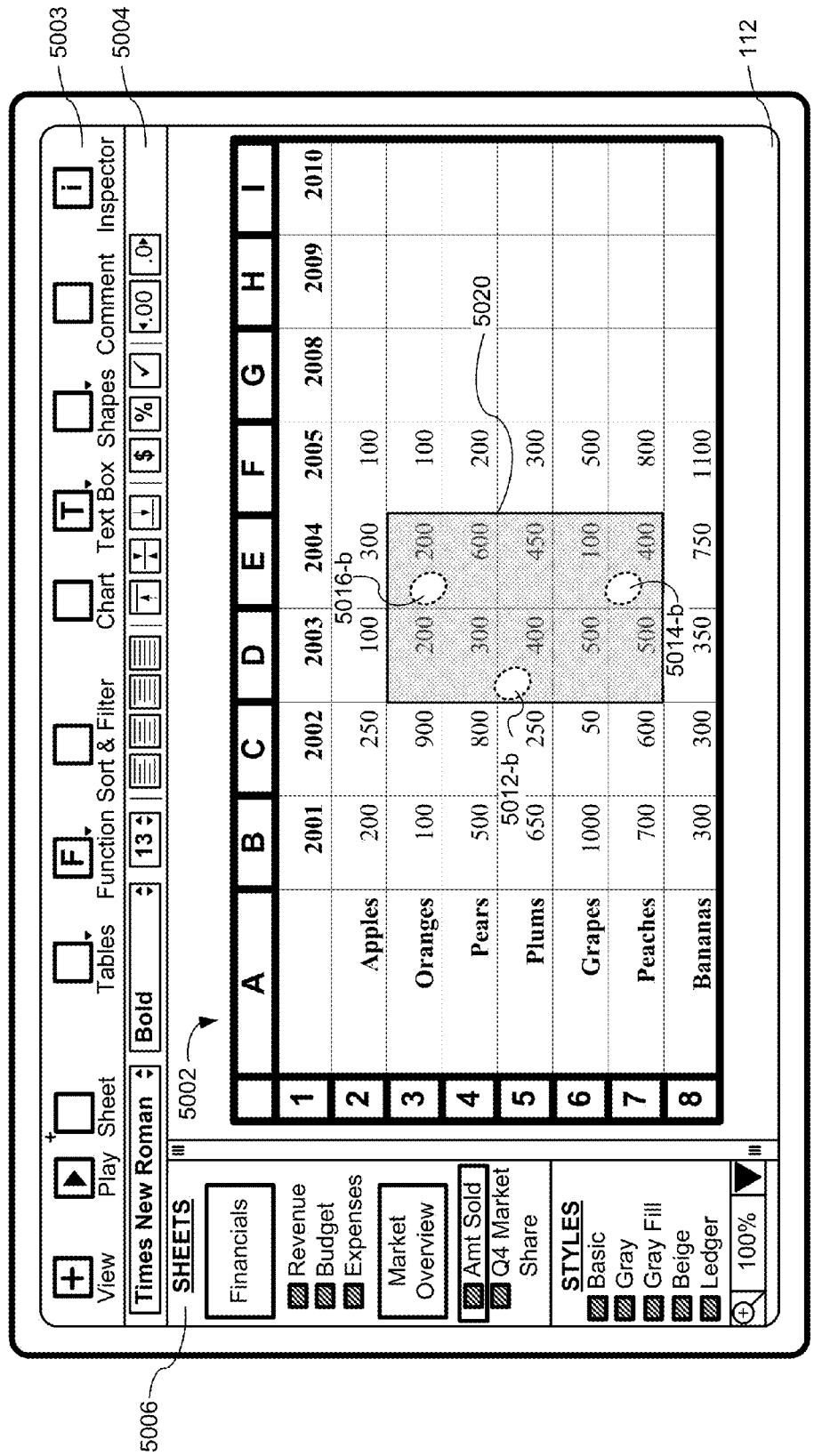

FIGS. 5B-5C illustrate updating the selected plurality of cells in response to movement of a plurality of contacts from a plurality of respective initial locations (e.g., 5012-*a*, 5014-*a* and 5016-*a* in FIG. 5B) to a plurality of respective updated locations (e.g., 5012-*b*, 5014-*b* and 5016-*b* in FIG. 5C).

FIGS. 5D-5G illustrate fixing the selection of the selected plurality of cells and moving the plurality of cells in response to detecting a second gesture that includes detecting a contact (e.g., 5022-*a* in FIG. 5E) at a location on the touch screen display 112 that corresponds to the location of the fixed selection of cells, and detecting subsequent movement 5024 of the contact 5022 to an new location (e.g., 5022-*b* in FIG.

5F), and in response to detecting the second gesture, the device moves the plurality of cells to a new location based on the movement of the contact 5022.

Figure 5D:
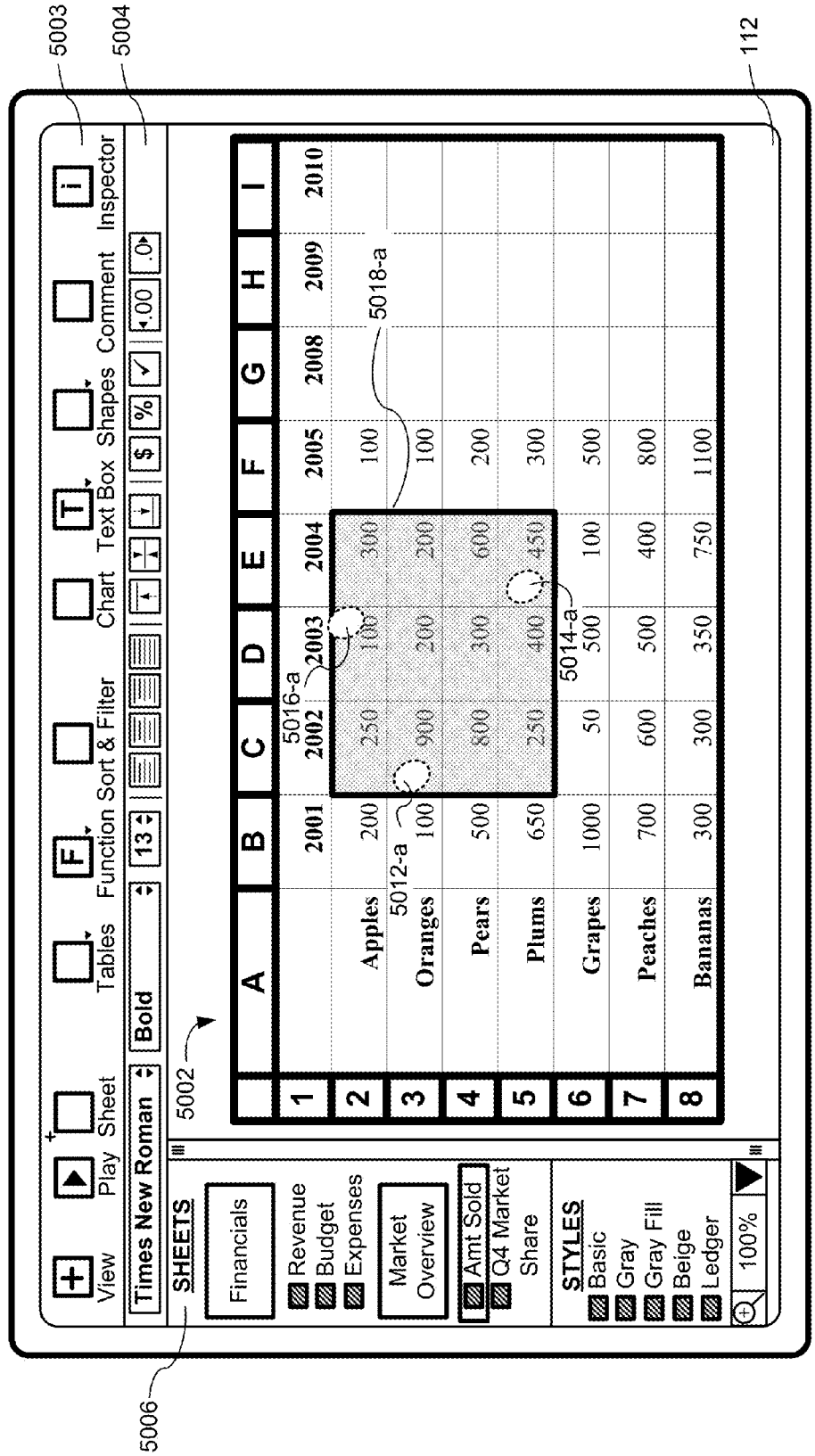
Figure 5E:
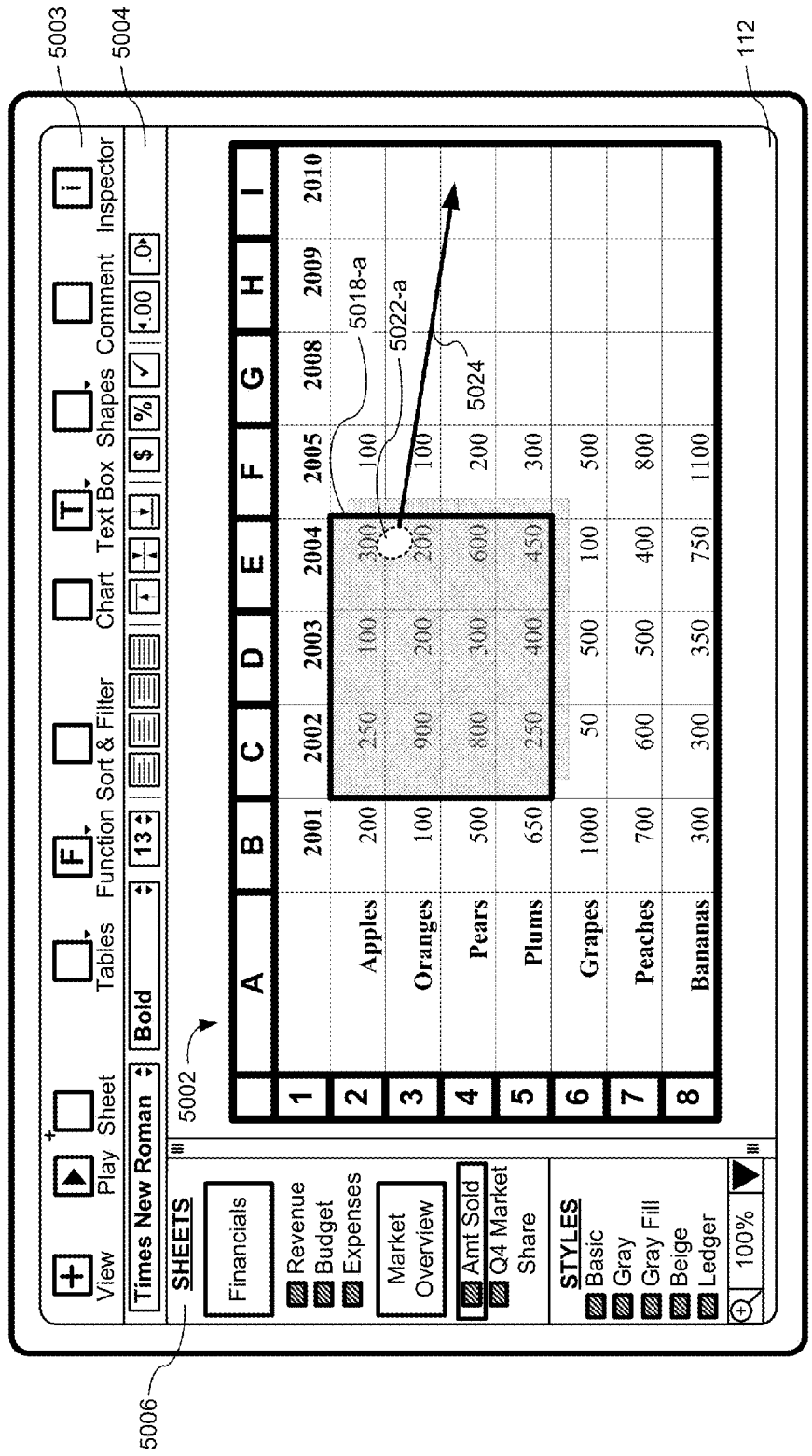
Figure 5F:
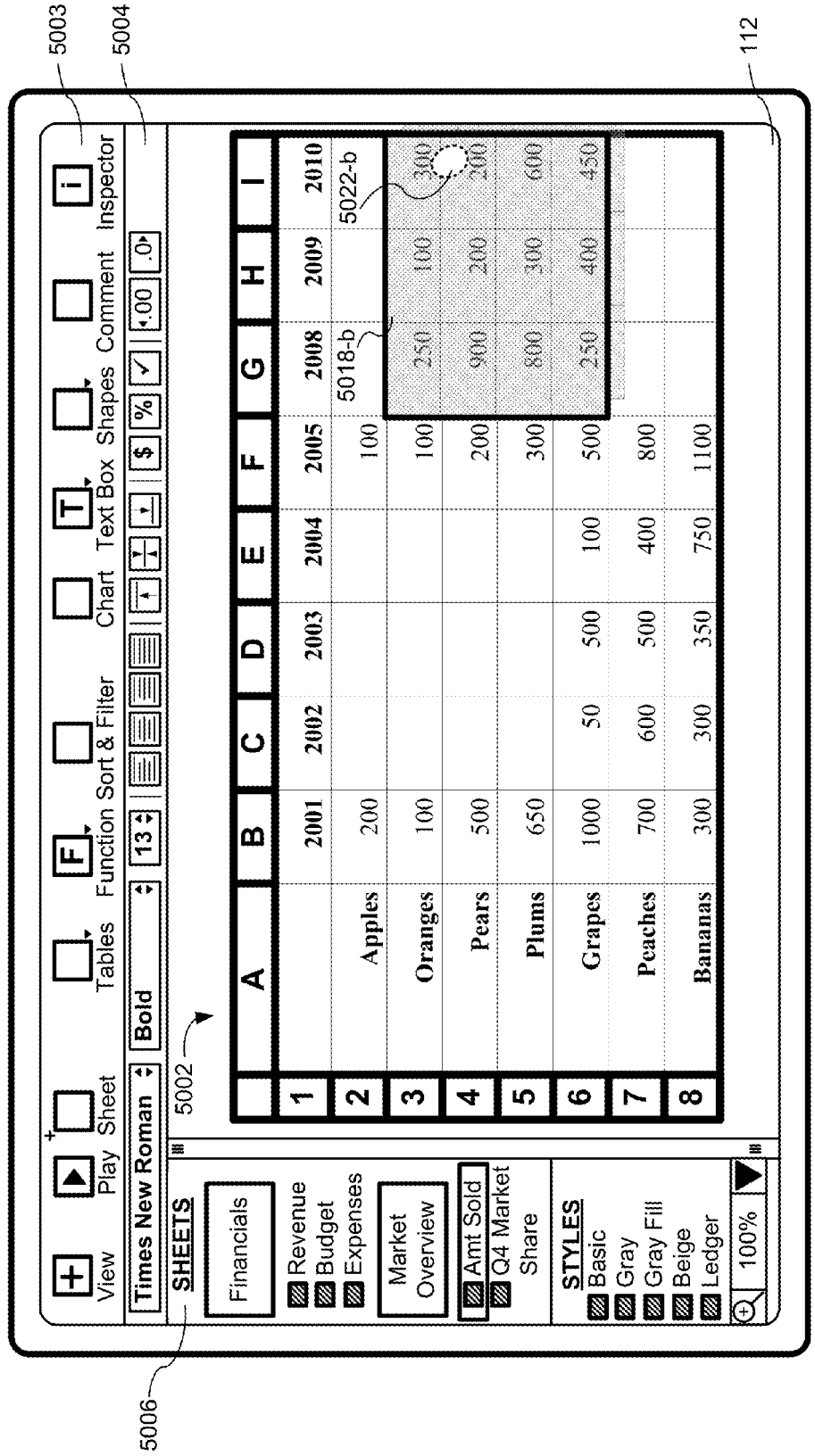
Figure 5G:
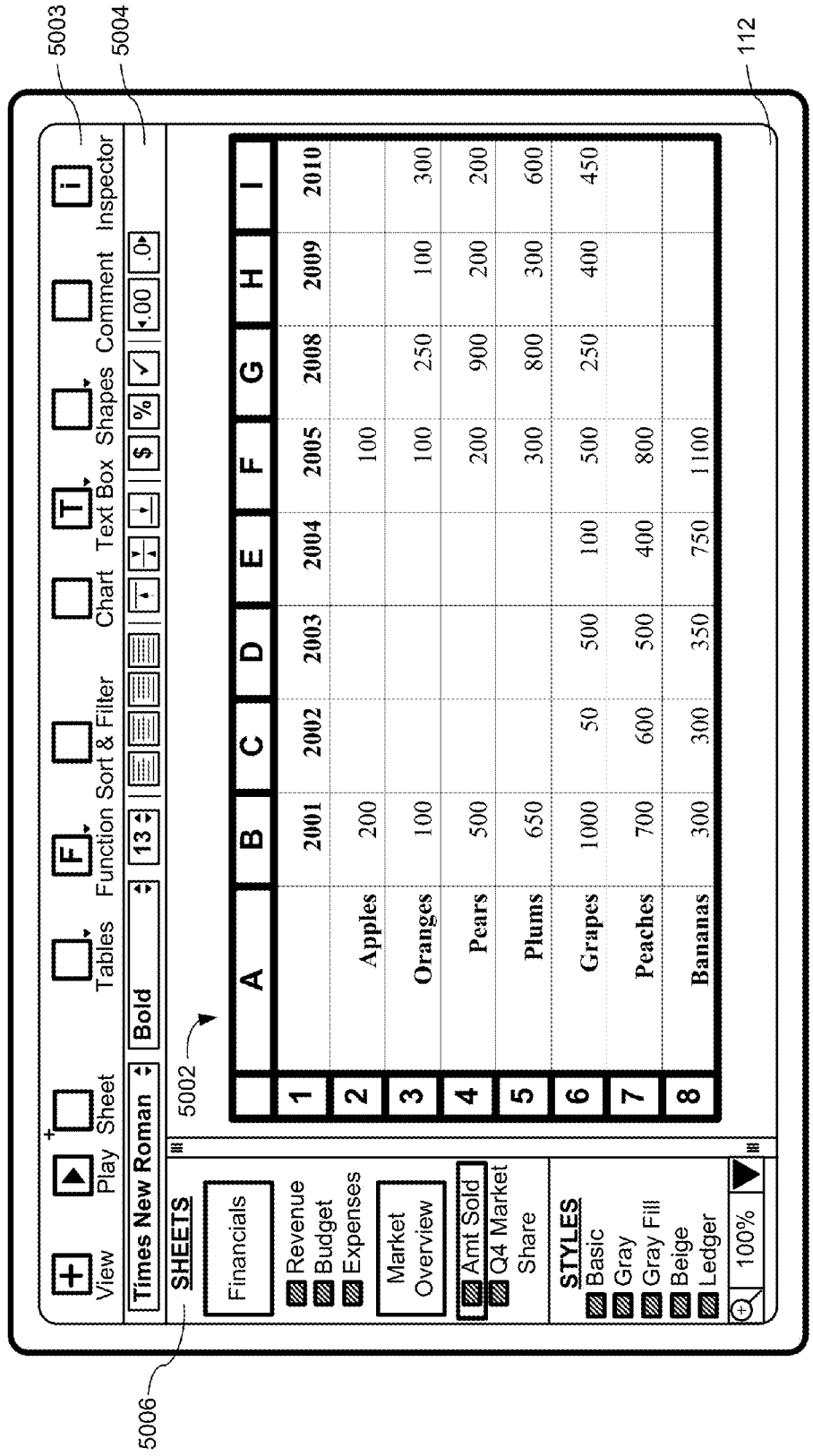
Figure 5H:
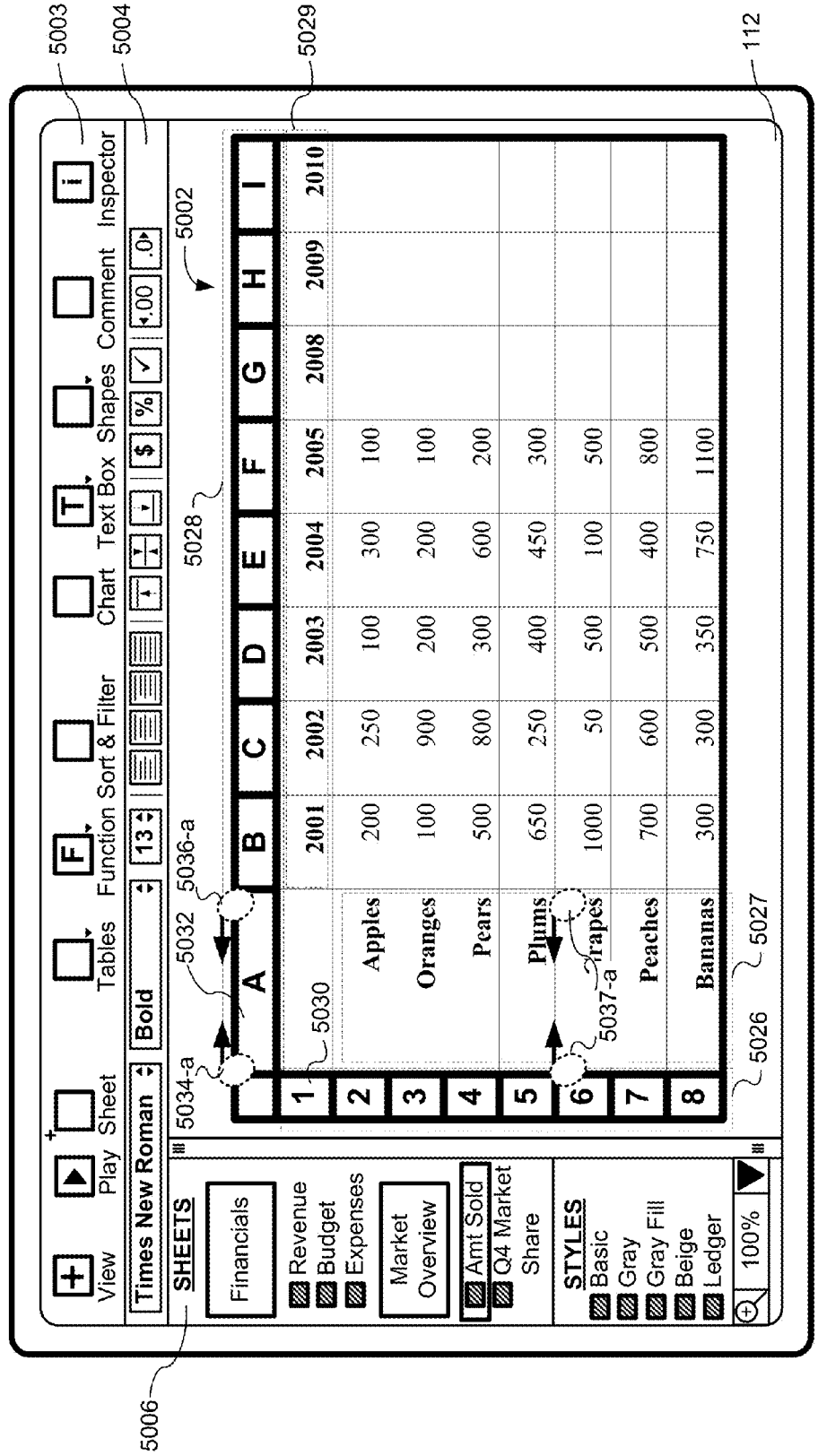
Figure 5I:
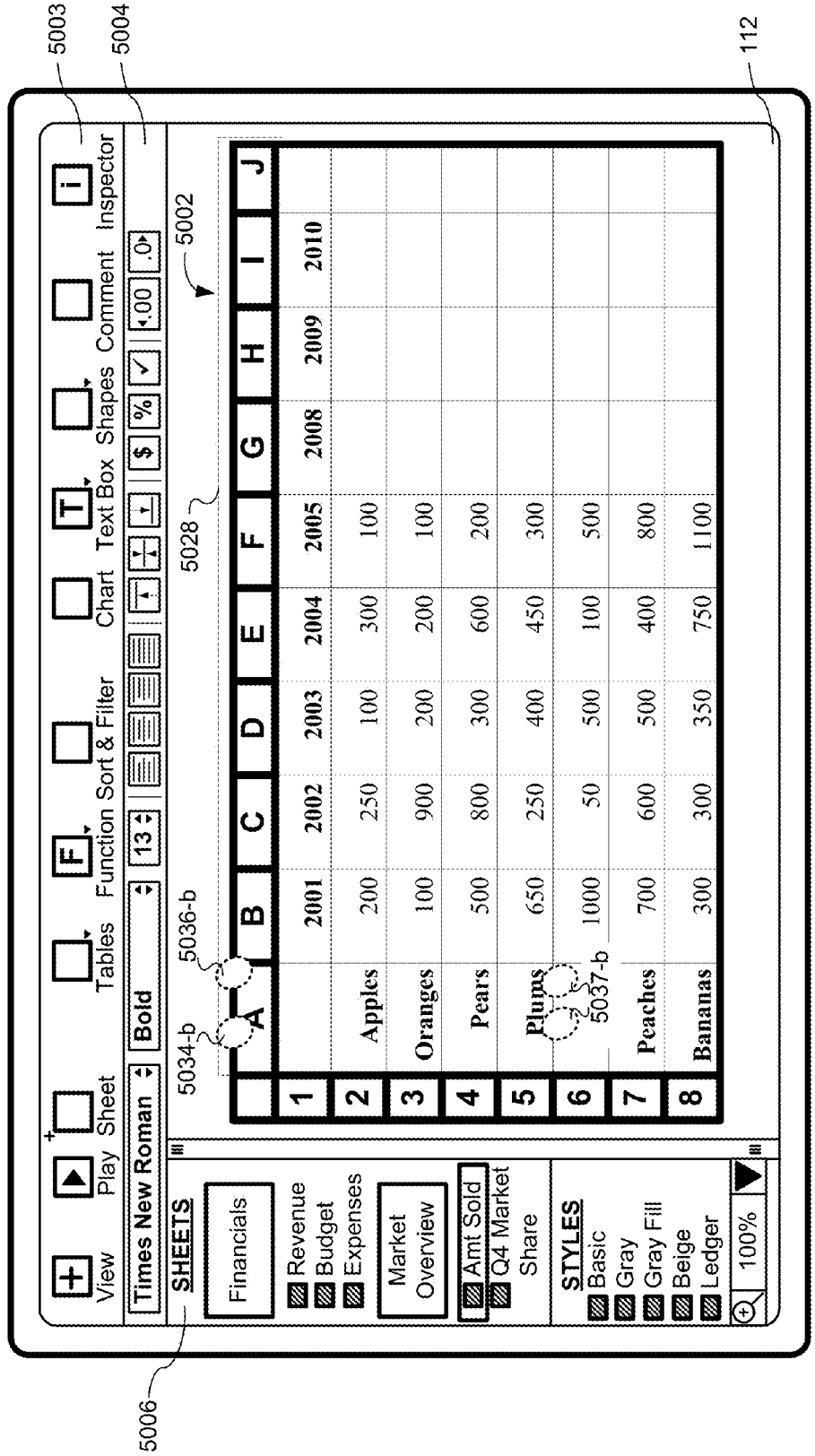

FIGS. 5H-5I illustrate detecting a pinch gesture that includes detecting two contacts (e.g., at locations 5034-*a* and 5036-*a* in FIG. 5H) in a column header region 5028 at locations corresponding to a column header (e.g., 5032 in FIG. 5H) for a single column (e.g., column A), subsequently detecting movement of two contacts towards each other (e.g., to locations 5034-*b* and 5036-*b* in FIG. 5I), and responding to detection of the pinch gesture by decreasing the width of the column (e.g., column A) associated with the column header (e.g., 5032 in FIG. 5H), as illustrated in FIG. 5I.

Figure 5J:
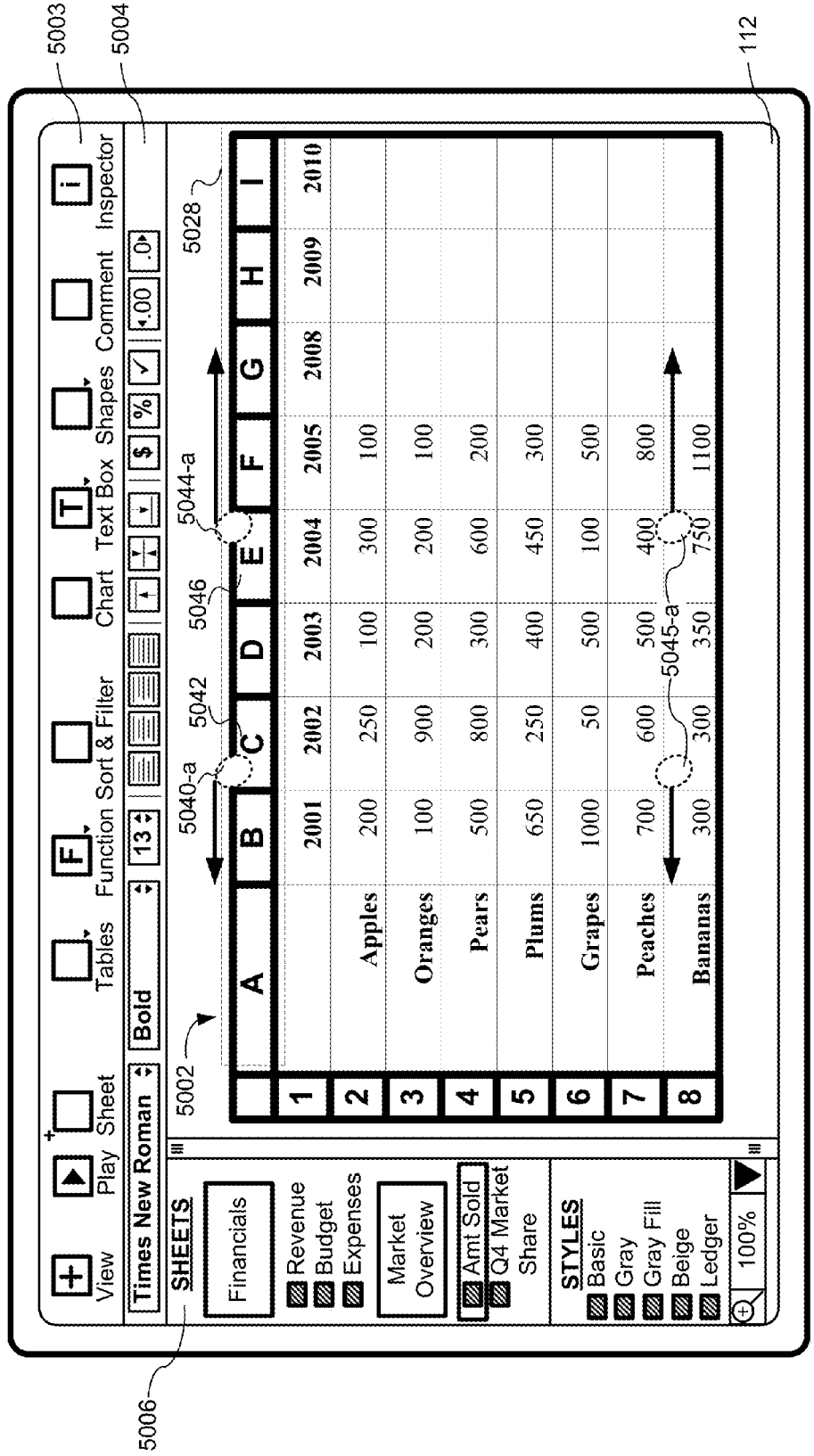
Figure 5K:
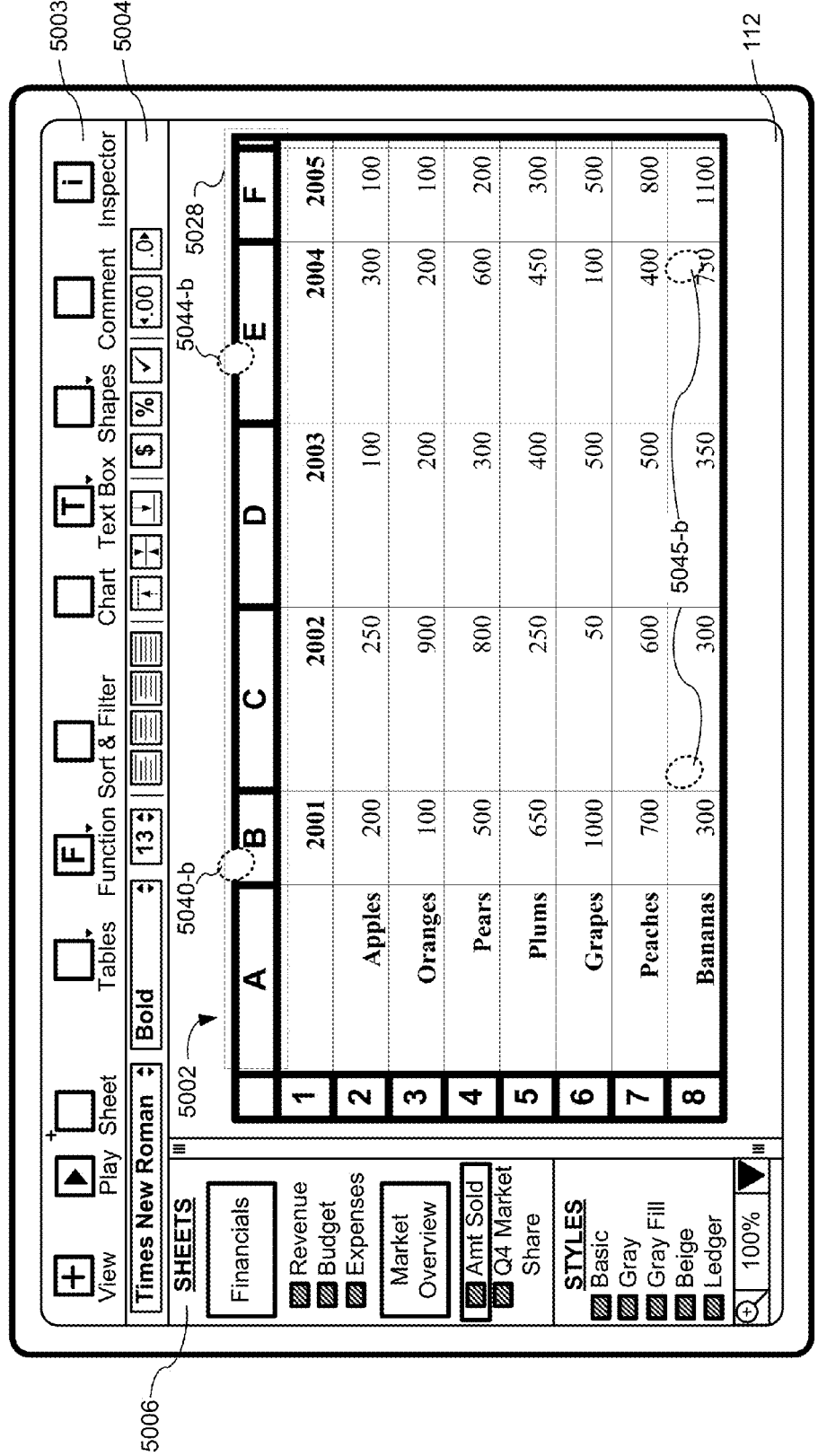

FIGS. 5J-5K illustrate detecting a de-pinch gesture that includes detecting two contacts (e.g., at locations 5040-*a* and 5044-*a* in FIG. 5J) in a column header region 5028 at locations corresponding to two distinct column headers (e.g., 5042 and 5046, respectively, in FIG. 5J) for different columns (e.g., column C and column E, respectively), subsequently detecting movement of two contacts away from each other (e.g., to locations 5040-*b* and 5044-*b* in FIG. 5K), and responding to detection of the de-pinch gesture by increasing the width of the columns (e.g., columns C and E) associated with the column headers (e.g., 5042 and 5046, respectively, in FIG. 5J) as well as increasing the width of the column(s) between the two distinct column headers (e.g., column D), as illustrated in FIG. 5K.

Figure 5L:
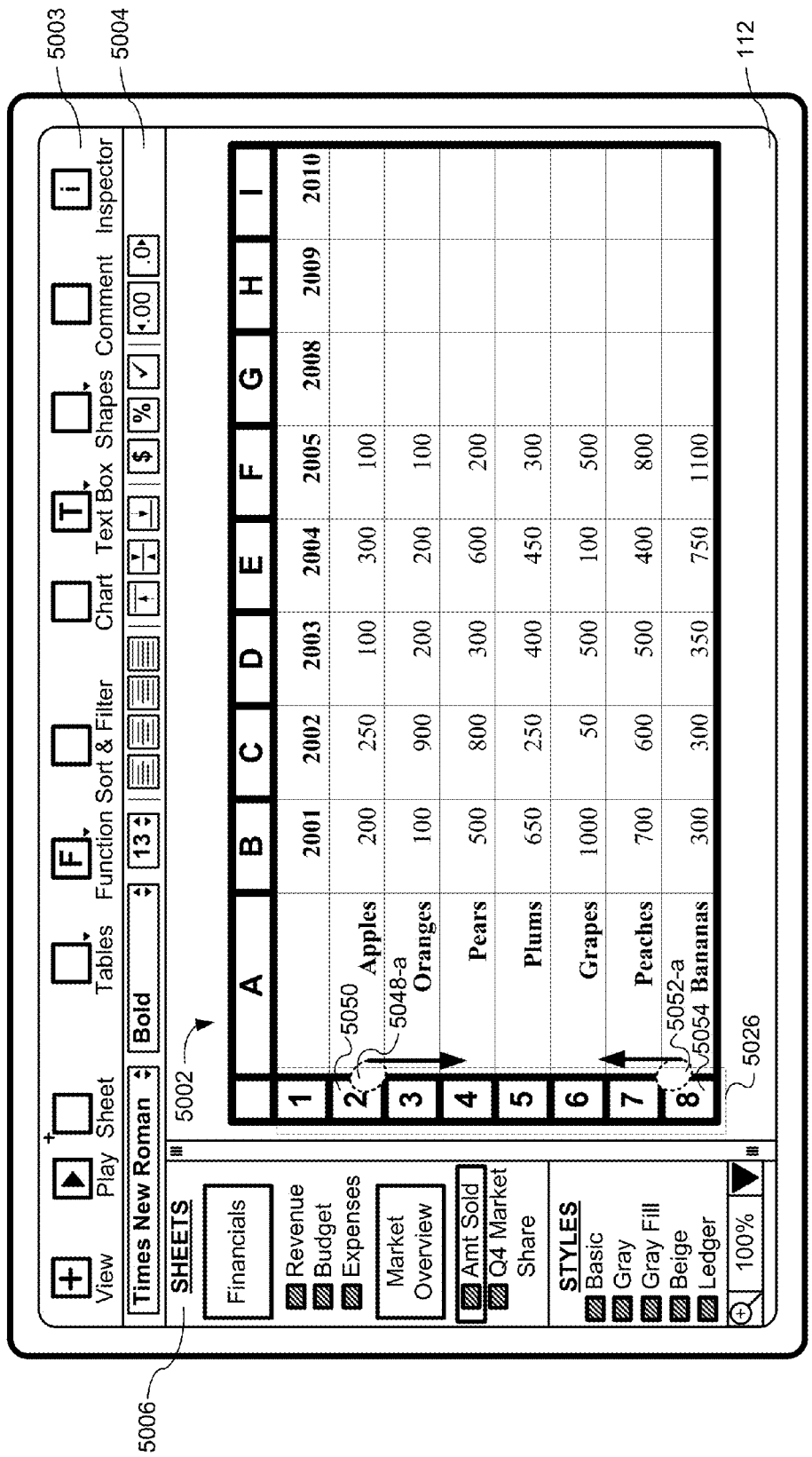
Figure 5M:
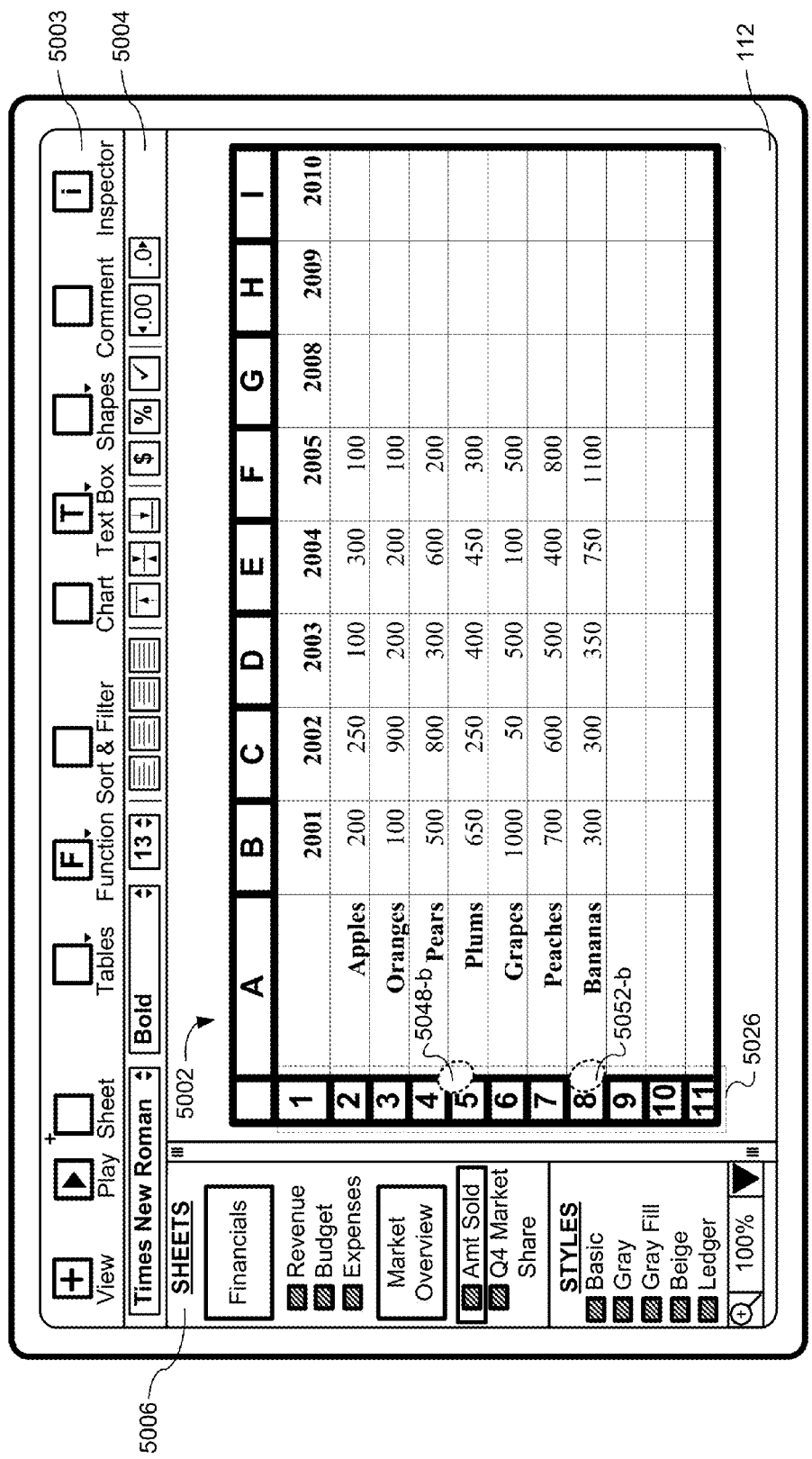

FIGS. 5L-5M illustrate detecting a pinch gesture that includes detecting two contacts (e.g., at locations 5048-*a* and 5052-*a* in FIG. 5L) in a row header region 5026 at locations corresponding to two distinct row headers (e.g., 5050 and 5054, respectively, in FIG. 5L) for different rows (e.g., row 2 and row 8, respectively), subsequently detecting movement of the two contacts towards each other (e.g., to locations 5048-*b* and 5052-*b* in FIG. 5M), and responding to detection of the pinch gesture by decreasing the height of the rows (e.g., rows 2 and 8) associated with the row headers (e.g., 5050 and 5054, respectively, in FIG. 5L), as well as decreasing the height of the other rows, as illustrated in FIG. M.

Figure 5N:
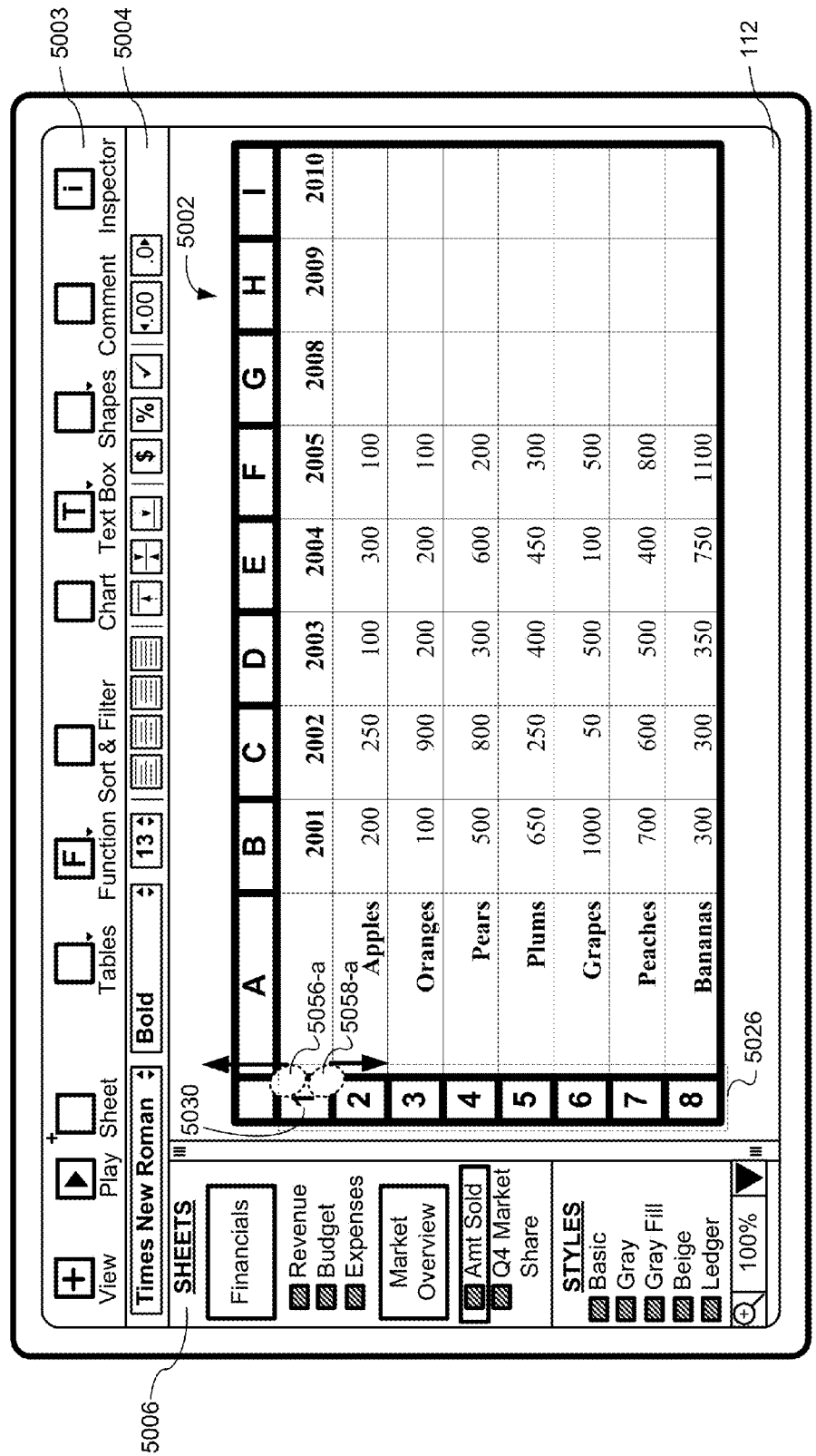
Figure 5O:
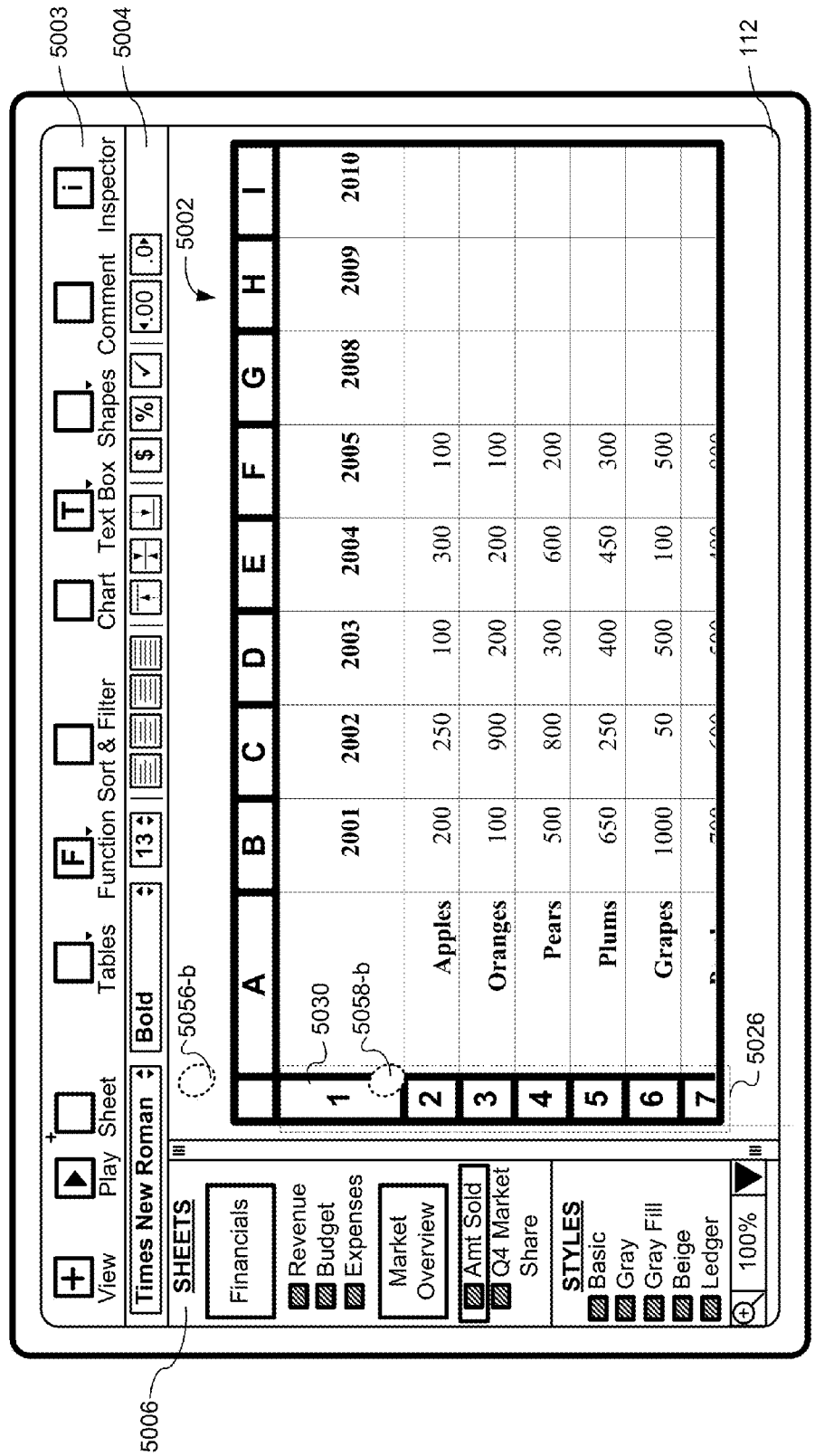

FIGS. 5N-5O illustrate detecting a de-pinch gesture that includes detecting two contacts (e.g., at locations 5056-*a* and 5058-*a* in FIG. 5N) in a row header region 5026 at locations corresponding to a single row header (e.g., 5030, in FIG. 5N) for a respective row (e.g., row 1), subsequently detecting movement of the two contacts away from each other (e.g., to locations 5056-*b* and 5058-*b* in FIG. 5O), and responding to detection of the de-pinch gesture by increasing the height of the row (e.g., row 1) associated with the row header (e.g., 5030 in FIG. 5N), as illustrated in FIG. O.

FIGS. 5P-5S illustrate detecting a swipe gesture (e.g., including contacts 5060 and 5062) that originates in a column header 5064 and moves downwards along the column (e.g., column C), and in response to detecting the swipe gesture, sorting the table in accordance with the content (e.g., values) in the column (e.g., column C). These figures also illustrate displaying an animation of a respective one of the rows moving to their final location in the sorted table (e.g., the row moving from an initial location 5066-*a* at row 3 of the table 5002 in FIG. 5P through one or more intermediate locations 5066-*b* in FIG. 5R to a final location 5066-*c* at row 2' of the table 5002 in FIG. 5S). The final sorted table is displayed in FIG. 5S.

Figure 5P:
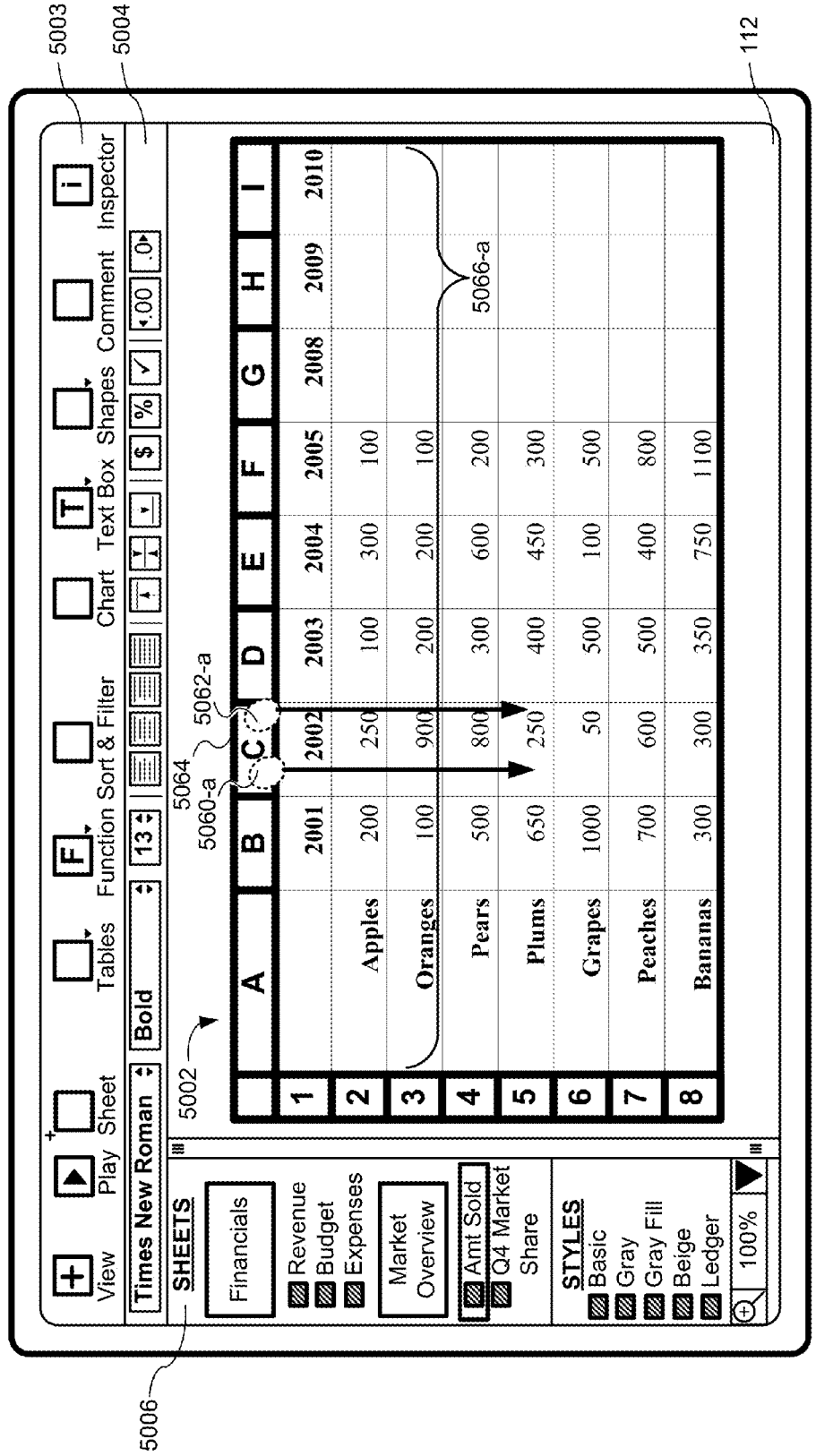
Figure 5Q:
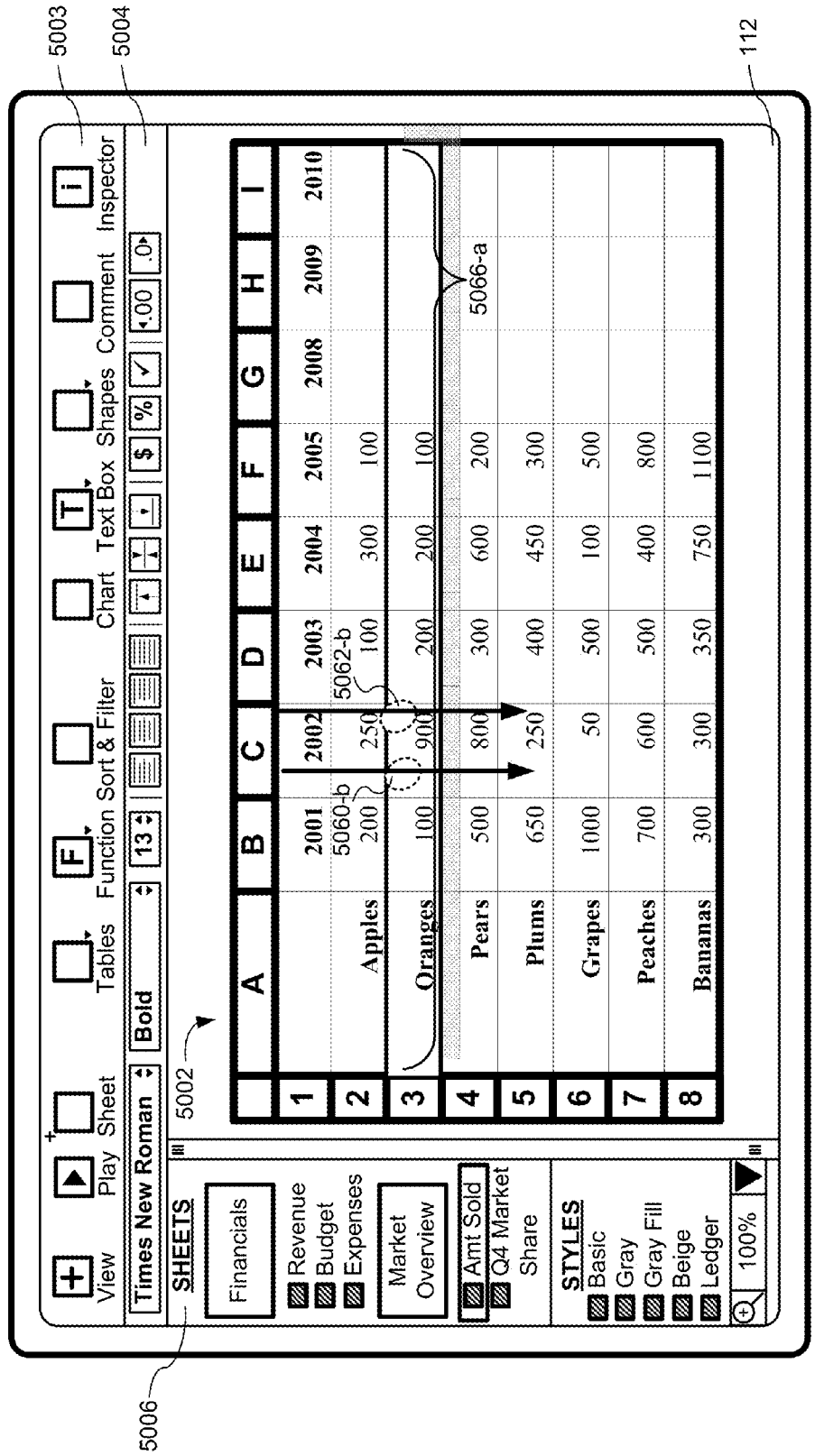
Figure 5R:
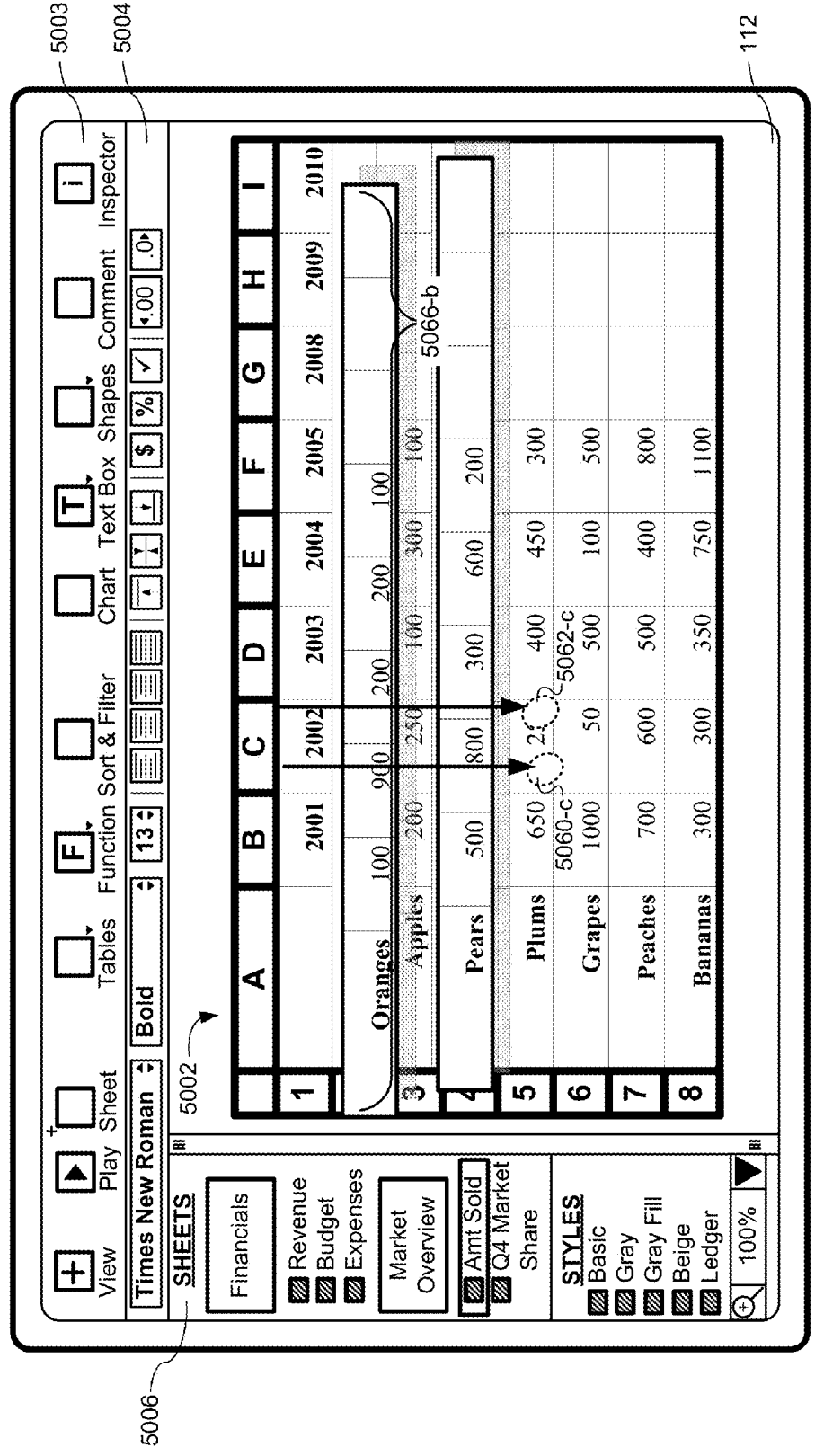
Figure 5S:
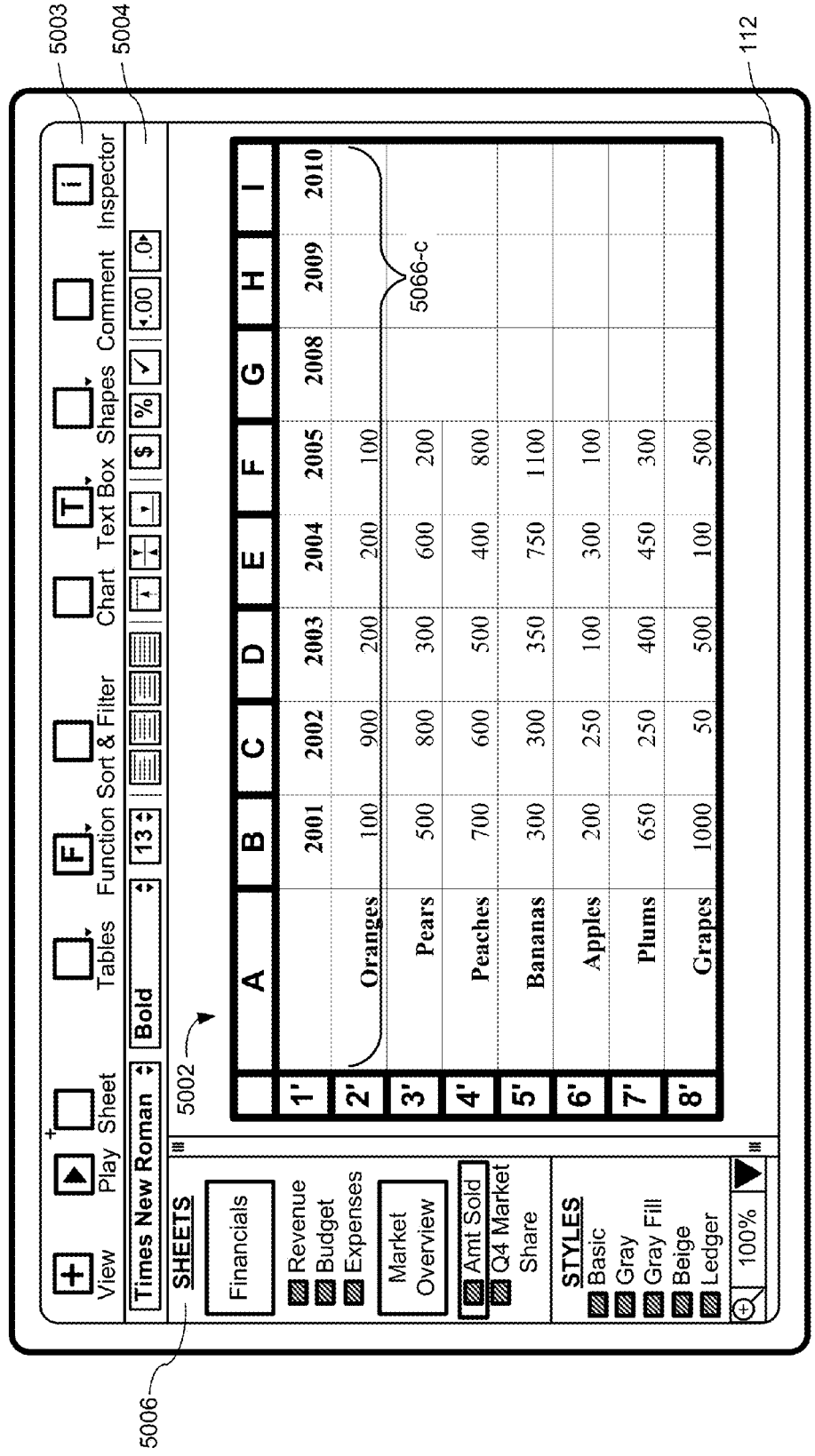
Figure 5T:
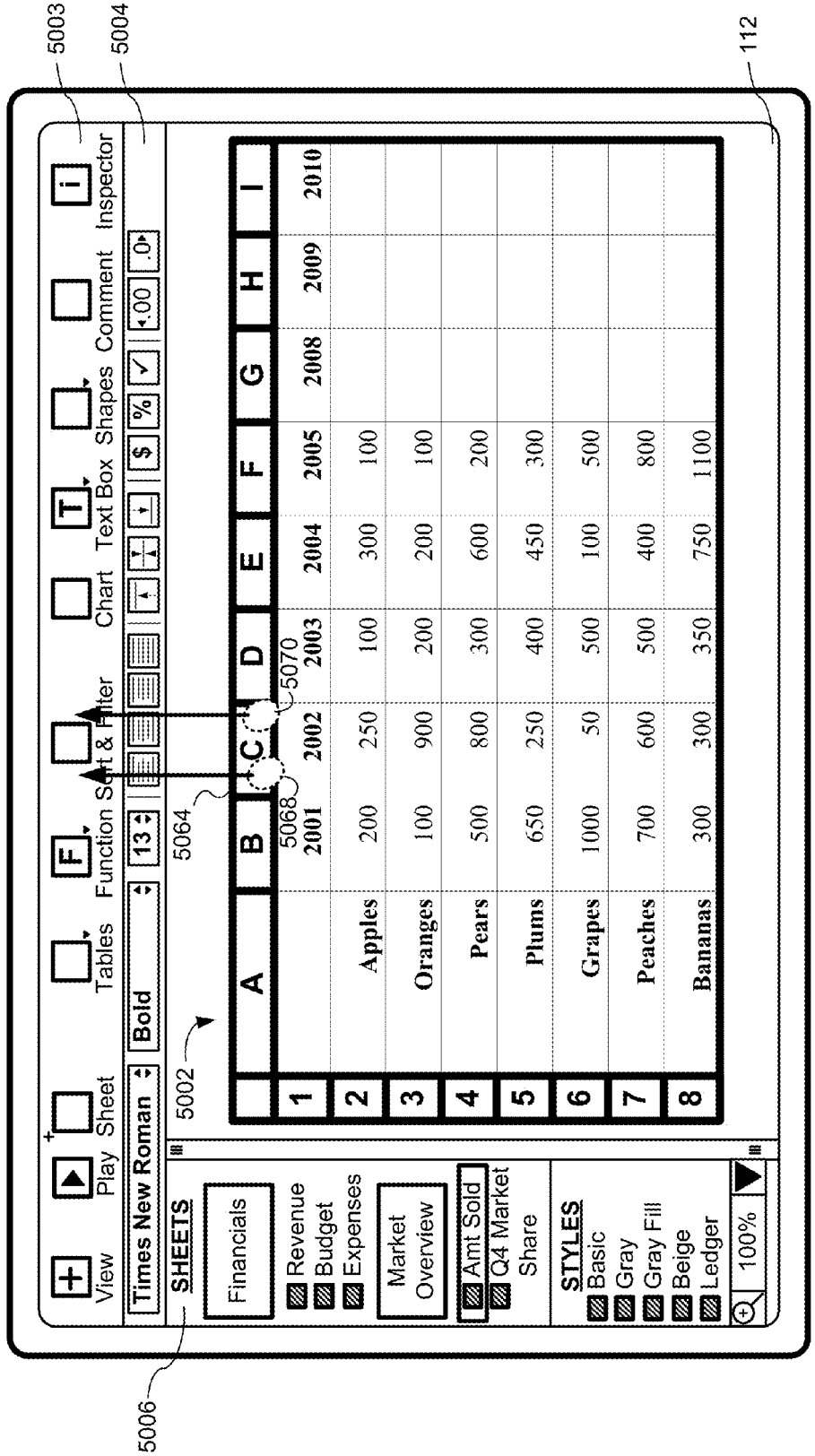
Figure 5U:
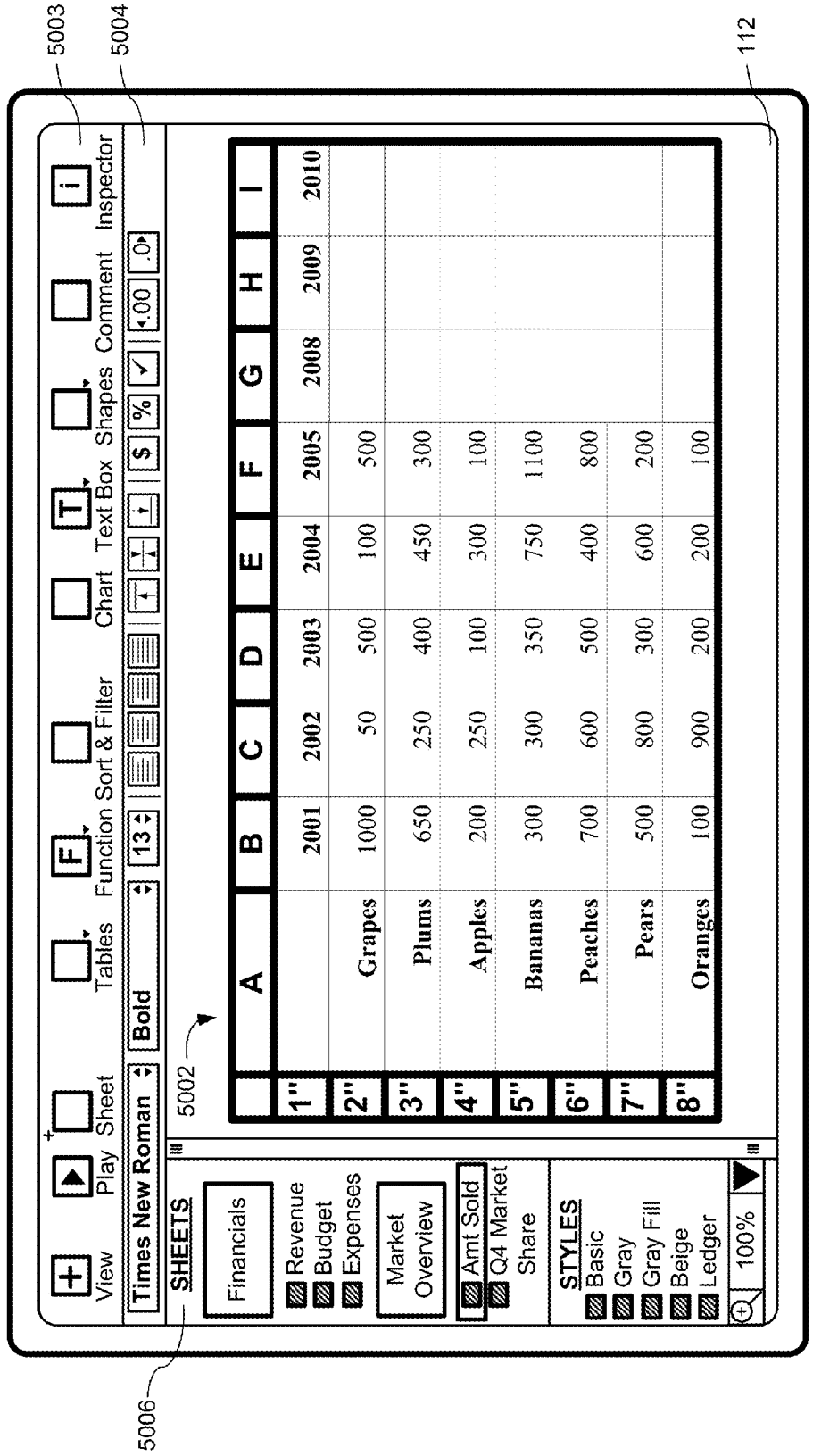

FIGS. 5T-5U illustrate detecting a swipe gesture (e.g., including contacts 5068 and 5070) that originates in a column header 5064 and moves upwards along the column (e.g., column C), and in response to the swipe gesture (e.g., movement of contacts 5068 and 5070 from a first location 5068-*a* and 5070-*a* in FIG. 5T to a second location 5068-*b* and 5070-*b* in FIG. 5U), sorting the table in accordance with the content (e.g., values) in the column (e.g., column C), where the sorting is in an order (e.g., as illustrated in FIG. 5U) that is different from the order in which the table is sorted when the swipe gesture is a downwards swipe gesture (e.g., as illustrated in FIGS. 5P-5S).

Figure 5V:
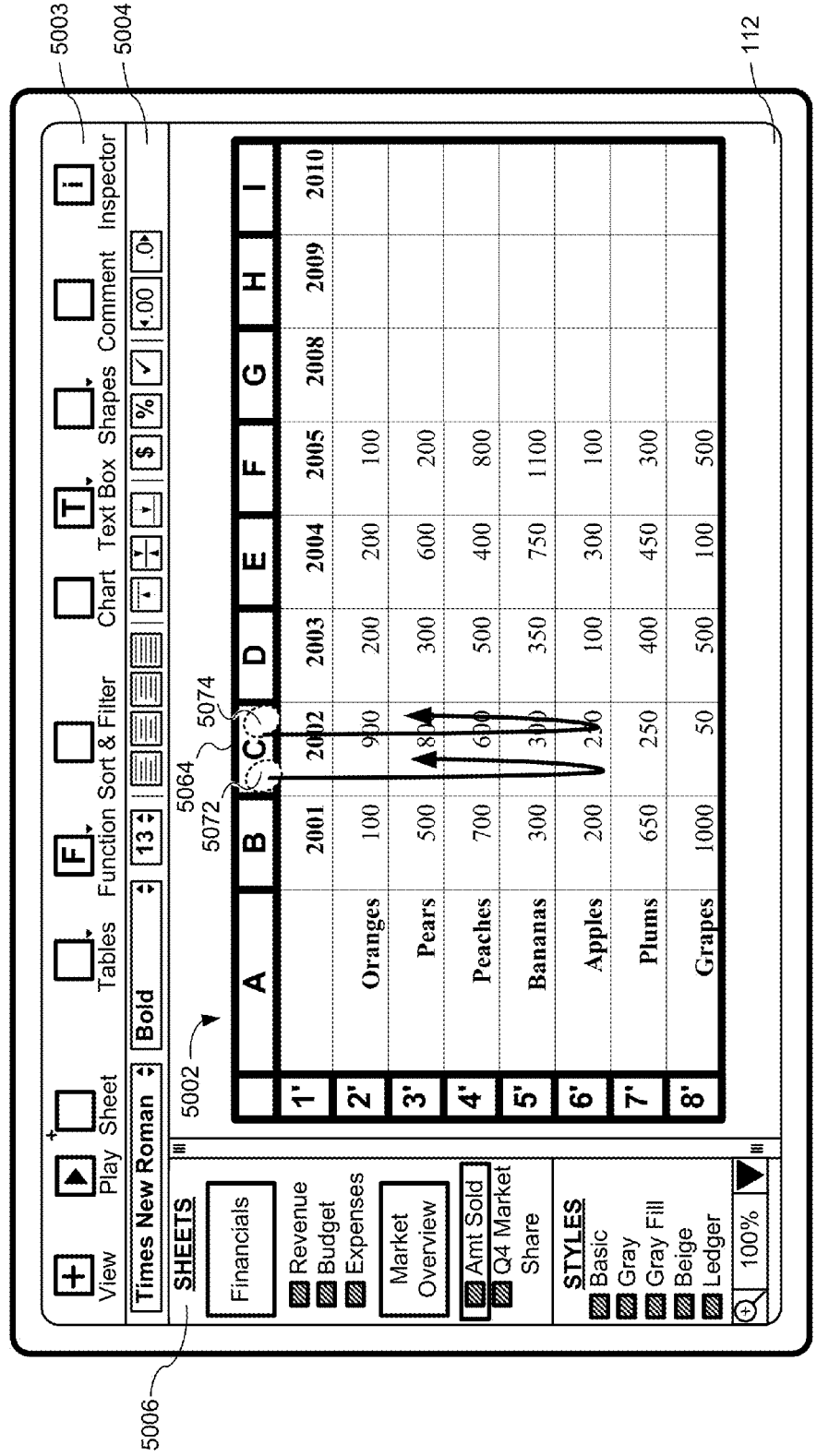

FIG. 5V illustrates detecting a second gesture (e.g., including contacts 5072 and 5074) on the touch-sensitive surface, where the second gesture includes simultaneous movement of the third contact and the fourth contact in a first direction (e.g., downwards) on the touch-sensitive surface that corresponds to a direction on the display that is along the first column (e.g., column C in FIG. 5V) and subsequent movement of the third contact and the fourth contact in a second direction (e.g., upwards) on the touch-sensitive surface that is substantially opposite the first direction. In some embodiments, the device sorts the table in accordance with the second gesture, as described in greater detail below.

Figure 5W:
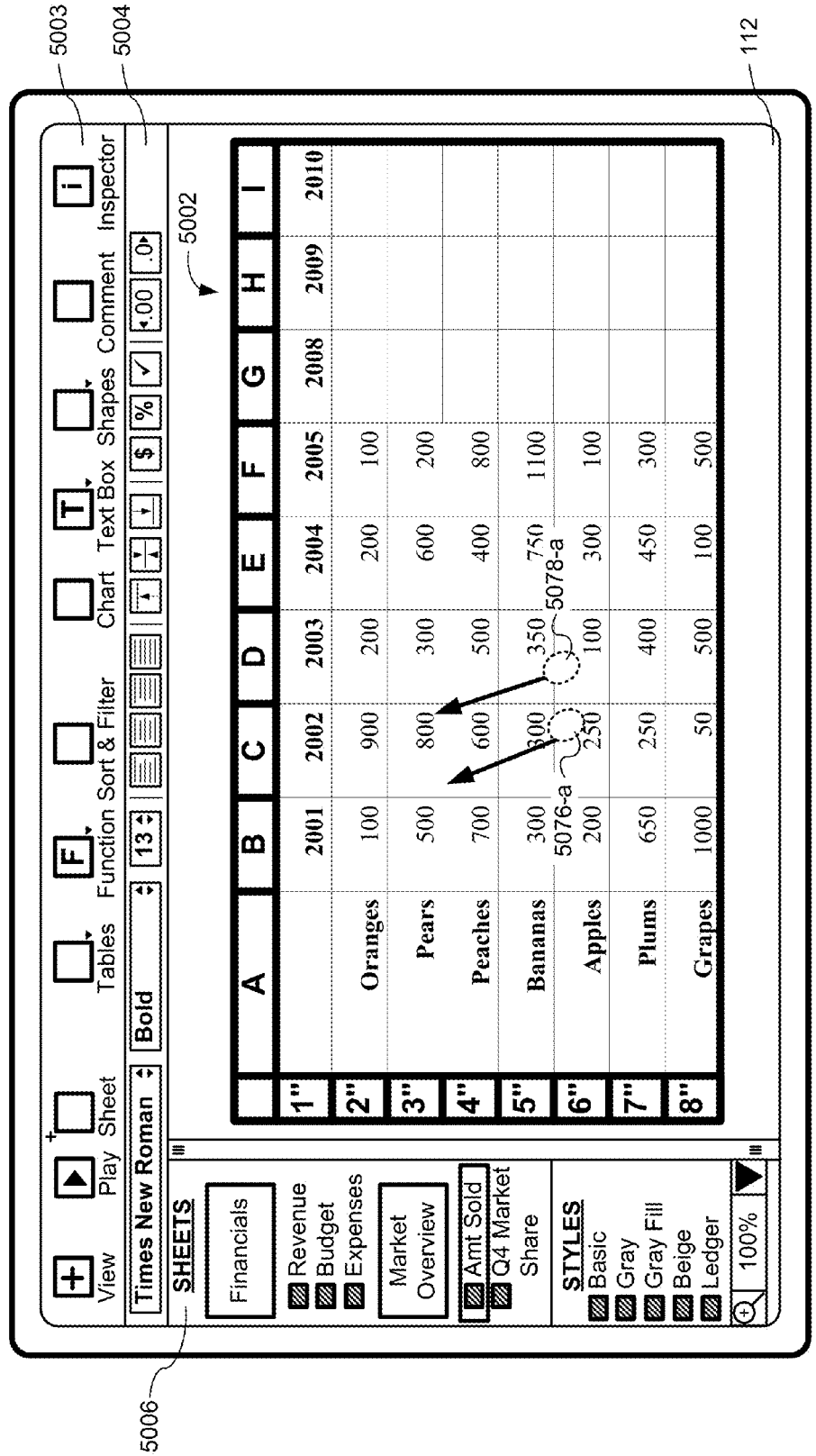
Figure 5X:
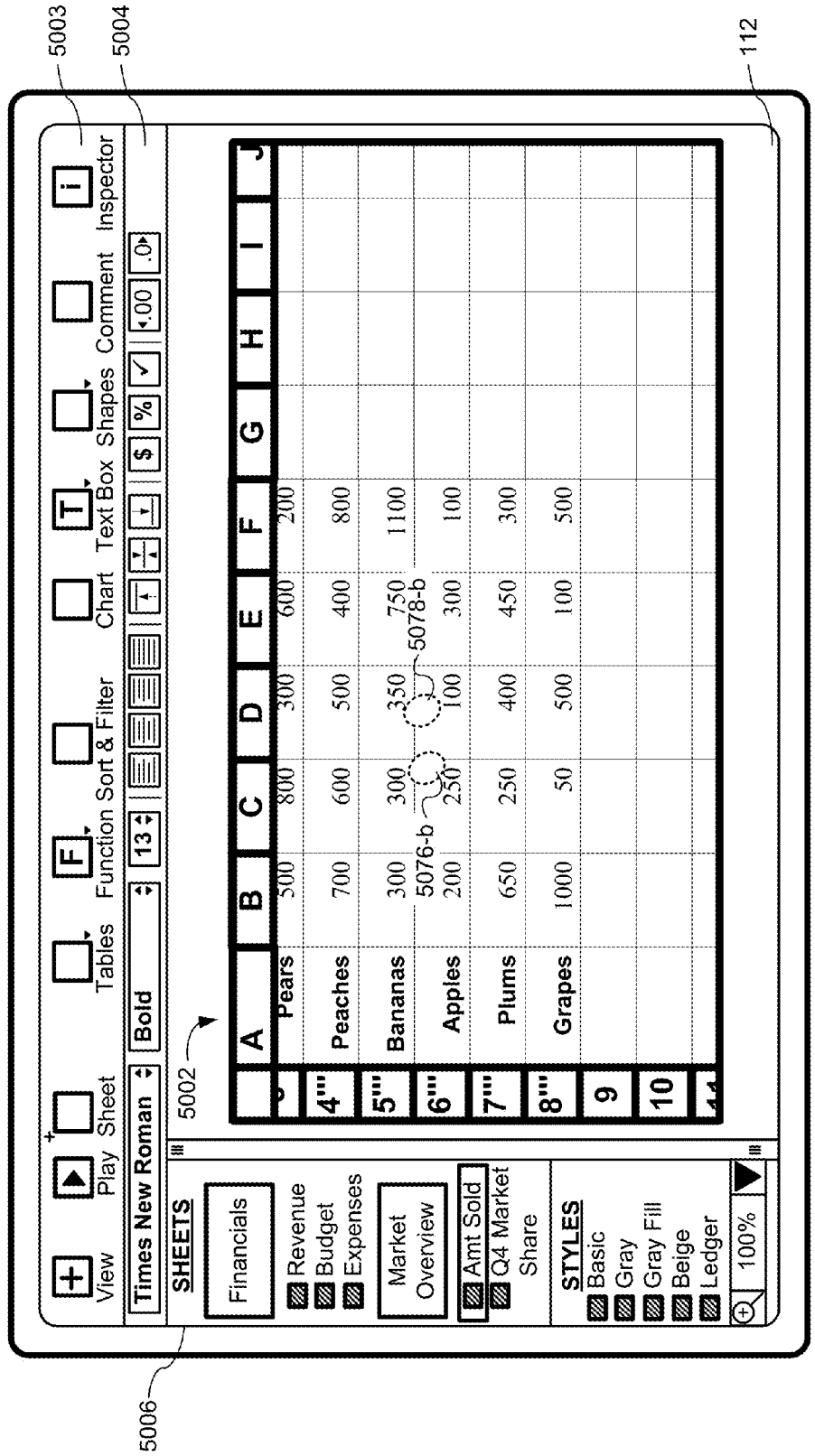

FIGS. 5W-5X illustrate translating the table laterally in response to a gesture that does not originate in the column header and includes lateral movement of the contacts from an initial location (e.g., 5076-*a* and 5078-*a* in FIG. 5W) on the touch screen display 112 to a final location (e.g., 5076-*b* and 5078-*b* in FIG. 5X) on the touch screen display 112.

Figure 5Y:
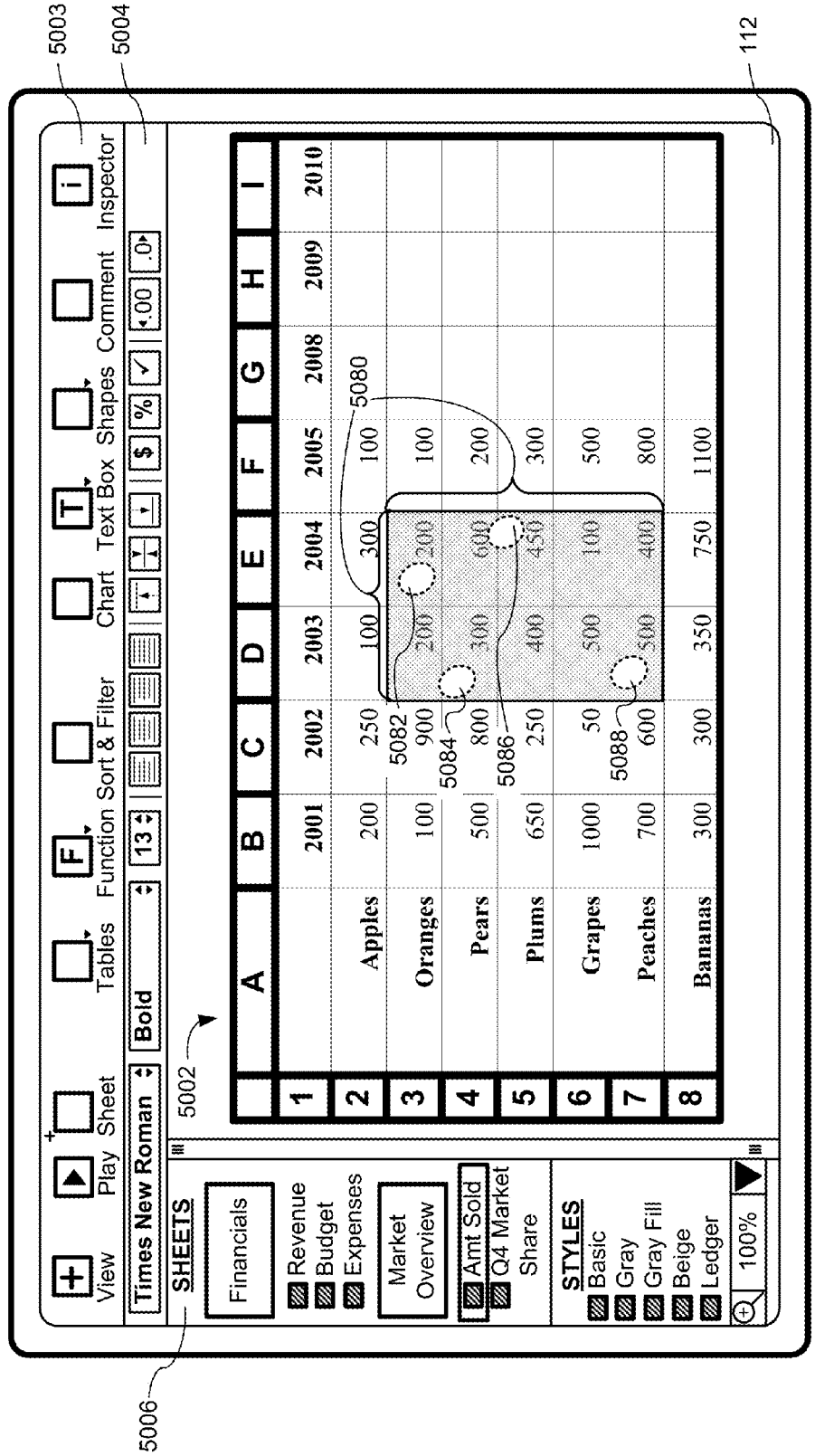
Figure 5Z:
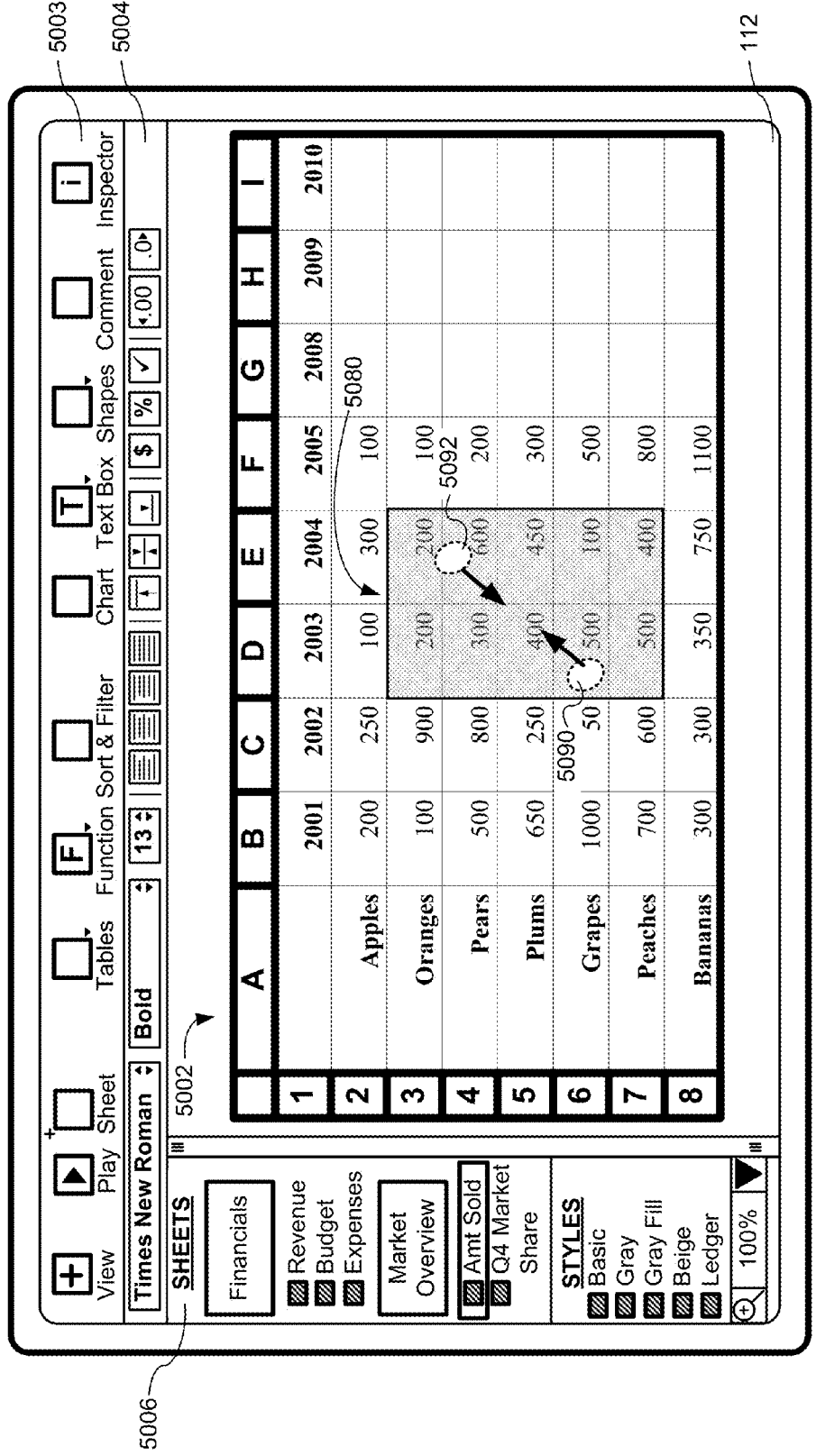
Figure 5A:
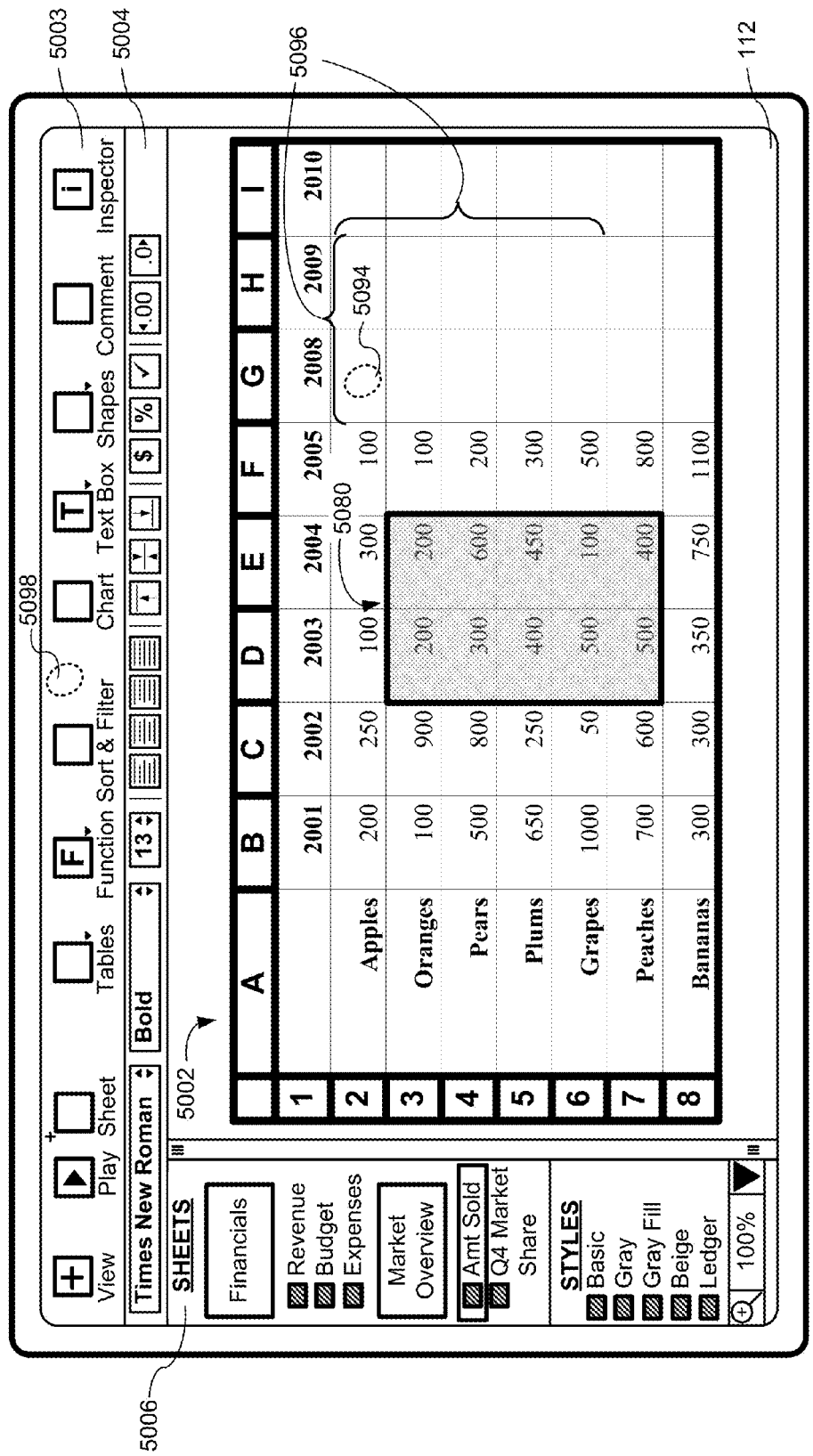
Figure 5B:
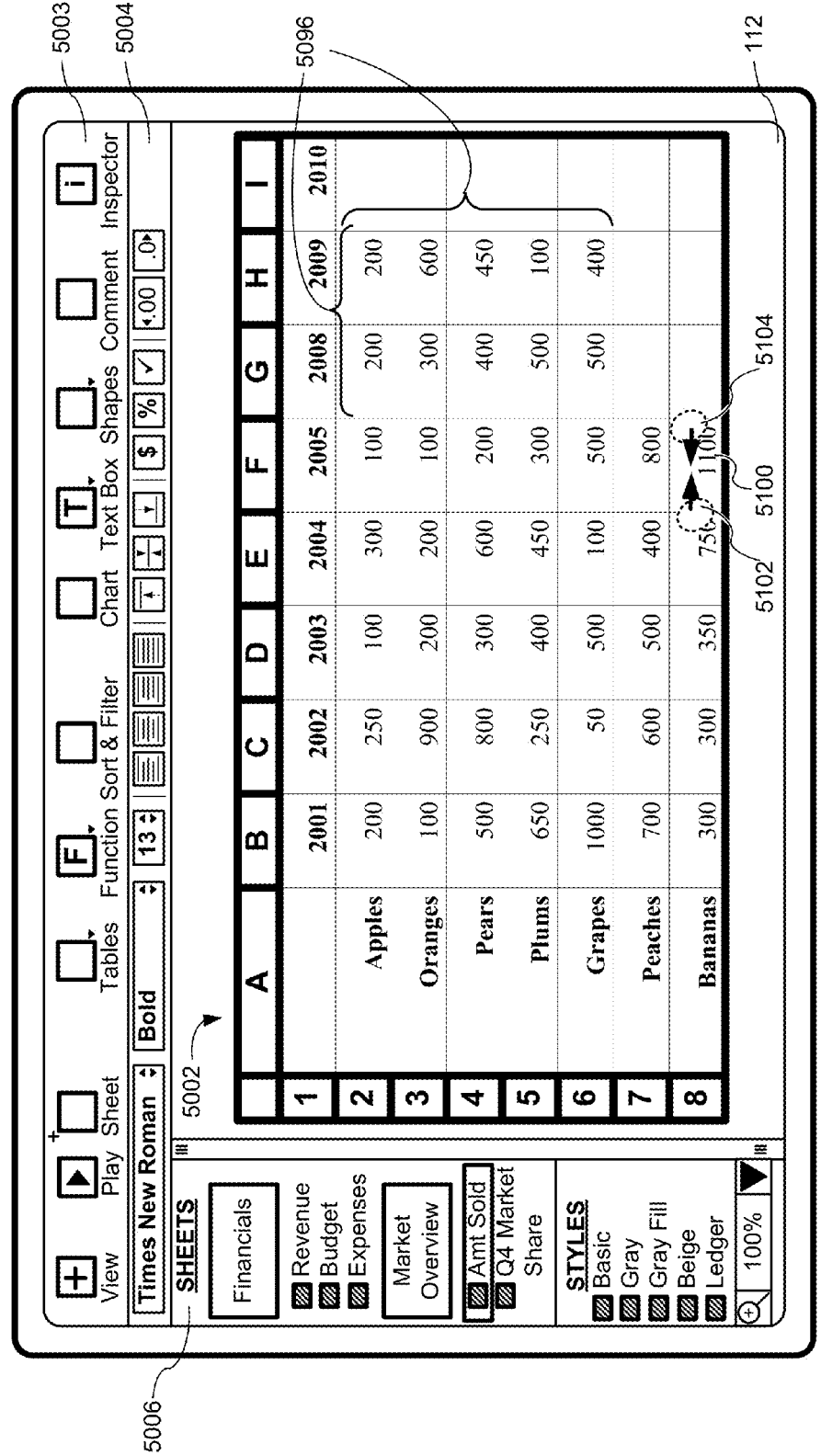
Figure 5C:
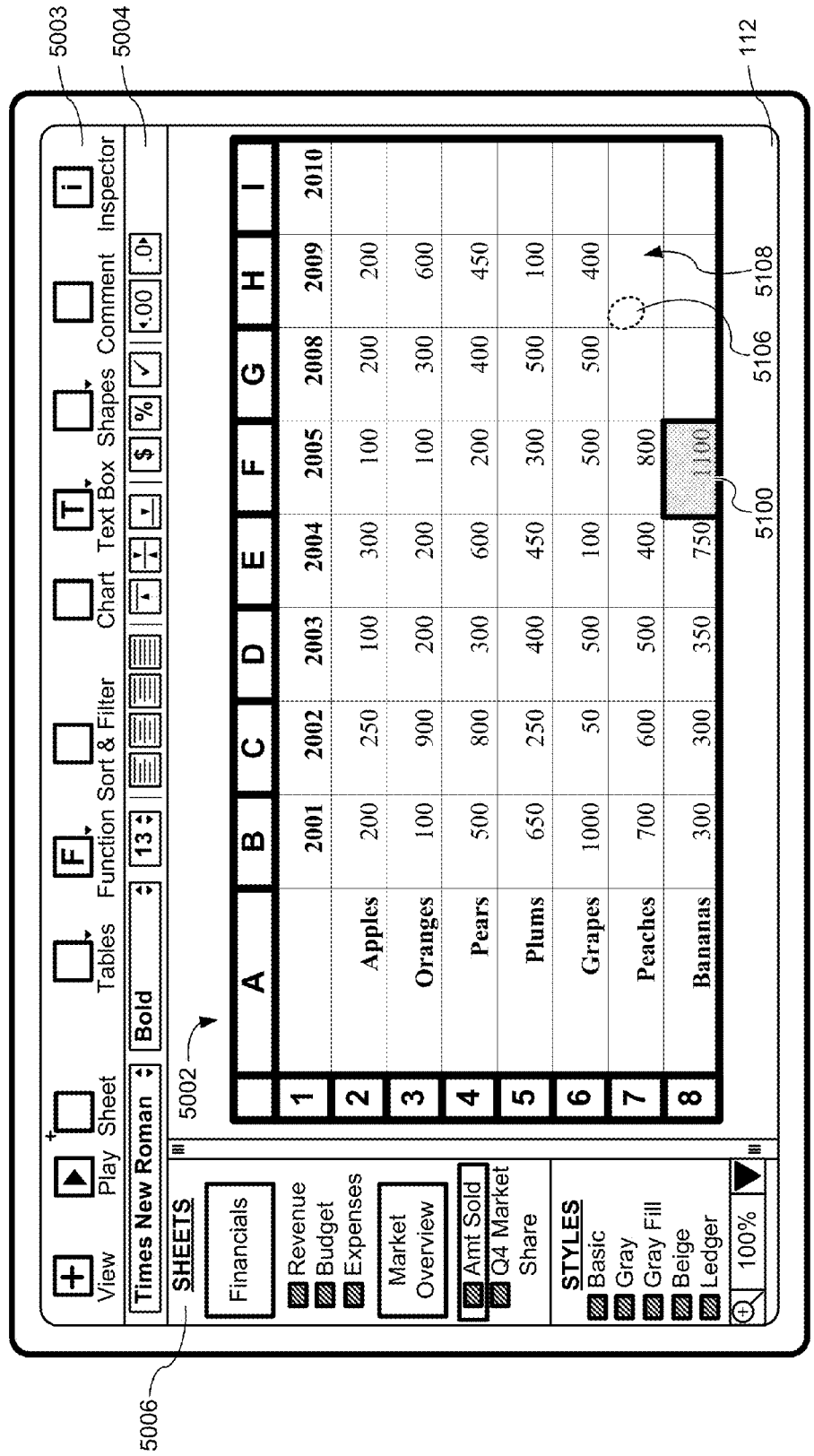
Figure 5D:
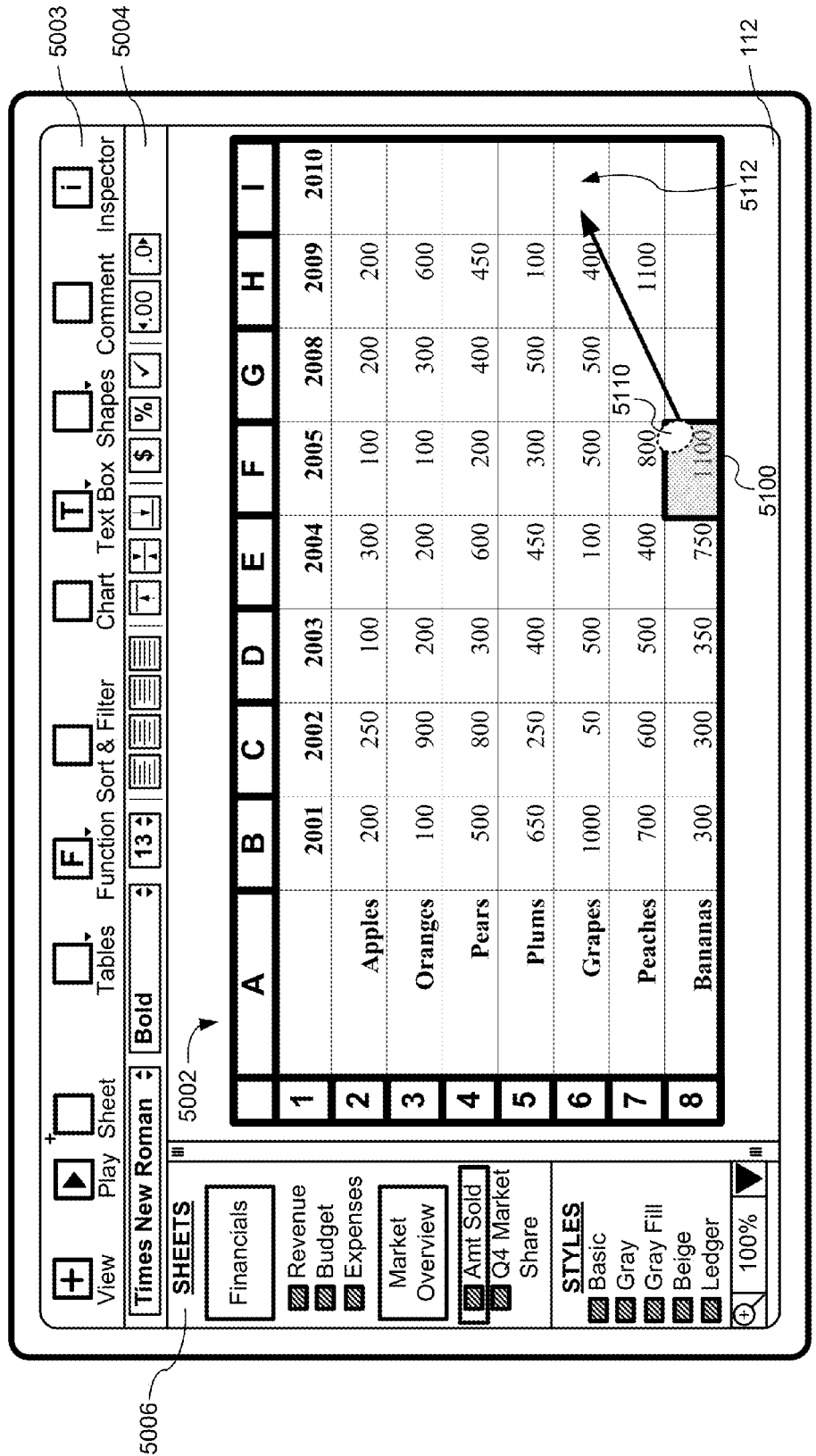
Figure 5E:
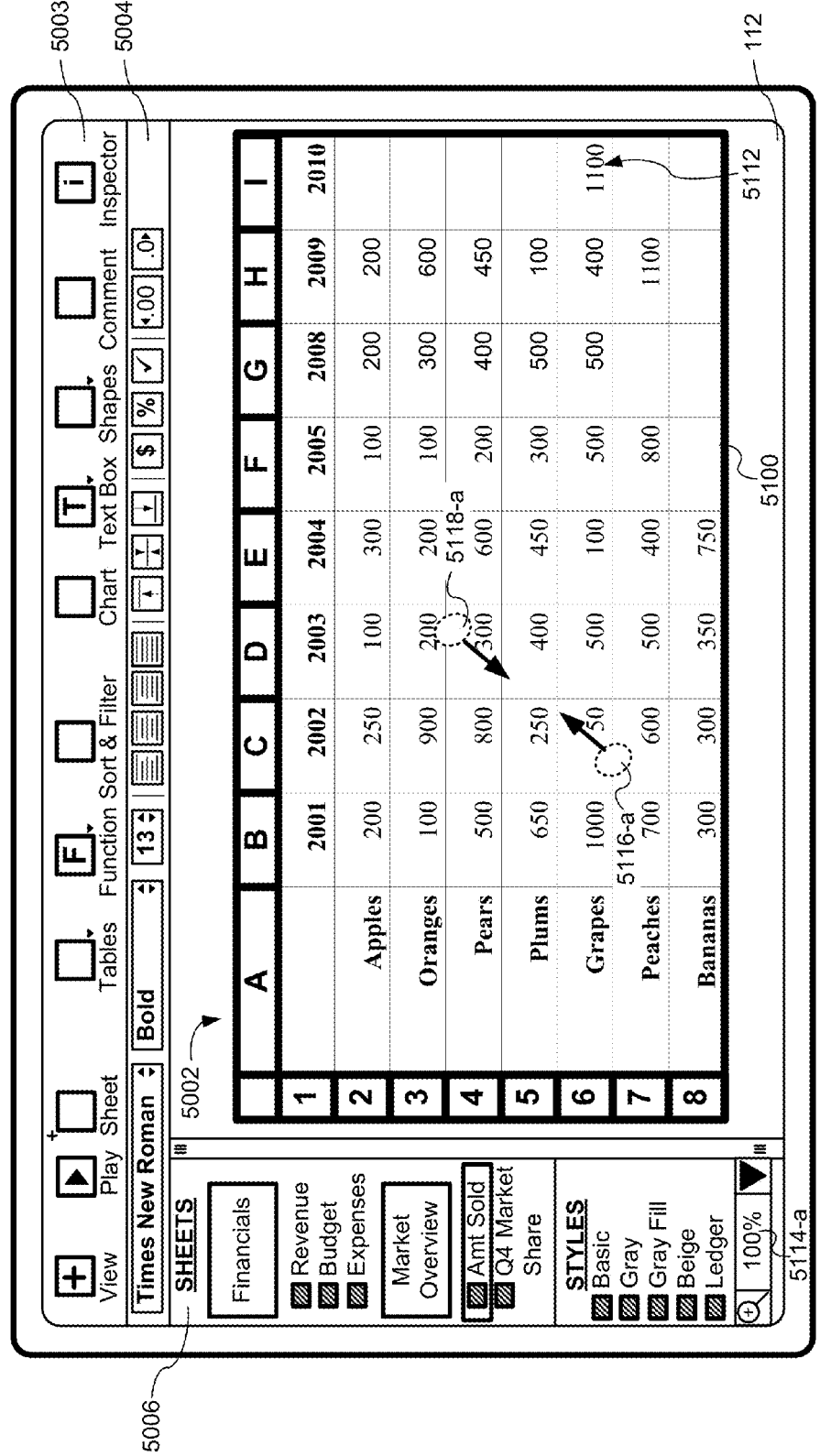
Figure 5F:
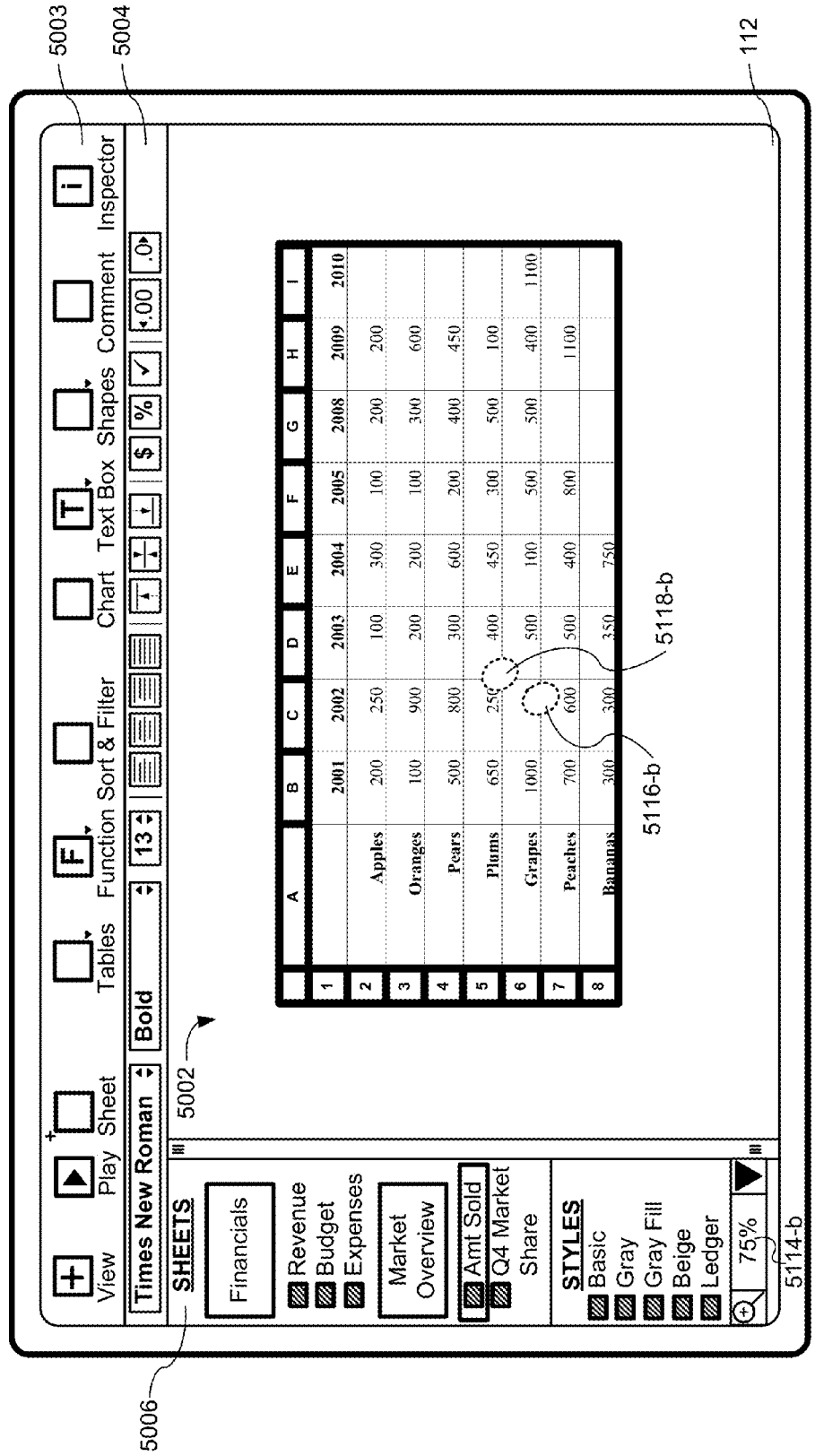
Figure 5G:
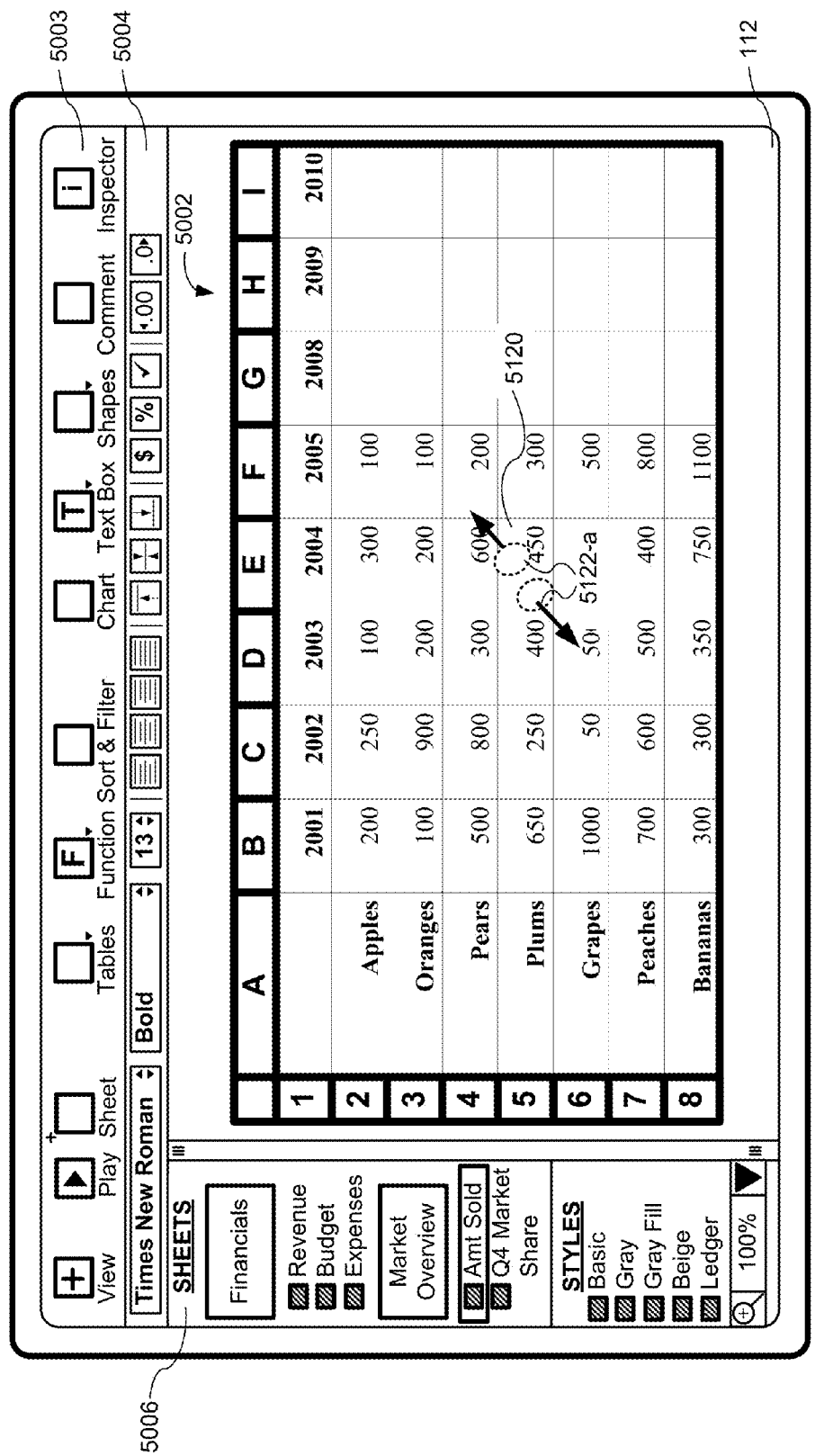
Figure 5H:
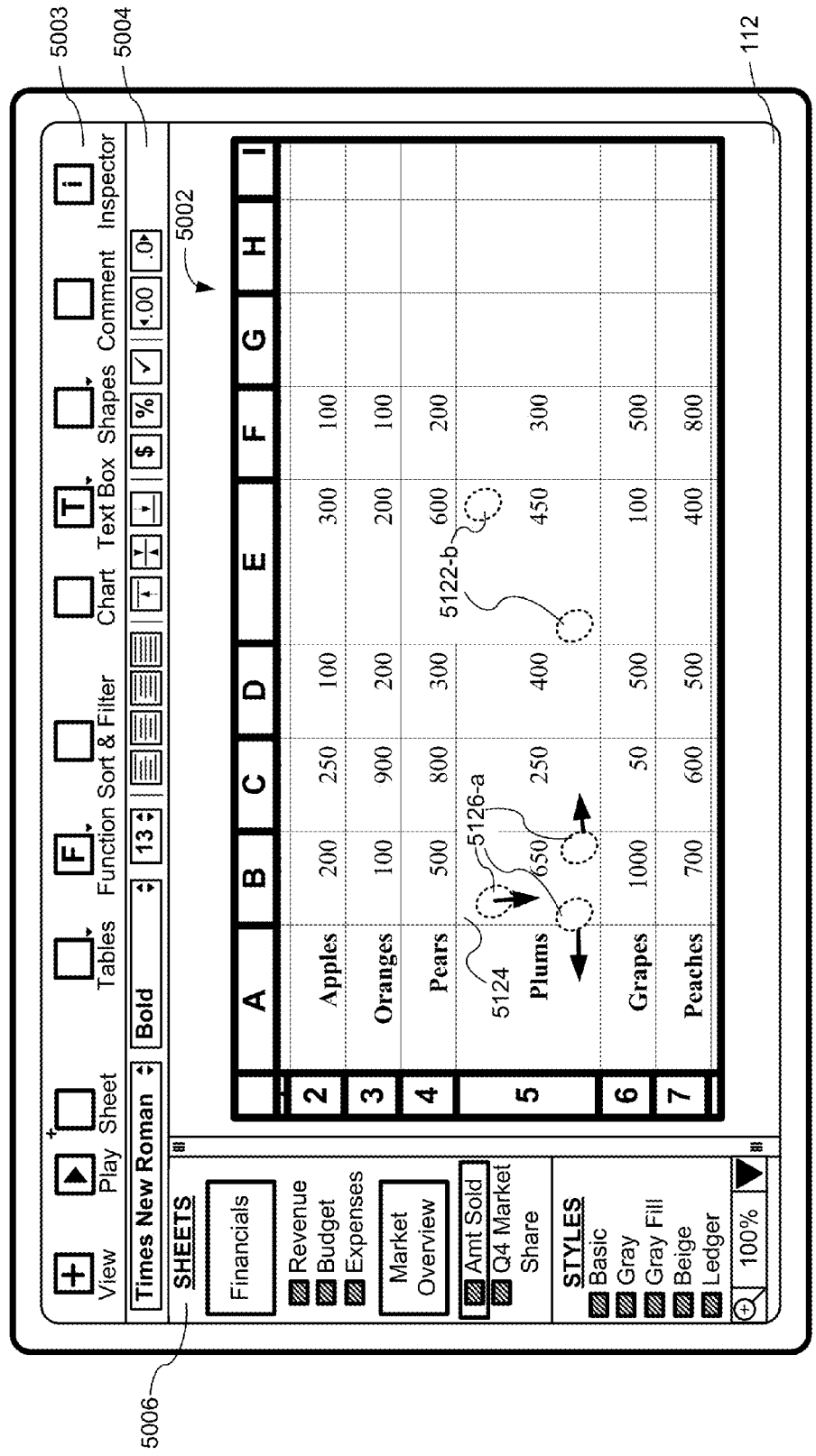
Figure 5I:
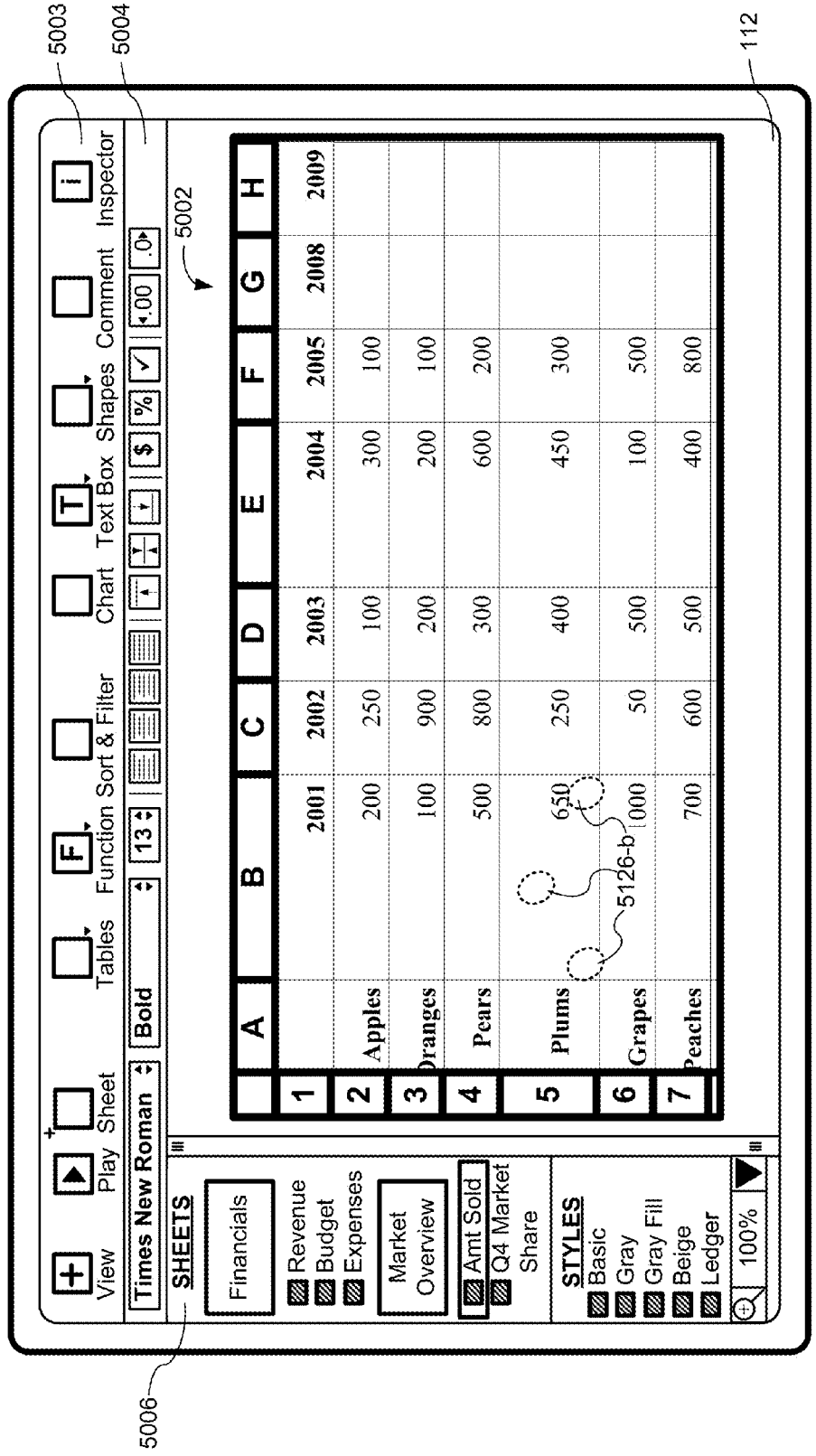
Figure 5J:
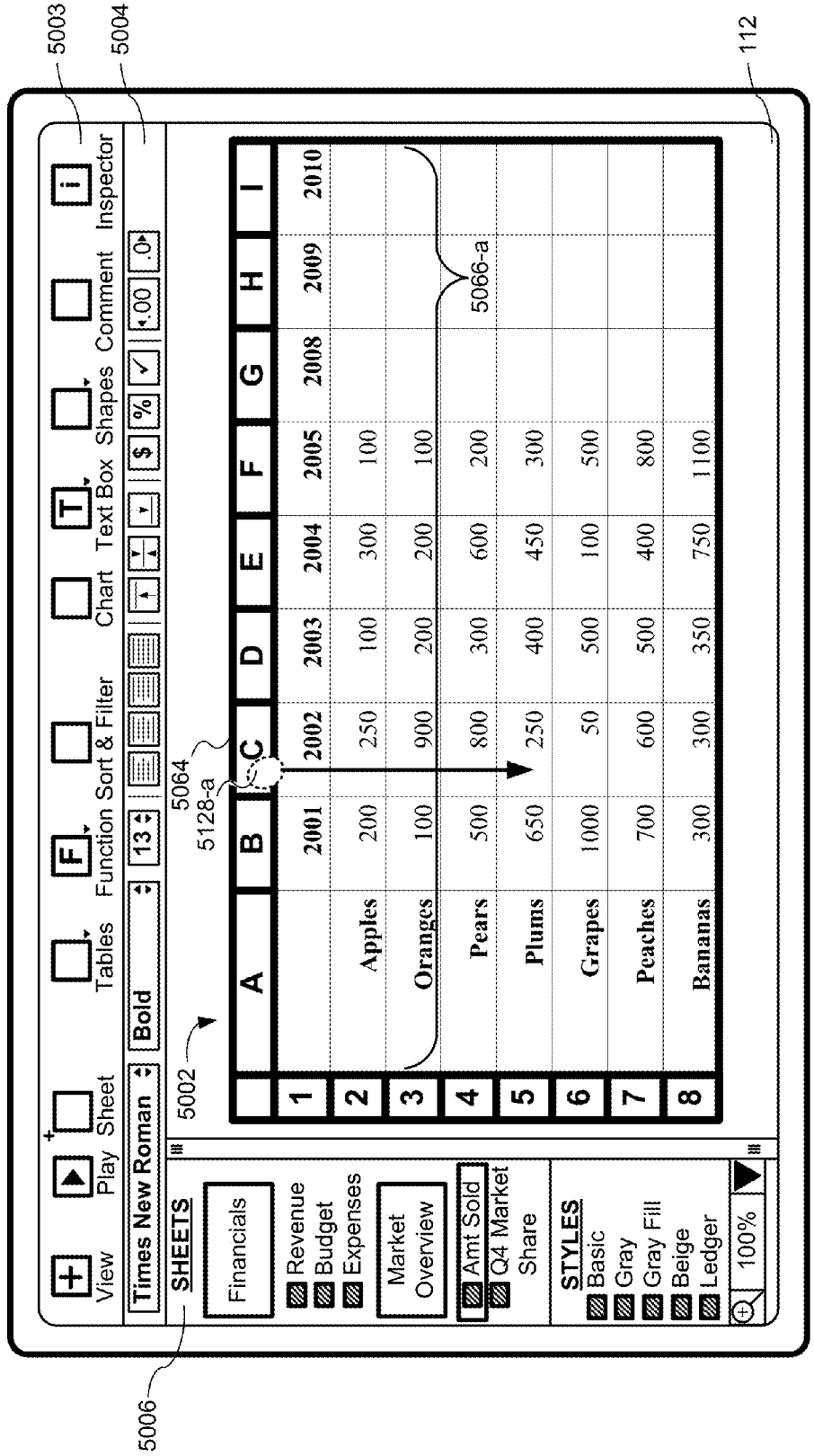
Figure 5K:
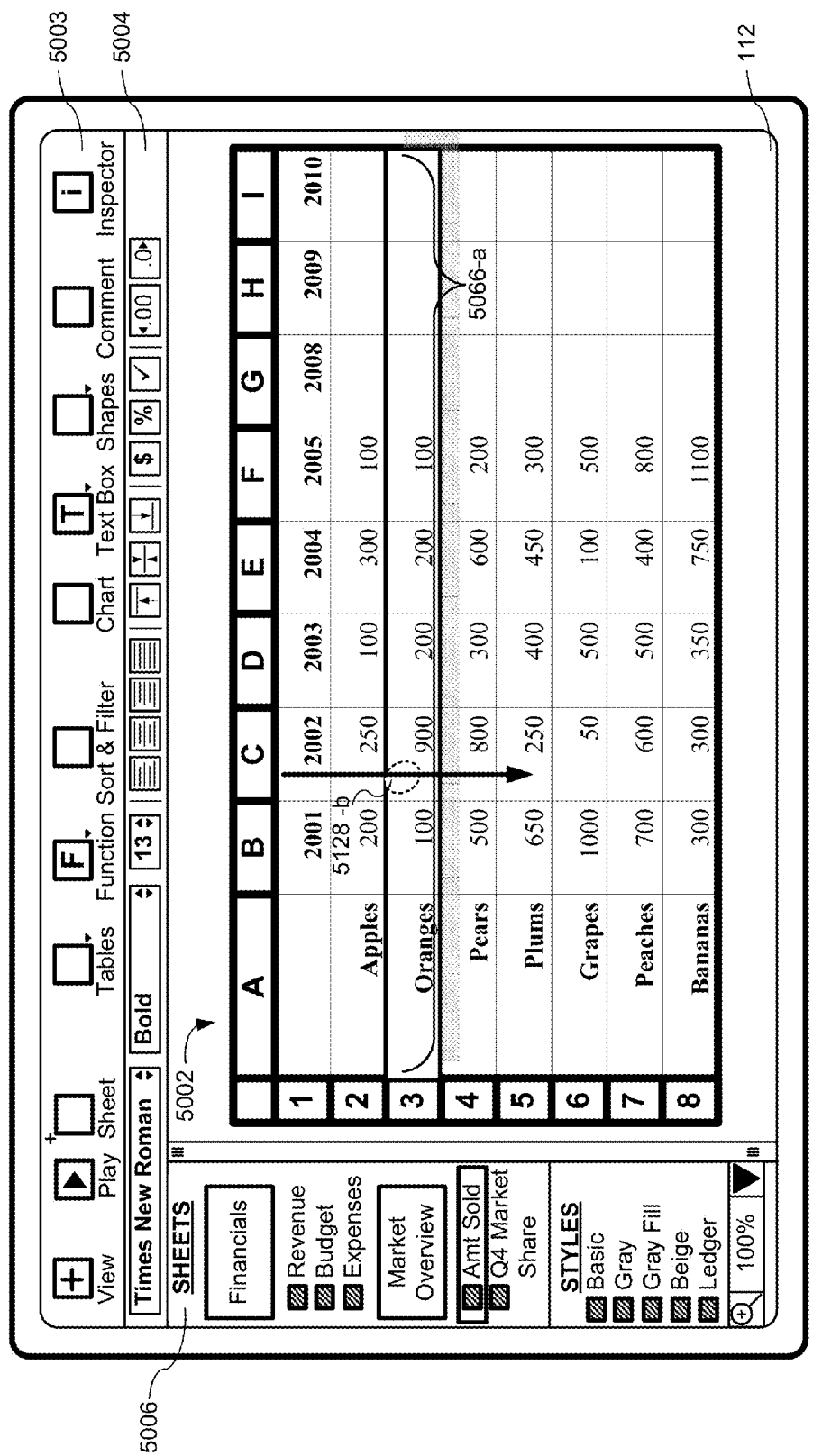
Figure 5L:
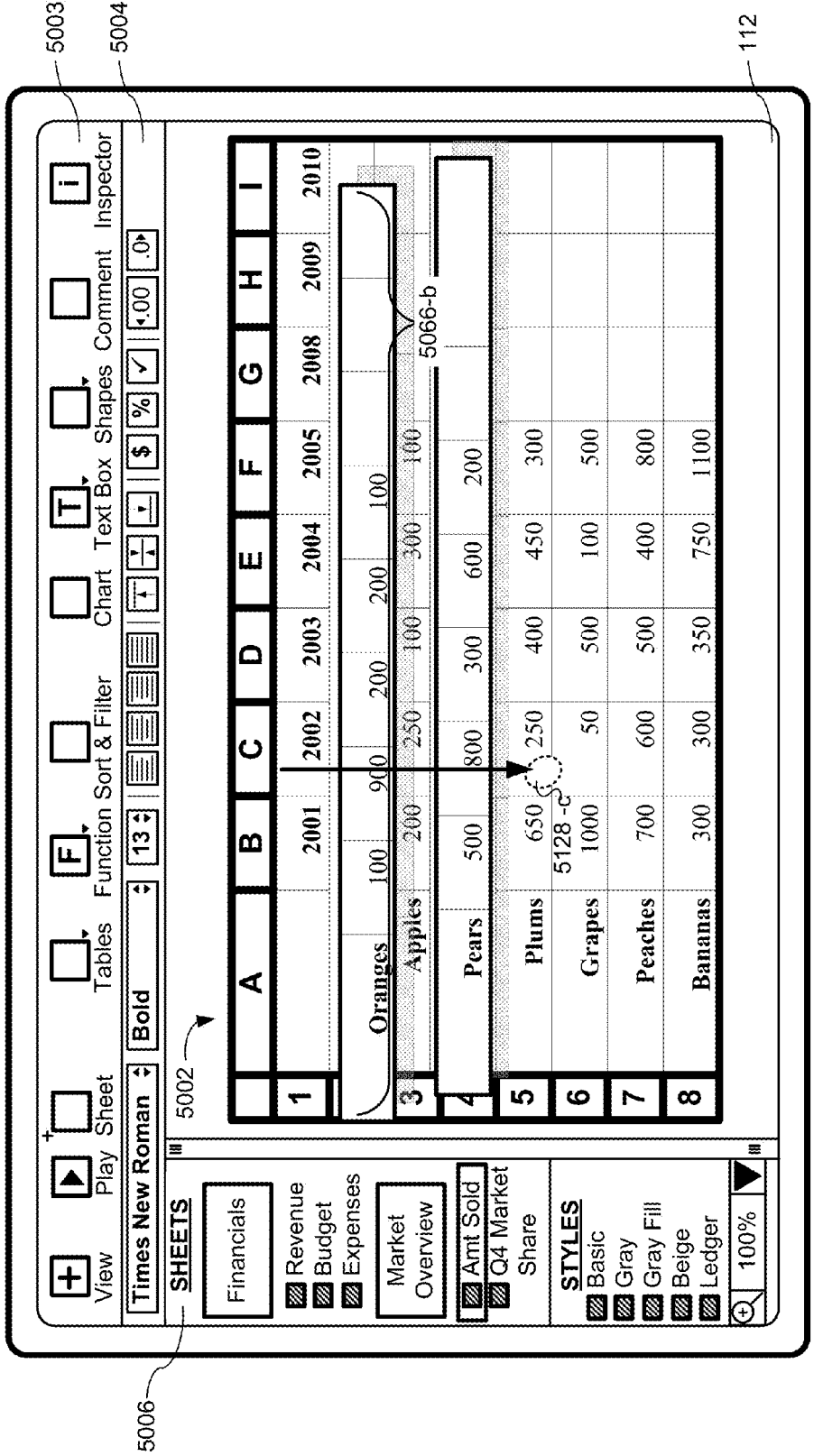
Figure 5M:
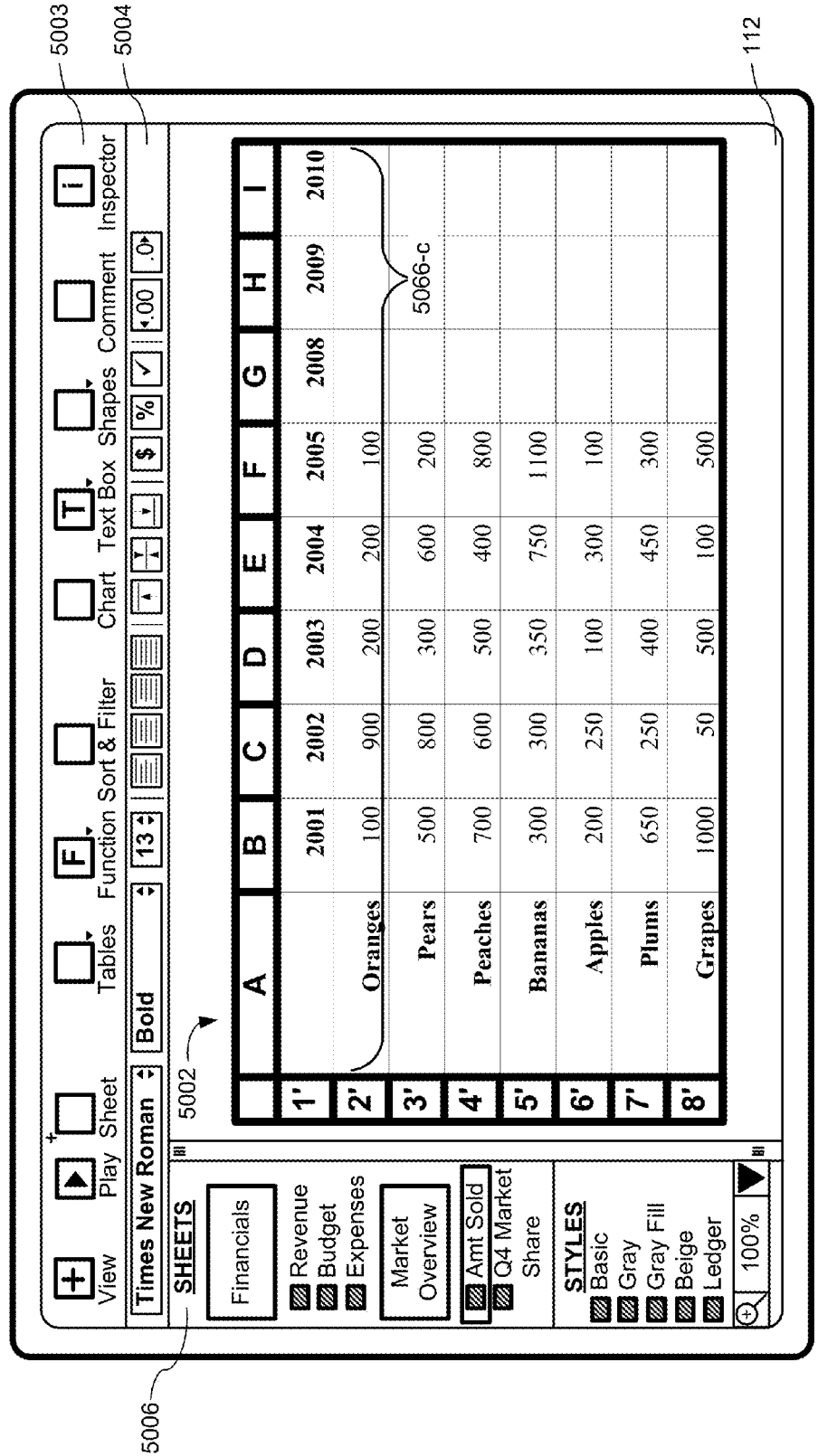
Figure 5N:
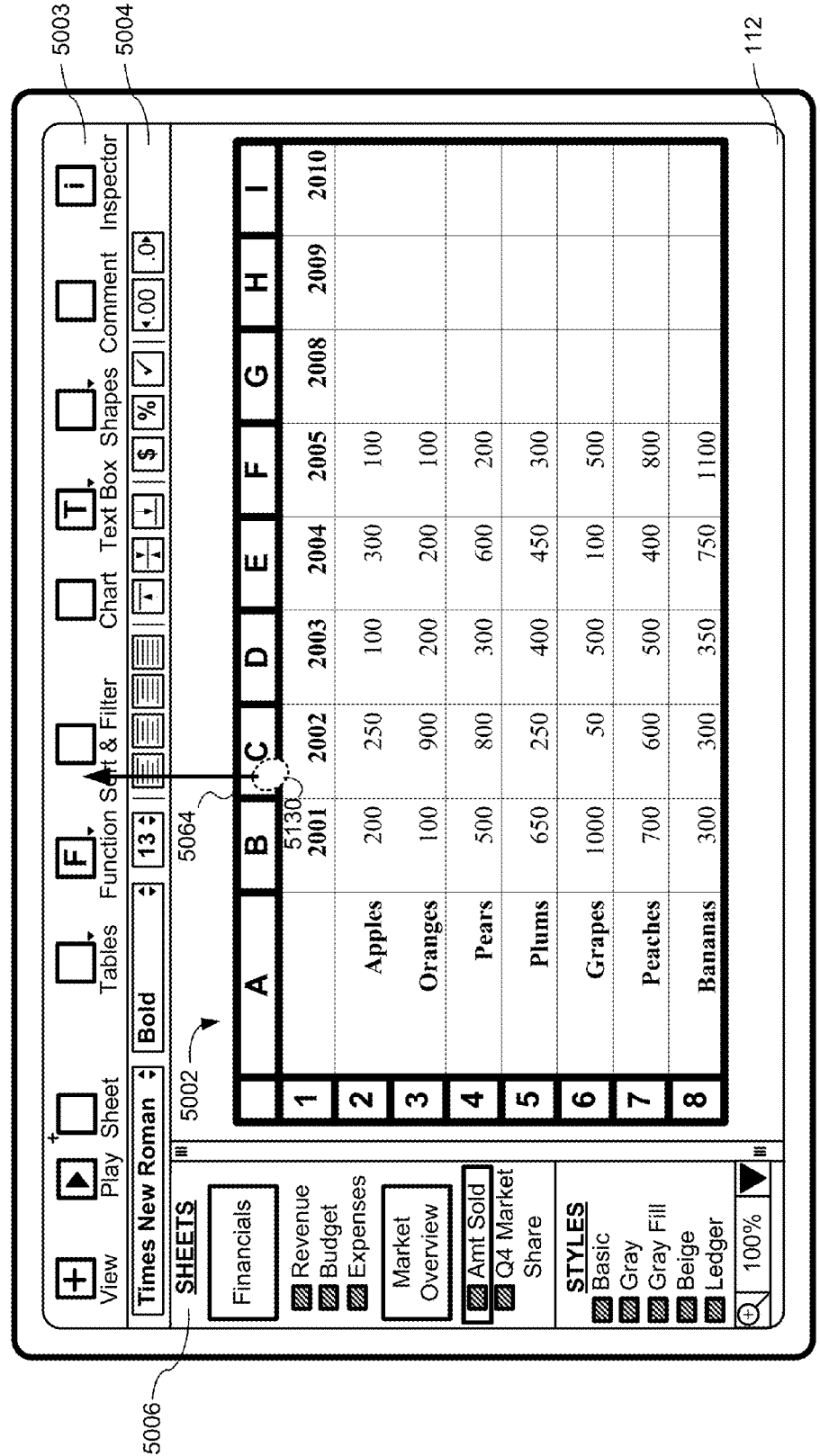
Figure 5O:
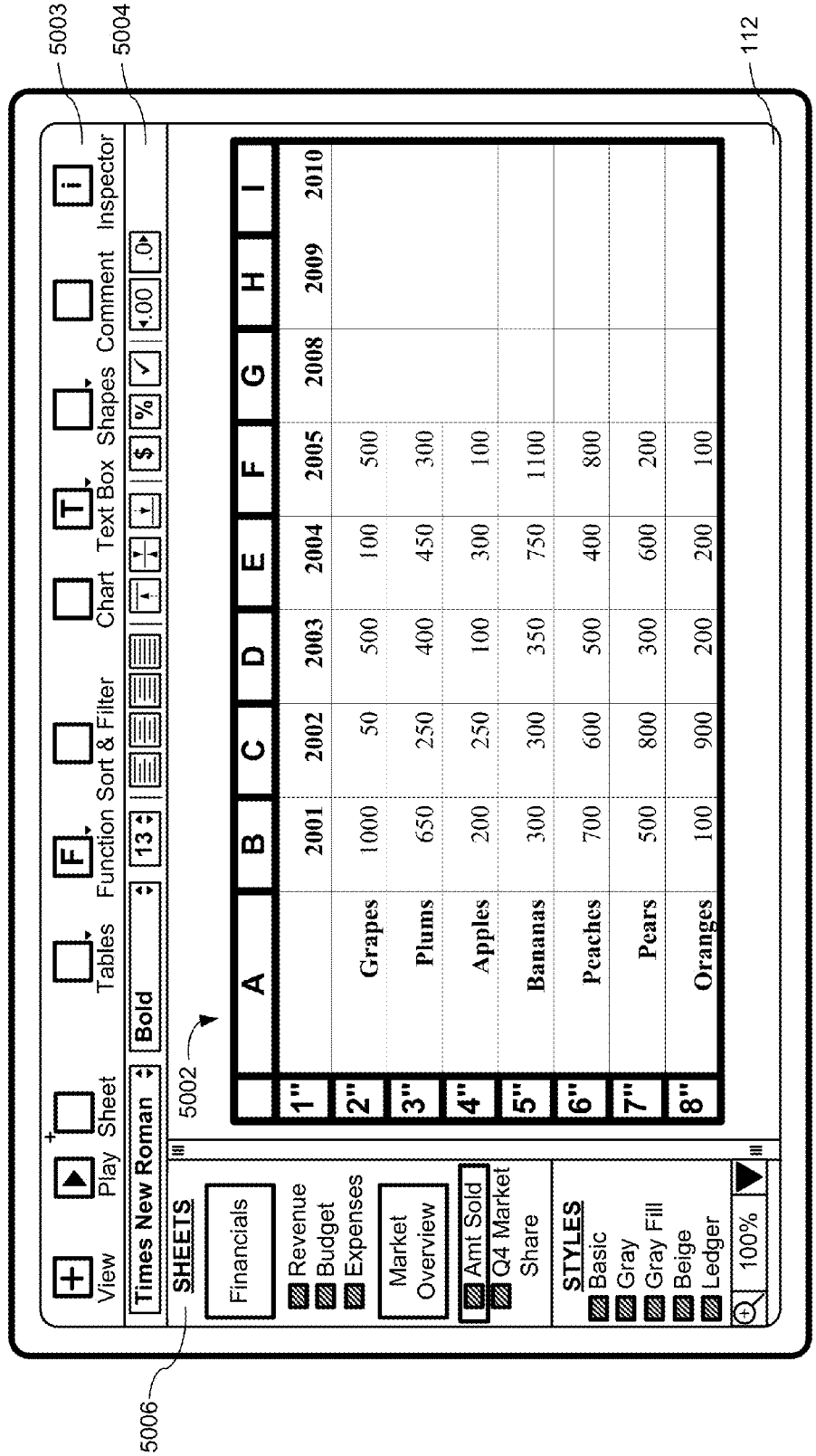
Figure 5P:
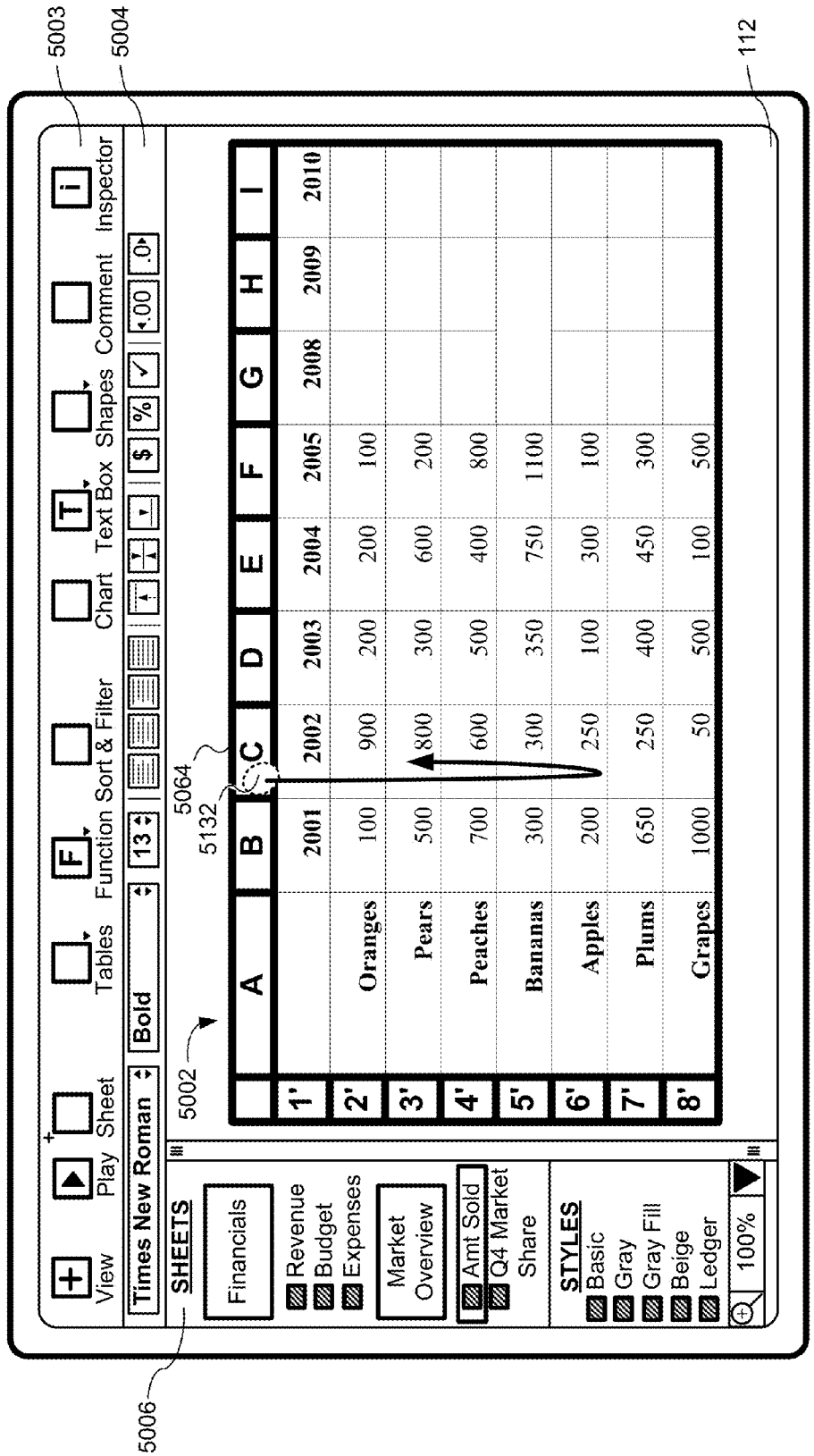

FIGS. 5Y-5BB illustrate selecting a plurality of origin cells (e.g., 5080 in FIG. 5Y), detecting a pinch gesture (e.g., detecting contacts 5090 and 5092 and subsequent movement of the contacts towards each other in FIG. 5Z) at a location on the touch screen display 112 that corresponds to the location of the origin cells, and in response to detecting a second gesture (e.g., tap gesture 5094 in FIG. 5AA) on another cell in the table, copying the content of the origin cells 5080 to a plurality of destination cells 5096, as illustrated in FIG. 5BB.

FIGS. 5BB-5DD illustrate selecting an origin cell 5100, detecting a pinch gesture (e.g., detecting contacts 5102 and 5104 and subsequent movement of the contacts towards each other in FIG. 5BB) at a location on the touch screen display 112 that corresponds to the location of the origin cells, and in response to detecting a second gesture (e.g., tap gesture 5106 in FIG. 5CC) on another cell in the table, copying the content of the origin cell 5100 to a destination cell 5108, as illustrated in FIG. 5DD.

FIGS. 5DD-5EE illustrate detecting a contact 5110 with the origin cell 5100, subsequent movement of that contact across the touch screen display 112 to a location on the display that corresponds to the location of a respective cell in the table (e.g., the cell 5112 in row 6 column I of the table 5002 in FIG. 5DD), and in response to detecting the gesture, copying the content of the origin cell 5100 to the respective cell 5112, and deleting the content from the origin cell 5100, as illustrated in FIG. 5EE.

FIGS. 5EE-5FF illustrate detecting a pinch gesture at a location on the touch screen display 112 that does not correspond to one or more origin cells, including detecting contacts at initial locations on the display (e.g., 5116-*a* and 5118-*a* in FIG. 5EE) and subsequent movement of the contacts to respective updated locations that correspond to respective updated locations on the display (e.g., 5116-*b* and 5118-*b* in FIG. 5FF). In response to detecting the pinch gesture, the device zooms out from the first magnification level to a second magnification level in accordance with the pinch gesture, where the second magnification level is lower than the first magnification level (e.g., in FIG. 5FF the magnification level of the table has been reduced from 100% to 75%).

FIGS. 5GG-5HH illustrate resizing a column (e.g., column E in FIGS. 5GG-5HH) and/or row (e.g., row 5 in FIGS.

5GG-5HH) associated with a cell (e.g., cell 5120 in FIG. 5GG) in response to detecting a de-pinch gesture including movement of contacts 5122 from a first location 5122-*a* in FIG. 5GG to a second location 5122-*b* in FIG. 5HH at a location on the touch-sensitive surface that corresponds to the cell (e.g., 5120 in FIG. 5GG). For example, in FIG. 5HH the device increases the height of row 5 in accordance with the vertical component of the de-pinch gesture that includes contacts 5122 in FIGS. 5GG-5HH, FIGS. 5HH-5II illustrate resizing a column (e.g., column B in FIGS. 5HH-5II) and or row (e.g., row 5 in FIGS. 5HH-5II) associated with a cell (e.g., cell 5124 in FIG. 5HH) in response to detecting a multi-contact gesture including movement of contacts 5126 from a first location 5126-*a* in FIG. 5HH to a second location 5126-*b* in FIG. 5II at a location on the touch-sensitive surface that corresponds to the cell (e.g., 5124 in FIG. 5HH). For example, in FIG. 5II the device decreases the height of row 5 in accordance with the vertical component of the multi-contact gesture that includes contacts 5126 in FIGS. 5HH-5II.

FIGS. 5JJ-5MM illustrate detecting a swipe gesture (e.g., including contact 5128) that originates in a region associated with a column (e.g., column C) and moves downwards along the column (e.g., column C), and in response to detecting the swipe gesture, sorting the table in accordance with the content (e.g., values) in the column (e.g., column C). These figures also illustrate displaying an animation of a respective one of the rows moving to their final location in the sorted table (e.g., the row moving from an initial location 5066-*a* at row 3 of the table 5002 in FIGS. 5JJ-5KK through one or more intermediate locations 5066-*b* in FIG. 5LL to a final location 5066-*c* at row 2' of the table 5002 in FIG. 5MM). The final sorted table is displayed in FIG. 5MM.

FIGS. 5NN-5OO illustrate detecting a swipe gesture (e.g., including contact 5064) that originates in a region associated with a column (e.g., column C) and moves upwards along the column (e.g., column C), and in response to the swipe gesture (e.g., movement of the contact 5130 from an initial location 5130-*a* in FIG. 5NN to a second location 5103-*b* in FIG. 5OO), sorting the table in accordance with the content (e.g., values) in the column (e.g., column C), where the sorting is in an order (e.g., as illustrated in FIG. 5OO) that is different from the order in which the table is sorted when the swipe gesture is a downwards swipe gesture (e.g., as illustrated in FIGS. 5JJ-5MM).

FIG. 5PP illustrates detecting a second gesture (e.g., including contact 5132) on the touch-sensitive surface, where the second gesture includes movement of the second contact in a first direction (e.g., downwards) on the touch-sensitive surface that corresponds to a direction on the display that is along the first column (e.g., column C in FIG. 5PP) and subsequent movement of the second contact in a second direction (e.g., upwards) on the touch-sensitive surface that is substantially opposite the first direction. In some embodiments, the device sorts the table in accordance with the second gesture, as described in greater detail below.

Figure 6A:
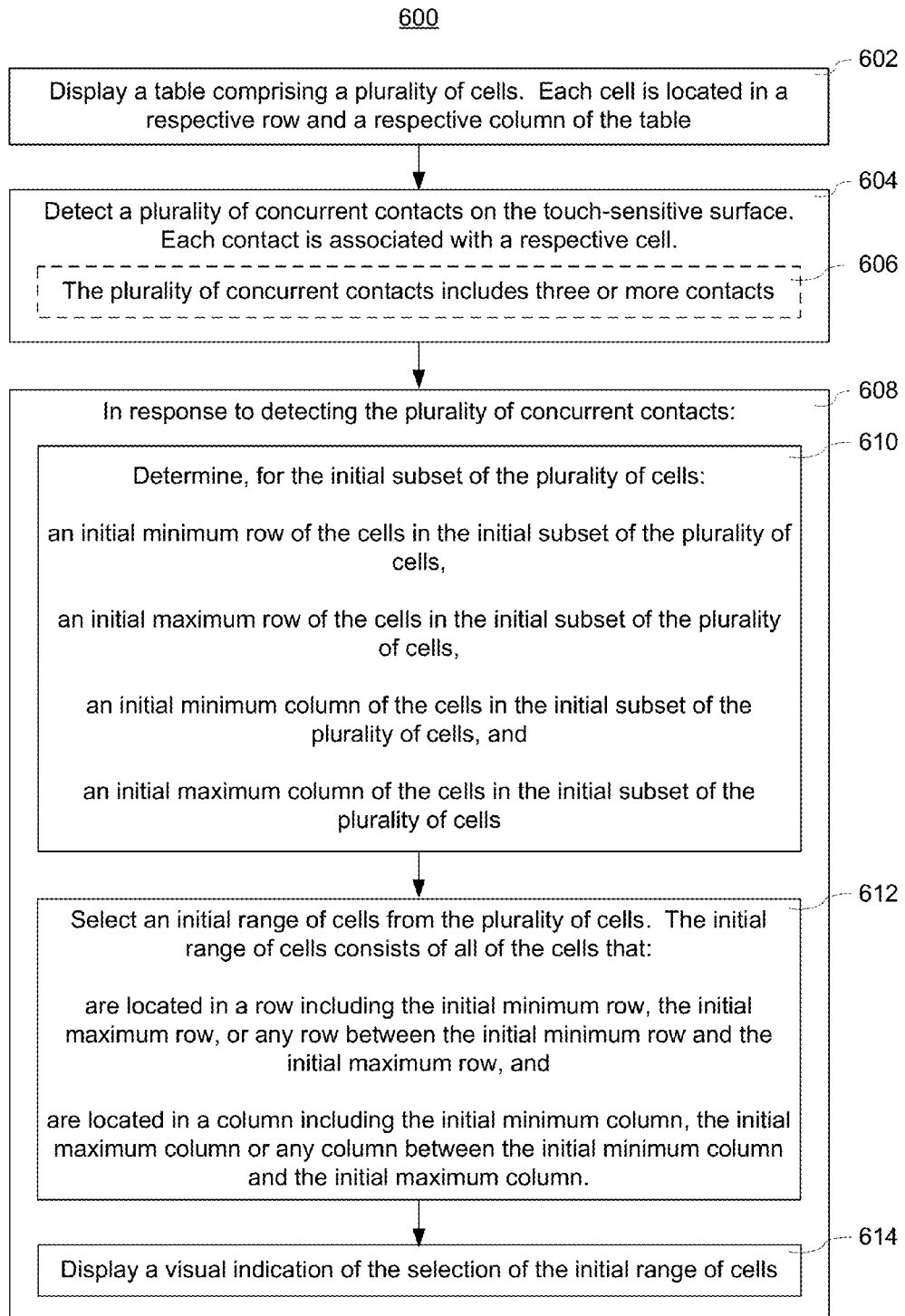
FIGS. 6A-6C are flow diagrams illustrating a method of selecting cells in a table using multi-contact gestures in accordance with some embodiments.
Figure 6B:
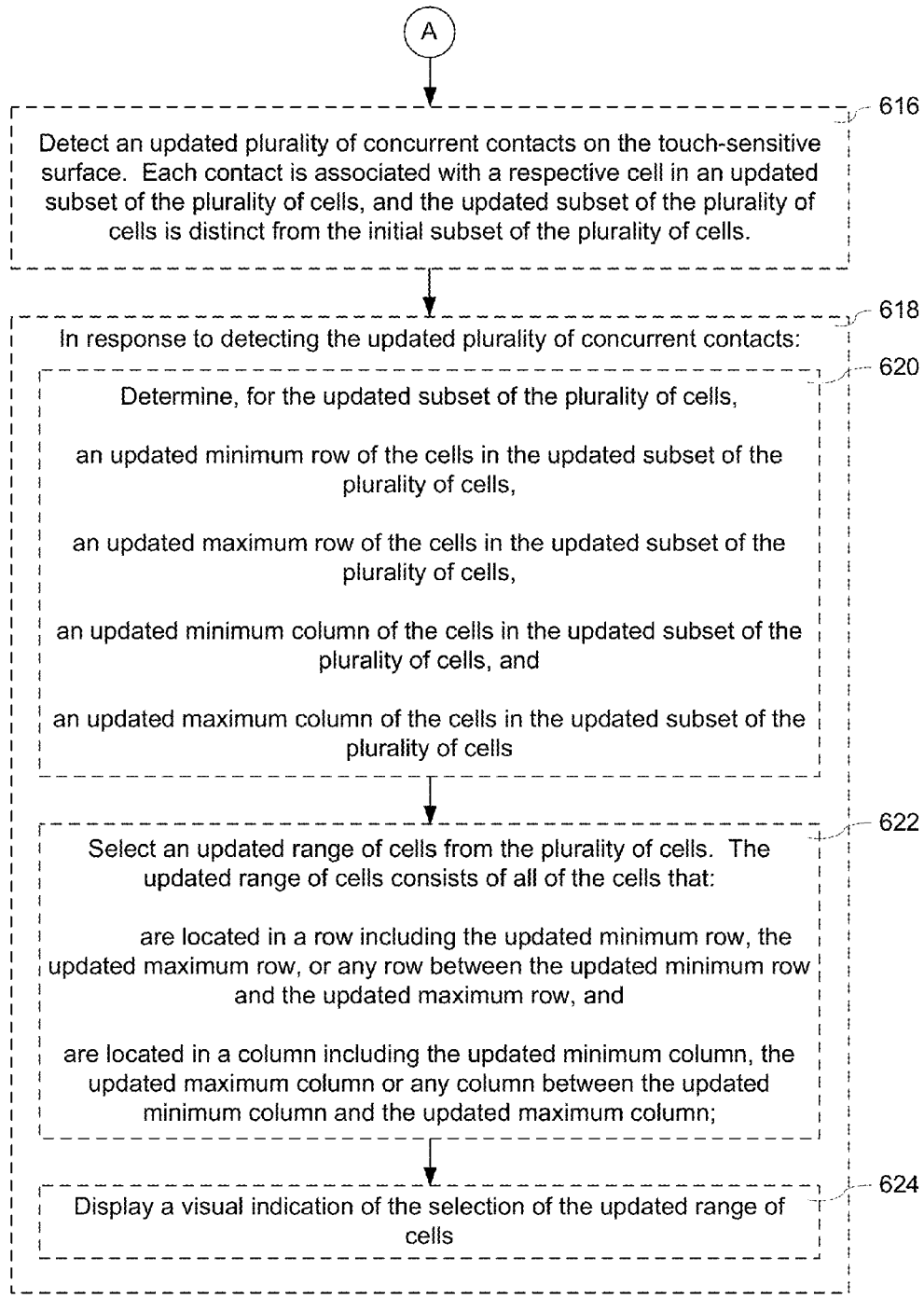
Figure 6C:
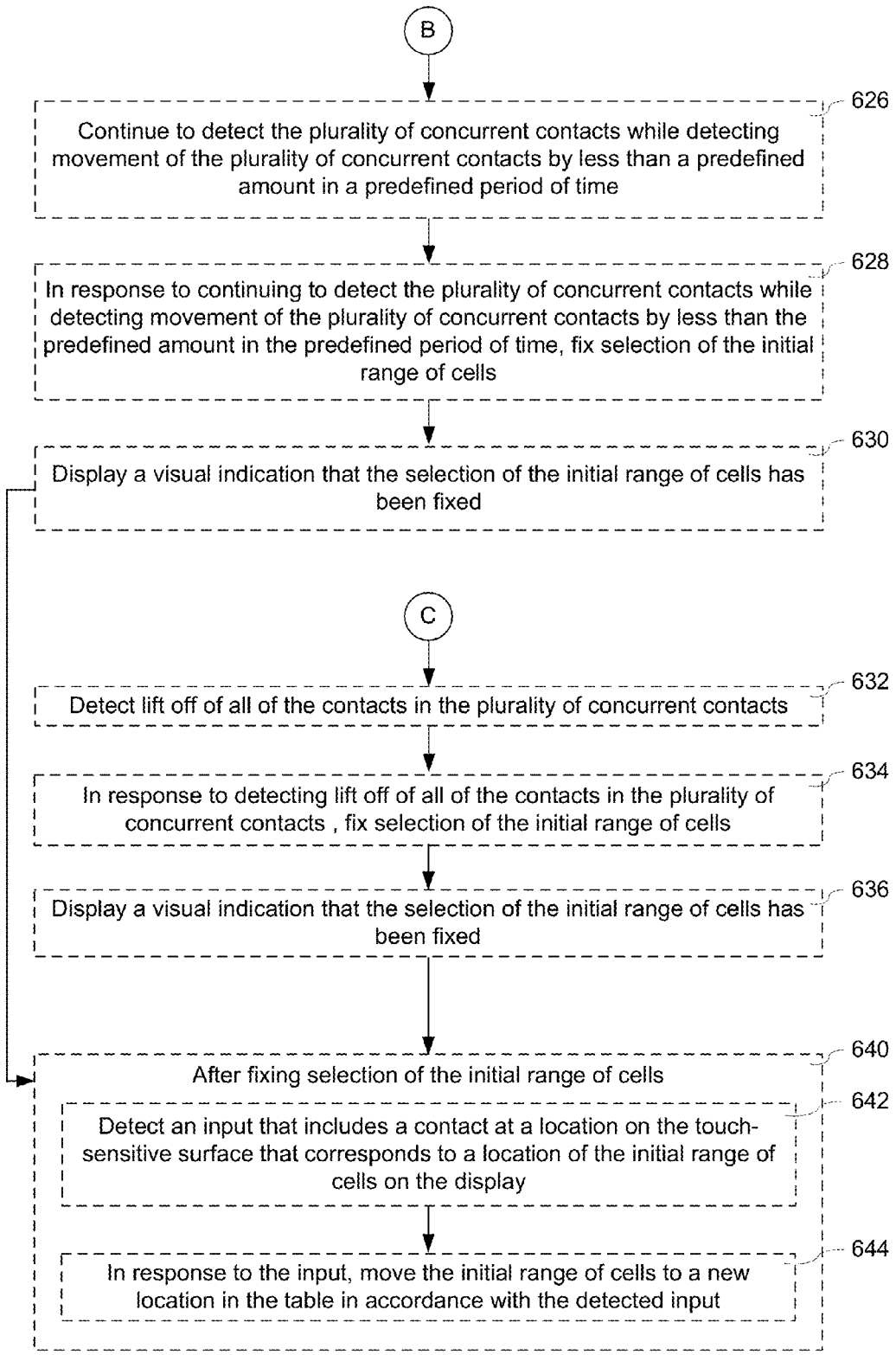
Figure 7A:
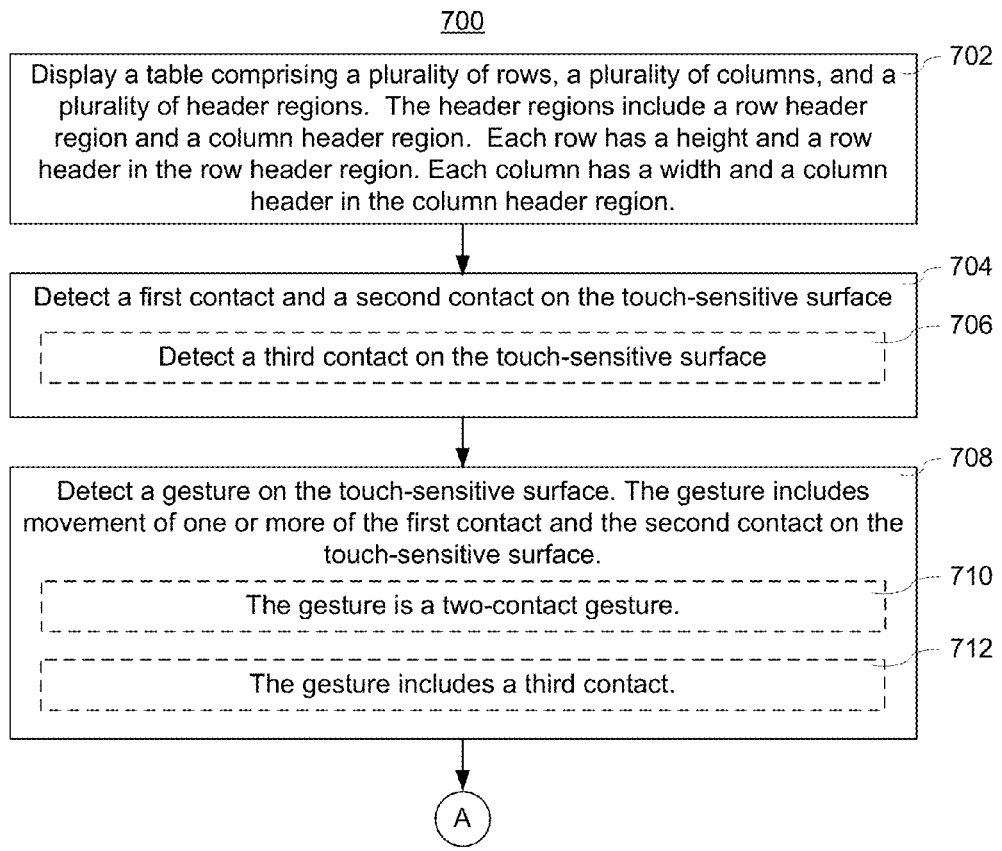
FIGS. 7A-7E are flow diagrams illustrating a method of adjusting the width of columns and/or the height of rows in a table using multi-contact gestures in accordance with some embodiments.
Figure 7B:
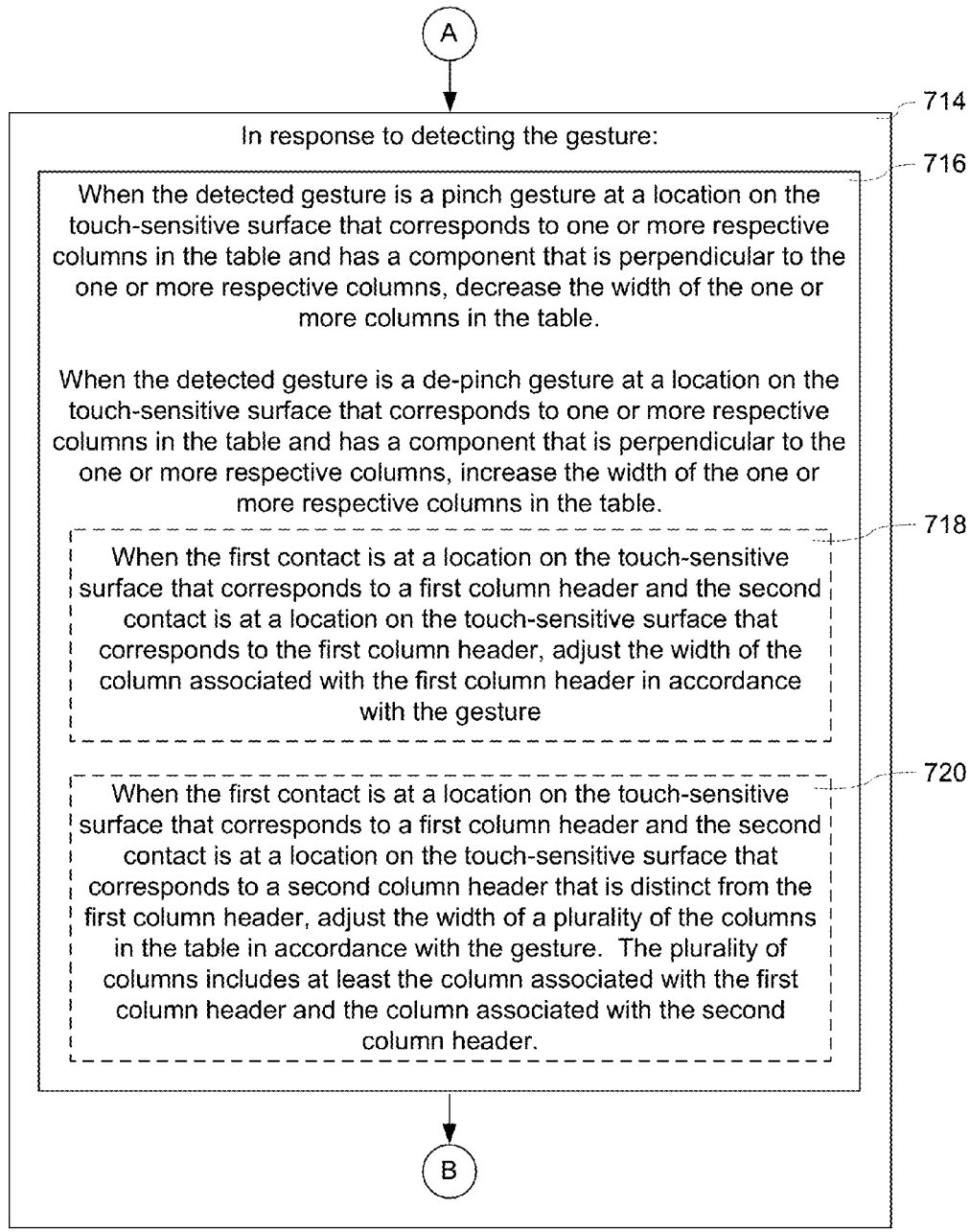
Figure 7C:
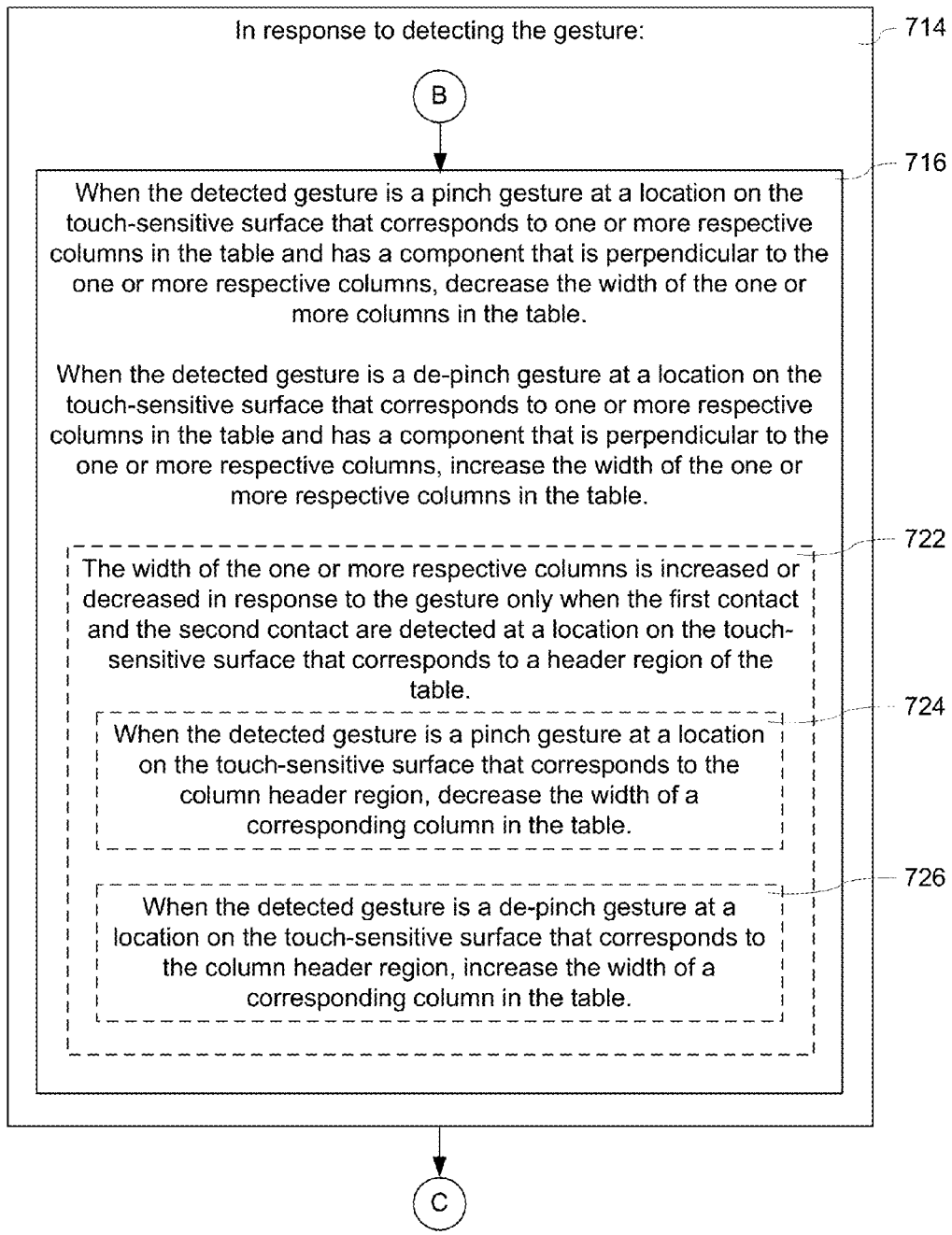
Figure 7D:
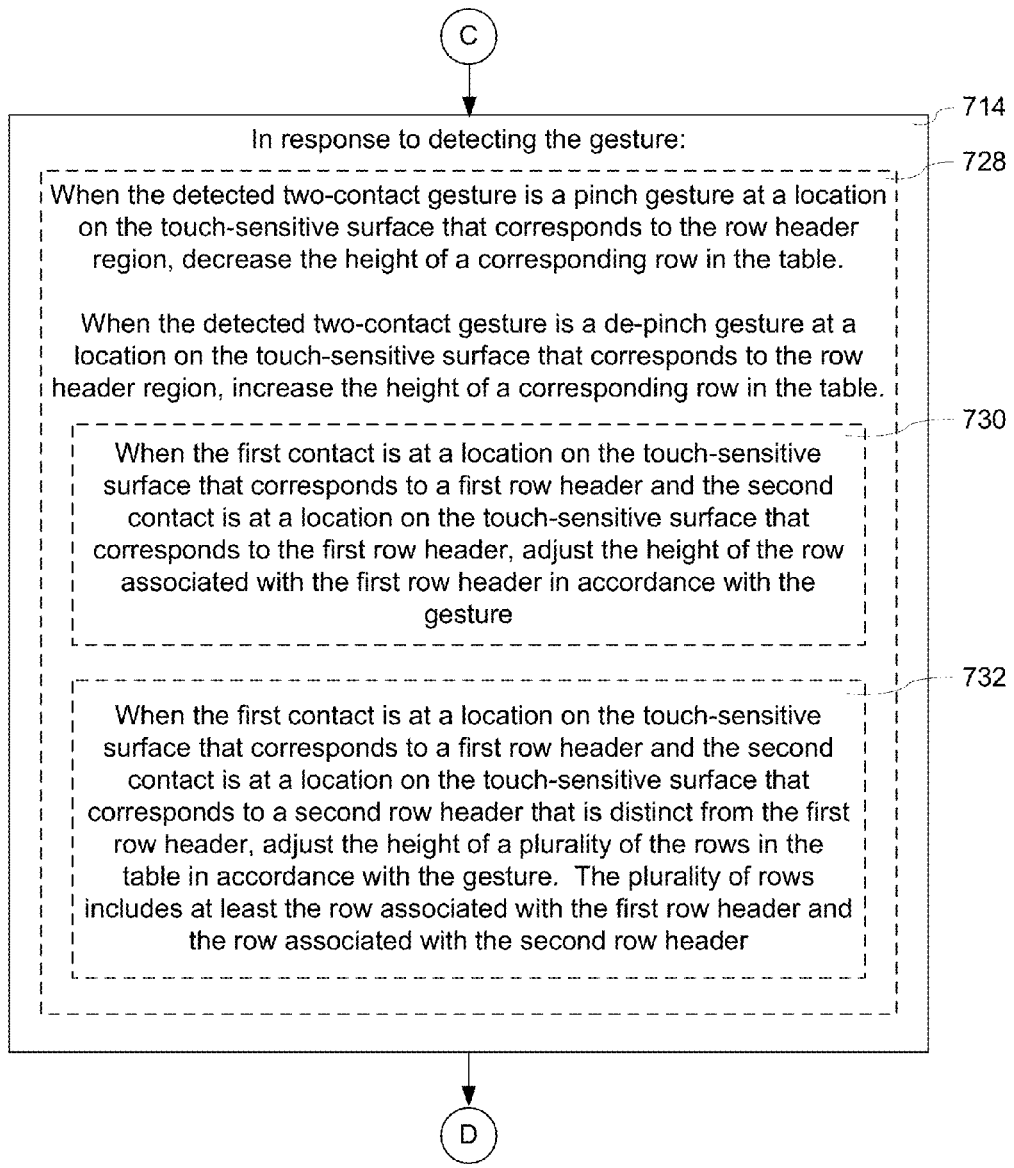
Figure 7E:
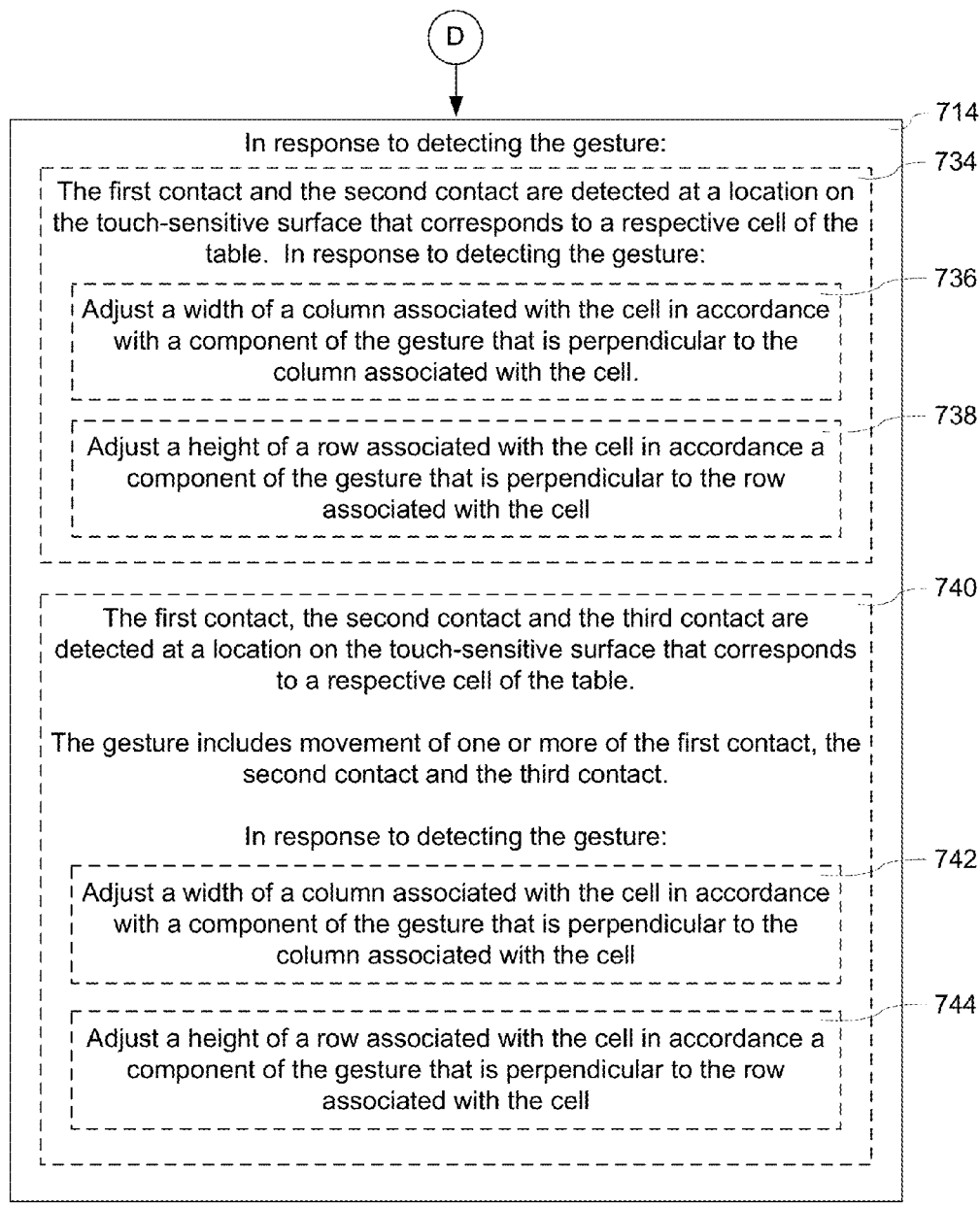

FIGS. 6A-6C are flow diagrams illustrating a method 600 of selecting cells in a table using multi-contact gestures in accordance with some embodiments. The method 600 is performed at a multifunction device (e.g., device 300, FIG. 3, or portable multifunction device 100, FIG. 1) with a display and a touch-sensitive surface. In some embodiments, the display is a touch screen display and the touch-sensitive surface is on the display. In some embodiments, the display is separate from the touch-sensitive surface. Some operations in method 600 may be combined and/or the order of some operations may be changed.

As described below, the method 600 provides an intuitive way to select cells in a table using multi-contact gestures. The method reduces the cognitive burden on a user when selecting cells in a table, thereby creating a more efficient human-machine interface. For battery-operated computing devices, enabling a user to select cells in a table faster and more efficiently conserves power and increases the time between battery charges.

The device displays (602) a table (e.g., 5002 in FIG. 5A) comprising a plurality of cells, wherein each cell is located in a respective row (e.g., row 1, row 2, row 3, etc.) and a respective column (e.g., column A, column B, column C, etc.) of the table (e.g., 5002 in FIG. 5A). The device detects (604) a plurality of concurrent contacts on the touch-sensitive surface (e.g., touch screen display 112 in FIGS. 5A-5G). Each contact is associated with a respective cell in an initial subset of the plurality of cells. It should be understood that, in accordance with some embodiments, contacts are concurrent when they are detected simultaneously on the touch-sensitive surface. For example in FIG. 5A, contact 5008 is associated with the cell in row 2, column C, while contact 5010 is associated with the cell in row 5, column E of the table. It should be noted that, in accordance with some embodiments a contact is associated with the respective cell that includes the centroid of the contact or other representative point in the contact. In some embodiments, the device examines the entire area of the contact and then determines a single point as a representative point for the contact, even if that point is not in the exact center of the contact. In some embodiments other heuristics are used to select the cell that is associated with the contact (e.g., the cell that includes the majority of the surface area of the contact, or any cell that includes at least a portion of the contact).

In some embodiments, the plurality of concurrent contacts includes (606) three or more contacts. For example, in FIG. 5B, an initial first contact 5012-*a* is associated with the cell in row 3, column C, while an initial second contact 5014-*a* is associated with the cell in row 5, column E, and an initial third contact 5016-*a* is associated with the cell in row 2, column D. In some embodiments, four or more contacts are used. In still other embodiments, five contacts are used. It should be understood, that in some embodiments, using a threshold of more than two contacts (e.g., a minimum of three, four or five contacts) is advantageous because it enables the device to distinguish the cell-selection gesture from other gestures which use two or fewer contacts. For example, in some embodiments, a two-contact lateral movement may be associated with scrolling or translating the user interface laterally (e.g., as described in greater detail below with reference to FIGS. 5W-5X); a two-contact pinch or de-pinch gesture may be associated with zooming the user interface (e.g., as described in greater detail below with reference to FIGS. 5EE-5FF), or resizing a cell, row or column; and a two-contact rotate gesture may be associated with rotating the user interface or a user interface object. In these embodiments, requiring a third contact provides a way to accurately distinguish these two-contact gestures from the three (or more) contact cell-selection gesture described with reference to FIGS. 5B-5D.

Operations 610-614 are performed in response (608) to detecting the plurality of concurrent contacts.

The device determines (610), for the initial subset of the plurality of cells, an initial minimum row of the cells in the initial subset of the plurality of cells, an initial maximum row of the cells in the initial subset of the plurality of cells, an initial minimum column of the cells in the initial subset of the plurality of cells, and an initial maximum column of the cells in the initial subset of the plurality of cells. For example, in FIG. 5B, the initial minimum row is the topmost row in the initial subset of the plurality of cells (i.e., row 2), while the initial maximum row is the bottommost row in the initial subset of the plurality of cells (i.e., row 5). Similarly, in the example illustrated in FIG. 5B, the initial minimum column is leftmost column in the initial subset of the plurality of cells (i.e., column B), while the initial maximum column is the rightmost column in the initial subset of the plurality of cells (i.e., column E).

The device selects (612) an initial range of cells from the plurality of cells. The initial range of cells consists of all of the cells that are located in a row including the initial minimum row (e.g., row 2 in FIG. 5B), the initial maximum row (e.g., row 5 in FIG. 5B), or any row between the initial minimum row and the initial maximum row (e.g., rows 3 and 4 in FIG. 5B), and are located in a column including the initial minimum column (e.g., column C in FIG. 5B), the initial maximum column (e.g., column E in FIG. 5B) or any column (e.g., column D in FIG. 5B) between the initial minimum column and the initial maximum column. For example, in FIG. 5D, the initial range of cells includes the initial subset of the plurality of cells and all of the cells in the rectangular area defined by the topmost row, the bottommost row, the leftmost column, and the rightmost column in the initial subset of the plurality of cells (e.g., as illustrated by the highlighted region 5018 in FIG. 5D).

The device displays (614) a visual indication (e.g., the highlighted region 5018-*a* in FIG. 5B) of the selection of the initial range of cells. In addition, as explained in greater detail below with reference to FIG. 5B, the range of cells that are selected can be varied prior to fixing the selection. In some embodiments, making a selection merely ephemerally selects a plurality of cells, while fixing the selection includes confirming that the selection is the user's desired selection, and making the selection semi-permanent so that the elements remain selected for at least a predefined period of time even if the device ceases to detect one or more of the initial contacts (e.g., 5012-*a*, 5014-*a*, 5016-*a* in FIG. 5B) or detects movement of one or more of the initial contacts (e.g., 5012-*a*, 5014-*a*, 5016-*a* in FIG. 5B).

In some embodiments, the device detects (616) an updated plurality of contacts (e.g., 5012-*b*, 5014-*b* and 5016-*b* in FIG. 5C) on the touch-sensitive surface. Each contact is associated with a respective cell in an updated subset of the plurality of cells, and the updated subset of the plurality of cells is distinct from the initial subset of the plurality of cells. In other words, the updated subset of the plurality of cells includes at least one cell that is not included in the initial subset of the plurality of cells and/or the initial subset of the plurality of cells includes at least one cell that is not included in the updated subset of the plurality of cells. For example, in FIG. 5C, an updated first contact 5012-*b* is associated with the cell in row 5, column D, while an updated second contact 5014-*b* is associated with the cell in row 7, column E, and an updated third contact 5016-*b* is associated with the cell in row 3, column E, and these positions are distinct from the cells associated with the initial first contact 5012-*a*, the initial second contact 5014-*a* and the initial third contact 5106-*a* in FIG. 5B.

While the updated concurrent contacts are updated in FIG. 5C by moving the contacts on the touch-sensitive surface, it should be understood that the updated contacts could also be the result of one or more of: the movement of a one or more of the initial contacts from a location on the touch-sensitive surface corresponding to one cell to a location on the touch-sensitive surface corresponding to another cell while the other contacts remain in substantially stationary locations; the addition of a new contact as compared with the plurality of concurrent contacts; and/or the subtraction of a contact that was present in the plurality of concurrent contacts. Consequently, in some embodiments, the plurality of concurrent contacts and the updated plurality of concurrent contacts include the same number of contacts. In some embodiments, the plurality of concurrent contacts and the updated plurality of concurrent contacts each consist of the same number of contacts (e.g., the plurality of concurrent contacts and the updated plurality of concurrent contacts each consist of exactly of three contacts). In some embodiments, the plurality of concurrent contacts includes more contacts than the updated plurality of concurrent contacts. In some embodiments, the plurality of concurrent contacts includes fewer contacts than the updated plurality of contacts.

Operations 620-624 are performed in response to detecting (618) the updated plurality of contacts on the touch-sensitive surface (e.g., touch screen display 112 in FIG. 5C).

In some embodiments, the device determines (620), for the updated subset of the plurality of cells, an updated minimum row of the cells in the updated subset of the plurality of cells, an updated maximum row of the cells in the updated subset of the plurality of cells, an updated minimum column of the cells in the updated subset of the plurality of cells, and an updated maximum column of the cells in the updated subset of the plurality of cells. For example, in FIG. 5C, the updated minimum row is the topmost row in the initial subset of the plurality of cells (i.e., row 3), while the updated maximum row is the bottommost row in the initial subset of the plurality of cells (i.e., row 7). Similarly, in the example illustrated in FIG. 5C, the updated minimum column is leftmost column in the initial subset of the plurality of cells (i.e., column D), while the updated maximum column is the rightmost column in the initial subset of the plurality of cells (i.e., column E).

In some embodiments, the device selects (622) an updated range of cells from the plurality of cells, wherein the updated range of cells consists of all of the cells that: are located in a row including the updated minimum row (e.g., row 3 in FIG. 5C), the updated maximum row (e.g., row 7 in FIG. 5C), or any row between the updated minimum row and the updated maximum row (e.g., rows 4-6 in FIG. 5C), and are located in a column including the updated minimum column (e.g., column D in FIG. 5C), the updated maximum column (e.g., column 5E in FIG. 5C) or any column between the updated minimum column and the updated maximum column. For example in FIG. 5C, the updated range of cells includes the updated subset of the plurality of cells and all of the cells in the rectangular area defined by the topmost row, the bottommost row, the leftmost column, and the rightmost column in the updated subset of the plurality of cells, as indicated by the highlighted area 5020 in FIG. 5C.

In some embodiments, the device displays (624) a visual indication of the selection of the updated range of cells (e.g., the highlighted region 5020 in FIG. 5C). While the description of manipulating selected cells is described below with reference to the initial range of cells, it should be understood that in some embodiments analogous manipulations are performed on the updated range of cells instead of being performed on the initial range of cells.

In some embodiments, the device continues (626) to detect the plurality of concurrent contacts (e.g., 5012-*a*, 5014-*a* and 5016-*a* in FIG. 5D) while detecting movement of the plurality of concurrent contacts by less than a predefined amount in a predefined period of time (e.g., each contact is associated with the same cell of the table for a predefined period of time). In some embodiments the predefined period of time is a period of time greater than 0.2 seconds. In some embodiments the predefined period of time is another reasonable period of time such as 0.05 seconds, 0.1 seconds, 0.4 seconds, 0.8 seconds or 1 second. In response to continuing to detect the plurality of concurrent contacts while detecting movement of the plurality of concurrent contacts by less than the predefined amount in the predefined period of time, the device fixes (628) selection of the initial range of cells. In some embodiments, when a selection of a range of cells is fixed, even if the device ceases to detect one or more of the contacts, or detects movement of one or more of the contacts, the cells included in the initial range of cells will continue to be selected. In some embodiments, the device displays (630) a visual indication that the selection of the initial range of cells has been fixed. For example, in FIG. 5D, the border of the highlighted region 5018-*a* is darkened to indicate that the selection of the initial range of cells is fixed. Similarly, in FIG. 5E, the range of cells is displayed as visually "popped-out" of the table so as to indicate that the initial range of cells is fixed.

An alternative embodiment for fixing selection of cells is described below. In some embodiments, the device detects (632) lift off of all of the contacts in the plurality of concurrent contacts (e.g., as illustrated in FIG. 5E, all of the contacts have been lifted off). In some embodiments, the selection is only fixed if each contact in the plurality of concurrent contacts ceases to be detected on the touch-sensitive surface before a predefined period of time has elapsed or within a predefined window of time after the device ceases to detect one of the plurality of concurrent contacts (e.g., if the initial contacts are lifted off from the touch-sensitive surface simultaneously or substantially simultaneously). In some embodiments, in response to detecting lift off of all of the contacts in the plurality of concurrent contacts, the device fixes (634) selection of the initial range of cells, as described in greater detail above. In some embodiments, the device displays (636) a visual indication that the selection of the initial range of cells has been fixed. For example, in FIG. 5D, the border of the highlighted region 5018-*a* is darkened to indicate that the selection of the initial range of cells is fixed. Similarly, in FIG. 5E, the range of cells is displayed as visually "popped-out" of the table so as to indicate that the initial range of cells is fixed.

In some embodiments, after fixing (640) selection of the initial range of cells, the device detects (642) an input that includes a contact at a location on the touch-sensitive surface that corresponds to a location of the initial range of cells on the display. For example, in FIGS. 5E-5G the highlighted region 5018 that includes the initial range of cells moves from an initial location (e.g., 5018-*a* in FIG. 5E) across the touch-sensitive surface to an updated location (e.g., 5018-*b* in FIG. 5F) in response to a tap and drag gesture that originates with a contact at an initial location (e.g., 5022-*a* in FIG. 5E) on the touch-sensitive display in the selected range of cells (e.g., with highlighted area 5018-*a* in FIG. 5E), and moves 5024 across the touch-sensitive surface to a final location (e.g., 5022-*b* in FIG. 5F). In response to the input, the device moves (644) the initial range of cells to a new location in the table in accordance with the detected input. In some embodiments, the movement of the range of cells is finalized upon detecting liftoff of the contact 5022, as illustrated in FIG. 5G.

FIGS. 7A-7E are flow diagrams illustrating a method 700 of adjusting the width of columns and/or the height of rows in a table using multi-contact gestures in accordance with some embodiments. The method 700 is performed at a multifunction device (e.g., device 300, FIG. 3, or portable multifunction device 100, FIG. 1) with a display and a touch-sensitive surface. In some embodiments, the display is a touch screen display and the touch-sensitive surface is on the display (e.g., the touch screen display 112 in FIGS. 5H-5O). In some embodiments, the display is separate from the touch-sensitive surface. Some operations in method 700 may be combined and/or the order of some operations may be changed.

As described below, the method 700 provides an intuitive way to adjust the width of columns and/or the height of rows in a table using multi-contact gestures. The method reduces the cognitive burden on a user when adjusting the width of columns and/or the height of rows in a table, thereby creating a more efficient human-machine interface. For battery-operated computing devices, enabling a user to adjust the width of columns and/or the height of rows in a table faster and more efficiently conserves power and increases the time between battery charges.

The device displays (702) a table (e.g., 5002 in FIG. 5H) comprising a plurality of rows (e.g., row 1, row 2, row 3, etc.), a plurality of columns (e.g., column A, column B, column C, etc.), and a plurality of header regions. The header regions include a row header region (e.g., 5026 or 5027 in FIG. 5H) and a column header region (e.g., 5028 or 5029 in FIG. 5H). Each row has a height and a row header (e.g., 5030 in FIG. 5H) in the row header region (e.g., 5026 in FIG. 5H). Each column has a width and a column header (e.g., 5032 in FIG. 5H) in the column header region (e.g., 5028 in FIG. 5H). It should be understood that in some embodiments the row/column headers are automatically generated by the device (e.g., the row headers in row header region 5026 and the column headers in column header region 5028 in FIG. 5H), and include generic labels (e.g., 1, 2, 3, etc. and/or A, B, C, etc.). In other embodiments the header regions are user-specified (e.g., the row headers in row header region 5027 and the column headers in column header region 5029) and include user-specified or selected labels (e.g., Apples, Oranges, Pears, etc., and/or 2001, 2002, 2003, etc.). Furthermore, it should be understood that in some embodiments both generic header regions (e.g., 5026 and 5028) and user-specified header regions (e.g., 5027 and 5029) are displayed. Alternatively, in some embodiments, header regions that include headers having both generic identifiers and user-specified identifiers are displayed. Thus, while the examples discussed herein are discussed primarily with reference to simultaneous multi-contact gestures that are performed within generic (e.g., device generated) headers within device generated header regions (e.g., row header region 5026 and column header region 5028), it should be understood that the mechanisms and methods described herein for manipulating tables using simultaneous multi-contact gestures are similarly applicable to situations where the header regions are user-specified header regions that include user-specified headers. In some embodiments, the user-specified header regions are explicitly identified by the user as being header regions (e.g., by changing the properties of the row/column to identify that row/column as a header region). In some embodiments, the user-specified header regions are automatically identified by the device based on a difference in the content between the cells which are identified as the user-specified header region and other cells in the table (e.g., in FIG. 5H, the device could determine that Apples, Oranges, Pears, etc. are row headers because they include letters/words instead of numbers, and/or the device could determine that 2001, 2002, 2003, etc. are column headers because they are sequential numerical values and have a different font size/format than the text in other cells of the table).

The device detects (704) a first contact and a second contact on the touch-sensitive surface. In some embodiments the device detects (706) a third contact on the touch-sensitive surface. The device detects (708) a gesture on the touch-sensitive surface. The gesture includes movement of one or more of the first contact and the second contact on the touch-sensitive surface. In some embodiments, the first contact moves in a direction that is substantially opposite to the direction moved by the second contact. In some embodiments, the gesture is (710) a two-contact gesture (e.g., as described in greater detail below with reference to FIGS. 5GG-5HH). In some embodiments, the gesture includes (712) a third contact (e.g., as described in greater detail below with reference to FIGS. 5HH-5II). In some embodiments, the movement is parallel to a primary axis of the header region. For example, when the gesture is the column header region (e.g., 5028 in FIGS. 5H-5K), the movement of the contacts is a horizontal pinch/de-pinch gesture, as illustrated in FIGS. 5H-5K and described in greater detail below. Conversely, when the gesture is in the row header region (e.g. 5026 in FIGS. 5L-5O), the movement of the contacts is a vertical pinch/de-pinch gesture, as illustrated in FIGS. 5L-5O and described in greater detail below.

Operations 716-720 are performed in response to detecting (714) the gesture. When the detected gesture is a pinch gesture at a location on the touch-sensitive surface that corresponds to one or more respective columns in the table and has a component that is perpendicular to the one or more respective columns, the device decreases (716) the width of the one or more respective columns in the table. For example, in FIGS. 5H-5I, the device detects a first contact 5034-*a* and a second contact 5036-*a* at locations on the touch screen display 112 that correspond to a column header 5032 for column A in FIG. 5H, and detects subsequent movement of the contacts towards each other along the column header region 5028 to respective current locations 5034-*b* and 5036-*b* in FIG. 5I. In response to this pinch gesture, the device decreases the width of the column (e.g., column A) that is associated with the column header 5032, as illustrated in FIG. 5I.

In contrast, when the detected gesture is a de-pinch gesture at a location on the touch-sensitive surface that corresponds to one or more respective columns in the table and has a component that is perpendicular to the one or more respective columns, the device increases the width of the one or more respective columns in the table. For example, in FIGS. 5J-5K, the device detects a first contact 5040 at an initial location on the touch screen display 112 that corresponds to a column header 5042 for column C and a second contact 5044 at an initial location on the touch screen display 112 that corresponds to a column header 5046 for column E in FIG. 5J and detects subsequent movement of the contacts away from each other along the column header region to respective current locations on the touch screen display 112 that correspond to locations 5040-*b* and 5044-*b* in FIG. 5K. In response to this de-pinch gesture, the device increases the width of the columns (e.g., column C and column E) that are associated with the column headers (5042 and 5046 in FIG. 5J) as well as increasing the width of the column(s) between the two distinct column headers (e.g., column D), as illustrated in FIG. 5K.

In some embodiments, when the first contact (e.g., 5034-*a* in FIG. 5H) is at a location on the touch-sensitive surface that corresponds to a first column header (e.g., 5032 in FIG. 5H) and the second contact (e.g., 5036-*a* in FIG. 5H) is at a location on the touch-sensitive surface that corresponds to the first column header (e.g., 5032 in FIG. 5H), the device adjusts (718) (e.g., increases/decreases) the width of the column (e.g., column A) associated with the first column header in accordance with the gesture (e.g., the width of the first column is adjusted either by increasing the width of the corresponding column or decreasing the width of the corresponding column depending on whether the gesture is a pinch gesture or a de-pinch gesture). In other words, when the first contact and the second contact are with the first column header, the first column that is associated with the first column header is the corresponding column described previously. For example, as illustrated in FIGS. 5H-5I a pinch gesture is performed within the column header 5032 for column A, and thus the width of column A is decreased in response to the pinch gesture, as illustrated in FIG. 5I. As another example, as illustrated in FIGS. 5H-5I a pinch gesture (e.g., movement of contacts 5037 towards each other from a first location 5037-*a* in FIG. 5H to a second location 5037-*b* in FIG. 5I) is performed within a cell in a respective column (e.g., column A) that is outside of the column header 5032 for column A, and in response to the pinch gesture, the width of column A is decreased, as illustrated in FIG. 5I.

In some embodiments, when the first contact (e.g., 5040-*a* in FIG. 5J) is at a location on the touch-sensitive surface that corresponds to a first column header (e.g., 5042 in FIG. 5J) and the second contact (e.g., 5044-*a* in FIG. 5J) is at a location on the touch-sensitive surface that corresponds to a second column header (e.g., 5046 in FIG. 5J) that is distinct from the first column header, the device adjusts (720) (e.g., increases/decreases depending on whether the gesture is a pinch gesture or a de-pinch gesture) the width of a plurality of the columns in the table in accordance with the gesture. The plurality of columns includes at least the column (e.g., column C) associated with the first column header (e.g., 5042 in FIG. 5J) and the column (e.g., column E) associated with the second column header (e.g., 5046 in FIG. 5J). In some embodiments, the width of all of the columns in the table is adjusted. In some embodiments, the width of the first column (e.g., column C), the second column (e.g., column E), and any column (e.g., column D) in the table that is in between the first column and the second column is adjusted. For example, as illustrated in FIGS. 5J-5K a de-pinch gesture is performed with contacts that are located at locations on the touch screen display 112 that correspond to column headers (e.g., 5042 and 5046 in FIG. 5J) for at least two distinct columns in the table (e.g., column C and column E), and thus the width of column C and column E are both increased in response to the de-pinch gesture, as illustrated in FIG. 5K. As another example, as illustrated in FIGS. 5J-5K a de-pinch gesture (e.g., movement of contacts 5045 away from each other from a first location 5045-*a* in FIG. 5J to a second location 5045-*b* in FIG. 5K) is performed within cells in one or more respective columns (e.g., columns C and E) that are outside of the column headers for the respective columns (e.g., column header 5042 for column C and the column header 5046 for column E), and in response to the de-pinch gesture, the width of columns C-E are increased, as illustrated in FIG. 5K.

In some embodiments, the width of the one or more respective columns is increased or decreased (722) in response to the gesture only when the first contact and the second contact are detected at a location on the touch-sensitive surface that corresponds to a header region of the table. In other words, in some embodiments, even if the device detects a first contact and a second contact with one or more respective columns of the table and a gesture that includes a component of movement of the contacts perpendicular to the table, the device does not resize the one or more respective columns unless the first contact and the second contact are at locations that correspond to a column header region of the table. For example, in these embodiments, detecting the pinch gesture including movement of contacts 5034 and 5036 towards each other in FIGS. 5H-5I would cause the device to decrease the width of Column A, while detecting the pinch gesture including movement of contacts 5037 towards each other would not cause the device to change the width of Column A, because contacts 5034 and 5036 are located in the column header region, while contacts 5037 are not located in the column header region. In some of these embodiments, when the detected gesture is a pinch gesture at a location on the touch-sensitive surface that corresponds to the column header region, the device decreases (724) the width of a corresponding column (e.g., Column A) in the table (e.g., as illustrated in FIGS. 5H-5I). In some embodiments, when the detected gesture is a de-pinch gesture at a location on the touch-sensitive surface that corresponds to the column header region, the device increases (726) the width of a corresponding column (e.g., Columns C-F) in the table (e.g., as illustrated in FIGS. 5I-5K).

In some embodiments, in response to detecting (714) the gesture, when the detected gesture is a pinch gesture at a location on the touch-sensitive surface that corresponds to the row header region (e.g., 5026 in FIGS. 5L-5O), the device decreases (728) the height of a corresponding row in the table. For example, in FIGS. 5L-5M, the device detects a first contact 5048-*a* at an initial location on the touch screen display 112 that corresponds to a row header 5050 for row 2 and a second contact 5052-*a* at an initial location on the touch screen display 112 that corresponds to region associated with a respective row (e.g., row header 5054 for row 8 in FIG. 5L) and detects subsequent movement of the contacts towards each other perpendicular to the respective row to respective current locations on the touch screen display 112 that correspond to locations 5048-*b* and 5052-*b* in FIG. 5M. In response to this pinch gesture, the device decreases the height of the rows (e.g., row 2 and row 8) that are associated with the row headers (e.g., 5050 and 5054 in FIG. 5L), as well as decreasing the height of the other rows, as illustrated in FIG. 5M.

In contrast, when the detected gesture is a de-pinch gesture at a location on the touch-sensitive surface that corresponds to the row header region (e.g., 5026 in FIGS. 5L-5O), the device increases the height of a corresponding row in the table. For example, in FIGS. 5N-5O, the device detects a first contact 5056-*a* and a second contact 5058-*a* at locations on the touch screen display 112 that correspond to a region for a respective row (e.g., row header 5030 for row 1 in FIG. 5N), and detects subsequent movement of the contacts away each other in a direction that is perpendicular to the respective row (e.g., along the row header region 5026 to respective current locations 5056-*b* and 5058-*b* in FIG. 5O). In response to this pinch gesture, the device increases the height of the respective row (e.g., row 1 that is associated with the row header 5030), as illustrated in FIG. 5O.

In some embodiments, when the first contact (e.g., 5056-*a* in FIG. 5N) is at a location on the touch-sensitive surface that corresponds to a first row header (e.g., 5030 in FIG. 5N) and the second contact (e.g., 5058-*a* in FIG. 5N) is at a location on the touch-sensitive surface that corresponds to the first row header (e.g., 5030 in FIG. 5N), the device adjusts (730) (e.g., increases/decreases) the height of the row (e.g., row 1) associated with the first row header in accordance with the gesture (e.g., the height of the first row is adjusted either by increasing the height of the corresponding row or decreasing the height of the corresponding row depending on whether the gesture is a pinch gesture or a de-pinch gesture). In other words, when the first contact and the second contact are with the first row header, the first row (e.g., row 1) that is associated with the first row header (e.g., 5030 in FIG. 5N) is the corresponding row described previously. For example, as illustrated in FIG. 5N a de-pinch gesture is performed within the row header 5030 for row 1, and thus the height of row 1 is increased in response to the de-pinch gesture, as illustrated in FIG. 5O.

In some embodiments, when the first contact (e.g., 5048-*a* in FIG. 5L) is at a location on the touch-sensitive surface that corresponds to a first row header (e.g., 5050 in FIG. 5L) and the second contact (e.g., 5052-*a* in FIG. 5L) is at a location on the touch-sensitive surface that corresponds to a second row header (e.g., 5054 in FIG. 5L) that is distinct from the first row header, the device adjusts (732) (e.g., increases/decreases depending on whether the gesture is a pinch gesture or a de-pinch gesture) the height of a plurality of the rows in the table in accordance with the gesture. The plurality of rows includes at least the row (e.g., row 2) associated with the first row header (e.g., 5050 in FIG. 5L) and the row (e.g., row 8) associated with the second row header (e.g., 5054 in FIG. 5L). In some embodiments, the height of all of the rows in the table is adjusted. In some embodiments, the height of the first row (e.g., row 2), the second row (e.g., row 8), and any row in the table that is in between the first row and the second row (e.g., rows 3-7) is adjusted. For example, as illustrated in FIG. 5L a pinch gesture is performed with contacts that are located at locations on the touch screen display 112 that correspond to row headers (e.g., 5050 and 5054 in FIG. 5L) for at least two distinct rows in the table (e.g., row 2 and row 8), and thus the height of row 2 and row 8 are both decreased in response to the pinch gesture, as well as decreasing the height of the other rows, as illustrated in FIG. 5M.

In some embodiments, the first contact and the second contact are detected at a location on the touch-sensitive surface that corresponds to a respective cell of the table (e.g., cell 5120 in table 5002 in FIG. 5GG); and operations 736-738 are performed in response to detecting (734) the gesture (e.g., a de-pinch gesture including movement of contacts 5122 from a first location 5122-*a* in FIG. 5GG to a second location 5122-*b* in FIG. 5HH). In these embodiments the device adjusts (736) a width of a column associated with the cell in accordance with a component of the gesture that is perpendicular to the column associated with the cell (e.g., in FIG. 5HH the device increases the width of Column E in accordance with the horizontal component of the de-pinch gesture that includes contacts 5122 in FIGS. 5GG-5HH). In these embodiments, the device also adjust (738) a height of a row associated with the cell in accordance a component of the gesture that is perpendicular to the row associated with the cell (e.g., in FIG. 5HH the device increases the height of row 5 in accordance with the vertical component of the de-pinch gesture that includes contacts 5122 in FIGS. 5GG-5HH).

In some embodiments, the first contact, the second contact and the third contact are detected at a location on the touch-sensitive surface that corresponds to a respective cell of the table (e.g., cell 5124 in table 5002 in FIG. 5HH); the gesture includes movement of one or more of the first contact, the second contact and the third contact (e.g., a multi-contact gesture including movement of contacts 5126 from a first location 5126-*a* in FIG. 5HH to a second location 5126-*b* in FIG. 5II); and, operations 742-744 are performed in response to detecting (740) the gesture. In these embodiments the device adjusts (742) a width of a column associated with the cell in accordance with a component of the gesture that is perpendicular to the column associated with the cell (e.g., in FIG. 5II the device increases the width of Column B in accordance with the horizontal component of the multi-contact gesture that includes contacts 5126 in FIGS. 5HH-5II). In these embodiments, the device also adjust (744) a height of a row associated with the cell in accordance a component of the gesture that is perpendicular to the row associated with the cell (e.g., in FIG. 5II the device decreases the height of row 5 in accordance with the vertical component of the multi-contact gesture that includes contacts 5126 in FIGS. 5HH-5II).

Figure 8A:
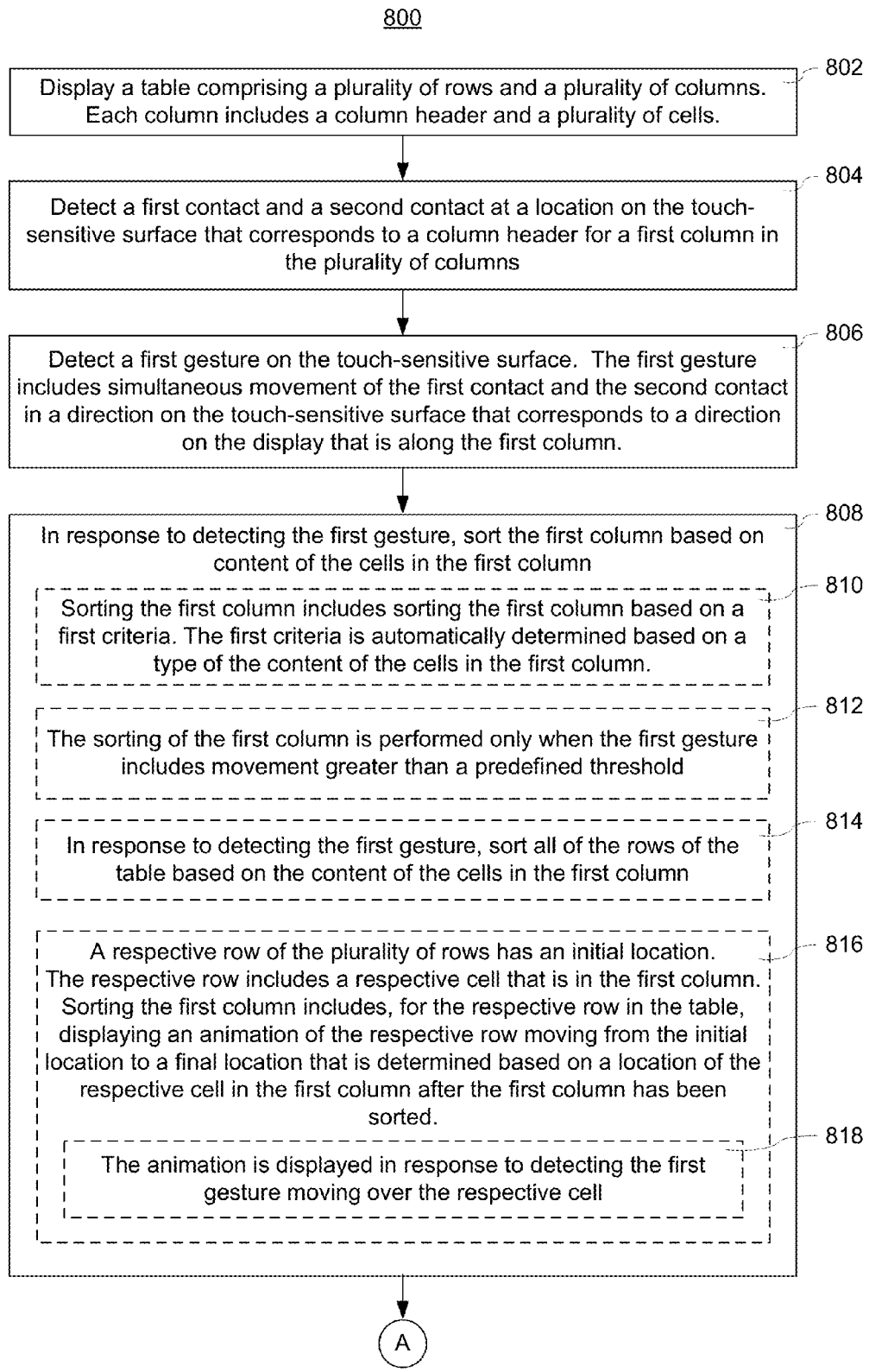
FIGS. 8A-8C are flow diagrams illustrating a method of sorting a table based on the contents of the table using multi-contact gestures in accordance with some embodiments.
Figure 8B:
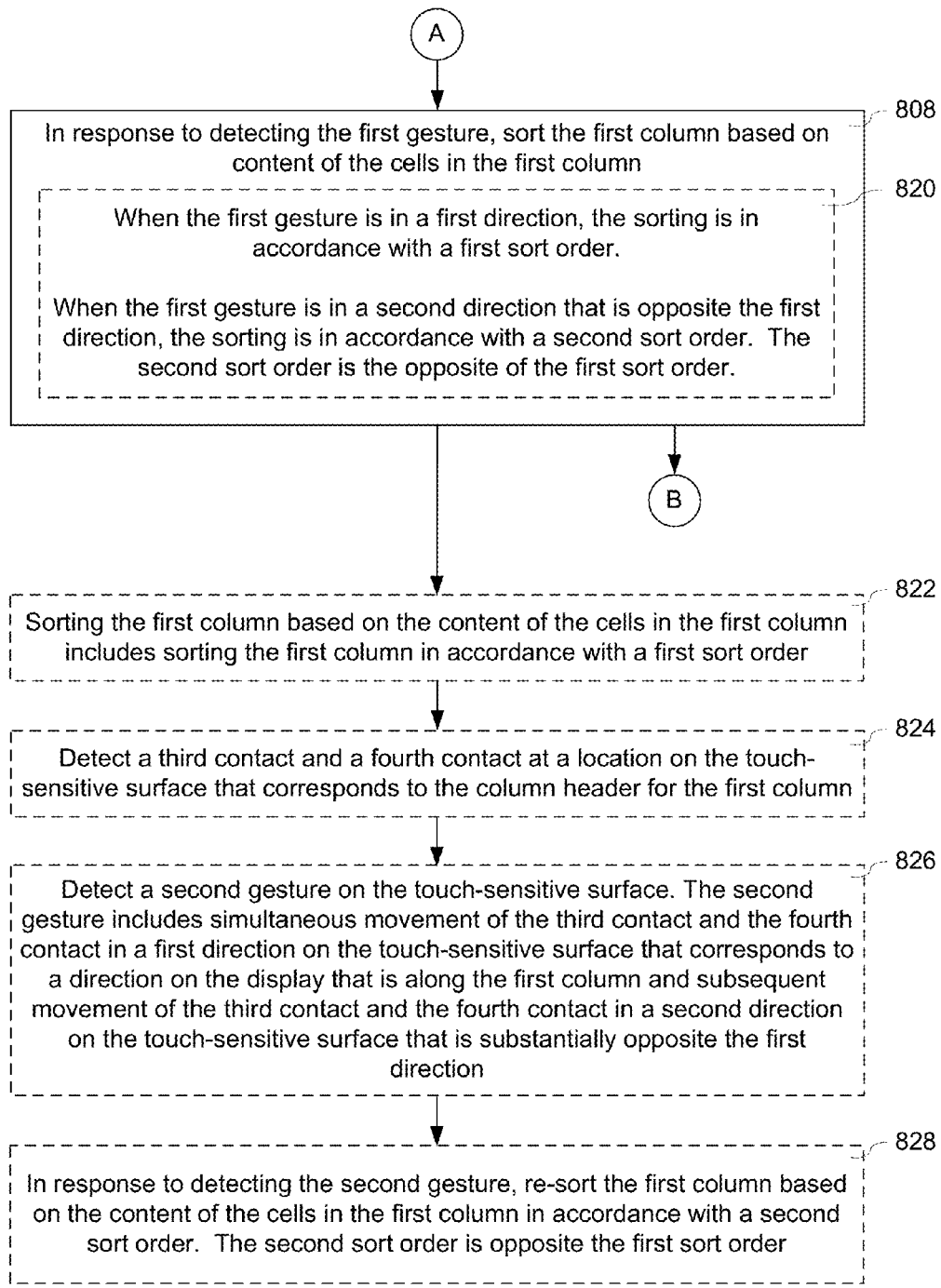
Figure 8C:
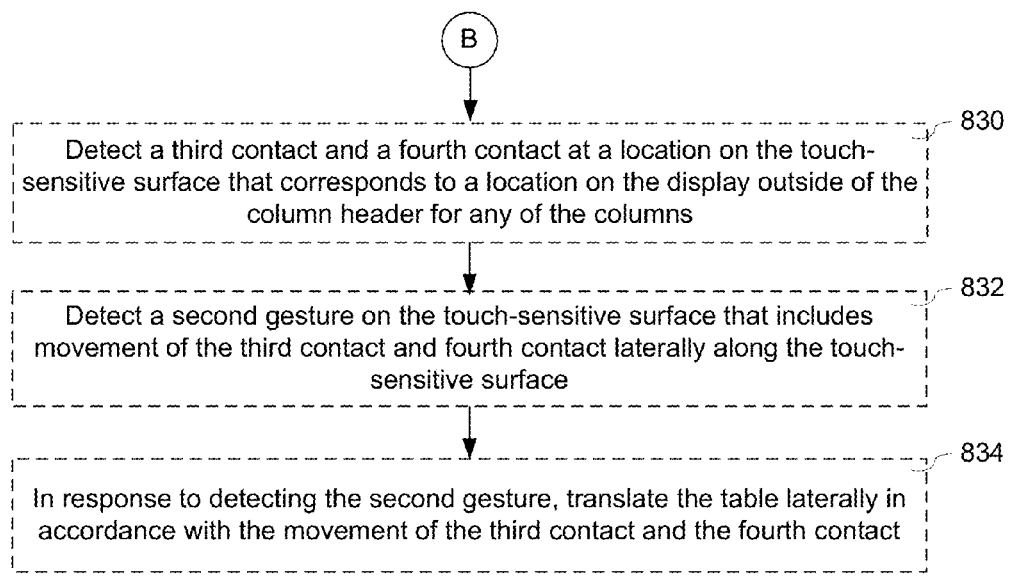

FIGS. 8A-8C are flow diagrams illustrating a method 800 of sorting a table based on the content of the table using multi-contact gestures in accordance with some embodiments. The method 800 is performed at a multifunction device (e.g., device 300, FIG. 3, or portable multifunction device 100, FIG. 1) with a display and a touch-sensitive surface. In some embodiments, the display is a touch screen display and the touch-sensitive surface is on the display (e.g., touch screen display 112 in FIGS. 5P-5X). In some embodiments, the display is separate from the touch-sensitive surface. Some operations in method 800 may be combined and/or the order of some operations may be changed.

As described below, the method 800 provides an intuitive way to sort tables based on the content of the table using multi-contact gestures. The method reduces the cognitive burden on a user when sorting tables based on the content of the table, thereby creating a more efficient human-machine interface. For battery-operated computing devices, enabling a user to sort tables based on the content of the table faster and more efficiently conserves power and increases the time between battery charges.

The device displays (802) a table (e.g., 5002 in FIG. 5P) comprising a plurality of rows (e.g., row 1, row 2, row 3, etc.) and a plurality of columns (e.g., column A, column B, column C, etc.). Each column includes a column header and a plurality of cells. The device detects (804) a first contact (e.g., 5060-a in FIG. 5P) and a second contact (e.g., 5062-a in FIG. 5P) at a location on the touch-sensitive surface that corresponds to a column header (e.g., 5064 in FIG. 5P) for a first column (e.g., column C) in the plurality of columns. The device detects (806) a first gesture on the touch-sensitive surface. The first gesture includes simultaneous movement of the first contact and the second contact in a direction on the touch-sensitive surface that corresponds to a direction on the display that is along the first column (e.g., the movement is entirely or partly within a region on the touch-sensitive surface that corresponds to the column). For example, as illustrated in FIGS. 5P-5R the contacts move (e.g., 5060 and 5062) from an initial location (e.g., 5060-a and 5062-a in FIG. 5P) along the touch screen display 112 through one or more intermediate locations (e.g., 5060-b and 5062-b in FIG. 5Q) to a final location (e.g., 5060-c and 5062-c in FIG. 5R). It should be understood that in some embodiments the row/column headers are generated by the device, while in other embodiments, the row/column headers are user-specified row/column headers, as described in greater detail above with reference to FIG. 5H. While the examples discussed herein are discussed primarily with reference to simultaneous multi-contact gestures that are performed within generic (e.g., device generated) headers within device generated header regions, it should be understood that the mechanisms and methods described herein for manipulating tables using simultaneous multi-contact gestures are similarly applicable to situations where the header regions are user-specified header regions that include user-specified headers.

In some embodiments, in response to detecting the first gesture, the device sorts (808) the first column based on content of the cells in the first column. For example, in FIG. 5P (e.g., prior to detecting the gesture) the rows in the table 5002 are not sorted, whereas in FIG. 5S (e.g., after detecting the gesture) the entire table 5002 has been sorted so that the rows are in order based on the content of the cells in column C.

In some embodiments, sorting the first column includes (810) sorting the first column based on a first criteria and the first criteria is automatically determined (e.g., without human intervention) based on a type of the content of the cells in the first column. In some embodiments, the first sort order is different for different kinds of content in the cells. For example, when the content in the cells includes letters, then the sorting is alphabetical; when the content in the cells includes numbers, then the sorting is from highest numerical value to lowest numerical value; and when the content in the cells include zip codes, then the sorting is based on geographical region. In some embodiments, the first sort order is descending for any type of content.

In some embodiments, the sorting of the first column is performed (812) only when the first gesture includes movement greater than a predefined threshold. In other words, the contacts must move more than a predetermined number of pixels before any sorting occurs (i.e., if the device detects movement below the predefined threshold, the device will ignore that movement). In some embodiments, the predetermined number of pixels is based on the size of the display (e.g., a number of pixels equal to 1% of the length or width of the display). In some embodiments the predetermined number of pixels is determined based on the size of the table on the display (e.g., a number of pixels equal to the height of one row, or a number of pixels equal to the width of two columns). In some embodiments, the predefined threshold is dragging the contacts outside of the header region. For example, in FIG. 5P, if the movement of the contacts (e.g., 5060 and 5062) stopped before reaching row 3, then no sorting operation would be performed, whereas if the movement of the contacts (e.g., 5060 and 5062) continued to at least row 3, then column C would be sorted, as illustrated in FIG. 5S.

In response to detecting the first gesture, the device sorts (814) all of the rows of the table based on the content of the cells in the first column. In other words, instead of merely sorting the content of the cells in the column (e.g., column C) that is associated with the gesture, the entire table is sorted based on the content of the cells in the column (e.g., column C) that is associated with the gesture. In other words, each row is moved to a location that is based on the content (e.g., numerical value of the content) of the cell of that row that is in the column (e.g., column C) with which the gesture is associated, as illustrated in FIG. 5S.

In some embodiments, a respective row (e.g., 5066-a in FIG. 5P) of the plurality of rows has an initial location, the respective row includes a respective cell that is in the first column; and sorting the first column includes (816), for the respective row in the table, displaying an animation of the respective row moving from the initial location to a final location that is determined based on a location of the respective cell in the first column after the first column has been sorted. For example, in FIGS. 5P-5S, the cells in row 3 are animated moving from an initial location (e.g., 5066-a in FIGS. 5P-5Q) through one or more intermediate locations (e.g., 5066-b in FIG. 5R) to a final location (e.g., 5066-c in FIG. 5S) in row 2' of the table in FIG. 5S. In some embodiments, the animation is displayed (818) in response to detecting the first gesture moving over a location that corresponds to the location of the respective cell in the table in its initial location on the display. In other words, as the contacts move over a respective row of the table, that row begins to float to its location in the final order of the table (e.g., if a row of cells has an initial location in the middle of the table, and the sort order will move the row to the top of the table, when the contacts in the gesture are at a location on the touch-sensitive surface that corresponds to a cell of that row, the row will begin to move to its location in the reordered table). For example, in FIG. 5Q, row 3 (e.g., 5066-a in FIG. 5Q) begins an animation to move to its final location when the contacts (e.g., 5060-b and 5062-b) pass over the cell (e.g., the cell in row 3, column C of the table in FIG. 5Q) on the touch screen display 112 that corresponds to that row (e.g., 5066-a in FIG. 5Q).

In some embodiments, when the first gesture is in a first direction (e.g., down the column), the sorting is (820) in accordance with a first sort order; and when the first gesture is in a second direction (e.g., up the column) that is opposite the first direction, the sorting is in accordance with a second sort order, where the second sort order is the opposite of the first sort order. For example, as described in greater detail above with reference to FIGS. 5P-5S, the device responds to a gesture that includes a swipe down column C by sorting the table numerically from largest value to smallest value based on the values of the cells in column C. In contrast in FIGS. 5T-5U, the device detects a gesture including two contacts (e.g., 5068 and 5070 in FIG. 5T) in the column header (e.g., 5064 in FIG. 5T) for the column (e.g., column C), and subsequent movement of the contacts upwards along a primary axis of the column, as illustrated in FIG. 5T. In this example, the device responds to the swipe up gesture illustrated by the arrows in FIG. 5T by sorting the table numerically from smallest value to largest value based on the values of the cells in column C, as illustrated in FIG. 5U. In other words, because the swipe gesture in FIGS. 5T-5U is upwards rather than downwards, the table is sorted in the opposite order from how the table is sorted in response to the downwards swipe gesture in FIGS. 5P-5S.

In some embodiments, sorting the first column based on the content of the cells in the first column includes (822) sorting the first column (e.g., column C in FIGS. 5P-5S) in accordance with a first sort order, as illustrated in FIGS. 5P-5S). In some embodiments, the device detects (824) a third contact (e.g., 5072 in FIG. 5V) and a fourth contact (e.g., 5074 in FIG. 5V) at a location on the touch-sensitive surface that corresponds to the column header (e.g., 5064 in FIG. 5V) for the first column (e.g., column C). In some embodiments, the device detects (826) a second gesture on the touch-sensitive surface. In these embodiments, the second gesture includes simultaneous movement of the third contact and the fourth contact in a first direction on the touch-sensitive surface that corresponds to a direction on the display that is along the first column and subsequent movement of the third contact and the fourth contact in a second direction on the touch-sensitive surface that is substantially opposite the first direction. For example in FIG. 5V, the second gesture includes movement of the third and fourth contacts (e.g., 5072 and 5074) downwards along a region on the touch screen display 112 that corresponds to column C and movement upwards along the region on the touch screen display 112 that corresponds to column C. In some embodiments, the third contact is made with the same finger as the first contact and the fourth contact is made with the same finger as the second contact.

In some embodiments, in response to detecting the second gesture, the device re-sorts (828) the first column (e.g., column C) based on the content of the cells in the first column (e.g., column C) in accordance with a second sort order, where the second sort order is opposite the first sort order. For example, in FIGS. 5P-5S, the device responds to a gesture that includes a swipe down column C by sorting the table numerically from largest value to smallest value based on the values of the cells in column C. Subsequently in FIG. 5V, the device detects the second gesture including two contacts (e.g., 5072 and 5074 in FIG. 5V) in the column header (e.g., 5064 in FIG. 5V) for the column (e.g., column C), and subsequent movement of the contacts downwards and then upwards along the column, as indicated by the arrows in FIG. 5V. In this example, the device responds to the swipe up gesture illustrated in FIG. 5V by re-sorting the table numerically from smallest value to largest value based on the values of the cells in column C, as illustrated in FIG. 5U.

Additionally, while this second gesture has been described as being performed after the first gesture, it could be performed with or without the first gesture in order to sort the content of the cells using a predetermined criteria that is different from the predetermined criteria used to sort the cells based on the content of the cells in response the first gesture. For example, in response to the gesture illustrated in FIG. 5P the device sorts the cells in column C from highest numerical value to lowest numerical value; while in response to the gesture illustrated in FIG. 5V the device sorts the cells from lowest numerical value to highest numerical value, without regard for whether the cells had previously been sorted in response to any previous gesture.

In some embodiments, the device detects (830) a third contact (e.g., 5076-a in FIG. 5W) and a fourth contact (e.g., 5078-a in FIG. 5W) at a location on the touch-sensitive surface that corresponds to a location on the display outside of the column header for any of the columns. In some embodiments, the device detects (832) a second gesture on the touch-sensitive surface that includes movement of the third contact and fourth contact laterally along the touch-sensitive surface. In some embodiments, in response to detecting the second gesture, the device scrolls (834) the table laterally in accordance with the movement of the third contact and the fourth contact. For example, in FIGS. 5W-5X, the device detects two contacts (e.g., 5076 and 5078) on the touch screen display 112 at a location that corresponds to a location on the display that is outside of the column headers, and detects lateral movement of the contacts from an initial location (e.g., 5076-a and 5078-a in FIG. 5W) to an updated location (e.g., 5076-b and 5078-b in FIG. 5X). In response to detecting this second gesture, the device translates the canvas laterally (e.g., up and to the right, when the contacts move up and to the right, as illustrated in FIGS. 5W-5X). It should be understood that similar lateral gestures along the touch-sensitive surface that are only in one direction (e.g., either vertical or horizontal) could also be used to scroll the table in a vertical or horizontal direction. Moreover, gestures that are close to being either vertical or horizontal (e.g., within 27 degrees of vertical or within 27 degrees of horizontal) may be treated as being perfectly horizontal or vertical, so as to enable scrolling vertically or horizontally for movements that are close to vertical or horizontal.

Additionally, while the preceding examples have been given with respect to sorting a table based on the content of cells in a single column of the table, it should be understood that analogous methods could be used to sort a table based on the content of cells in a single row of the table.

Figure 9:
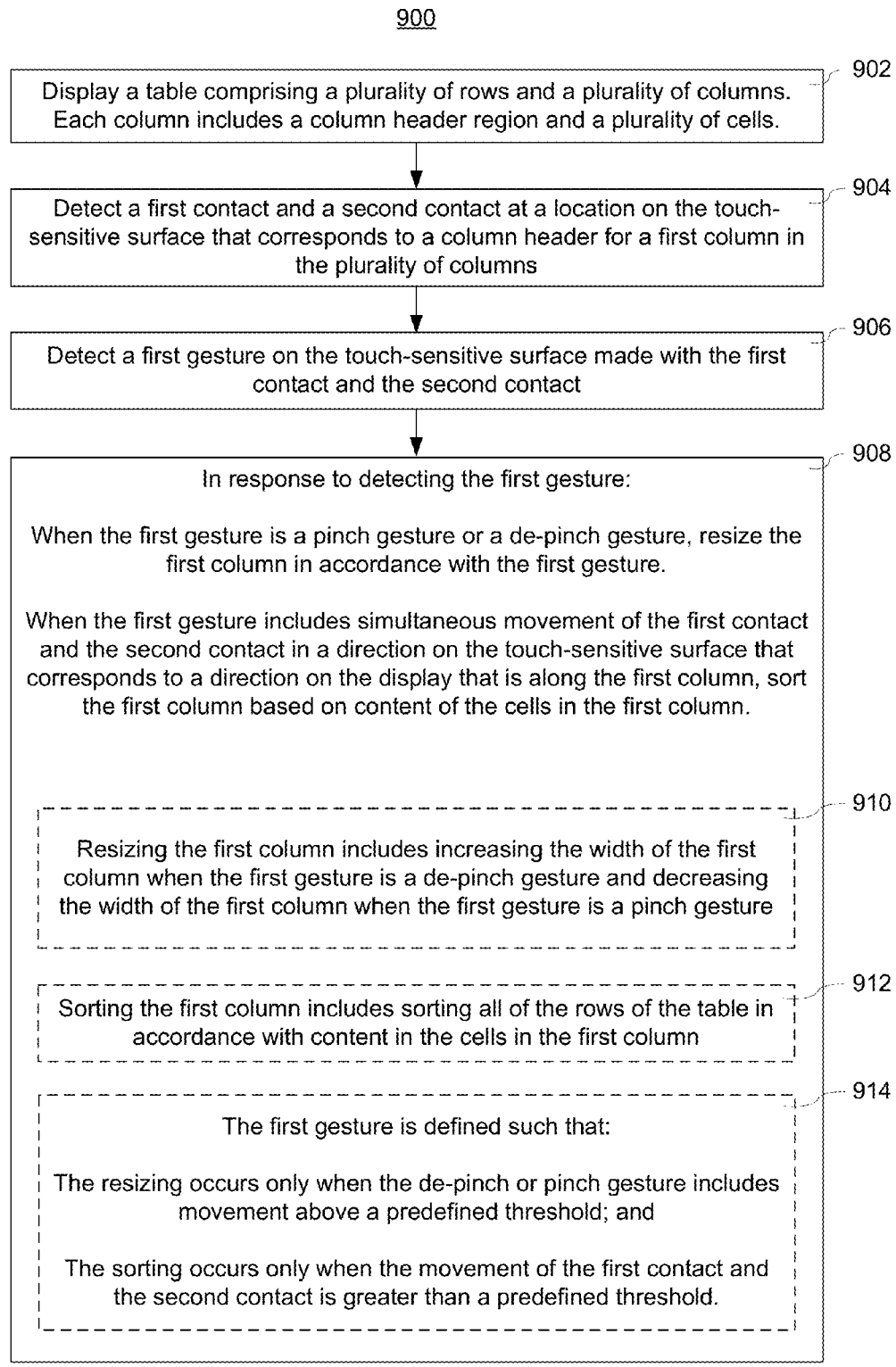
FIG. 9 is a flow diagram illustrating a method of distinguishing between multi-contact resize row/column gestures and multi-contact sort row/column gestures in accordance with some embodiments.

FIG. 9 is a flow diagram illustrating a method 900 of distinguishing between resize row/column multi-contact gestures and sort row/column multi-contact gestures in accordance with some embodiments. The method 900 is performed at a multifunction device (e.g., device 300, FIG. 3, or portable multifunction device 100, FIG. 1) with a display and a touch-sensitive surface. In some embodiments, the display is a touch screen display and the touch-sensitive surface is on the display (e.g., touch screen display 112 in FIGS. 5H-5X). In some embodiments, the display is separate from the touch-sensitive surface. Some operations in method 900 may be combined and/or the order of some operations may be changed.

As described below, the method 900 provides an intuitive way to distinguish between resize row/column multi-contact gestures and sort row/column multi-contact gestures. The method reduces the cognitive burden on a user when manipulating a table by sorting and resizing rows/columns of the table, thereby creating a more efficient human-machine interface. For battery-operated computing devices, enabling a user to sort and resize rows/columns of the table faster and more efficiently conserves power and increases the time between battery charges.

Note that details of the processes described above with respect to method 700 (e.g., FIGS. 7A-7E) of adjusting the width of columns and/or the height of rows in a table using multi-contact gestures and method 800 (e.g., FIGS. 8A-8C) of sorting a table based on the content of the table using multi-touch gestures are also applicable in an analogous manner to the methods described in greater detail below when it has been determined that a gesture is either a resizing gesture or a sorting gesture. In other words, the method 900 of distinguishing between a resize row/column gesture and a sort row/column gesture described below may be used when a device responds to both the gestures described above with reference to method 700 and the gestures described above with reference to method 800. For example, the details of how the rows/columns are resized that are described with reference to FIGS. 7A-7E may be applied once the device has determined that the gesture is a row/column resizing gesture using the method 900. Likewise the details of how the rows/columns are sorted that are described with reference to FIGS. 8A-8C may be applied once the device has determined that the gesture is a row/column sorting gesture using the method 900. For brevity, the details of the gestures that are described in detail above for resizing columns/rows and sorting columns/rows are not repeated below.

The device displays (902) a table (e.g., 5002 in FIGS. 5H-5X) comprising a plurality of rows and a plurality of columns, wherein each column includes a column header region and a plurality of cells. The device detects (904) a first contact and a second contact at a location on the touch-sensitive surface that corresponds to a column header for a first column in the plurality of columns. The device detects (906) a first gesture on the touch-sensitive surface made with the first contact and the second contact. For example in both FIG. 5H and FIG. 5P, the device detects two contacts at a location on the touch screen display 112 that corresponds to a column header (e.g., in FIG. 5H, the device detects contact 5034-*a* and 5036-*a* in column header 5032 for column A, while in FIG. 5P, the device detects contact 5060-*a* and contact 5062-*a* in column header 5064 for column C). It should be understood that in some embodiments the row/column headers are generated by the device, while in other embodiments, the row/column headers are user-specified row/column headers, as described in greater detail above with reference to FIG. 5H. While the examples discussed herein are discussed primarily with reference to simultaneous multi-contact gestures that are performed within generic (e.g., device generated) headers within device generated header regions, it should be understood that the mechanisms and methods described herein for manipulating tables using simultaneous multi-contact gestures are similarly applicable to situations where the header regions are user-specified header regions that include user-specified headers.

In response to detecting the first gesture: when the first gesture is a pinch gesture or a de-pinch gesture, the device resizes (908) the first column in accordance with the first gesture (e.g., as described in greater detail above with reference to FIGS. 5H-5K); and when the first gesture includes simultaneous movement of the first contact and the second contact in a direction on the touch-sensitive surface that corresponds to a direction on the display that is along the first column, the device sorts the first column based on content of the cells in the first column (e.g., as described in greater detail above with reference to FIGS. 5P-5V). In other words, after detecting two contacts at a location that corresponds to a column header the device determines whether the two contacts are being used to perform a swipe gesture along the row/column or a pinch/de-pinch gesture along the column header. If the gesture is a swipe gesture, the device sorts the row/column, whereas if the gesture is a pinch/de-pinch gesture, the device resizes the row/column.

In some embodiments, resizing the first column includes (910): increasing the width of the first column when the first gesture is a de-pinch gesture (e.g., as described in greater detail above with reference to FIGS. 5J-5K) and decreasing the width of the first column when the first gesture is a pinch gesture (e.g., as described in greater detail above with reference to FIGS. 5H-5I). In some embodiments, sorting the first column includes (912) sorting all of the rows of the table in accordance with content in the cells in the first column (e.g., as described in greater detail above with reference to FIGS. 5P-5S).

In some embodiments, the first gesture is defined such that (914): the resizing occurs only when the de-pinch or pinch gesture includes movement above a predefined threshold; and the sorting occurs only when the movement of the first contact and the second contact is greater than a predefined threshold. For example, in some embodiments, the contacts must move more than a predetermined number of pixels before any resizing or sorting occurs (i.e., if the device detects movement below the predefined threshold, the device will ignore that movement). In some embodiments, the predetermined number of pixels is based on the size of the display (e.g., a number of pixels equal to 1% of the length or width of the display). In some embodiments the predetermined number of pixels is determined based on the size of the table on the display (e.g., a number of pixels equal to the height of one row, or a number of pixels equal to the width of two columns). In some embodiments, the predefined threshold includes movement of one or more of the contacts in the gesture outside of the header region (e.g., for the sorting gesture) or movement of one or more of the contacts in the gesture outside of the row header or column header in which they were initially located at the start of the gesture (e.g., for the pinch or de-pinch gesture).

Figure 10A:
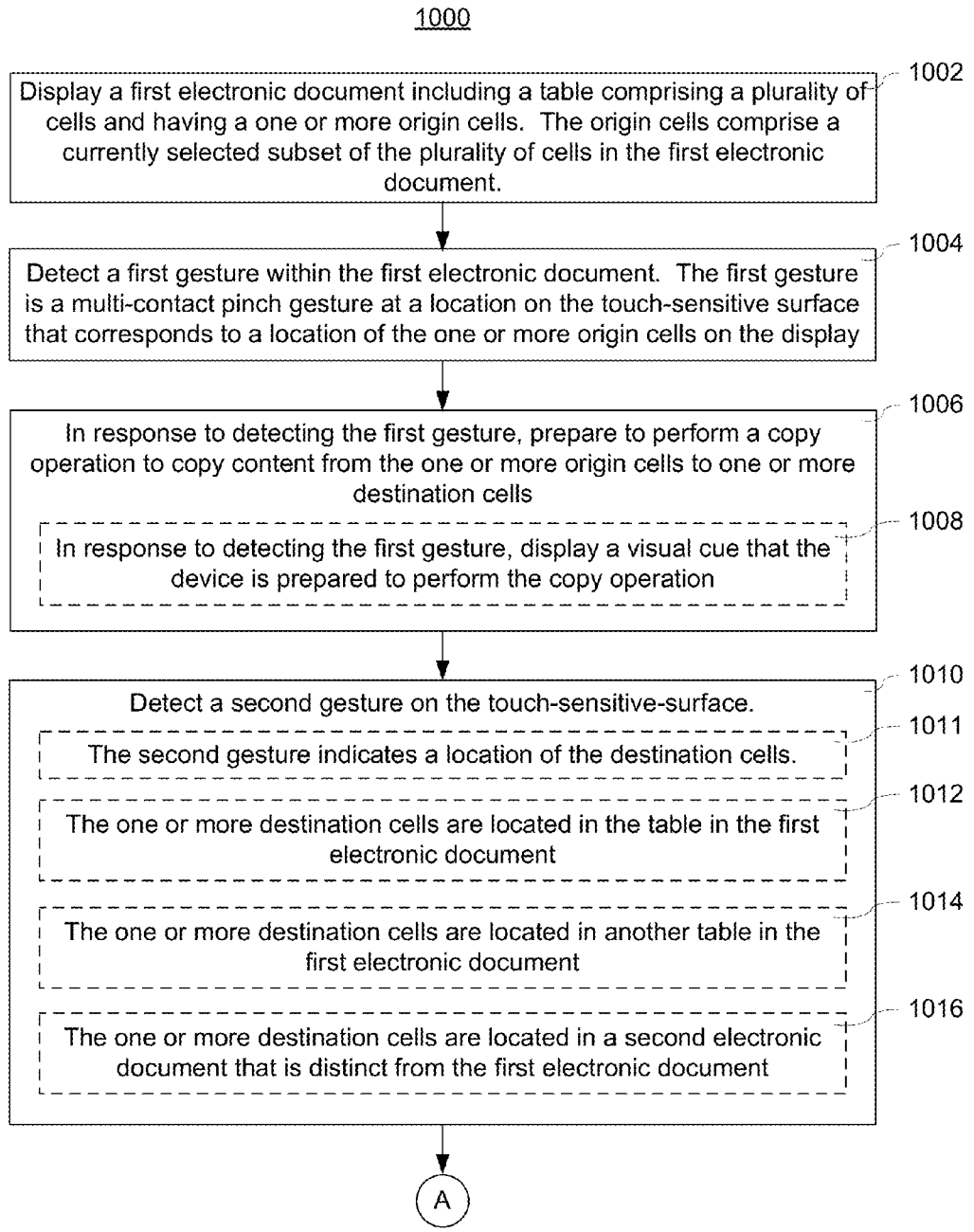
FIGS. 10A-10C are flow diagrams illustrating a method of copying and pasting content from cells in a table using multi-contact gestures in accordance with some embodiments.
Figure 10B:
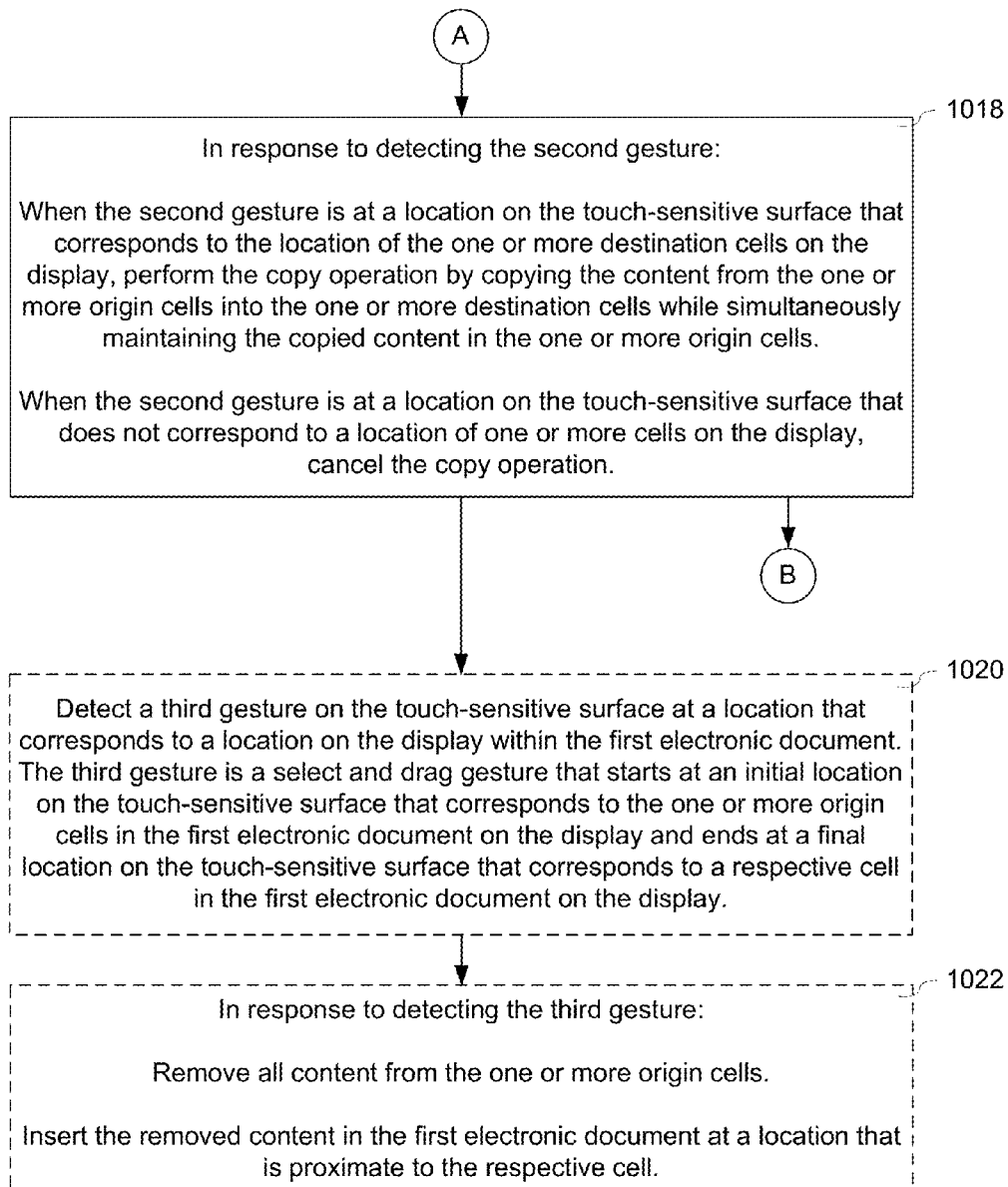
Figure 10C:
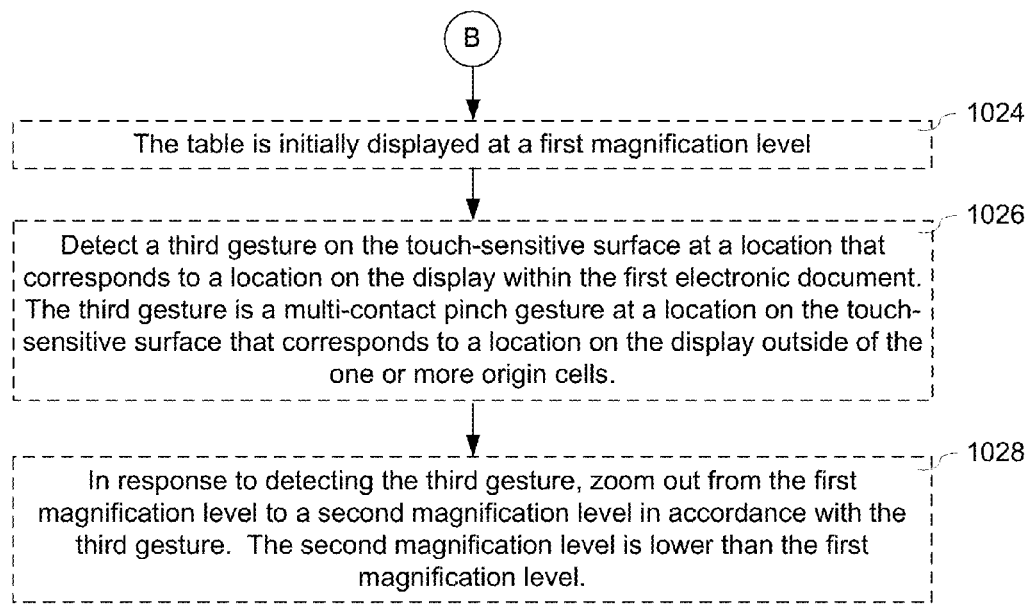

FIGS. 10A-10C are flow diagrams illustrating a method 1000 of copying and pasting content of cells in a table using multi-contact gestures in accordance with some embodiments. The method 1000 is performed at a multifunction device (e.g., device 300, FIG. 3, or portable multifunction device 100, FIG. 1) with a display and a touch-sensitive surface. In some embodiments, the display is a touch screen display and the touch-sensitive surface is on the display (e.g., touch screen display 112 in FIGS. 5Y-5FF). In some embodiments, the display is separate from the touch-sensitive surface. Some operations in method 1000 may be combined and/or the order of some operations may be changed.

As described below, the method 1000 provides an intuitive way to copy and paste content of cells in a table using multi-contact gestures. The method reduces the cognitive burden on a user when copying and pasting content of cells in a table, thereby creating a more efficient human-machine interface. For battery-operated computing devices, enabling a user to copy and paste content of cells in a table faster and more efficiently conserves power and increases the time between battery charges.

The device displays (1002) a first electronic document including a table (e.g., 5002 in FIG. 5Y) comprising a plurality of cells and having a one or more origin cells, the origin cells (e.g., 5080 in FIG. 5Y) comprising a currently selected subset of the plurality of cells in the first electronic document.

In some embodiments, the origin cells are a single cell. In some embodiments, the origin cells include a plurality of cells. In some embodiments, the origin cells are selected using the method described in greater detail above with reference to FIGS. 5A-5E).

For example, in FIG. 5Y the device detects an initial plurality of contacts on the touch screen display 112. Each contact is associated with a respective cell in the table. For example in FIG. 5Y, a first contact 5082 is associated with the cell in row 3, column E; a second contact 5084 is associated with the cell in row 4, column D of the table; a third contact 5086 is associated with the cell in row 5, column E; and a fourth contact 5088 is associated with the cell in row 7 column D of the table. The device determines, for the respective cells associated with the contacts, an initial minimum row of the respective cells, an initial maximum row of the respective cells, an initial minimum column of the respective cells, and an initial maximum column of the respective cells. In the example illustrated in FIG. 5Y, the initial minimum row is the topmost row in the initial subset of the plurality of cells (i.e., row 3), while the initial maximum row is the bottommost row in the initial subset of the plurality of cells (i.e., row 7). Similarly, in the example illustrated in FIG. 5Y, the initial minimum column is leftmost column in the initial subset of the plurality of cells (i.e., column D), while the initial maximum column is the rightmost column in the initial subset of the plurality of cells (i.e., column E). In this example, the device selects the origin cells 5080 in response to detecting the initial plurality of contacts.

In some embodiments, the selection of the origin cells 5080 is fixed as described in greater detail above with reference to FIGS. 5D-5E above, and operations 1004-1028 are performed after the selection has been fixed.

The device detects (1004) a first gesture within the first electronic document. The first gesture is a multi-contact pinch gesture at a location on the touch-sensitive surface that corresponds to a location of the one or more origin cells on the display. It should be understood, that in accordance with some embodiments, a gesture is "at" a location on the touch-sensitive surface that corresponds to a location of the one or more origin cells on the display when all of the contacts that make up the multi-contact gesture (or the respective centroids of such contacts) are within the bounds of the single selected cell or the group of selected cells. For example in FIG. 5Z, the device detects a two-contact pinch gesture including a first contact 5090 and a second contact 5092 where the two contacts are entirely within the location of the fixed selection of the origin cells 5080, and the device detects movement of the first contact 5090 and the second contact 5092 towards each other in a pinch gesture.

In response to detecting the first gesture (e.g., the pinch gesture including contacts 5090 and 5092 in FIG. 5Z), the device prepares (1006) to perform a copy operation to copy content from the one or more origin cells (e.g., 5080 in FIG. 5Z) to one or more destination cells. Preparing to perform a copy operation may include placing the content of the origin cells in a memory buffer or other computer readable storage medium. In some embodiments, the content of the cells is represented as data in a virtual clipboard. In some embodiments, in response to detecting the first gesture, the device displays (1008) a visual cue that the device is prepared to perform the copy operation. For example in FIG. 5AA, the origin cells 5080 have been highlighted by placing a dark border around the origin cells, however, it should be understood that the visual cue could alternatively be provided using shading, saturation, hue, drop shadows, animated effects and/or other methods of providing visual emphasis to the origin cells.

The device detects (1010) a second gesture on the touch-sensitive surface. In some embodiments, the second gesture indicates (1011) a location of the destination cells (e.g., the second gesture specifies where to paste the copied cells). For example in FIG. 5AA, the device detects a tap gesture (e.g., 5094 in FIG. 5AA) at a location on the touch screen display 112 that corresponds to a cell of the table (e.g., the cell in row 2, column G). In some embodiments, the one or more destination cells are located (1012) in the table in the first electronic document, as illustrated in FIG. 5AA. For example, in FIGS. 5AA-5BB the destination cells 5096 are the cells that are in the column of the tap gesture and one column to the right and are in the row of the tap gesture and 4 rows below the tap gesture. In other words, in this example, the destination cells are defined as the cells into which content will be pasted so as to maintain the relative positions of the content in the origin cells when the content of the upper left cell in the origin cells is inserted into the cell indicated by the second gesture. In some embodiments, the one or more destination cells are located (1014) in another table in the first electronic document. In some embodiments, the one or more destination cells are located (1016) in a second electronic document that is distinct from the first electronic document. In some embodiments, the second electronic document is a different type of electronic document (e.g., the first electronic document is a spreadsheet in a spreadsheet application and the second electronic document is a slide in slideshow application or a page in a word processing application).

In response to detecting the second gesture: when the second gesture is at a location on the touch-sensitive surface that corresponds to the location of one or more destination cells on the display, the device performs (1018) the copy operation by copying the content from the one or more origin cells into the one or more destination cells while simultaneously maintaining the copied content in the one or more origin cells; and when the second gesture is at a location on the touch-sensitive surface that does not correspond to a location of one or more cells on the display, the device cancels the copy operation. For example, in FIG. 5AA, the device detects the tap gesture 5094 at a location on the touch sensitive surface that corresponds to a cell in the table (e.g., the cell in row 2, column G), and the device copies the content from the origin cells to the destination cells 5096, as illustrated in FIG. 5BB. If, however, instead of detecting the tap gesture (e.g., 5094 in FIG. 5AA) within the table, the device detects a contact 5098 (FIG. 5AA) outside of the table or any region into which the cells could be pasted, the device cancels the operation (e.g., the table 5002 in FIG. 5AA remains unchanged).

In some embodiments, the device selects a single origin cell and prepares to copy the cell in response to a single gesture (e.g., when the device detects a pinch gesture that is entirely within a single cell of the table). For example, in FIG. 5BB, the device detects a first gesture within the first electronic document. The first gesture is a multi-contact pinch gesture at a location on the touch-sensitive surface that corresponds to a location of the origin cell (e.g., cell 5100 in FIG. 5BB) on the display. In this example, the device detects a two-contact pinch gesture including a first contact 5102 and a second contact 5104 at a location on the touch screen display 112 that corresponds to the location of origin cell 5100, and the device detects movement of the first contact 5102 and the second contact 5104 towards each other in a pinch gesture. In response to detecting the first gesture (e.g., the pinch gesture including contacts 5102 and 5104 in FIG. 5BB), the device selects origin cell 5100 and prepares to perform a copy operation to copy content from the origin cell 5100 in FIG. 5BB to the destination cell. In response to detecting the first gesture, the device displays a visual cue that the device is prepared to perform the copy operation (e.g., by highlighting the origin cell 5100). For example, in FIG. 5CC, the origin cell 5100 has been highlighted by placing a dark border around the origin cell 5100.

Continuing this example, the device subsequently detects a second gesture on the touch screen display 112 that indicates a location of the destination cells. As illustrated in FIG. 5CC, the device the device detects a tap gesture 5106 in a cell of the table, indicating that that cell (e.g., the cell in row 7, column H) is the destination cell 5108. In response to detecting the second gesture: when the second gesture is at a location on the touch-sensitive surface that corresponds to the location of the destination cell on the display, the device performs the copy operation by copying the content from the origin cell 5100 into the destination cell 5108 while simultaneously maintaining the copied content in the origin cell 5100, as illustrated in FIG. 5DD.

In some embodiments, the device detects (1020) a third gesture on the touch-sensitive surface at a location that corresponds to a location on the display within the first electronic document. The third gesture is a select and drag gesture that starts at an initial location on the touch-sensitive surface that corresponds to the one or more origin cells in the first electronic document on the display and ends at a final location on the touch-sensitive surface that corresponds to a respective destination cell in the first electronic document on the display. In these embodiments, in response to detecting the third gesture: the device removes (1022) all content from the one or more origin cells; and inserts the removed content in the first electronic document at a location that is proximate to the respective destination cell. In other words, in response to the tap and drag gesture, the device cuts and pastes the content instead of copying and pasting the content. For example, in FIG. 5DD, the device detects a contact 5110 with the origin cell 5100, and subsequent movement of that contact across the touch screen display 112 to a location on the touch screen display 112 that corresponds to the location of a respective destination cell in the table (e.g., the cell 5112 in row 6 column I of the table 5002 in FIG. 5DD). In this example, in response to detecting the gesture, the device copies the contents of the origin cell 5100 to the respective destination cell 5112, and deletes the contents from the origin cell 5100 (e.g., the number "1100" is cut from the origin cell 5100 and pasted into the respective cell 5112).

In some embodiments, the table is (1024) initially displayed at a first magnification level (e.g., in FIG. 5EE the magnification level of the table is 100%, as indicated by the magnification level indicator 5114-*a*). In these embodiments, the device detects (1026) a third gesture on the touch-sensitive surface at a location that corresponds to a location on the display within the first electronic document. The third gesture is a multi-contact pinch gesture at a location on the touch-sensitive surface that corresponds to a location on the display outside of the one or more selected origin cells (e.g., the multi-touch gesture includes contacts within multiple distinct cells and is outside of any currently selected subset of the plurality of cells, or at least one of the contacts in the multi-contact gesture is outside of the table). In other words, when a pinch gesture is detected at a location on the touch-sensitive surface that corresponds to one or more selected origin cells, the device prepares to copy the content of the one or more selected origin cells, whereas when a pinch gesture is detected at a location on the touch-sensitive surface that does not correspond to one or more selected origin cells, the device zooms the magnification level of the table instead of preparing to copy the content of the selected origin cells.

For example, in FIG. 5EE the device detects a first contact 5116 and a second contact 5118 on the touch screen display 112 at locations that are outside of selected origin cells (in some embodiments, such as that shown in FIG. 5EE, no cells are selected, so there are no origin cells), and detects subsequent movement of the first contact 5116 and the second contact 5118 towards each other on the touch sensitive surface from respective initial locations on the touch screen display 112 (e.g., 5116-*a* and 5118-*a* in FIG. 5EE) to respective updated locations on the touch screen display 112 (e.g., 5116-*b* and 5118-*b* in FIG. 5FF). In these embodiments, in response to detecting the third gesture (e.g., the pinch gesture including contacts 5116 and 5118 illustrated in FIGS. 5EE-5FF), the device zooms (1028) out from the first magnification level to a second magnification level in accordance with the third gesture, where the second magnification level is lower than the first magnification level (e.g., in FIG. 5FF the magnification level of the table has been reduced from 100% to 75% as indicated by the magnification level indicator 5114-*b*).

Figure 11A:
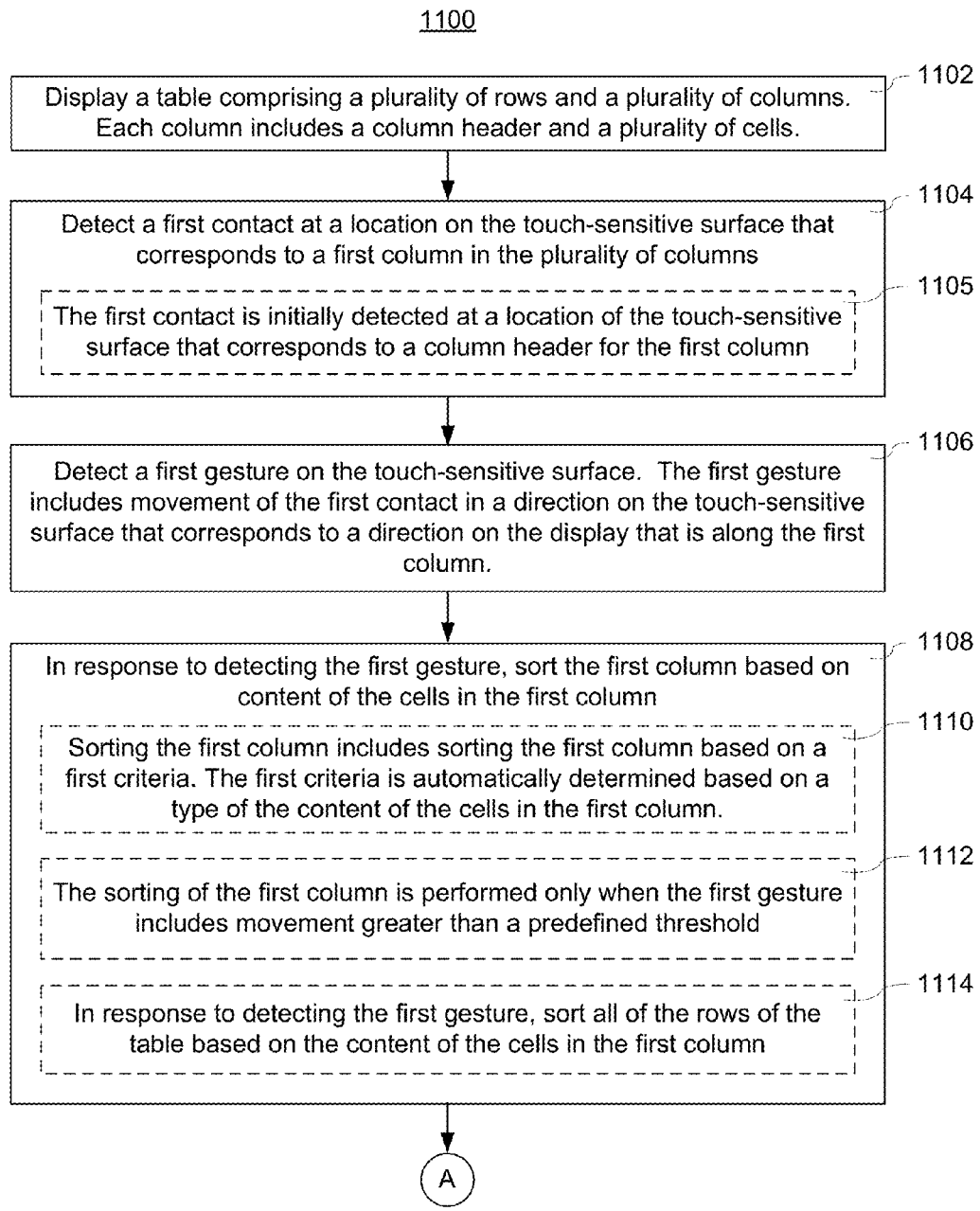
FIGS. 11A-11C are flow diagrams illustrating a method of sorting a table based on the content of the table using single-contact gestures in accordance with some embodiments.
Figure 11B:
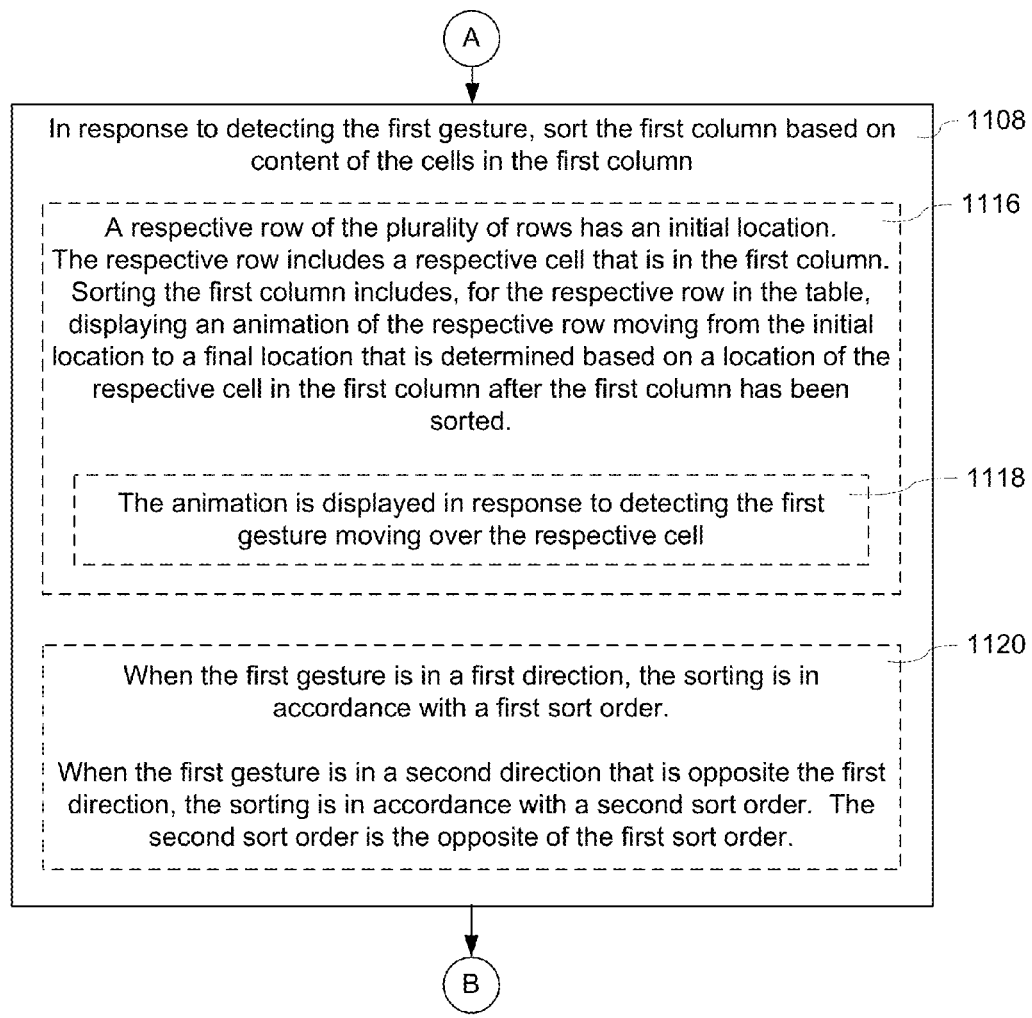
Figure 11C:
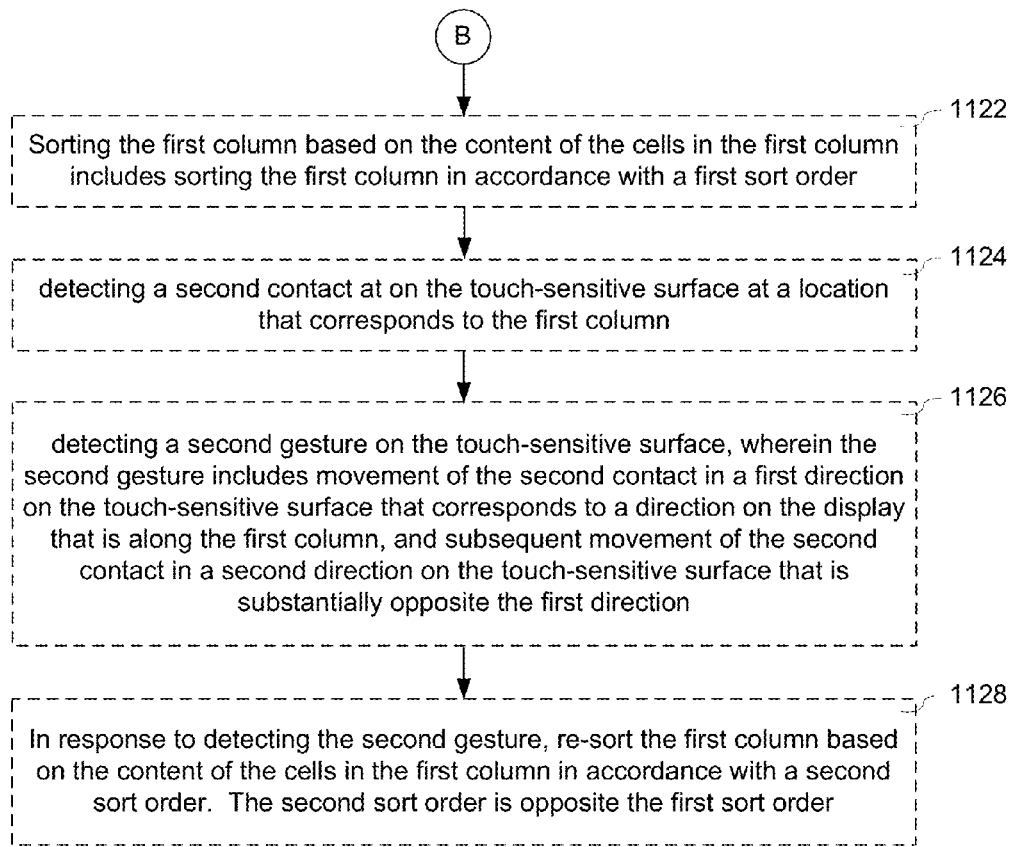

FIGS. 11A-11C are flow diagrams illustrating a method 1100 of sorting a table based on the content of the table using single-contact gestures in accordance with some embodiments. The method 1100 is performed at a multifunction device (e.g., device 300, FIG. 3, or portable multifunction device 100, FIG. 1) with a display and a touch-sensitive surface. In some embodiments, the display is a touch screen display and the touch-sensitive surface is on the display (e.g., touch screen display 112 in FIGS. 5JJ-5PP). In some embodiments, the display is separate from the touch-sensitive surface. Some operations in method 1100 may be combined and/or the order of some operations may be changed.

As described below, the method 1100 provides an intuitive way to sort tables based on the content of the table using single-contact gestures. The method reduces the cognitive burden on a user when sorting tables based on the content of the table, thereby creating a more efficient human-machine interface. For battery-operated computing devices, enabling a user to sort tables based on the content of the table faster and more efficiently conserves power and increases the time between battery charges.

The device displays (1102) a table (e.g., 5002 in FIG. 5JJ) comprising a plurality of rows (e.g., row 1, row 2, row 3, etc.) and a plurality of columns (e.g., column A, column B, column C, etc.). Each column includes a column header and a plurality of cells. The device detects (1104) a first contact (e.g., 5128-*a* in FIG. 5JJ) a first column (e.g., column C) in the plurality of columns. In some embodiments, the first contact is initially detected (1105) at a location of the touch-sensitive surface that corresponds to a column header (e.g., 5064 in FIGS. 5JJ-5PP) for the first column. The device detects (1106) a first gesture on the touch-sensitive surface. The first gesture includes movement of the first contact in a direction on the touch-sensitive surface that corresponds to a direction on the display that is along the first column (e.g., the movement is entirely or partly within a region on the touch-sensitive surface that corresponds to the column). For example, as illustrated in FIGS. 5JJ-5LL the contact (e.g., 5128) moves from an initial location (e.g., 5128-*a* in FIG. 5JJ) along the touch screen display 112 through one or more intermediate locations (e.g., 5128-*b* in FIG. 5KK) to a final location (e.g., 5128-*c* in FIG. 5LL).

It should be understood that in some embodiments the row/column headers are generated by the device, while in other embodiments, the row/column headers are user-specified row/column headers, as described in greater detail above with reference to FIG. 5H. While the examples discussed herein are discussed primarily with reference to single-contact gestures that are performed within a region for a column, it should be understood that the mechanisms and methods described herein for manipulating tables using single-contact gestures are similarly applicable to situations where the single-contact gestures are detected within generic (e.g., device generated) headers or within header regions that are user-specified header regions that include user-specified headers.

In some embodiments, in response to detecting the first gesture, the device sorts (1108) the first column based on content of the cells in the first column. For example, in FIG. 5JJ (e.g., prior to detecting the first gesture) the rows in the table 5002 are not sorted, whereas in FIG. 5MM (e.g., after detecting the first gesture) the entire table 5002 has been sorted so that the rows are in order based on the content of the cells in column C.

In some embodiments, sorting the first column includes (1110) sorting the first column based on a first criteria and the first criteria is automatically determined (e.g., without human intervention) based on a type of the content of the cells in the first column. In some embodiments, the first sort order is different for different kinds of content in the cells. For example, when the content in the cells includes letters, then the sorting is alphabetical; when the content in the cells includes numbers, then the sorting is from highest numerical value to lowest numerical value; and when the content in the cells include zip codes, then the sorting is based on geographical region. In some embodiments, the first sort order is descending for any type of content.

In some embodiments, the sorting of the first column is performed (1112) only when the first gesture includes movement greater than a predefined threshold. In other words, the contacts must move more than a predetermined number of pixels before any sorting occurs (i.e., if the device detects movement below the predefined threshold, the device will ignore that movement). In some embodiments, the predetermined number of pixels is based on the size of the display (e.g., a number of pixels equal to 1% of the length or width of the display). In some embodiments the predetermined number of pixels is determined based on the size of the table on the display (e.g., a number of pixels equal to the height of one row, or a number of pixels equal to the width of two columns). In some embodiments, the predefined threshold is dragging the contacts outside of the header region. For example, in FIG. 5JJ, if the movement of the contact (e.g., 5128) stopped before reaching row 3, then no sorting operation would be performed, whereas if the movement of the contacts (e.g., 5128) continued to at least row 3, then column C would be sorted, as illustrated in FIG. 5MM.

In response to detecting the first gesture, the device sorts (1114) all of the rows of the table based on the content of the cells in the first column. In other words, instead of merely sorting the content of the cells in the column (e.g., column C) that is associated with the gesture, the entire table is sorted based on the content of the cells in the column (e.g., column C) that is associated with the gesture. In other words, each row is moved to a location that is based on the content (e.g., numerical value of the content) of the cell of that row that is in the column (e.g., column C) with which the gesture is associated, as illustrated in FIG. 5MM.

In some embodiments, a respective row (e.g., 5066-a in FIG. 5JJ) of the plurality of rows has an initial location, the respective row includes a respective cell that is in the first column; and sorting the first column includes (1116), for the respective row in the table, displaying an animation of the respective row moving from the initial location to a final location that is determined based on a location of the respective cell in the first column after the first column has been sorted. For example, in FIGS. 5JJ-5MM, the cells in row 3 are animated moving from an initial location (e.g., 5066-a in FIGS. 5JJ-5KK) through one or more intermediate locations (e.g., 5066-b in FIG. 5LL) to a final location (e.g., 5066-c in FIG. 5MM) in row 2' of the table in FIG. 5MM. In some embodiments, the animation is displayed (1118) in response to detecting the first gesture moving over a location that corresponds to the location of the respective cell in the table in its initial location on the display. In other words, as the contacts move over a respective row of the table, that row begins to float to its location in the final order of the table (e.g., if a row of cells has an initial location in the middle of the table, and the sort order will move the row to the top of the table, when the contacts in the gesture are at a location on the touch-sensitive surface that corresponds to a cell of that row, the row will begin to move to its location in the reordered table). For example, in FIG. 5KK, row 3 (e.g., 5066-a in FIG. 5KK) begins an animation to move to its final location when the contact (e.g., 5128-b passes over the cell (e.g., the cell in row 3, column C of the table in FIG. 5KK) on the touch screen display 112 that corresponds to that row (e.g., 5066-a in FIG. 5KK).

In some embodiments, when the first gesture is in a first direction (e.g., down the column), the sorting is (1120) in accordance with a first sort order; and when the first gesture is in a second direction (e.g., up the column) that is opposite the first direction, the sorting is in accordance with a second sort order, where the second sort order is the opposite of the first sort order. For example, as described in greater detail above with reference to FIGS. 5JJ-5MM, the device responds to a gesture that includes a swipe down column C by sorting the table numerically from largest value to smallest value based on the values of the cells in column C. In contrast in FIGS. 5NN-5OO, the device detects a gesture including a single contact (e.g., 5130 in FIG. 5NN) in a region associated with the column (e.g., a region associated with the column header 5064 in FIG. 5NN for column C), and subsequent movement of the contact upwards along a primary axis of the column, as illustrated in FIG. 5NN. In this example, the device responds to the swipe up gesture illustrated by the arrows in FIG. 5NN by sorting the table numerically from smallest value to largest value based on the values of the cells in column C, as illustrated in FIG. 5OO. In other words, because the swipe gesture in FIGS. 5NN-5OO is upwards rather than downwards, the table is sorted in the opposite order from how the table is sorted in response to the downwards swipe gesture in FIGS. 5JJ-5MM.

In some embodiments, sorting the first column based on the content of the cells in the first column includes (1122) sorting the first column (e.g., column C in FIGS. 5JJ-5MM) in accordance with a first sort order, as illustrated in FIGS. 5JJ-5MM). In some embodiments, the device detects (1124) a second contact (e.g., 5132 in FIG. 5PP) on the touch-sensitive surface that corresponds to the first column (e.g., a region that corresponds to a column header 5064 for column C in FIG. 5PP). In some embodiments, the device detects (1126) a second gesture on the touch-sensitive surface. In these embodiments, the second gesture includes movement of the second contact in a first direction on the touch-sensitive surface that corresponds to a direction on the display that is along the first column and subsequent movement of the second contact in a second direction on the touch-sensitive surface that is substantially opposite the first direction. For example in FIG. 5PP, the second gesture includes movement of the third contact (e.g., 5132) downwards along a region on the touch screen display 112 that corresponds to column C and movement upwards along the region on the touch screen display 112 that corresponds to column C. In some embodiments, the second contact is made with the same finger as the first contact.

In some embodiments, in response to detecting the second gesture, the device re-sorts (1128) the first column (e.g., column C) based on the content of the cells in the first column (e.g., column C) in accordance with a second sort order, where the second sort order is opposite the first sort order. For example, in FIGS. 5JJ-5MM, the device responds to a gesture that includes a swipe down column C by sorting the table numerically from largest value to smallest value based on the values of the cells in column C. Subsequently in FIG. 5PP, the device detects the second gesture including a single contact (e.g., 5132 in FIG. 5PP) in the column header (e.g., 5064 in FIG. 5PP) for the column (e.g., column C), and subsequent movement of the contacts downwards and then upwards along the column, as indicated by the arrows in FIG. 5PP. In this example, the device responds to the swipe up gesture illustrated in FIG. 5PP by re-sorting the table numerically from smallest value to largest value based on the values of the cells in column C, as illustrated in FIG. 5OO.

Additionally, while this second gesture has been described as being performed after the first gesture, it could be performed with or without the first gesture in order to sort the content of the cells using a predetermined criteria that is different from the predetermined criteria used to sort the cells based on the content of the cells in response the first gesture. For example, in response to the gesture illustrated in FIG. 5JJ the device sorts the cells in column C from highest numerical value to lowest numerical value; while in response to the gesture illustrated in FIG. 5PP the device sorts the cells from lowest numerical value to highest numerical value, without regard for whether the cells had previously been sorted in response to any previous gesture.

Additionally, while the preceding examples have been given with respect to sorting a table based on the content of cells in a single column of the table, it should be understood that analogous methods could be used to sort a table based on the content of cells in a single row of the table.

Figure 12A:
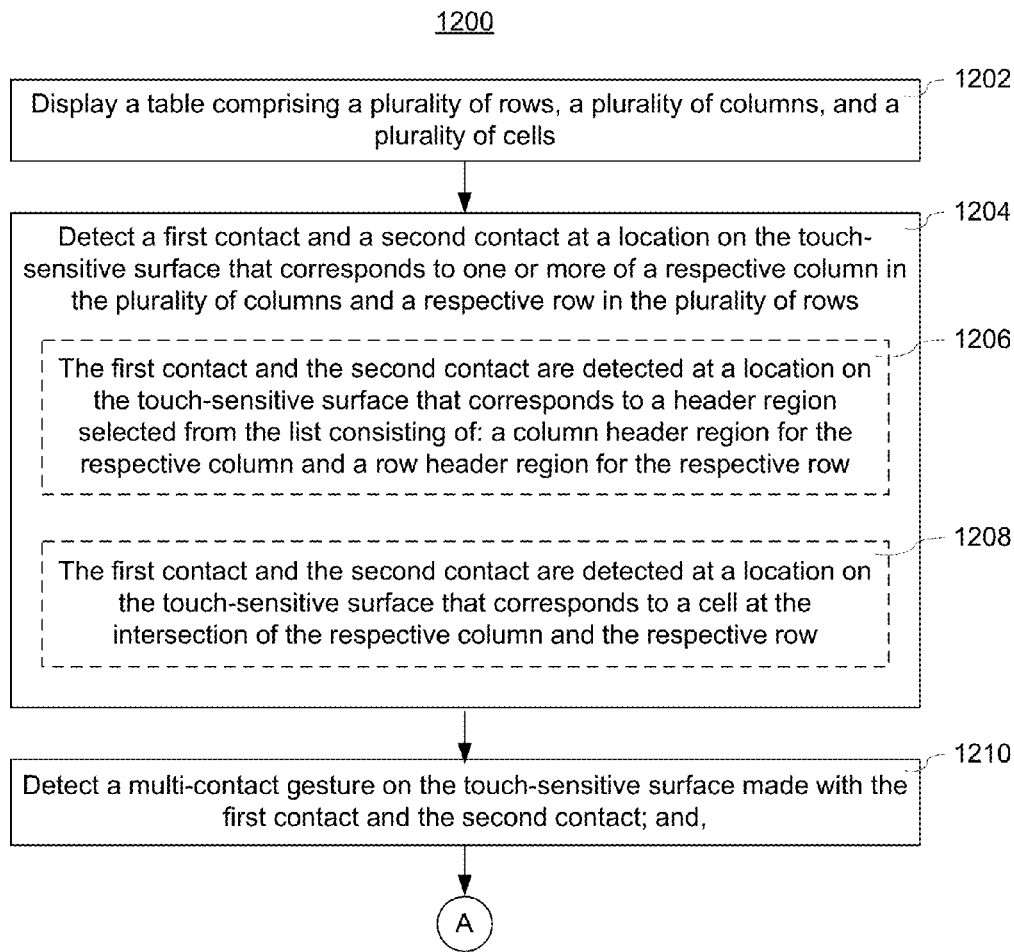
FIGS. 12A-12C are flow diagrams illustrating a method of disambiguating multi-contact gestures such as resize row/column multi-contact gestures and sort row/column multi-contact gestures in accordance with some embodiments.
Figure 12B:
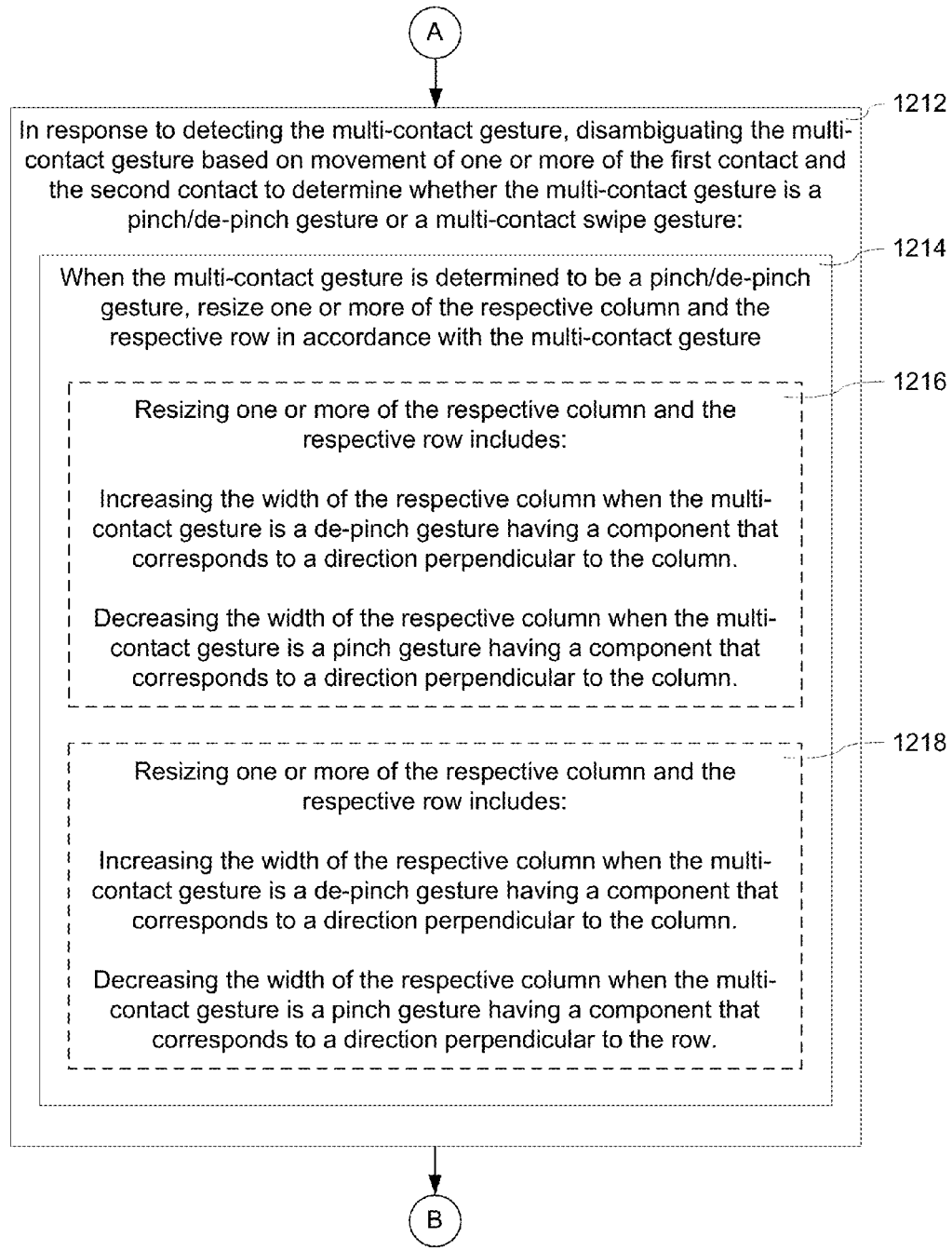
Figure 12C:
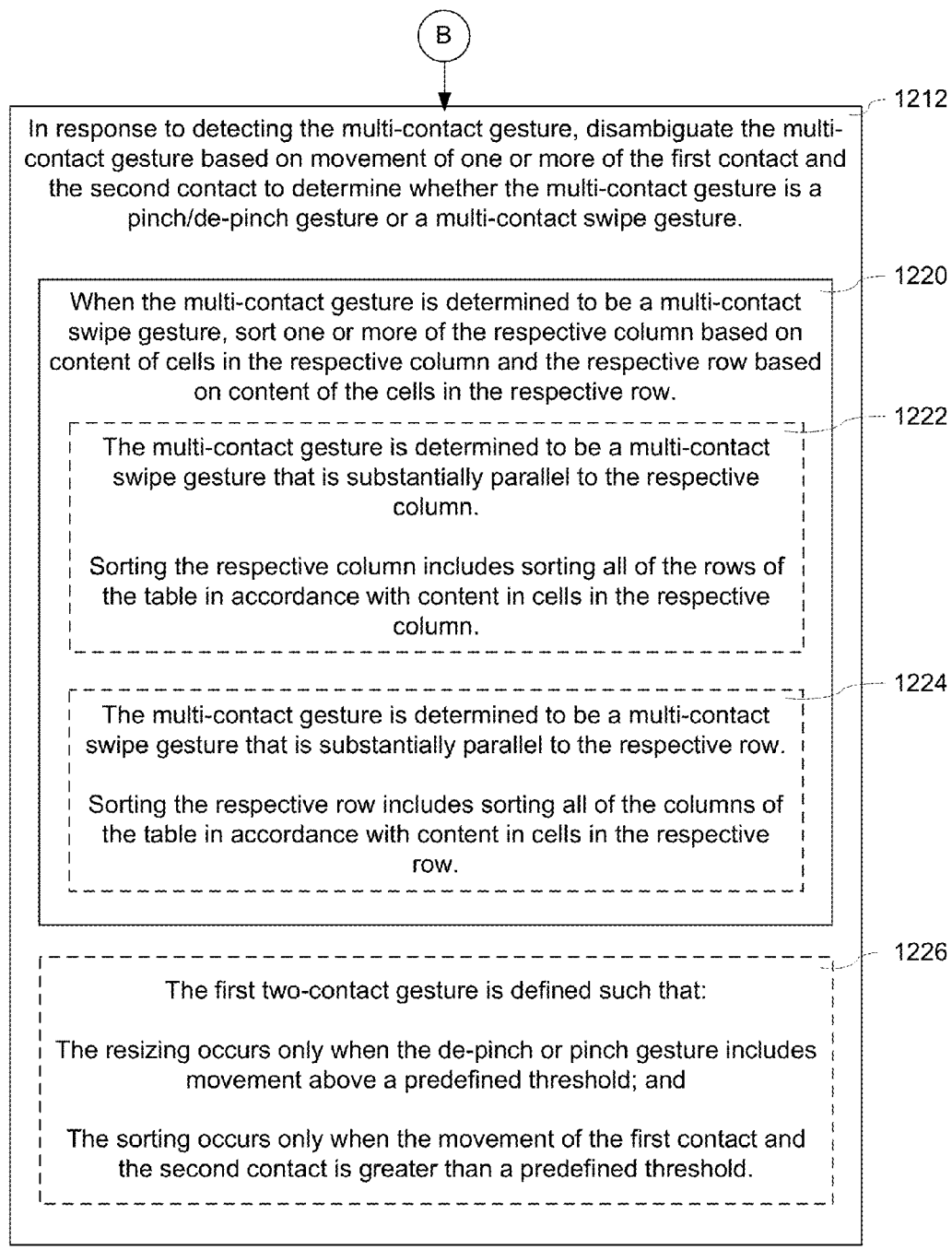

FIGS. 12A-12C are a flow diagrams illustrating a method 1200 of disambiguating multi-contact gestures such as resize row/column multi-contact gestures and sort row/column multi-contact gestures in accordance with some embodiments. The method 1200 is performed at a multifunction device (e.g., device 300, FIG. 3, or portable multifunction device 100, FIG. 1) with a display and a touch-sensitive surface. In some embodiments, the display is a touch screen display and the touch-sensitive surface is on the display (e.g., touch screen display 112 in FIGS. 5H-5X). In some embodiments, the display is separate from the touch-sensitive surface. Some operations in method 1200 may be combined and/or the order of some operations may be changed.

As described below, the method 1200 provides an intuitive way to disambiguate multi-contact gestures such as resize row/column multi-contact gestures and sort row/column multi-contact gestures. The method reduces the cognitive burden on a user when manipulating a table (e.g., by sorting and resizing rows/columns of the table), thereby creating a more efficient human-machine interface. For battery-operated computing devices, enabling a user to manipulate a table (e.g., by sorting and resize rows/columns of the table) faster and more efficiently conserves power and increases the time between battery charges.

Note that details of the processes described above with respect to method 700 (e.g., FIGS. 7A-7E) of adjusting the width of columns and/or the height of rows in a table using multi-contact gestures and method 800 (e.g., FIGS. 8A-8C) of sorting a table based on the content of the table using multi-touch gestures are also applicable in an analogous manner to the methods described in greater detail below when it has been determined that a gesture is either a resizing gesture or a sorting gesture. In other words, the method 1200 of distinguishing between a resize row/column gesture and a sort row/column gesture described below may be used when a device responds to both the gestures described above with reference to method 700 and the gestures described above with reference to method 800. For example, the details of how the rows/columns are resized that are described with reference to FIGS. 7A-7E may be applied once the device has determined that the gesture is a row/column resizing gesture using the method 1200. Likewise the details of how the rows/columns are sorted that are described with reference to FIGS. 8A-8C may be applied once the device has determined that the gesture is a row/column sorting gesture using the method 1200. For brevity, the details of the gestures that are described in detail above for resizing columns/rows and sorting columns/rows are not repeated below.

The device displays (1202) a table (e.g., 5002 in FIGS. 5H-5X) comprising plurality of rows, a plurality of columns, and a plurality of cells. The device detects (1204) a first contact and a second contact at a location on the touch-sensitive surface that corresponds to one or more of a respective column in the plurality of columns and a respective row in the plurality of rows. In some embodiments, the first contact and the second contact are detected (1206) at a location on the touch-sensitive surface that corresponds to a header region selected from the list consisting of: a column header region for the respective column and a row header region for the respective row. For example in FIG. 5H contacts 5034 and 5036 are detected at a location that corresponds to a header region 5032 for a respective column (e.g., column A). In some embodiments, the first contact and the second contact are detected (1208) at a location on the touch-sensitive surface that corresponds to a cell at the intersection of the respective column and the respective row. For example, in FIG. 5H, contacts 5037 are detected at a location that corresponds to a cell at the intersection of the respective column (e.g., column A) and the respective row (e.g., row 6).

The device detects (1210) a multi-contact gesture on the touch-sensitive surface made with the first contact and the second contact. For example in both FIG. 5H and FIG. 5P, the device detects two contacts at a location on the touch screen display 112 that corresponds to a column header (e.g., in FIG. 5H, the device detects contact 5034-*a* and 5036-*a* in column header 5032 for column A, or alternatively the device detects contacts 5037 in a cell that is at the intersection of column A and row 6, while in FIG. 5P, the device detects contact 5060-*a* and contact 5062-*a* in column header 5064 for column C or alternatively the device detects contacts 5122 in FIG. 5GG in a cell that is at an intersection of column E and row 5).

It should be understood that in some embodiments the row/column headers discussed herein are generated by the device, while in other embodiments, the row/column headers are user-specified row/column headers, as described in greater detail above with reference to FIG. 5H. While the examples discussed herein are discussed primarily with reference to simultaneous multi-contact gestures that are performed within generic (e.g., device generated) headers within device generated header regions, it should be understood that the mechanisms and methods described herein for manipulating tables using simultaneous multi-contact gestures are similarly applicable to situations where the header regions are user-specified header regions that include user-specified headers.

In response to detecting the first gesture: the device disambiguates (1212) the multi-contact gesture based on movement of one or more of the first contact and the second contact to determine whether the multi-contact gesture is a pinch/de-pinch gesture or a multi-contact swipe gesture. In other words, after detecting two contacts at a location that corresponds to one or more respective rows and/or one or more respective columns in the table, the device determines whether the two contacts are being used to perform a swipe gesture along the row/column or a pinch/de-pinch gesture along the column header. If the gesture is a swipe gesture, the device sorts the row/column, whereas if the gesture is a pinch/de-pinch gesture, the device resizes the row/column, as described in greater detail below.

When the multi-contact gesture is determined to be a pinch/de-pinch gesture, the device resizes (1214) one or more of the respective column and the respective row in accordance with the multi-contact gesture. (e.g., as described in greater detail above with reference to FIGS. 5H-5K)

In some embodiments, resizing (1216) one or more of the respective column and the respective row includes increasing the width of the respective column when the multi-contact gesture is a de-pinch gesture having a component that corresponds to a direction perpendicular to the column (e.g., as described in greater detail above with reference to FIGS. 5J-5K and FIGS. 5GG-5II); and, decreasing the width of the respective column when the multi-contact gesture is a pinch gesture having a component that corresponds to a direction perpendicular to the column (e.g., as described in greater detail above with reference to FIGS. 5H-5I).

In some embodiments, resizing (1218) one or more of the respective column and the respective row includes increasing the height of the respective row when the multi-contact gesture is a de-pinch gesture having a component that corresponds to a direction perpendicular to the row (e.g., as described in greater detail above with reference to FIGS. 5N-5O and FIGS. 5GG-5II); and, decreasing the height of the respective row when the multi-contact gesture is a pinch gesture having a component that corresponds to a direction perpendicular to the row (e.g., as described in greater detail above with reference to FIGS. 5L-5M and FIGS. 5GG-5II).

When the multi-contact gesture is determined to be a multi-contact swipe gesture, the device sorts (1220) one or more of the respective column based on content of cells in the respective column and the respective row based on content of the cells in the respective row (e.g., as described in greater detail above with reference to FIGS. 5P-5V).

In some embodiments, the multi-contact gesture is (1222) determined to be a multi-contact swipe gesture that is substantially parallel to the respective column; and sorting the respective column includes sorting all of the rows of the table in accordance with content in cells in the respective column (e.g., as described in greater detail above with reference to FIGS. 5P-5V).

In some embodiments, the multi-contact gesture is (1224) determined to be a multi-contact swipe gesture that is substantially parallel to the respective row; and sorting the respective row include instructions for sorting all of the columns of the table in accordance with content in cells in the respective row.

In some embodiments, the first gesture is defined such that (1226): the resizing occurs only when the de-pinch or pinch gesture includes movement above a predefined threshold; and the sorting occurs only when the movement of the first contact and the second contact is greater than a predefined threshold. For example, in some embodiments, the contacts must move more than a predetermined number of pixels before any resizing or sorting occurs (i.e., if the device detects movement below the predefined threshold, the device will ignore that movement). In some embodiments, the predetermined number of pixels is based on the size of the display (e.g., a number of pixels equal to 1% of the length or width of the display). In some embodiments the predetermined number of pixels is determined based on the size of the table on the display (e.g., a number of pixels equal to the height of one row, or a number of pixels equal to the width of two columns). In some embodiments, the predefined threshold includes movement of one or more of the contacts in the gesture outside of the header region (e.g., for the sorting gesture) or movement of one or more of the contacts in the gesture outside of the row header or column header in which they were initially located at the start of the gesture (e.g., for the pinch or de-pinch gesture).

The operations in the information processing methods described above may be implemented by running one or more functional modules in information processing apparatus such as general purpose processors or application specific chips. These modules, combinations of these modules, and/or their combination with general hardware (e.g., as described above with respect to FIGS. 1A, 1B and 3) are all included within the scope of protection of the invention.

For example, the operations depicted in FIGS. 6A-6C, 7A-7E, 8A-8C, 9, 10A-10C, 11A-11C, and 12A-12C may be implemented by components depicted in FIGS. 1A-1C. For example, display operation 602, detect operation 604, determine operation 610, and select operation 612 may be implemented by event sorter 170, event recognizer 180, and event handler 190. Event monitor 171 in event sorter 170 detects a contact on a touch-sensitive display 112, and event dispatcher module 174 delivers the event information to application 136-1. A respective event recognizer 180 of application 136-1 compares the event information to respective event definitions 186, and determines whether a first contact at a first location on the touch-sensitive surface corresponds to a predefined event, such a swipe gesture or a pinch gesture at a location that corresponds to a displayed table. When the predefined event or sub-event is detected, event recognizer 180 activates an event handler 180 associated with the detection of the event. Event handler 180 may utilize or call data updater 176 or object updater 177 to update data or a text display region and the application internal state 192. Similarly, it would be clear to a person having ordinary skill in the art how other processes can be implemented based on the components depicted in FIGS. 1A-1C.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated.

What is claimed is:

1. An electronic device, comprising:
a display and a touch-sensitive surface;
one or more processors;
memory; and
one or more programs, wherein the one or more programs are stored in the memory and configured to be executed by the one or more processors, the one or more programs including instructions for:
displaying a table comprising a plurality of rows, a plurality of columns, and a plurality of header regions, wherein:
the header regions include a row header region and a column header region,
each row has a height and a row header in the row header region, and
each column has a width and a column header in the column header region;
detecting a first contact and a second contact on the touch-sensitive surface;
detecting a gesture on the touch-sensitive surface, wherein the gesture includes movement of one or more of the first contact and the second contact on the touch-sensitive surface; and
in response to detecting the gesture:
when the detected gesture is a pinch gesture, that includes a decrease in a distance between the first contact and the second contact on the touch-sensitive surface, at a location on the touch-sensitive surface that corresponds to one or more respective columns in the table that are at least partially between the first contact and the second contact and has a component that is perpendicular to the one or more respective columns, decreasing the width of the one or more respective columns in the table that are at least partially between the first contact and the second contact while maintaining a width of one or more other columns in the table that are not between the first contact and the second contact and are concurrently displayed on the display with the one or more respective columns; and
when the detected gesture is a de-pinch gesture, that includes an increase in a distance between the first contact and the second contact on the touch-sensitive surface, at a location on the touch-sensitive surface that corresponds to one or more respective columns in the table that are at least partially between the first contact and the second contact and has a component that is perpendicular to the one or more respective columns, increasing the width of the one or more respective columns in the table that are at least partially between the first contact and the second contact while maintaining a width of one or more other columns in the table that are not between the first contact and the second contact and are concurrently displayed on the display with the one or more respective columns.

2. The device of claim 1, wherein:
the first contact and the second contact are detected at a location on the touch-sensitive surface that corresponds to a respective cell of the table; and,
the device includes instructions for, in response to detecting the gesture:
adjusting a width of a respective column associated with the cell in accordance with a component of the gesture that is perpendicular to the column associated with the cell while maintaining a width of one or more other columns in the table that are concurrently displayed on the display with the respective column; and,
adjusting a height of a respective row associated with the cell in accordance a component of the gesture that is perpendicular to the row associated with the cell while maintaining a height of one or more other rows in the table that are concurrently displayed on the display with the respective row.

3. The device of claim 1, including instructions for:
detecting a third contact, wherein:
the first contact, the second contact and the third contact are detected at a location on the touch-sensitive surface that corresponds to a respective cell of the table; and,
the gesture includes movement of one or more of the first contact, the second contact and the third contact; and,
in response to detecting the gesture:
adjusting a width of a respective column associated with the cell in accordance with a component of the gesture that is perpendicular to the column associated with the cell while maintaining a width of one or more other columns in the table that are concurrently displayed on the display with the respective column; and,
adjusting a height of a respective row associated with the cell in accordance a component of the gesture that is perpendicular to the row associated with the cell while maintaining a height of one or more other rows in the table that are concurrently displayed on the display with the respective row.

4. The device of claim 1, wherein the width of the one or more respective columns is increased or decreased in response to the gesture only when the first contact and the second contact are detected at a location on the touch-sensitive surface that corresponds to a header region of the table.

5. The device of claim 1, including instructions for, when the first contact is at a location on the touch-sensitive surface that corresponds to a first column header and the second contact is at a location on the touch-sensitive surface that corresponds to a second column header that is distinct from the first column header, adjusting the width of a plurality of the columns in the table in accordance with the gesture, wherein the plurality of columns includes at least the column associated with the first column header and the column associated with the second column header.

6. The device of claim 1, including instructions for, in response to detecting the gesture:
when the detected gesture is a pinch gesture, that includes a decrease in a distance between the first contact and the second contact on the touch-sensitive surface, at a location on the touch-sensitive surface that corresponds to the row header region, decreasing the height of a corresponding row in the table while maintaining a height of one or more other rows in the table that are concurrently displayed on the display with the corresponding row; and
when the detected gesture is a de-pinch gesture, that includes an increase in a distance between the first contact and the second contact on the touch-sensitive surface, at a location on the touch-sensitive surface that corresponds to the row header region, increasing the height of a corresponding row in the table while maintaining a height of one or more other rows in the table that are concurrently displayed on the display with the corresponding row.

7. The device of claim 6, including instructions for, when the first contact is at a location on the touch-sensitive surface that corresponds to a first row header and the second contact is at a location on the touch-sensitive surface that corresponds to a second row header that is distinct from the first row header, adjusting the height of a plurality of the rows in the table in accordance with the gesture, wherein the plurality of rows includes at least the row associated with the first row header and the row associated with the second row header.

8. A method, comprising:
at an electronic device with a display and a touch-sensitive surface:
displaying a table comprising a plurality of rows, a plurality of columns, and a plurality of header regions, wherein:
the header regions include a row header region and a column header region,
each row has a height and a row header in the row header region, and
each column has a width and a column header in the column header region;
detecting a first contact and a second contact on the touch-sensitive surface;
detecting a gesture on the touch-sensitive surface, wherein the gesture includes movement of one or more of the first contact and the second contact on the touch-sensitive surface; and
in response to detecting the gesture:
when the detected gesture is a pinch gesture, that includes a decrease in a distance between the first contact and the second contact on the touch-sensitive surface, at a location on the touch-sensitive surface that corresponds to one or more respective columns in the table that are at least partially between the first contact and the second contact and has a component that is perpendicular to the one or more respective columns, decreasing the width of the one or more respective columns in the table that are at least partially between the first contact and the second contact while maintaining a width of one or more other columns in the table that are not between the first contact and the second contact and are concurrently displayed on the display with the one or more respective columns; and
when the detected gesture is a de-pinch gesture, that includes an increase in a distance between the first contact and the second contact on the touch-sensitive surface, at a location on the touch-sensitive surface that corresponds to one or more respective columns in the table that are at least partially between the first contact and the second contact and has a component that is perpendicular to the one or more respective columns, increasing the width of the one or more respective columns in the table that are at least partially between the first contact and the second contact while maintaining a width of one or more other columns in the table that are not between the first contact and the second contact and are concurrently displayed on the display with the one or more respective columns.

9. The method of claim 8, wherein:
the first contact and the second contact are detected at a location on the touch-sensitive surface that corresponds to a respective cell of the table; and,
the method includes, in response to detecting the gesture:
adjusting a width of a respective column associated with the cell in accordance with a component of the gesture that is perpendicular to the column associated with the cell while maintaining a width of one or more other columns in the table that are concurrently displayed on the display with the respective column; and,
adjusting a height of a respective row associated with the cell in accordance a component of the gesture that is perpendicular to the row associated with the cell while maintaining a height of one or more other rows in the table that are concurrently displayed on the display with the respective row.

10. The method of claim 8, including:
detecting a third contact, wherein:
the first contact, the second contact and the third contact are detected at a location on the touch-sensitive surface that corresponds to a respective cell of the table; and,
the gesture includes movement of one or more of the first contact, the second contact and the third contact; and,
in response to detecting the gesture:
adjusting a width of a respective column associated with the cell in accordance with a component of the gesture that is perpendicular to the column associated with the cell while maintaining a width of one or more other columns in the table that are concurrently displayed on the display with the respective column; and,
adjusting a height of a respective row associated with the cell in accordance a component of the gesture that is perpendicular to the row associated with the cell while maintaining a height of one or more other rows in the table that are concurrently displayed on the display with the respective row.

11. The method of claim 8, wherein the width of the one or more respective columns is increased or decreased in response to the gesture only when the first contact and the second contact are detected at a location on the touch-sensitive surface that corresponds to a header region of the table.

12. The method of claim 8, including, when the first contact is at a location on the touch-sensitive surface that corresponds to a first column header and the second contact is at a location on the touch-sensitive surface that corresponds to a second column header that is distinct from the first column header, adjusting the width of a plurality of the columns in the table in accordance with the gesture, wherein the plurality of columns includes at least the column associated with the first column header and the column associated with the second column header.

13. The method of claim 8, including, in response to detecting the gesture:
when the detected gesture is a pinch gesture, that includes a decrease in a distance between the first contact and the second contact on the touch-sensitive surface, at a location on the touch-sensitive surface that corresponds to the row header region, decreasing the height of a corresponding row in the table while maintaining a height of one or more other rows in the table that are concurrently displayed on the display with the corresponding row; and
when the detected gesture is a de-pinch gesture, that includes an increase in a distance between the first contact and the second contact on the touch-sensitive surface, at a location on the touch-sensitive surface that corresponds to the row header region, increasing the height of a corresponding row in the table while maintaining a height of one or more other rows in the table that are concurrently displayed on the display with the corresponding row.

14. The method of claim 13, including, when the first contact is at a location on the touch-sensitive surface that corresponds to a first row header and the second contact is at a location on the touch-sensitive surface that corresponds to a second row header that is distinct from the first row header, adjusting the height of a plurality of the rows in the table in accordance with the gesture, wherein the plurality of rows includes at least the row associated with the first row header and the row associated with the second row header.

15. A non-transitory computer readable storage medium storing one or more programs, the one or more programs comprising instructions, which when executed by an electronic device with a display and a touch-sensitive surface, cause the device to:
  display a table comprising a plurality of rows, a plurality of columns, and a plurality of header regions, wherein:
    the header regions include a row header region and a column header region,
    each row has a height and a row header in the row header region, and
    each column has a width and a column header in the column header region;
  detect a first contact and a second contact on the touch-sensitive surface;
  detect a gesture on the touch-sensitive surface, wherein the two-contact gesture includes movement of one or more of the first contact and the second contact on the touch-sensitive surface; and
  in response to detecting the gesture:
    when the detected gesture is a pinch gesture, that includes a decrease in a distance between the first contact and the second contact on the touch-sensitive surface, at a location on the touch-sensitive surface that corresponds to one or more respective columns in the table that are at least partially between the first contact and the second contact and has a component that is perpendicular to the one or more respective columns, decrease the width of the one or more respective columns in the table that are at least partially between the first contact and the second contact while maintaining a width of one or more other columns in the table that are not between the first contact and the second contact and are concurrently displayed on the display with the one or more respective columns; and
    when the detected gesture is a de-pinch gesture, that includes an increase in a distance between the first contact and the second contact on the touch-sensitive surface, at a location on the touch-sensitive surface that corresponds to one or more respective columns in the table that are at least partially between the first contact and the second contact and has a component that is perpendicular to the one or more respective columns, increase the width of the one or more respective columns in the table that are at least partially between the first contact and the second contact while maintaining a width of one or more other columns in the table that are not between the first contact and the second contact and are concurrently displayed on the display with the one or more respective columns.

16. The non-transitory computer readable storage medium of claim 15, wherein:
  the first contact and the second contact are detected at a location on the touch-sensitive surface that corresponds to a respective cell of the table; and,
  the computer readable storage medium includes instructions to, in response to detecting the gesture:
    adjust a width of a respective column associated with the cell in accordance with a component of the gesture that is perpendicular to the column associated with the cell while maintaining a width of one or more other columns in the table that are concurrently displayed on the display with the respective column; and,
    adjust a height of a respective row associated with the cell in accordance a component of the gesture that is perpendicular to the row associated with the cell while maintaining a height of one or more other rows in the table that are concurrently displayed on the display with the respective row.

17. The non-transitory computer readable storage medium of claim 15, wherein the computer readable storage medium includes instructions to:
  detect a third contact, wherein:
    the first contact, the second contact and the third contact are detected at a location on the touch-sensitive surface that corresponds to a respective cell of the table; and,
    the gesture includes movement of one or more of the first contact, the second contact and the third contact; and,
  in response to detecting the gesture:
    adjust a width of a respective column associated with the cell in accordance with a component of the gesture that is perpendicular to the column associated with the cell while maintaining a width of one or more other columns in the table that are concurrently displayed on the display with the respective column; and,
    adjust a height of a respective row associated with the cell in accordance a component of the gesture that is perpendicular to the row associated with the cell while maintaining a height of one or more other rows in the table that are concurrently displayed on the display with the respective row.

18. The non-transitory computer readable storage medium of claim 15, wherein the width of the one or more respective columns is increased or decreased in response to the gesture only when the first contact and the second contact are detected at a location on the touch-sensitive surface that corresponds to a header region of the table.

19. The non-transitory computer readable storage medium of claim 15, including instructions to, when the first contact is at a location on the touch-sensitive surface that corresponds to a first column header and the second contact is at a location on the touch-sensitive surface that corresponds to a second column header that is distinct from the first column header, adjust the width of a plurality of the columns in the table in accordance with the gesture, wherein the plurality of columns includes at least the column associated with the first column header and the column associated with the second column header.

20. The non-transitory computer readable storage medium of claim 15, including instructions to, in response to detecting the gesture:
  when the detected gesture is a pinch gesture, that includes a decrease in a distance between the first contact and the second contact on the touch-sensitive surface, at a location on the touch-sensitive surface that corresponds to the row header region, decrease the height of a corresponding row in the table while maintaining a height of one or more other rows in the table that are concurrently displayed on the display with the corresponding row; and
  when the detected gesture is a de-pinch gesture, that includes an increase in a distance between the first contact and the second contact on the touch-sensitive surface, at a location on the touch-sensitive surface that corresponds to the row header region, increase the height of a corresponding row in the table while maintaining a height of one or more other rows in the table that are concurrently displayed on the display with the corresponding row.

21. The non-transitory computer readable storage medium of claim 20, including instructions to, when the first contact is at a location on the touch-sensitive surface that corresponds to a first row header and the second contact is at a location on the touch-sensitive surface that corresponds to a second row header that is distinct from the first row header, adjust the height of a plurality of the rows in the table in accordance with the gesture, wherein the plurality of rows includes at least the row associated with the first row header and the row associated with the second row header.

22. An electronic device, comprising:
a display and a touch-sensitive surface;
one or more processors;
memory; and
one or more programs, wherein the one or more programs are stored in the memory and configured to be executed by the one or more processors, the one or more programs including instructions for:
displaying a table comprising a plurality of rows, a plurality of columns, and a plurality of header regions, wherein:
the header regions include a row header region and a column header region,
each row has a height and a row header in the row header region, and
each column has a width and a column header in the column header region;
detecting a first contact and a second contact on the touch-sensitive surface;
detecting a gesture on the touch-sensitive surface, wherein the gesture includes movement of one or more of the first contact and the second contact on the touch-sensitive surface; and
in response to detecting the gesture:
when the detected gesture is a pinch gesture, that includes a decrease in a distance between the first contact and the second contact on the touch-sensitive surface, at a location on the touch-sensitive surface that corresponds to two or more respective columns in the table that are at least partially between the first contact and the second contact and has a component that is perpendicular to the two or more respective columns, decreasing the width of the two or more respective columns in the table that are at least partially between the first contact and the second contact while maintaining a width of one or more other columns in the table that are not between the first contact and the second contact and are concurrently displayed on the display with the two or more respective columns; and
when the detected gesture is a de-pinch gesture, that includes an increase in a distance between the first contact and the second contact on the touch-sensitive surface, at a location on the touch-sensitive surface that corresponds to two or more respective columns in the table that are at least partially between the first contact and the second contact and has a component that is perpendicular to the two or more respective columns, increasing the width of the two or more respective columns in the table that are at least partially between the first contact and the second contact while maintaining a width of one or more other columns in the table that are not between the first contact and the second contact and are concurrently displayed on the display with the two or more respective columns.

* * * * *